United States Patent [19]
Nishimura et al.

[11] Patent Number: 6,125,083
[45] Date of Patent: Sep. 26, 2000

[54] MAGNETO-OPTICAL RECORDING METHOD AND MEDIUM COMPRISING THREE LAYERS, WHOSE MIDDLE LAYER HAS A LOWER CURIE TEMPERATURE THAN THE OTHER LAYERS

[75] Inventors: Naoki Nishimura, Tokyo; Tomoyuki Hiroki, Zama; Takeshi Okada, Tokyo, all of Japan

[73] Assignee: Canon Kabushiki Kaisha, Tokyo, Japan

[21] Appl. No.: 08/982,454

[22] Filed: Dec. 2, 1997

Related U.S. Application Data

[63] Continuation of application No. 08/487,706, Jun. 7, 1995, abandoned.

[30] Foreign Application Priority Data

| Jun. 10, 1994 | [JP] | Japan | 6-128778 |
| Jun. 10, 1994 | [JP] | Japan | 6-128779 |
| Jun. 10, 1994 | [JP] | Japan | 6-128780 |
| Aug. 26, 1994 | [JP] | Japan | 6-201979 |
| Aug. 26, 1994 | [JP] | Japan | 6-201980 |
| Sep. 30, 1994 | [JP] | Japan | 6-236209 |
| Oct. 24, 1994 | [JP] | Japan | 6-258002 |

[51] Int. Cl.$^7$ .................................................. G11B 11/00
[52] U.S. Cl. ............................................................. 369/13
[58] Field of Search ................................ 369/13, 110, 14, 369/283, 116, 275.2; 360/59, 114; 365/122; 428/694 ML, 694 MM, 694 EC

[56] References Cited

U.S. PATENT DOCUMENTS

| 5,168,482 | 12/1992 | Aratani et al. | 369/13 |
| 5,208,799 | 5/1993 | Nakao et al. | 369/110 |
| 5,239,524 | 8/1993 | Sato et al. | 369/13 |
| 5,241,520 | 8/1993 | Ohta et al. | 369/13 |
| 5,367,507 | 11/1994 | Sato et al. | 369/13 |

FOREIGN PATENT DOCUMENTS

| 0498461 | 8/1992 | European Pat. Off. . |
| 0536780 | 4/1993 | European Pat. Off. . |
| 0583720 | 2/1994 | European Pat. Off. . |
| 0586175 | 3/1994 | European Pat. Off. . |
| 62-175948 | 8/1987 | Japan . |
| 62-175945 | 9/1987 | Japan . |
| 393056 | 4/1991 | Japan . |
| 393058 | 4/1991 | Japan . |
| 4-255946 | 9/1992 | Japan . |
| 4-255947 | 9/1992 | Japan . |
| 4-271039 | 9/1992 | Japan . |
| 6-124500 | 5/1994 | Japan . |
| 6-180874 | 6/1994 | Japan . |
| 94-16017 | 7/1994 | Rep. of Korea . |

OTHER PUBLICATIONS

Kaneko, M., et al., "IRISTER—Magneto–Optical Disk for Magnetically Induced SuperResolution," Proc. IEEE, vol. 32, No. 4, Apr. 1994, pp. 544–552.

Kaneko, M., et al., "Multilayered Magneto–Optical Disks for Magnetically Induced Superresolution," Jpn. J. Appl. Phys., Part 1(31) No. 2, Feb. 22, pp. 568–575.

Patent Abstract of Japan, vol. 17, No. 36, published Jan. 22, 1993, English Abstract of Japanese Patent No. 4–255946.

*Primary Examiner*—Ali Neyzari
*Attorney, Agent, or Firm*—Fitzpatrick, Cella, Harper & Scinto

[57] ABSTRACT

In a magneto-optical recording medium, a first magnetic layer for participating in reproduction of information is laminated on a substrate. A second magnetic layer for storing information is laminated on the first magnetic layer. A third magnetic layer having a Curie temperature lower than those of the first and second magnetic layers is disposed between the first magnetic layer and the second magnetic layer. A magnetization of a region of the first magnetic layer adjacent to a region of the third magnetic layer the temperature of which is above the Curie temperature of the third magnetic layer is aligned with the direction of magnetization of a region around the region of the first magnetic layer.

34 Claims, 52 Drawing Sheets

DISC TRAVELING DIRECTION
TEMPERATURE DISTRIBUTION
IN TRACK CENTER

DISC TRAVELING DIRECTION
TEMPERATURE DISTRIBUTION
IN TRACK CENTER

DISC TRAVELING DIRECTION
TEMPERATURE DISTRIBUTION IN TRACK CENTER

DISC TRAVELING DIRECTION
TEMPERATURE DISTRIBUTION IN TRACK CENTER

FIG. 14
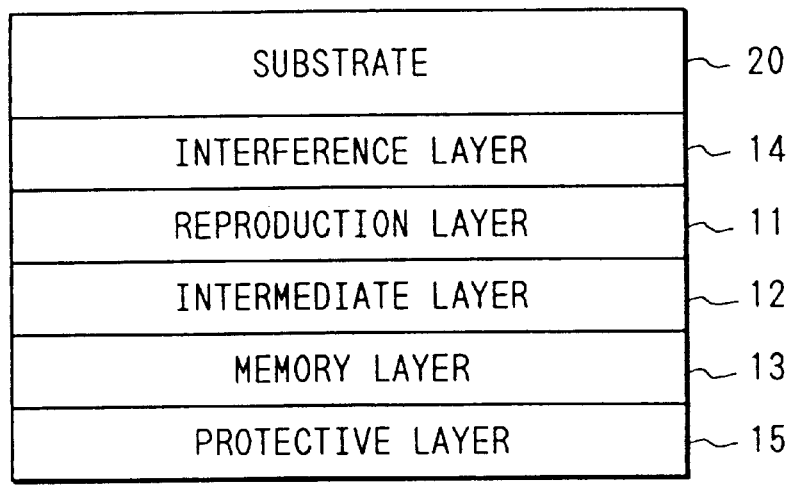
FIG. 15A          FIG. 15B
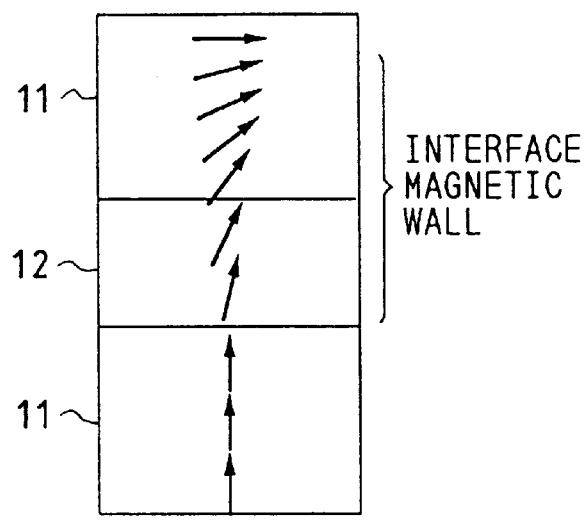
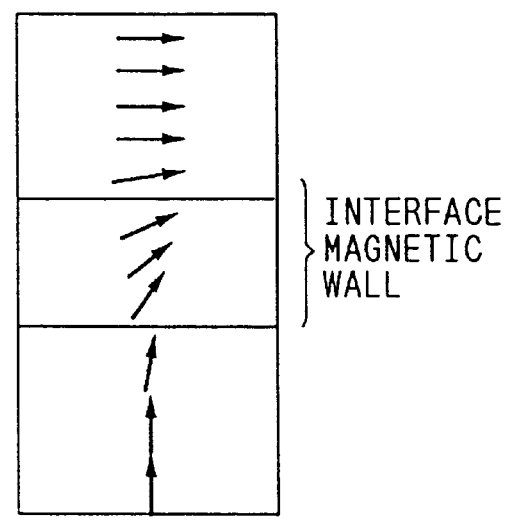

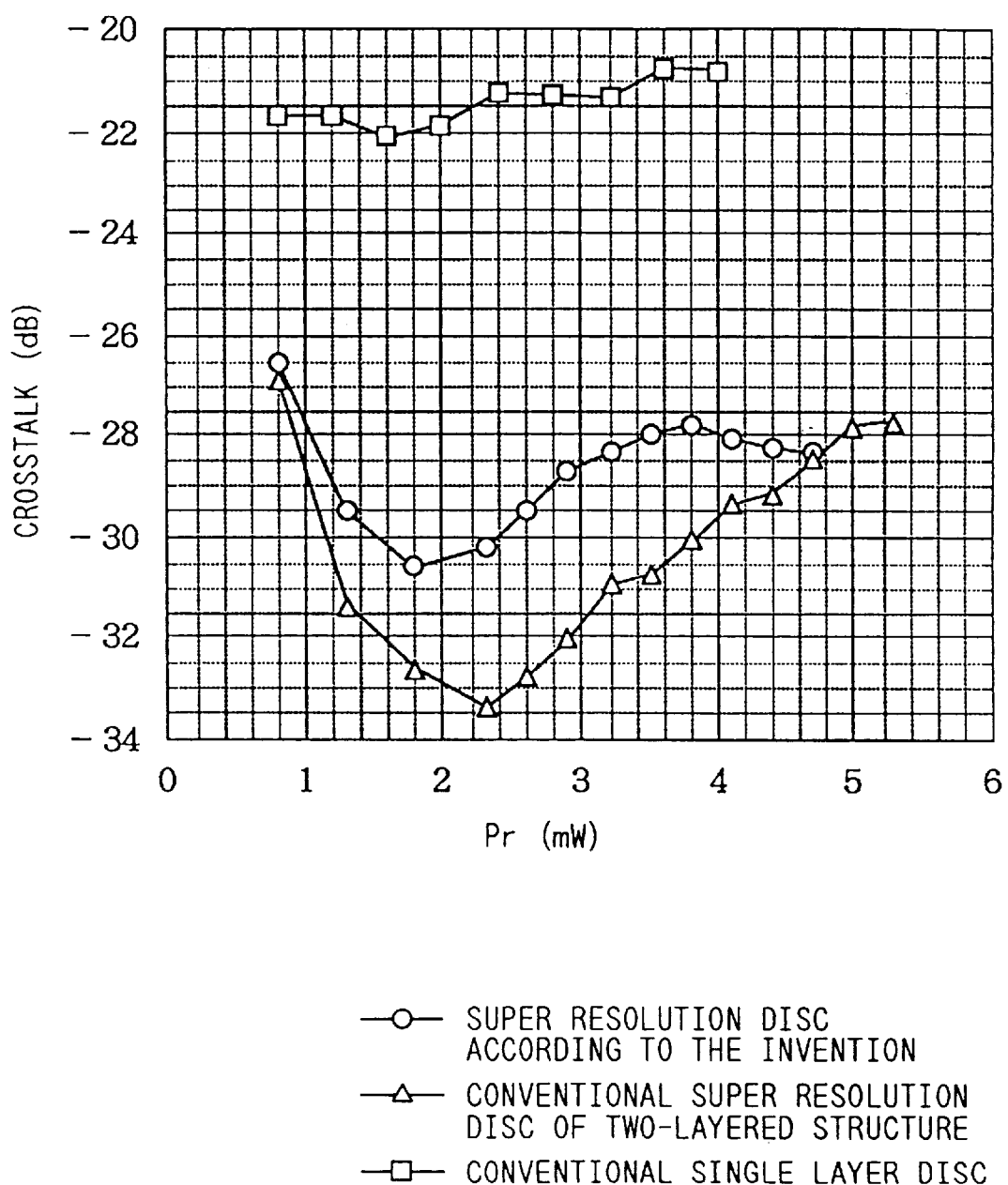

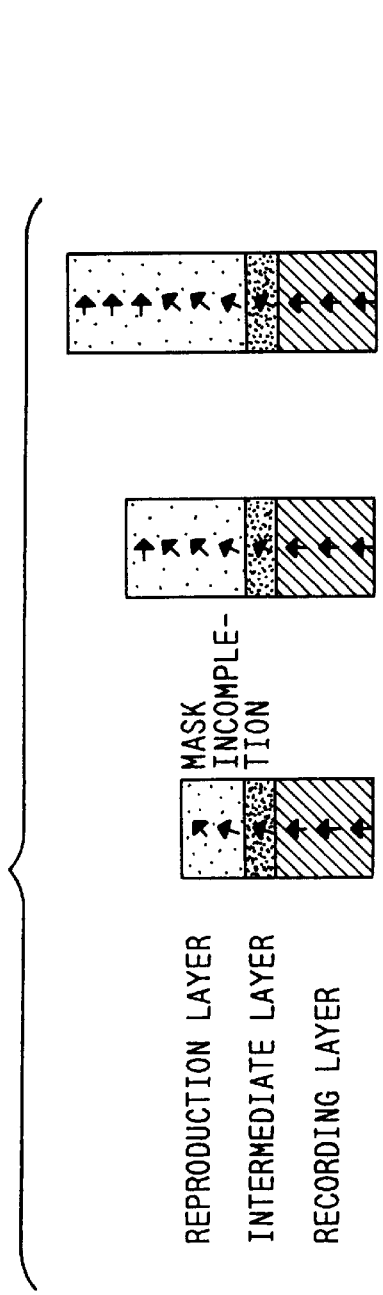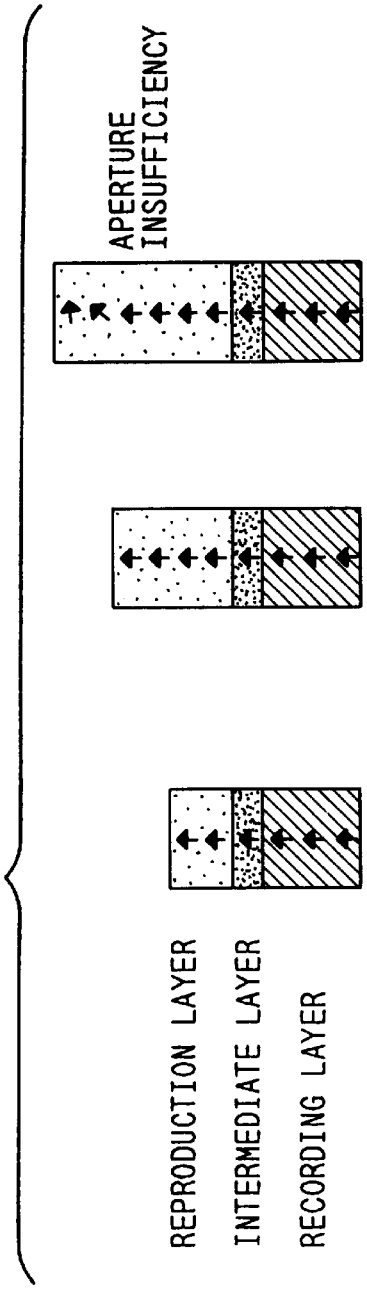

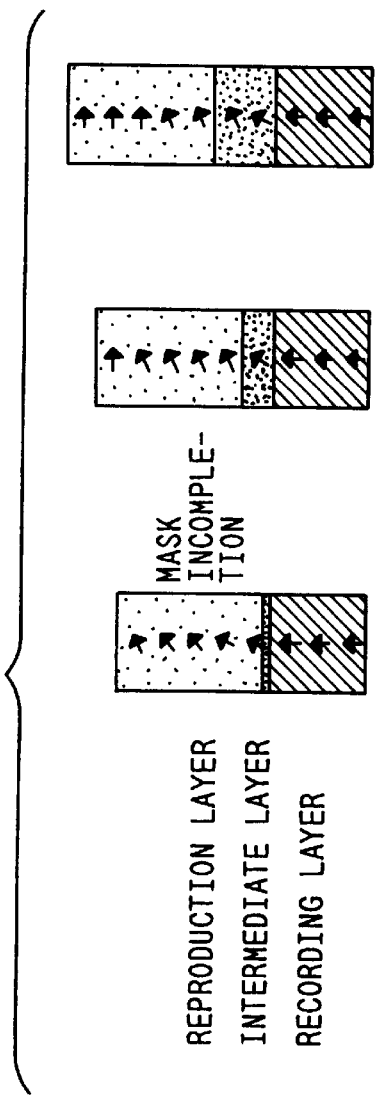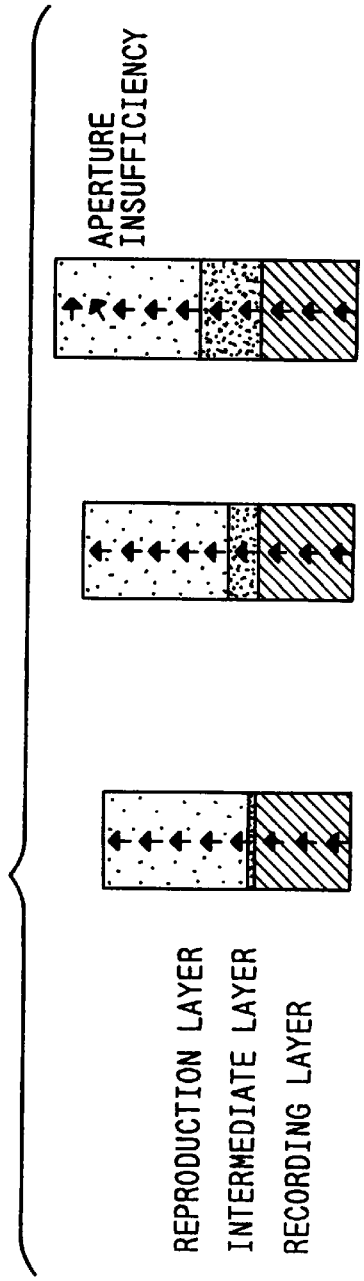

FILM THICKNESS OF RECORDING LAYER = 30nm

FILM THICKNESS OF INTERMEDIATE LAYER = 10nm

MARK LENGTH = 0.78μm

2400rpm, R36

LINEAR VELOCITY = 9m/s

FILM THICKNESS OF REPRODUCTION LAYER = 40nm

FILM THICKNESS OF RECORDING LAYER = 30nm

MARK LENGTH = 0.78μm

2400rpm, R36

LINEAR VELOCITY = 9m/s

CARRIER
- ─○─ SUPER RESOLUTION DISC ACCORDING TO THE INVENTION
- ─△─ CONVENTIONAL SUPER RESOLUTION DISC OF TWO-LAYERED STRUCTURE
- ─□─ CONVENTIONAL DISC OF SINGLE LAYER FILM

NOISE
- ─●─ SUPER RESOLUTION DISC ACCORDING TO THE INVENTION
- ─▲─ CONVENTIONAL SUPER RESOLUTION DISC OF TWO-LAYERED STRUCTURE
- ─■─ CONVENTIONAL DISC OF SINGLE LAYER FILM

—○— SUPER RESOLUTION DISC
ACCORDING TO THE INVENTION

—△— CONVENTIONAL SUPER RESOLUTION
DISC OF TWO-LAYERED STRUCTURE

—□— CONVENTIONAL DISC
OF SINGLE LAYER FILM

LINEAR VELOCITY = 9.05m/s
REPRODUCING POWER = 3.5mW

CARRIER

—○— SUPER RESOLUTION DISC ACCORDING TO THE INVENTION

—△— CONVENTIONAL SUPER RESOLUTION DISC OF TWO-LAYERED STRUCTURE

—□— CONVENTIONAL DISC OF SINGLE LAYER FILM

NOISE

—●— SUPER RESOLUTION DISC ACCORDING TO THE INVENTION

—▲— CONVENTIONAL SUPER RESOLUTION DISC OF TWO-LAYERED STRUCTURE

—■— CONVENTIONAL DISC OF SINGLE LAYER FILM

—○— SUPER RESOLUTION DISC
       ACCORDING TO THE INVENTION
—△— CONVENTIONAL SUPER RESOLUTION
       DISC OF TWO-LAYERED STRUCTURE
—□— CONVENTIONAL DISC
       OF SINGLE LAYER FILM

LINEAR VELOCITY = 9.05m/s
REPRODUCING POWER = 3.5mW

—○— SUPER RESOLUTION DISC ACCORDING TO THE INVENTION
—△— CONVENTIONAL SUPER RESOLUTION DISC OF TWO-LAYERED STRUCTURE
—□— CONVENTIONAL SINGLE LAYER DISC

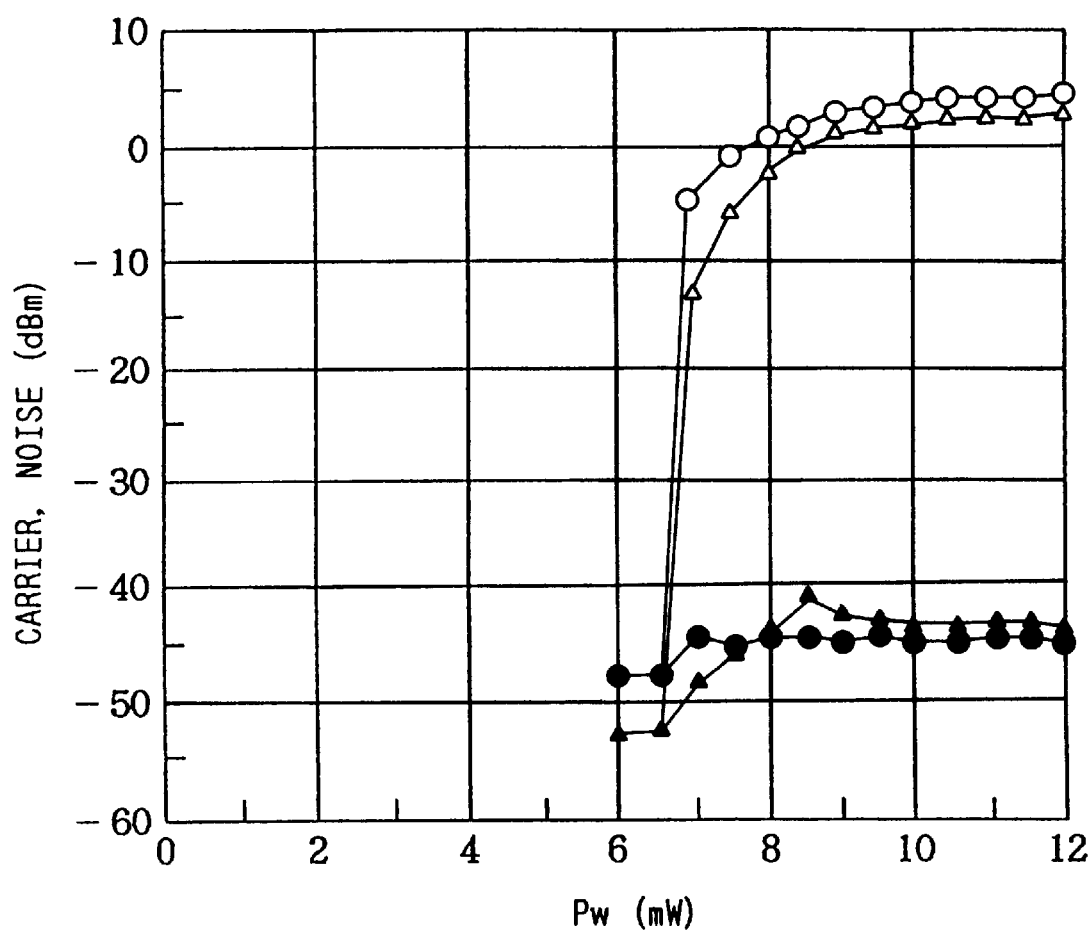

MAGNETO-OPTICAL RECORDING METHOD AND MEDIUM COMPRISING THREE LAYERS, WHOSE MIDDLE LAYER HAS A LOWER CURIE TEMPERATURE THAN THE OTHER LAYERS

This application is a continuation of Appln. Ser. No. 08/487,706, filed Jun. 7, 1995, now abandoned.

BACKGROUND OF THE INVENTION

1. Field of the Invention

The present invention relates to a magneto-optical recording medium, wherein information is recorded and reproduced using a laser beam, and more specifically, to a magneto-optical recording medium and a magneto-optical reproducing method, which are capable of realizing high-density recording and super-resolution reproduction.

2. Related Background Art

As a high-density recording system which is rewritable, a magneto-optical recording system has been receiving a lot of attention, wherein information is recorded by writing magnetic domains in a magnetic thin film using the thermal energy of a semiconductor laser beam, and the recorded information is read out using a magneto-optical effect. In recent years, the demand has been increasing to enhance the recording density of this magneto-optical recording medium for further increasing its storage volume.

The line recording density of an optical disc, such as, a magneto-optical recording medium, largely depends on a laser beam wavelength 1 in the reproducing optical system and the numerical aperture, N.A., of an objective lens. Specifically, since the diameter of a beam is determined when the reproducing light wavelength and the objective lens aperture number are determined, the shortest mark length which can be reproduced is limited to about $\lambda/2$ N.A.

On the other hand, the track density is mainly limited by crosstalk between adjacent tracks and depends on the diameter of the reproducing beam spot like the shortest mark length.

Accordingly, in order to realize higher-density recording with a conventional optical disc, it is necessary to shorten the laser beam wavelength in the reproducing optical system or increase the numerical aperture, N.A., of the objective lens. However, it is not easy to shorten the laser beam wavelength due to a drop in the efficiency of the element, generation of heat, and the like. On the other hand, when increasing the numerical aperture of the objective lens, the processing of the lens becomes difficult, and further, the distance between the lens and the disc becomes so short that a mechanical problem, such as, collision with the disc, occurs. In view of this, techniques have been developed to improve the structure of the recording medium and the information reading method so as to increase the recording density.

For example, in a magneto-optical reproducing method as disclosed in Japanese Patent Application Laid-open No. 3-93056, a medium structure as shown in FIGS. 1A to 1C has been proposed. FIG. 1A is a sectional view of an optical disc as an example of the super-resolution technique. A substrate 20 is normally formed of a transparent material, such as, glass or polycarbonate. On the substrate 20, an interference layer 34, a reproduction layer 31, an intermediate layer 32, a memory layer 33 and a protective layer 35 are laminated in the order named. An interference layer 34 is provided for enhancing the Kerr effect, and the protective layer 35 is provided for protecting the magnetic layers. Arrows in the magnetic layers each represent the direction of magnetization or atomic magnetic moment in the magnetic film. A light spot irradiates the medium having the reproduction layer, the intermediate layer and the memory layer to form a temperature distribution on the medium. In the temperature distribution, magnetic coupling between the reproduction layer and the memory layer at a high-temperature region is cut off by the intermediate layer having a low Curie temperature, and magnetization of the reproduction layer at the portion where the magnetic coupling was cut off, is aligned in one direction by an external magnetic field, so as to mask a portion of magnetic-domain information of the memory layer within the light spot. In this manner, a signal having a period equal to or smaller than the diffraction limit of light can be reproduced so as to improve the line recording density.

On the other hand, in super-resolution producing methods as disclosed in Japanese Patent Application Laid-open Nos. 3-93058 and 4-255946, a medium formed of a reproduction layer 31, an intermediate layer 32, and a memory layer 33 is used as shown in FIGS. 2A to 2C. Prior to reproducing information, magnetization of the reproduction layer 31 is aligned in one direction by an initializing magnetic field 21 so as to mask magnetic-domain information of the memory layer 33. Thereafter, a light spot 2 irradiates the medium to form a temperature distribution on the medium. In the temperature distribution, the initialized state of the reproduction layer 31 is held in a low-temperature region to form a front mask 4. On the other hand, in a high-temperature region where the temperature is equal to or higher than a Curie temperature Tc2 of the intermediate layer 32, magnetization of the reproduction layer 31 is forcibly oriented in a direction of the reproducing magnetic field 22 so as to form a rear mask 5. Only in a medium-temperature region, is the magnetic-domain information of the memory layer 33 transferred so as to reduce the effective size of the reproducing light spot. By this arrangement, a recorded mark 1 equal to or smaller than the diffraction limit of light can be reproduced so as to improve the line recording density.

On the other hand, in Japanese Patent Application Laid-open No. 6-124500, a magneto-optical recording medium structure has been proposed, as shown in FIGS. 3A to 3C, for providing a super-resolution technique to realize a recording density exceeding the optical resolution of the reproduced signal.

FIG. 3A is a sectional view of an optical disc as an example of the super-resolution technique. Arrows in the magnetic films each represent a direction of the iron family element sublattice magnetization in the film.

The memory layer 42 is a film formed of a material, such as, TbFeCo, DyFeCo or the like, having a large perpendicular magnetic anisotropy. Information is held in the memory layer 42 in the form of magnetic domains, which are directed upward or downward relative to a film surface. The reproduction layer 41 is an in-plane magnetization film at room temperature and becomes a perpendicular magnetization film when increased in temperature to Tl-mask.

When information reproducing light irradiates the disc having the foregoing medium structure from a side of the substrate 20, a temperature gradient at the center of the data track becomes as shown in FIG. 3C. When viewing this from the side of the substrate 20, an isotherm of Tl-mask exists in the light spot as shown in FIG. 3B. As described above, since the reproduction layer 41 is an in-plane magnetization film at a temperature lower than Tl-mask, it does not contribute to the Kerr effect (forming the front mask 4) at that portion so that the recorded magnetic domain held in the memory 42 is masked by the front mask 4. On the other hand, at a portion where a temperature is no less than Tl-mask, the reproduction layer 41 becomes a perpendicular magnetization film, and further, the direction of the magnetization becomes the same as the recorded information due to the exchange-coupling force from the memory layer 42. As a result, the recorded magnetic domain of the memory layer 42 is transferred only to an aperture portion 3, which is smaller than the size of the spot 2 so that super resolution is realized.

In the foregoing known super-resolution techniques, since the front mask 4 at the low-temperature region extends toward the adjacent tracks, those techniques aim to also improve the track density along with the line recording density.

However, in the method disclosed in Japanese Patent Application Laid-open No. 3-93056, although the resolution can be enhanced without reducing signal equality, it is necessary to apply the reproducing magnetic field. Further, in the methods disclosed in Japanese Patent Application Laid-opens Nos. 3-93058 and 4-255946 it is necessary to align the magnetization of the reproduction layer 31 in one direction prior to reproducing information so that an initializing magnet 21 for that purpose should be added to the conventional device. Further, in the super-resolution reproducing method disclosed in Japanese Patent Application Laid-open No. 6-124500, since only the front mask 4 is used, when expanding the mask region for enhancing the resolution, the position of the aperture 3 deviates from the center of the spot causing a deterioration in signal equality.

As described above, the conventional super-resolution reproducing methods include problems such that the resolution can not be increased to a sufficient level, the magneto-optical recording/reproduction apparatus is complicated in structure and is expensive and it is difficult to reduce the size thereof.

SUMMARY OF THE INVENTION

The present invention has been made to solve the above-mentioned problems, and has as its object to provide a magneto-optical recording medium and a magneto-optical information reproducing method using the medium, which can reproduce a recorded mark equal to or smaller than the diffraction limit of light in high signal equality with a simple structure which does not require either an initializing magnetic field or a reproducing magnetic field upon reproduction.

In order to achieve the above object, there is provided a magneto-optical recording medium comprising:
  a substrate;
  a first magnetic layer laminated on the substrate for reproducing information;
  a second magnetic layer laminated on the first magnetic layer for storing the information; and
  a third magnetic layer disposed between the first and second magnetic layers and having a Curie temperature lower than Curie temperatures of the first and second magnetic layers,
  wherein the direction of magnetization of a region of the first magnetic layer, the region being adjacent to a region of the third magnetic layer having a temperature equal to or higher than the Curie temperature of the third magnetic layer, is oriented in the direction of magnetization around the region of the first magnetic layer.

In order to achieve the above object, there is also provided an information reproducing method for reproducing information stored in a magneto-optical recording medium including:
  a substrate;
  a first magnetic layer laminated on the substrate for reproducing the information;
  a second magnetic layer laminated on the first magnetic layer for storing the information; and
  a third magnetic layer disposed between the first and second magnetic layers and having a Curie temperature lower than Curie temperatures of the first and second magnetic layers,
  wherein the direction of magnetization of a region of the first magnetic layer, the region being adjacent to a region of the third magnetic layer having a temperature equal to or higher than the Curie temperature of the third magnetic layer, is oriented in the direction of magnetization around the region of the first magnetic layer,
  the information reproducing method comprising the steps of:
  irradiating a light spot;
  increasing, in temperature, the third magnetic layer to near its Curie temperature in a high-temperature region within the light spot so as to orient the direction of magnetization, in the high-temperature region, of the first magnetic layer in the direction of magnetization of the first magnetic layer around the high-temperature region;
  transferring the information stored in the second magnetic layer to the first magnetic layer at least at a medium-temperature region within the light spot; and
  reproducing the information by detecting a magneto-optical effect of reflected light of the light spot.

BRIEF DESCRIPTION OF THE DRAWINGS

FIGS. 5A to 5C are diagrams showing one manner of operation of an information reproducing method for the magneto-optical recording medium according to the first embodiment of the present invention, wherein FIG. 5A is a diagram showing a mask region and an aperture region within a light spot on an upper surface of the medium, FIG. 5B is a diagram showing a magnetization direction state of each layer, and FIG. 5C is a diagram showing a temperature distribution in a track direction;

FIGS. 6A to 6C are diagrams showing another manner of operation of the information reproducing method for the magneto-optical recording medium according to the first embodiment of the present invention, wherein FIG. 6A is a diagram showing a mask region and an aperture region within a light spot on an upper surface of the medium, FIG. 6B is a diagram showing a magnetization direction state of each layer, and FIG. 6C is a diagram showing a temperature distribution in a track direction;

FIG. 14 is a diagram showing an example of a layer structure of the magneto-optical recording medium of the present invention;

FIGS. 15A and 15B are diagrams showing an interface magnetic wall;

FIG. 23 is a diagram showing the reproducing power dependency of crosstalk;

FIG. 25A is a diagram showing a mask effect due to the film thickness of the reproduction layer;

FIG. 25B is a diagram showing an aperture effect due to the film thickness of the reproduction layer;

FIG. 26A is a diagram showing a mask effect due to the film thickness of the intermediate layer;

FIG. 26B is a diagram showing an aperture effect due to the film thickness of the intermediate layer;

FIG. 57 is a diagram showing the recording power dependency of a carrier and noise when magnetic field modulation recording is performed relative to the medium of the fourth embodiment;

FIGS. 59A to 59C are diagrams showing one manner of operation of an information reproducing method for the magneto-optical recording medium according to the fifth embodiment of the present invention, wherein FIG. 59A is a diagram showing a mask region and an aperture region within a light spot on an upper surface of the medium, FIG. 59B is a diagram showing the magnetization direction state of each layer, and FIG. 59C is a diagram showing the temperature distribution in a track direction;

FIGS. 60A to 60C are diagrams showing another manner of operation of an information reproducing method for the magneto-optical recording medium according to the fifth embodiment of the present invention, wherein FIG. 60A is a diagram showing a mask region and an aperture region within a light spot on an upper surface of the medium, FIG. 60B is a diagram showing the magnetization direction state of each layer, and FIG. 60C is a diagram showing the temperature distribution in a track direction;

FIGS. 64A to 64C are diagrams showing one manner of operation of an information reproducing method for the magneto-optical recording medium according to the sixth embodiment of the present invention, wherein FIG. 64A is a diagram showing a mask region and an aperture region within a light spot on an upper surface of the medium, FIG. 64B is a diagram showing the magnetization direction state of each layer, and FIG. 64C is a diagram showing the temperature distribution in a track direction;

DETAILED DESCRIPTION OF THE PREFERRED EMBODIMENTS (First Embodiment)

A magneto-optical recording medium according to a first embodiment of the present invention and an information reproducing method using the medium will be described in detail hereinbelow with reference to the accompanying drawings.

Figure 4:
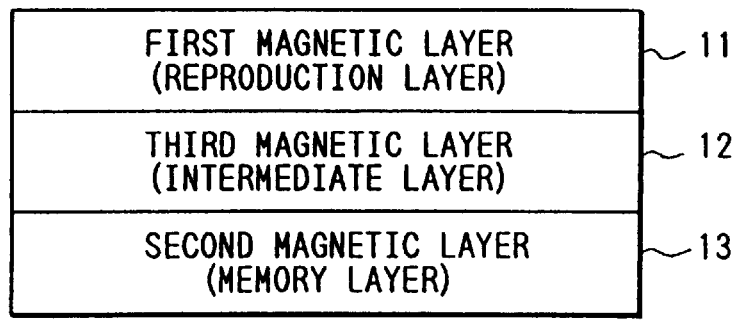
FIG. 4 is a diagram showing a basic layer structure of magnetic layers of a magneto-optical recording medium according to a first embodiment of the present invention.

The magneto-optical recording medium of the present invention has, on a translucent substrate, at least three magnetic layers, that is, a first magnetic layer, a third magnetic layer having a Curie temperature lower than those of the first magnetic layer and a second magnetic layer, and the second magnetic layer being a perpendicular magnetization film, in the order named from a side of the substrate (FIG. 4). Hereinbelow, the first magnetic layer will be referred to as a reproduction layer, the second magnetic layer will be referred to as a memory layer and the third magnetic layer will be referred to as an intermediate layer.

The reproduction layer is a layer for reproducing magnetization information held in the memory layer. The reproduction layer is located closer to a light incident side of the medium as compared with the intermediate layer and the memory layer, and its Curie temperature is set to be higher than those of the intermediate layer and the memory layer for preventing deterioration of a Kerr rotation angle upon reproduction. Further, it is necessary that the coercive force of the reproduction layer is smaller than that of the memory layer. Preferably, the reproduction layer has a small magnetic anisotropy, and a compensation temperature between room temperature and the Curie temperature. Further, the magnetization manner of the reproduction layer is such that the reproduction layer is a perpendicular magnetization film at room temperature and between room temperature and the Curie temperature, or the reproduction layer is an in-plane magnetization film at room temperature and becomes a perpendicular magnetization film between room temperature and the Curie temperature. As a specific material of the reproduction layer, a material, for example, a rare earth-iron family amorphous alloy, such as, GdFeCo, GdTbFeCo, GdDyFeCo, NdGdFeCo or the like, mainly containing GdFeCo, is preferable since it has a high Curie temperature and a low coercive force and easily causes contraction of recorded magnetic domains in a high-temperature region, which is the prime aim of the present medium.

The intermediate layer is provided mainly for partly mediating and partly reducing or cutting off an exchange-coupling force from the memory layer to the reproduction layer. Accordingly, the intermediate layer is located between the reproduction layer and the memory layer and has a Curie temperature which is set to be higher than room temperature and lower than those of the reproduction layer and the memory layer. The Curie temperature of the intermediate layer is set to be high enough to mediate the exchange-coupling force from the memory layer to the reproduction layer at a low-temperature portion and a medium-temperature portion within a light spot, but low enough to cut off the exchange-coupling force at a highest-temperature portion within the light spot, and thus preferably, 80° C. or higher and 220° C. or lower, and more preferably, 110° C or higher and 180° C. or lower. When the reproduction layer has a compensation temperature between room temperature and the Curie temperature, the Curie temperature of the intermediate layer is set to a temperature within a range of, preferably, −100° C. to +50° C. relative to the compensation temperature, and more preferably, −80° C. to +20° C. relative to the compensation temperature. As a material of the intermediate layer, for example, a rare earth-iron family amorphous alloy, such as, TbFe, TbFeCo, GdFe, GdFeCo, GdTbFeCo, GdDyFeCo, DyFe, DyFeCo, TbDyFeCo or the like is preferable. A non-magnetic element, such as, Cr, Al, Si, Cu or the like may be added for lowering the Curie temperature. Further, when masking a low-temperature region by causing the reproduction layer to be an in-plane magnetization film at a low temperature, it is preferable that the in-plane magnetic anisotropy of the intermediate layer at room temperature is greater than that of the reproduction layer at room temperature, for example, the saturation magnetization Ms of the intermediate layer at room temperature is greater than that of the reproduction layer at room temperature, for strengthening the in-plane magnetic anisotropy of the reproduction layer at the low temperature.

The memory layer is a layer for storing recorded information and thus is required to stably hold the magnetic domains. As a material of the memory layer, a material which has a large perpendicular magnetic anisotropy and can stably hold a magnetization state, for example, a rare earth-iron family amorphous alloy, such as, TbFeCo, DyFeCo, TbDyFeCo or the like, garnet, a platinum family-iron family periodic structure film, such as, Pt/Co, Pd/Co or the like, or a platinum family-iron family alloy, such as, PtCo, PdCo or the like is preferable. An element, such as, Al, Ti, Pt, Nb, Cr or the like may be added to the reproduction layer, the intermediate layer and the memory layer for improving their corrosion resistance. For enhancing the interference effect and the protective performance, a dielectric layer formed of $SiN_x$, $AlO_x$, $TaO_x$, $SiO_x$ or the like may be provided in addition to the foregoing reproduction, intermediate and memory layers. Further, for improving thermal conductivity, a layer formed of Al, AlTa, AlTi, TlCr, Cu or the like and having good thermal conductivity may be provided. Further, an initialization layer whose magnetization is aligned in one direction for performing optical modulation overwriting may be provided. Further, auxiliary layers for recording assistance and reproducing assistance may be provided to adjust the exchange-coupling force or the magnetostatic coupling force. Moreover, a protective coat formed of the foregoing dielectric layer or a polymer resin may be added as a protective film.

Now, the recording/reproduction process of the present invention will be described hereinbelow.

First, magnetic domains are formed, according to a data signal, in the memory layer of the magneto-optical recording medium of the present invention. In a first recording method, recording is performed, after once erasing old information, by modulating the power of a laser while a magnetic field is applied in a recording direction. In a second recording method, new information is overwrite-recorded on old information by modulating the power of a laser while an external magnetic field is applied. In these optical modulation recording methods, by determining the intensity of the laser beam in consideration of the linear velocity of the recording medium so as to allow only a given region within the light spot to reach near the Curie temperature of the memory layer, a recorded magnetic domain equal to or smaller than a diameter of the light spot can be formed. As a result, a signal having a period equal to or smaller than the diffraction limit of light can be recorded. On the other hand, in a third recording method, overwrite-recording is performed by modulating an external magnetic field while a laser beam, having sufficient power to cause the temperature of the memory layer to be equal to or higher than its Curie temperature, irradiates the medium. In this case, a magnetic domain equal to or smaller than the diameter of the light spot can be formed by setting the modulation rate to be large depending on the linear velocity. As a result, a signal having a period equal to or smaller than the diffraction limit of light can be recorded.

As is clear from later-described mechanism, in order for the super resolution of the present invention to function stably, it is necessary that magnetization around a recorded mark is oriented in a direction is opposite to that of the mark.

In the first recording method which is the most popular, the laser power is held constant at a high power while a constant magnetic field is applied so as to initialize (erasing operation) magnetization of a track to be subjected to recording, and thereafter, in the state where the direction of the magnetic field is inverted, the laser power is modulated in intensity so as to form a desired recorded mark. At this time, when there is a portion around the recorded mark where the directions of the magnetization are random, noise is caused upon reproduction. For this reason, a region wider than the recorded mark is generally erased for enhancing a quality of a reproduced signal. Accordingly, since the magnetization around the recorded magnetic domains aligns without fail in a direction opposite to that of the magnetic domains, the super resolution of the present invention operates stably in this recording method.

In the second recording method, a medium having a structure as described in Japanese Patent Application Laid-open No. 62-175948 (this medium has a write layer in which magnetization is aligned in one direction prior to recording, in addition to the memory layer for holding the recorded information) is used. Accordingly, an erasing operation in advance of recording is not required. On the other hand, when recording is effected on this medium, the laser intensity is modulated between Ph and Pl (Ph>Pl) depending on information to be recorded, while a constant magnetic field is applied in a direction opposite to that of the write layer. When the medium is increased to a temperature Th corresponding to Ph, since Th is set to be substantially equal to Tc of the write layer, magnetization of the memory layer and the write layer is oriented in the direction of the external magnetic field so as to form the magnetic domain. On the other hand, when the medium is increased only to a temperature Tl corresponding to Pl, the direction of magnetization becomes the same as that of the write layer. This process occurs regardless of the magnetic domain recorded in advance. It is assumed that a laser beam of Ph irradiates onto the medium. In this case, although a portion forming the recorded magnetic domain is increased to Th, the temperature distribution at this time extends two-dimensionally so that, even if the laser intensity is increased to Ph. there always occurs a portion around the magnetic domain where the temperature increases only to Tl. Accordingly, the portion having the opposite magnetization direction exists around the recorded magnetic domain so that the super resolution of the present invention also operates stably in this recording method.

Further, as another recording method, a magnetic field modulation recording can be cited, wherein the direction of the foregoing external magnetic field is changed alternately. In this recording method, magnetic field modulation is performed while a DC laser beam irradiates the medium at a high power. In order to record new information without a history of the magnetic domain recorded before, the width forming the magnetic domain should be always constant. Accordingly, in this case, some measure should be taken, or otherwise, there occurs a region around the recorded magnetic domain where the directions of the magnetization are random so that the super resolution of the present invention does not operate stably. Accordingly, when performing magnetic field modulation recording, it is necessary that the initialization is executed with a power greater than the normal recording power or the initialization of magnetization is performed extensively relative to both lands and grooves, prior to shipping the medium or the first recording.

Now, the reproducing method of the present invention will be described hereinbelow.

Figure 7A:
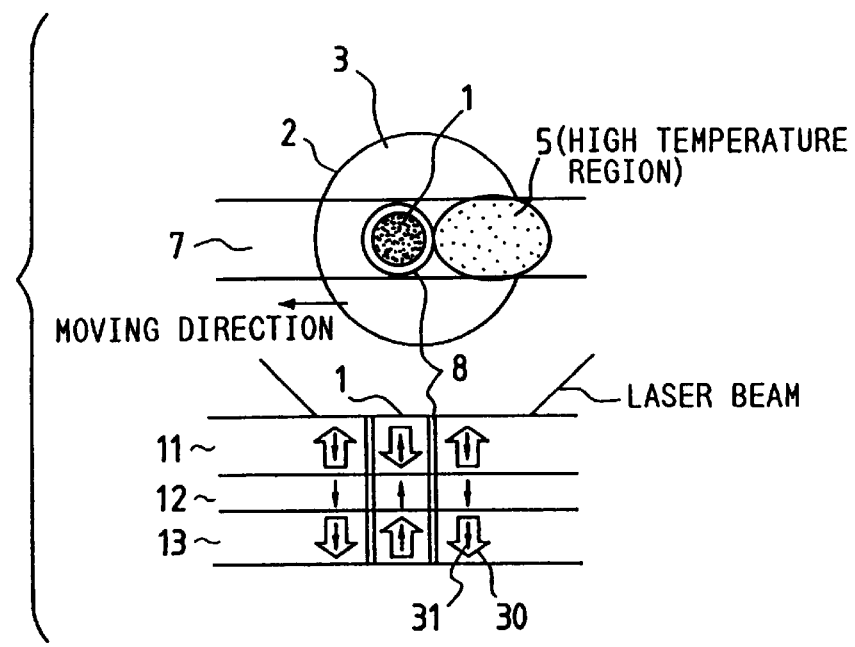
FIGS. 7A to 7C are diagrams for explaining a principle in which a high-temperature region in a light spot is masked in the magneto-optical recording medium according to the first embodiment of the present invention.
Figure 7B:
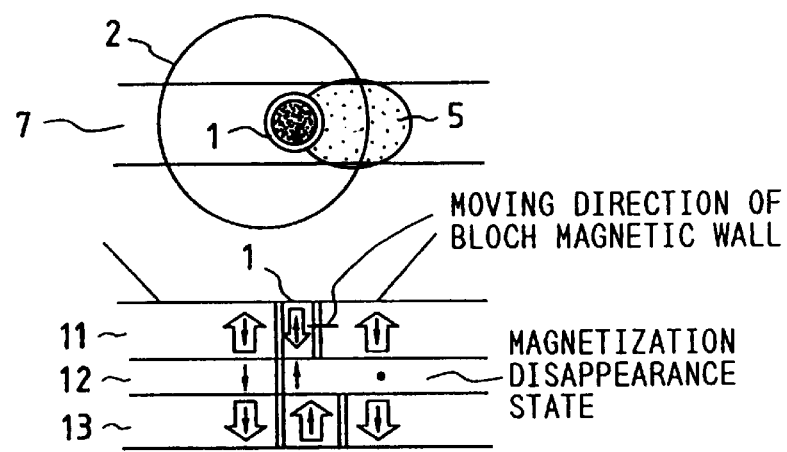
Figure 7C:
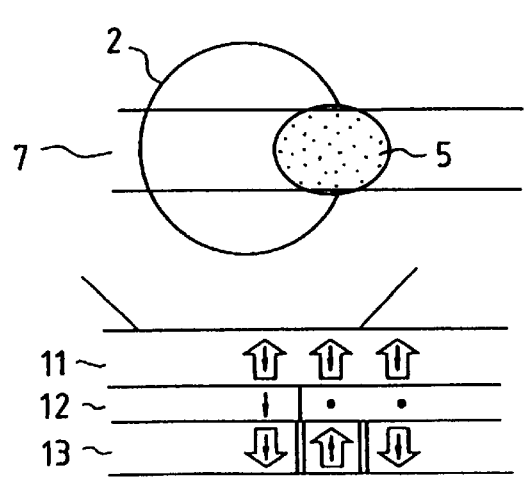

In the present invention, magnetic super resolution is realized by apparently and optically masking a partial region within the light spot without applying an external magnetic field. First, the magneto-optical recording medium and the magneto-optical reproducing method will be described with reference to the drawings, wherein a high-temperature region is formed with a rear mask and the other region is caused to be an aperture region, that is, the magnetization of the reproduction layer is such that the reproduction layer is a perpendicular magnetization film at room temperature and between room temperature and the Curie temperature. FIGS. 7A, 7B and 7C are diagrams showing a process, wherein the recorded magnetic domain of the reproduction layer transferred from the memory layer (hereinbelow simply referred to as "recorded magnetic domain") is contracted in the high-temperature region while the light spot moves. For brevity, in FIGS. 7A to 7C, the contracting process of only one recorded magnetic domain is shown. Further, in these figures, a rare earth-iron family ferromagnetic substance is used as a magnetic material, blank arrows 30 represent the whole magnetization, black arrows 31 represent the iron family sublattice magnetization, the reproduction layer 11 is an RE rich magnetic layer and the memory layer 13 is a TM rich magnetic layer. On the other hand, in FIGS. 5A to 5C, the whole image upon reproduction is shown along with the temperature distribution. The temperature distribution of the medium is shifted from the center of the light spot in a direction opposite to a moving direction of the light spot due to the limit of thermal conductivity. As shown in FIG. 7A, shortly after the light spot 2 has reached the recorded magnetic domain 1, the recorded magnetic domain 1 does not reach the high-temperature region 5. In addition to an effective magnetic field Hwi due to the exchange-coupling force from the memory layer 13, an effective magnetic field Hwb due to the Bloch magnetic wall energy and a static magnetic field Hd from the interior of the medium are applied to the recorded magnetic domain 1. Hwi works to stably hold the recorded magnetic domain 1 of the reproduction layer, while Hwb and Hd apply forces in directions to expand and contract the recorded magnetic domain. Accordingly, in order for the reproduction layer 11 to be stably transferred with the magnetization of the memory layer 13, a condition expressed by relation (1) should be satisfied before the recorded magnetic domain 1 reaches the high-temperature region 5.

$$|Hwb-Hd|<Hcl+Hwi(T<Th-mask) \quad (1)$$

A coercive force Hcl of the reproduction layer 11 is apparently increased due to the exchange-coupling force from the memory layer 13. Accordingly, relation (1) can be easily established to stably transfer the magnetization information of the memory layer 13 so that the recorded information can be reproduced accurately.

If the interface magnetic wall energy between the reproduction layer 11 and the memory layer 13 is σwi, the saturation magnetization of the recorded magnetic domain 1 of the reproduction layer 11 is Msl and the film thickness of the reproduction layer is hi, and Hwi is expressed by relation (2).

$$Hwi=\sigma wi/2Mslhl \quad (2)$$

When the light spot further moves so that the recorded magnetic domain 1 enters the high-temperature region 5, Hwi reaches around the Curie temperature of the intermediate layer 12 so that σwi is rapidly decreased to diminish Hwi. Accordingly, the reproduction layer 11 returns to the state where the coercive force is small, to satisfy relation (3) so that a Bloch magnetic wall 8 of the recorded magnetic domain 1 easily moves.

$$|Hwb-Hd|>Hcl+Hwi(T>Th-mask) \quad (3)$$

Figure 8:
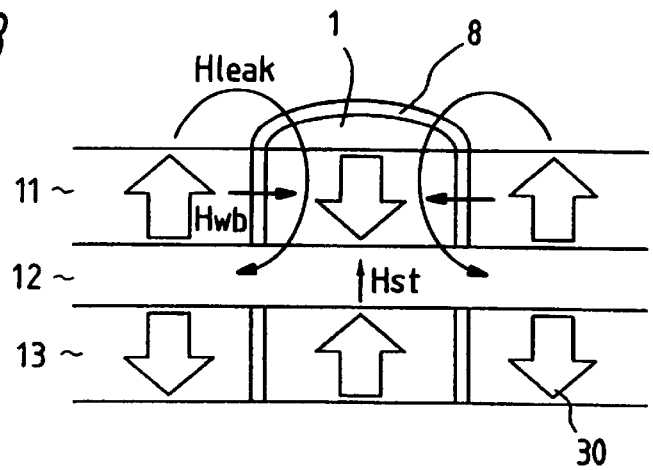
FIG. 8 is a diagram showing static magnetic fields Hleak, Hst and an effective magnetic field Hwb due to a Bloch magnetic wall energy, which are applied to a recorded magnetic domain transferred to a reproduction layer.

If a Bloch magnetic wall energy is σwb and a radius of the recorded magnetic domain 1 of the reproduction layer 11 is r, Hwb is expressed by relation (4) and works in a direction to contract the recorded magnetic domain 1 (FIG. 8).

$$Hwb=\sigma wb/2Mslr \quad (4)$$

Accordingly, when Hwb−Hd becomes dominant in positive (sign is +) to satisfy relation (5), the recorded magnetic domain 1 is contracted.

$$|Hwb-Hd|>Hcl+Hwi(T>Th-mask) \quad (5)$$

In this manner, as shown in FIG. 7B, the recorded magnetic domain 1 is contracted and inverted when entering the high-temperature region 5, and as shown in FIG. 7C, the magnetization is all oriented in an erasing direction.

Figure 5A:
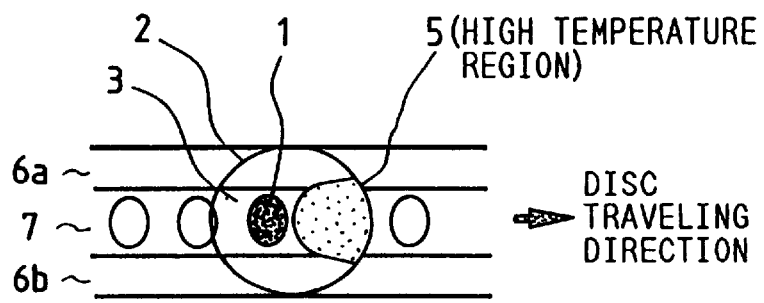
Figure 5B:
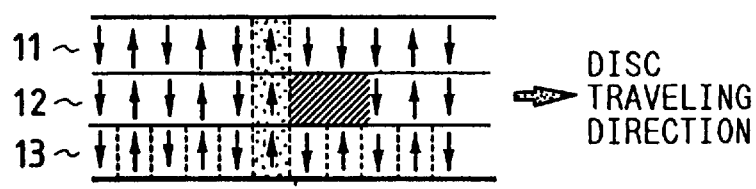
Figure 5C:
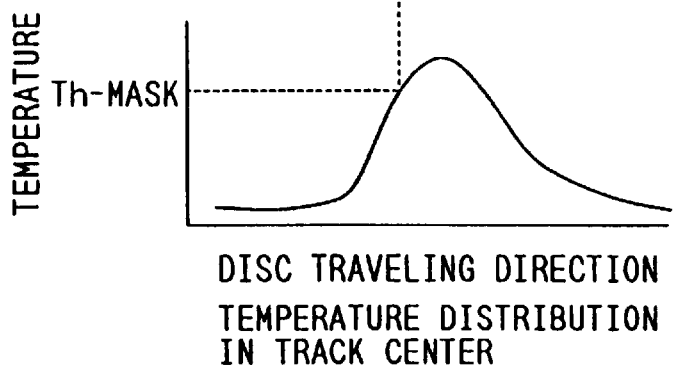

Specifically, as shown in FIGS. 5A to 5C, the reproduction layer 11 always becomes a perpendicular magnetization film oriented in the erasing direction at the high-temperature region 5 within the light spot 2, thus serving as an optical mask (rear mask 5). Accordingly, as shown in FIG. 5A, the light spot 2 is apparently narrowed to a region excluding the high-temperature region 5 and serving as the aperture region 3 so that the recorded magnetic domain (recorded mark) having a period equal to or smaller than the detection limit can be detected.

On the other hand, in the conventional super-resolution method, as described in Japanese Patent Application Laid-open No. 4-255947, a mask is formed using an external magnetic field Hr based on relation (6).

$$Hr>Hcl+Hwi \quad (6)$$

In the present invention, since the mask is formed by changing a magnitude of the effective magnetic field Hwb−Hd inside the medium instead of using the external magnetic field Hr. the external magnetic field is not necessary.

Now, the method for making Hwb−Hd dominant in positive at a high temperature will be described in further detail.

Hd in relation (5) is formed by a leakage magnetic field Hleak from the ambient erasing magnetization, a static magnetic field Hst from the magnetization of the memory layer 13 and the like, and is expressed by relation (7).

$$Hd=Hleak \pm Hst \quad (7)$$

In relation (7), Hleak works in a direction to expand the recorded magnetic domain 1 as shown in FIG. 8. A first method to make Hwb−Hd dominant in positive in the high-temperature region is a method which diminishes Hleak, that is, reduces the magnetic field preventing inversion of the recorded magnetic domain 1. If the saturation magnetization of the reproduction layer 11 around the recorded magnetic domain to be made to disappear is Msl" and a radius of the recorded magnetic domain 1 is r, Hleak is roughly expressed by relation (8).

$$Hleak = 4\pi n Msl''hl(hl+3/2r) \qquad (8)$$

Figure 10A:
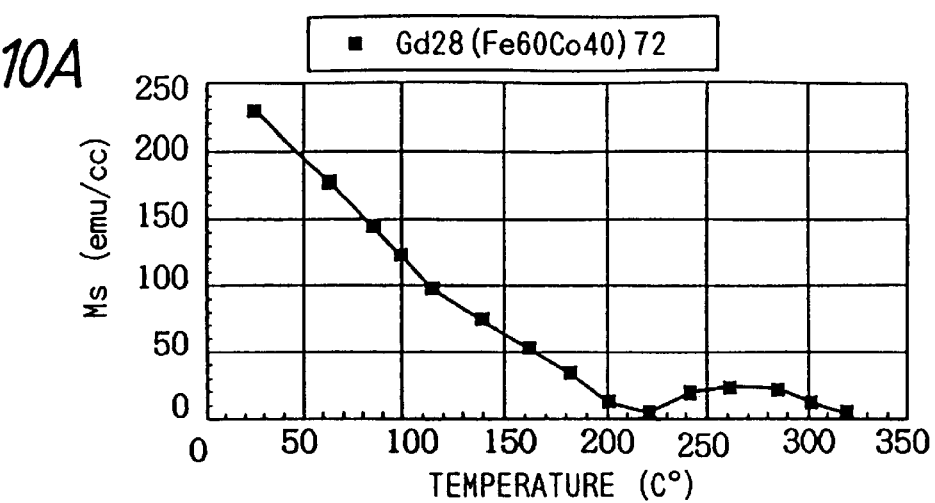
FIGS. 10A to 10C are diagrams, respectively, showing temperature dependencies of saturation magnetizations with respect to GdFeCo having different compensation temperatures.
Figure 10B:
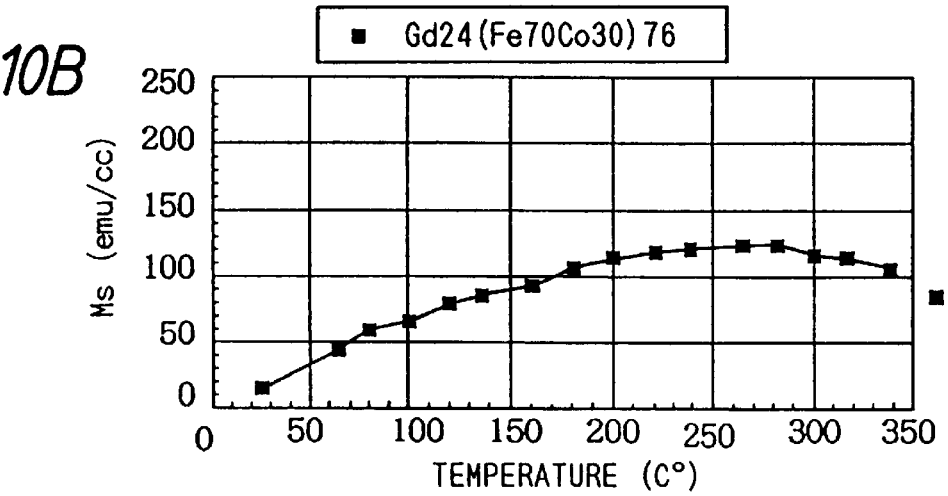
Figure 10C:
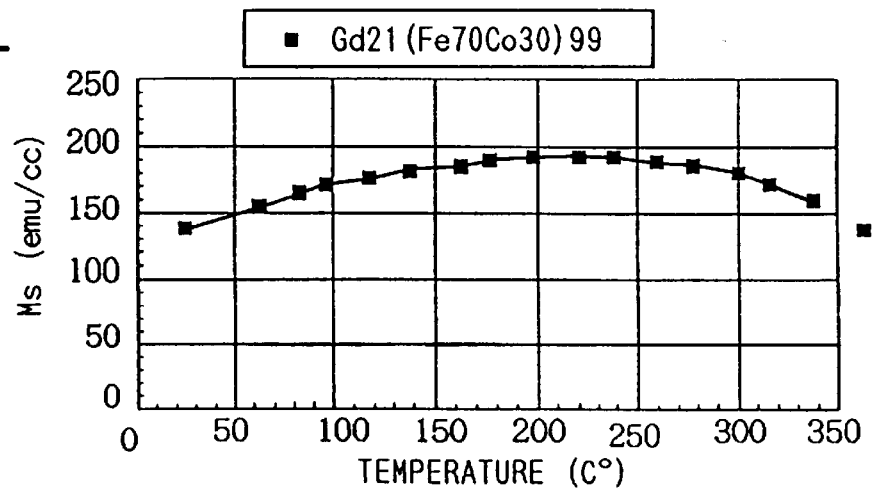
Figure 11:
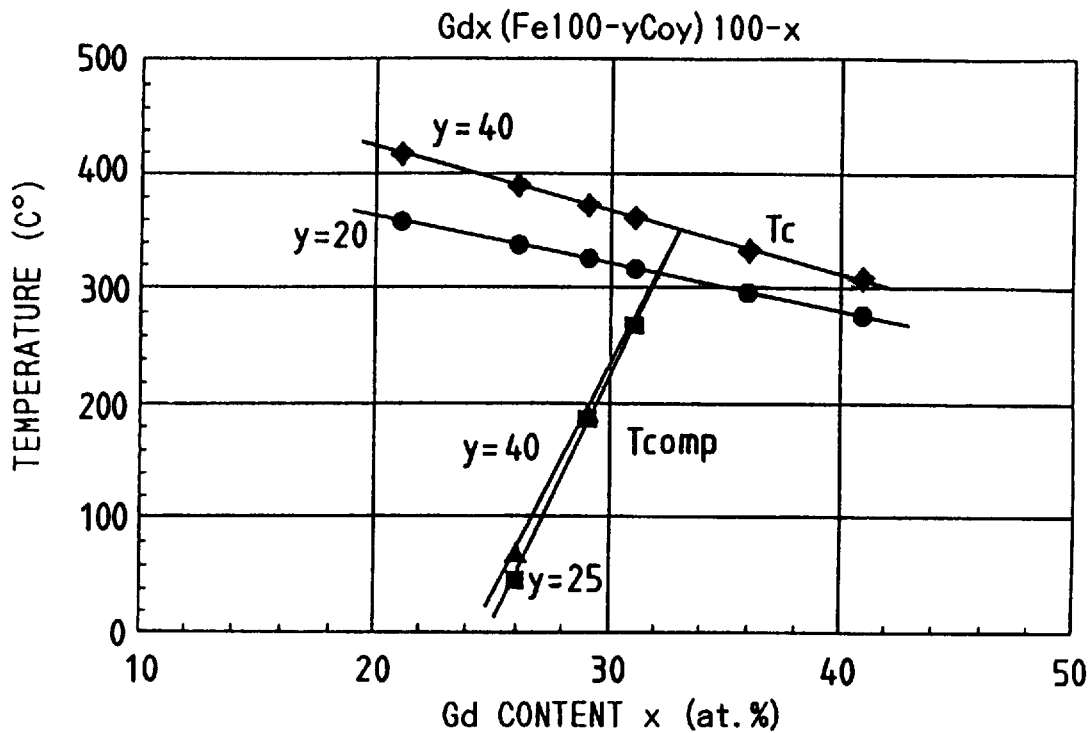
FIG. 11 is a diagram showing a composition dependency of a compensation temperature and a Curie temperature of GdFeCo.

In relation (8), the radius r of the recorded magnetic domain and the film thickness hl of the reproduction layer can not be easily changed. Accordingly, it is necessary to diminish Msl''. This is achieved by selecting a material for the reproduction layer, which has a compensation temperature between room temperature and the Curie temperature. Since the magnetization is reduced at the compensation temperature, Hleak can be diminished. An example will be described, wherein GdFeCo is used for the reproduction layer 11. FIGS. 10A to 10C respectively show temperature dependencies of Ms of GdFeCo having different compensation temperatures. Although the maximum temperature on the medium upon reproduction differs depending on the reproducing power, the maximum temperature shown in the figures reaches approximately 160° C.–220° C. in general, and the medium-temperature region is a region where the temperature is lower than the maximum temperature by about 20° C.–60° C. Accordingly, in case of FIGS. 10B and 10C, Msl'' is large so that Hleak also becomes large. If a composition in which the compensation temperature exists between room temperature and the Curie temperature, is used for the reproduction layer 11, Ms in the medium-temperature and high-temperature regions is reduced to diminish Hd. When GdFeCo is used for the reproduction layer 11, since the compensation temperature largely depends on a composition of, particularly, a rare earth element (Gd) as shown in FIG. 11, it is preferable to set the Gd content to be 25 to 35% in case a magnetic layer mainly containing GdFeCo is used as the reproduction layer 11.

Figure 9A:
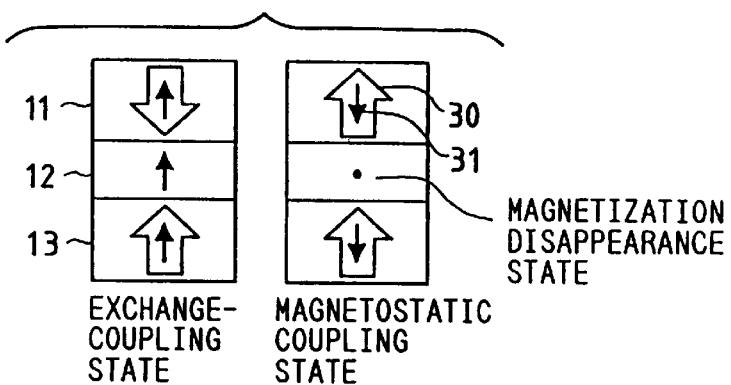
FIG. 9A is a diagram showing stable magnetization states for a layer structure of an anti-parallel type, wherein an exchange-coupling force and a magnetostatic coupling force are dominant, respectively.
Figure 9B:
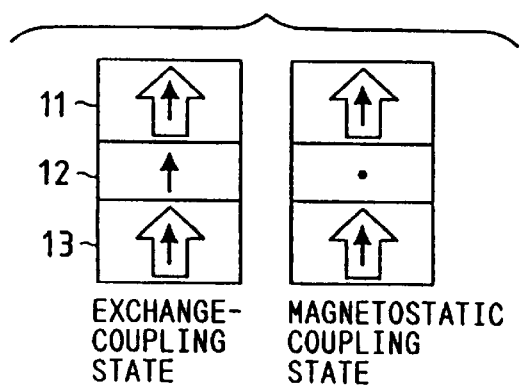
FIG. 9B is a diagram showing stable magnetization states for a layer structure of a parallel type, wherein an exchange-coupling force and a magnetostatic coupling force are dominant, respectively.

A second method is a method which makes Hst dominant in negative, that is, facilitates inversion of the recorded magnetic domain 1 by the static magnetic field Hst from the memory layer 13. In relation (7), when entering the high-temperature region from the exchange-coupling region, Hst is determined whether to work in a direction to contract the recorded magnetic domain 1 or work to hold the recorded magnetic domain 1, depending on whether the reproduction layer 11 and the memory layer 13 are of a parallel type or an anti-parallel type. The reason is as follows:

As shown in FIGS. 9A and 9B, the exchange-coupling force aligns in a direction of TM sublattice magnetization, where the exchange force is great, and the magnetostatic coupling force aligns in a direction of the whole magnetization. FIG. 9A shows the anti-parallel type, wherein the reproduction layer 11 is RE rich and the memory layer 13 is TM rich. In this case, when the intermediate layer 12 reaches around the Curie temperature to cut off the exchange coupling, the recorded magnetic domain 1 is caused to be inverted in magnetization due to the magnetostatic coupling force with the memory layer 13 (Hst becomes negative). To the contrary, in case of the parallel type as shown in FIG. 9B (in the figure, both the reproduction and memory layers are shown to be TM rich), the magnetostatic coupling force works in a direction to hold the exchange-coupling state (Hst becomes positive). Accordingly, for inverting the recorded magnetic domain 1, the composition of the anti-parallel type is desired.

Specifically, for example, both the reproduction layer 11 and the memory layer 13 may be set to be ferromagnetic, and kinds of the dominant sublattice magnetization in the reproduction layer 11 and the memory layer 13 may be set to be opposite to each other. For example, the reproduction layer 11 and the memory layer 13 are formed of rare earth (RE) iron family (TM) element alloys, and the reproduction layer 11 is arranged to be rare earth element sublattice magnetization dominant (RE rich), while the memory layer 13 is arranged to be iron family element sublattice magnetization dominant (TM rich) at room temperature. It is necessary that this anti-parallel composition is achieved at least at the temperature where the recorded magnetic domain 1 is contracted (in the foregoing medium-temperature region to high-temperature region 5).

A value of Hst can be roughly calculated using, on the assumption that the magnetic domain is cylindrical, the radius of the recorded magnetic domain 1, the distance from the magnetic domain of the memory layer 13 and the saturation magnetization Ms2 of the memory layer (see pages 40 and 41, Nagoya University doctoral thesis "Research about Rare Earth-Iron Family Amorphous Alloy Thin Film and Magnetism and Magneto-optical Effect of Composite Film thereof" 1985. 3 by Tadashi Kobayashi). Hst is proportional to the saturation magnetization Ms2 of the memory layer (relation 9).

$$Hst \alpha Ms2 \qquad (9)$$

Accordingly, it is preferable that Ms2 is set to be such a large value that does not cause deterioration in the stability of the recorded information or cause inversion of the erasing magnetization.

Further, the static magnetic field Hst from the memory layer 13 also works on the magnetization in the erasing direction. However, if the magnetization in the erasing direction is inverted by Hst, a magnetic wall is formed over an extensive range of the high-temperature region 5 so that the magnetic wall energy is largely increased. Accordingly, magnetization inversion does not occur, and the magnetization in the erasing direction is held. Thus, in the high-temperature region 5, a region is generated in which magnetization is always oriented in the erasing direction. This region becomes the rear mask 5. If a radius of the inverted magnetic domain is R, an effective magnetic field Hwb' of the Bloch magnetic wall energy in case of the erasing magnetization being inverted is expressed by relation (10).

$$Hwb' = \sigma wb / 2MslR \qquad (10)$$

Thus, a condition that the erasing magnetization is not inverted by Hst is expressed by relation (11).

$$Hwb' > Hst \qquad (11)$$

Only one of the foregoing two methods, that is, the method of reducing Hleak and the method of increasing Hst at a negative side, may be used. On the other hand, if the two methods are used in combination, the super-resolution effect is realized to the greatest extent. As described above, by using the magneto-optical recording medium of the present invention, the magnetization can be oriented in a uniform direction in the high-temperature region 5 of the light spot upon reproduction without applying the external magnetic field so as to optically mask the magnetization of the memory layer 13.

Further, in the medium where the reproduction layer is a perpendicular magnetization film at room temperature and between room temperature and the Curie temperature, since the aperture region 3 extends over substantially all the region other than the high-temperature region 5, it is necessary that the reproduction layer 11 becomes a perpendicular magnetization film to a sufficient extent even in the low-temperature region, so as to stably transfer the magnetization of the memory layer 13. Accordingly, a material in which the magnetization is oriented in a perpendicular direction to a further extent as compared with the reproduction layer 11 (a material having a coercive force greater than the reproduction layer 11), for example, TbFe, TbFeCo and DyFeCo, may be preferably used for the intermediate layer 12. By using such a material, the interface magnetic wall energy σwl is increased so that the reproduction layer 11 can transfer the magnetization information of the memory layer 13 stably due to the exchange-coupling force. Further, in case the reproduction layer 11 has a small perpendicular magnetic anisotropy, for example, even in case the reproduction layer, when alone, becomes an in-plane magnetization film, by using the intermediate layer in which the magnetization is oriented in the perpendicular direction to a further extent, to be laminated on the reproduction layer 11, the perpendicular magnetic anisotropy of the reproduction layer 11 is sufficiently increased to allow the aperture region to transfer the magnetization information of the memory layer 13 accurately.

The formation of the mask has been described above using the expressions containing the magnetic field. On the other hand, the formation of the mask can also be described using expressions containing energy. When, particularly, Ms is close to 0, the magnetic field, even largely applied to, does not effectively act on the recorded magnetic domain. Accordingly, it is preferable to describe it in terms of energy since the formation of the mask can be judged more precisely. For describing in terms of an energy relation, the foregoing definition and relation expressions of the magnetic field may be multiplied by 2Msl, respectively. Accordingly, relations (1), (2), (3), (4), (5), (7) and (8) are expressed by relations (12), (13), (14), (15), (16), (17) and (18), respectively. In the relations, Ewb represents a Bloch magnetic wall energy, Ed represents a static magnetic field energy from the interior of the medium applied to the Bloch magnetic wall of the recorded magnetic domain, Ewi represents an exchange-coupling energy with the second magnetic layer, and Ecl represents a coercive force energy of the first magnetic layer.

$$Ewb-Ed|<Ecl+Ewi(T<Th-mask) \tag{12}$$

$$Ewi=\sigma wi/hi \tag{13}$$

$$Ewb-Ed|>Ecl+Ewi(T>Th-mask) \tag{14}$$

$$Ewb=\sigma wb/r \tag{15}$$

$$Ewb-Ed>Ecl+Ewi(T>Th-mask) \tag{16}$$

$$Ed=Eleak+Est \tag{17}$$

$$Eleak=8\pi nMs1^2 hl(h1+3/2r) \tag{18}$$

Figure 6A:
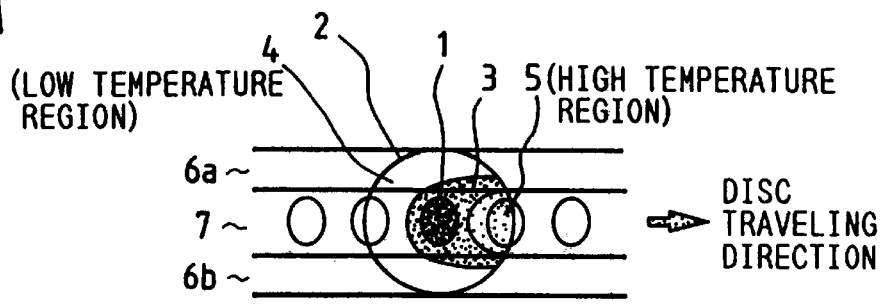
Figure 6B:
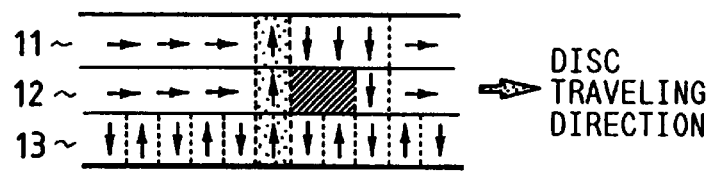
Figure 6C:
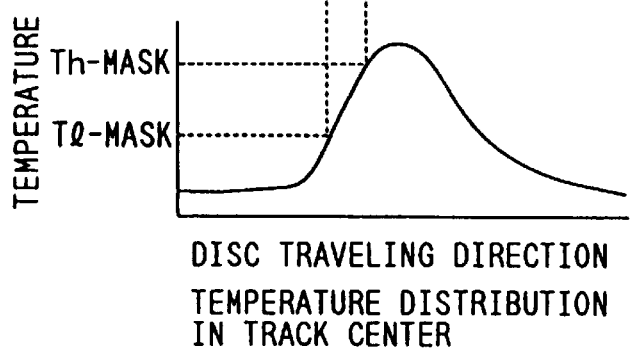

Further, the method has been described before, wherein the magnetization information of the memory layer 13 is optically masked only in the high-temperature region 5 within the light spot 2. Now, a method in which the low-temperature region is also masked in addition to the high-temperature region 5 so as to detect the magnetization information only in the medium-temperature region, that is, a magneto-optical recording medium and an information reproducing method in which the magnetization manner of the reproduction layer is such that the reproduction layer is an in-plane magnetization film at room temperature and makes the transition to a perpendicular magnetization film between room temperature and the Curie temperature, will be described hereinbelow. FIGS. 6A, 6B and 6C show a structure of the mask and the aperture region, the magnetization state and the temperature distribution for the medium having the present manner, respectively. In this case, a magnetic film which is an in-plane magnetization film at room temperature and becomes a perpendicular magnetization film at a high temperature, is used for the reproduction layer 11. An example of such a magnetic film will be explained hereinbelow. In general, in the case of a single-layer magnetic film, if the saturation magnetization is Ms and a perpendicular magnetic anisotropy energy is Ku, a main direction of its magnetization is known to be determined by an effective perpendicular magnetic anisotropy constant K defined by relation (19).

$$K=Ku-2\pi Ms^2 \tag{19}$$

wherein, $2\pi Ms^2$ represents a diamagnetic field energy.

Figure 12:
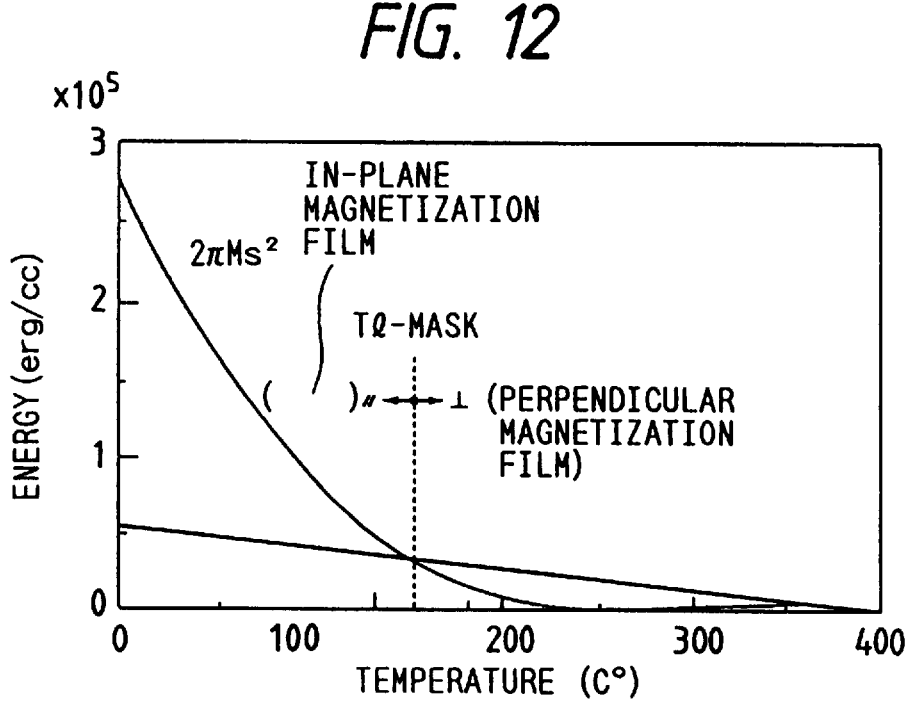
FIG. 12 is a diagram showing an example of a temperature characteristic of a diamagnetic field energy 2Ms2 and a perpendicular magnetic anisotropy constant Ku of the reproduction layer of the magneto-optical recording medium according to the first embodiment of the present invention.

When K is positive, the magnetic film becomes a perpendicular magnetization film. On the other hand, when K is negative, the magnetic film becomes an in-plane magnetization film. Accordingly, as shown in FIG. 12, the magnetic film which changes relation in magnitude between Ku and $2\pi Ms^2$ depending on a temperature, is effective to make the transition from an in-plane magnetization film to a perpendicular magnetization film. In such a reproduction layer 11, relation (20) is established in the low-temperature region where a temperature is equal to or lower than a temperature Tl-mask at which the region (the aperture region 3 in FIG. 6A) reproducing the magnetization information of the memory 13 is reached. Accordingly, the low-temperature region becomes an in-plane magnetization film (front mask 4) to mask the magnetization information of the memory layer 13.

$$Ku<2\pi Ms^2, K<0 \ (T<Tl-mask) \tag{20}$$

On the other hand, when the temperature T of the medium is increased, Ms is decreased to rapidly diminish $2\pi Ms^2$. Accordingly, the relation in magnitude between $2\pi Ms^2$ and Ku is reversed to satisfy relation (21).

$$Ku>2\pi Ms^2, K>0(Tl-mask<T) \tag{21}$$

Accordingly, an in-plane magnetization film makes the transition to a perpendicular magnetization film to form the aperture region 3. Further, at a temperature equal to or higher than Th-mask, the rear mask 5 is formed in the high-temperature region 5 as described before.

As shown in FIGS. 6A to 6C, in this method, the reproduction layer 11 becomes an in-plane magnetization film in the low-temperature region 4 and a perpendicular magnetization film in the high-temperature region 5 where the magnetization is always oriented in the erasing direction, so that both work as optical masks. Only the medium-temperature region of the reproduction layer 11 becomes a perpendicular magnetization film where a signal of the memory layer 13 is transferred due to the exchange coupling so that the medium-temperature region becomes the information detectable region (aperture region 3).

In this method, since the low-temperature region 4 is masked in addition to the high-temperature region 5, information on the adjacent tracks (grooves 6a, 6b in FIG. 6A) can also be masked. Thus, crosstalk is reduced to improve the track density. Further, as described above, in the method where the medium-temperature region is used as the detecting region, the aperture region 3 within the laser spot 2 becomes a narrow region sandwiched between the high-temperature region 5 and the low-temperature region 4. Further, even when the laser power fluctuates, the widths of the aperture region 3 do not change, but are held constant. Thus, even when the higher-density recording is performed, reproduction can be achieved satisfactorily with high resolution so that stable reproduction is realized even when a laser power fluctuation occurs. Further, in the present invention, since the detecting region is located near the center of the laser spot, a better C/N ratio can be expected.

As described before, FIGS. 10A to 10C respectively show temperature dependencies of Ms of GdFeCo having different compensation temperatures. Among them, in the composition where the compensation temperature is between room temperature and the Curie temperature as shown in FIG. 10A, since the saturation magnetization is reduced to 0 in a temperature range higher than room temperature and lower than the Curie temperature, an intersection is generated between the diamagnetic field energy and the perpendicular magnetic anisotropy constant so that the transition from an in-plane magnetization film to a perpendicular magnetization film occurs. On the other hand, in FIGS. 10B and 10C, such a transition does not occur. Accordingly, as a material of the reproduction layer 11, for example, a material having a compensation temperature between room temperature and the Curie temperature is preferable, and further, a material having a magnetic anisotropy which is smaller than the diamagnetic field energy $2\pi Ms^2$ at room temperature, is preferable.

When laminating this magnetic film via the memory layer 13, the intermediate layer 12 and the like, Ku is apparently increased due to the action of the exchange-coupling force from the memory layer 13. Accordingly, a temperature at which the transition to a perpendicular magnetization film occurs, shifts to a lower temperature side as compared with the case of no such lamination. However, by setting the temperature of transition to the perpendicular magnetization in the single-layer state to a relatively high value, it can be arranged so that the magnetic film is an in-plane magnetization film at room temperature and becomes a perpendicular magnetization film when increased in temperature, even when the magnetic film is laminated with the memory layer 13.

In this case, a condition where the reproduction layer 11 becomes an in-plane magnetization film, is expressed by relation (20').

$$Ku+Ew13<2\pi Ms^2 \quad (20')$$

where Ew13 represents an energy for orienting the magnetization of the reproduction layer 11 in a perpendicular direction due to the exchange-coupling force from the memory layer 13.

On the other hand, a condition where the reproduction layer 11 becomes a perpendicular magnetization film, is expressed by relation (21').

$$Ku+Ew13>2\pi Ms^2 \quad (21')$$

The intermediate layer 12 may be in the form of a perpendicular magnetization film having a large perpendicular magnetic anisotropy. However, when the intermediate layer 12 having the large perpendicular magnetic anisotropy is laminated on the reproduction layer 11 being an in-plane magnetization film at room temperature, the interface magnetic wall tends to permeate into a side of the reproduction layer 11 as shown in FIG. 15A so that the magnetization information of the memory layer 13 can not be masked sufficiently. In view of this, it is preferable to use a magnetic layer for the intermediate layer 12, which has a perpendicular magnetic anisotropy small enough to work as a magnetic wall portion between the reproduction layer 11 and the memory layer 13 in a low-temperature region near room temperature as shown in FIG. 15B, and in other words, which has a large in-plane anisotropy. For working as a magnetic wall portion, a magnetic material having small magnetic wall energy, such as, GdFe or GdFeCo, may be preferably used as the intermediate layer. The fact that the in-plane anisotropy is large corresponds to the fact that K in relation (19) is a smaller value (K is a negative value and its absolute value is large). In order to make K of the intermediate layer 12 at room temperature smaller than K of the reproduction layer 11 at room temperature, when, for example, using a rare earth-iron family element alloy, such as, GdFe, GdFeCo or the like, the Ms of the intermediate layer 12 at room temperature is made greater than that of the reproduction layer 11 by increasing the content of a rare earth element (Gd). Further, it is also effective to diminish Ku by increasing the content of Co. Among them, the method of increasing Ms is preferable since Ms is reduced as the intermediate layer 12 approaches the Curie temperature so that the perpendicular anisotropy is increased in the aperture region. However, since the reproduction layer 11 does not become a perpendicular magnetization film to a sufficient extent in the aperture region when the in-plane anisotropy of the intermediate layer 12 is increased too much, the in-plane anisotropy thereof is increased to a degree which does not deteriorate the signal quality.

Figure 13A:
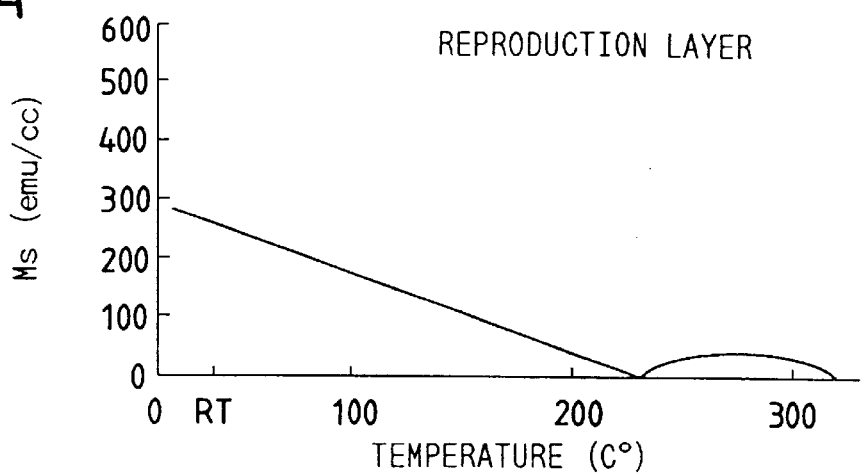
FIGS. 13A to 13C are diagrams showing examples of temperature characteristics of Ms of the respective magnetic layers of the magneto-optical recording medium according to the first embodiment of the present invention.
Figure 13B:
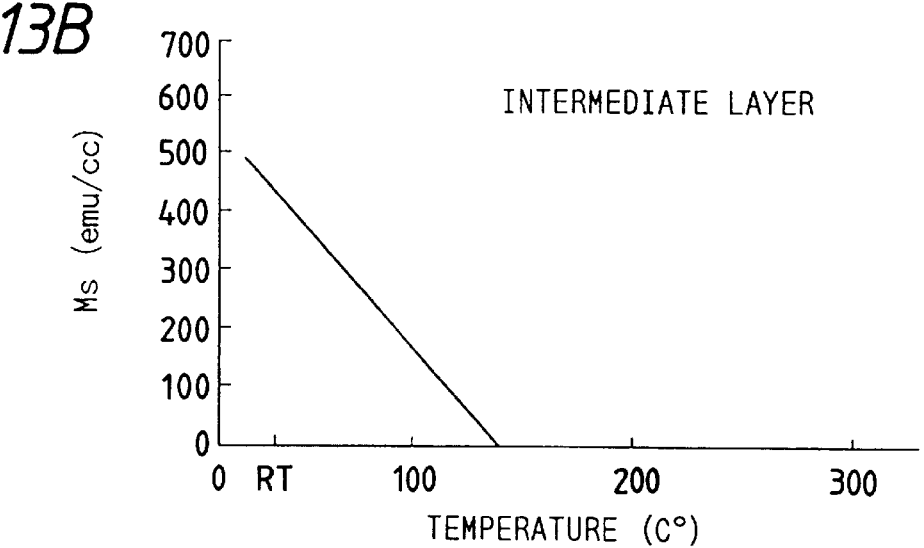
Figure 13C:
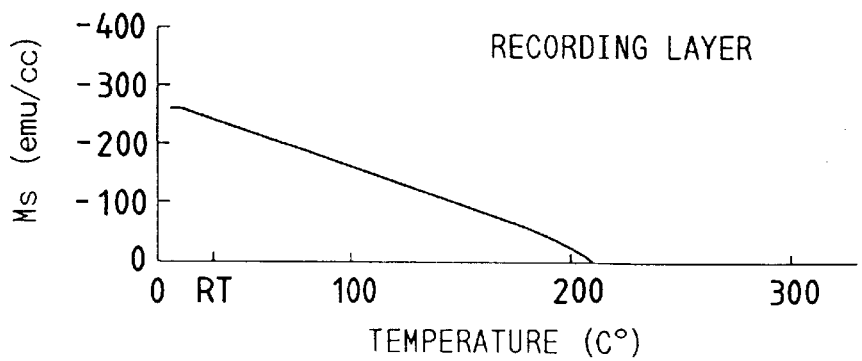

Quite naturally, the intermediate layer is arranged to reach the Curie temperature after the reproduction layer 11 becomes a perpendicular magnetization film and is exchange-coupled to the memory layer 13. In other words, it is necessary to arrange that the reproduction layer 11 is an in-plane magnetization film at room temperature and becomes a perpendicular magnetization film at least between room temperature and the Curie temperature of the intermediate layer 12. Examples of the temperature dependencies of Ms of the reproduction layer 11, the intermediate layer 12 and the memory layer 13 of such a medium are shown in FIGS. 13A to 13C, respectively. In the figures, a positive Ms represents a RE rich mixture, while negative Ms represents a TM rich mixture.

The present invention will be described in further detail by way of experimental examples. However, the present invention is not limited to these experimental examples.

First, a magneto-optical recording medium in which a reproduction layer is a perpendicular magnetization film at room temperature and between room temperature and the Curie temperature was prepared and evaluated, which will be described in the following Experimental Examples 1 and 2.

Experimental Example 1

Si, Gd, Tb, Fe and Co targets were attached to a DC magnetron sputtering apparatus, and a glass substrate having a diameter of 130 mm and a polycarbonate substrate with lands and grooves were fixed to a substrate holder which was set at a position separated from the respective targets by a distance of 150 mm. Thereafter, the interior of the chamber was evacuated by a cryopump to a high vacuum of $1\times10^{-5}$ Pa or less. During the evacuation, Ar gas was introduced into the chamber to 0.4 Pa, and thereafter, an SiN interference layer of 900 Å thickness, a GdFeCo reproduction layer of 400 Å thickness, a TbFeCo intermediate layer of 50 Å thickness, a TbFeCo memory layer of 350 Å thickness and an SiN protective layer of 700 Å thickness were formed in the order named, thus obtaining the magneto-optical recording medium of the present invention with a structure shown in FIG. 14. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.2.

The composition of the GdFeCo reproduction layer was $Gd_{30}(Fe_{65}Co_{35})_{70}$ and represented an RE rich layer at room temperature, an Ms of 196 emu/cc, a compensation temperature of 240° C. and a Curie temperature of 300° C. or more.

The composition of the TbFeCo intermediate layer was $Tb_{18}(Fe_{97}Co_3)_{82}$ and represented a TM rich layer at room temperature, an Ms of −95 emu/cc and a Curie temperature of 135° C.

The composition of the TbFeCo memory layer was $Tb_{18}(Fe_{88}Co_{12})_{82}$ and represented a TM rich layer at room temperature, an Ms of −120 emu/cc and a Curie temperature of 220° C.

After recording a magnetic domain of a 0.78 μm mark length in the magneto-optical recording medium, the magnetic domain was observed by a polarizing microscope under irradiation of a semiconductor laser beam of 830 nm. While increasing the laser power, it was confirmed that the recorded magnetic domain was contracted and the magnetization was oriented in an erasing direction at the center (high-temperature region) of the light spot at a certain laser power.

Subsequently, the recording/reproduction characteristic thereof was measured using this magneto-optical recording medium. The measurement was performed by setting the N.A. of an objective lens to be 0.55, a laser beam wavelength to be 780 nm, a recording power to be in a range of 7⁻13 mW and a reproducing power to be in a range of 2.5⁻3.5 mW, so as to provide the highest C/N ratio. The linear velocity was set to be 9 m/s. First, erasing was performed entirely on the medium, and thereafter, carrier signals of 5.8 MHz, 11.3 MHz and 15 MHz (corresponding to mark lengths 0.78 μm, 0.40 μm and 0.30 μm, respectively) were recorded in the memory layer so as to examine the mark-length dependency of C/N.

Subsequently, crosstalk with the adjacent tracks (hereinafter referred to as "crosstalk") was measured. Specifically, after recording a signal of a 0.78 μm mark length on the land as in the foregoing manner and measuring a carrier level C1, a carrier level C2 was similarly measured upon tracking the adjacent groove where data had been erased, and the crosstalk was represented by a ratio (C2/C1). Since the experiment was performed on the assumption that data were recorded on both the land and groove, the effective track pitch was 0.8 μm.

Both the C/N ratios and the crosstalk were measured without applying an initializing magnetic field and a reproducing magnetic field. Table 1 shows compositions and materiality values of each layer and the results of the C/N ratios and the crosstalk.

Experimental Example 2

Using the same apparatus and method as in Experimental Example 1, an SiN interference level of 900 Å thickness, a GdFeCo reproduction layer of 400 Å thickness, a DyFeCo intermediate layer of 60 Å thickness, a TbFeCo memory layer of 350 Å thickness and an SiN protective layer of 700 Å thickness were formed on a polycarbonate substrate in the order named, thus obtaining the magneto-optical recording medium of the present invention with a structure shown in FIG. 14.

The composition of the GdFeCo reproduction layer was $Gd_{28}(Fe_{65}Co_{35})_{72}$ and represented a RE rich layer at room temperature, an Ms of 160 emu/cc, a compensation temperature of 180° C. and a Curie temperature of 300° C. or more.

The composition of the DyFeCo intermediate layer was $Dy_{20}(Fe_{97}Co_3)_{80}$ and represented a TM rich layer at room temperature, an Ms of −80 emu/cc and a Curie temperature of 128° C.

The composition of the TbFeCo memory layer was $Tb_{18}(Fe_{88}Co_{12})_{82}$ and represented a TM rich layer at room temperature, an Ms of −120 emu/cc and a Curie temperature of 220° C.

Subsequently, using this magneto-optical recording medium, the mark-length dependency of C/N and the crosstalk were examined as in Experimental Example 1. The results are shown in Table 1.

Now, a magneto-optical recording medium in which a reproduction layer is an in-plane magnetization film at room temperature and becomes a perpendicular magnetization film between room temperature and a Curie temperature thereof was prepared and evaluated, which will be described in the following Experimental Examples 3, 4, 5 and 6.

Experimental Example 3

Using the same apparatus and method as in Experimental Example 1, an SiN interference layer of 900 Å thickness, a GdFeCo reproduction layer of 400 Å thickness, a GdFe intermediate layer of look thickness, a TbFeCo memory layer of 300 Å thickness and an SiN protective layer of 700 Å thickness were formed on a polycarbonate substrate in the order named, thus obtaining a sample with a structure shown in FIG. 14.

The composition of the GdFeCo reproduction layer was set to represent an RE rich layer at room temperature, an Ms of 218 emu/cc, a compensation temperature of 238° C. and a Curie temperature of 300° C. or more.

The composition of the GdFe intermediate layer was set to represent an RE rich layer at room temperature, an Ms of 475 emu/cc and a Curie temperature of 190° C.

The composition of the TbFeCo memory layer was set to represent a TM rich layer at room temperature, an Ms of −150 emu/cc and a Curie temperature of 260° C.

Subsequently, using this magneto-optical recording medium, the recording/reproduction characteristic was evaluated as in Experimental Example 1. The results are shown in Table 1.

Experimental Example 4

Using the same apparatus and method as in Experimental Example 1, an SiN interference layer of 900 Å thickness, a GdFeCo reproduction layer of 450 Å thickness, a GdFe intermediate layer of 80 Å thickness, a TbFeCo memory layer of 320 Å thickness and an SiN protective layer of 700 Å thickness were formed on a polycarbonate substrate in the order named, thus obtaining a sample with a structure shown in FIG. 14.

The composition of the GdFeCo reproduction layer was set to represent a RE rich layer at room temperature, an Ms of 170 emu/cc, a compensation temperature of 190° C. and a Curie temperature of 300° c. or more.

The composition of the GdFe intermediate layer was set to represent a RE rich layer at room temperature, an Ms of 540 emu/cc and a Curie temperature of 165° C.

The composition of the TbFeCo memory layer was set to represent a TM rich layer at room temperature, an Ms of −50 emu/cc and a Curie temperature of 240° c.

Subsequently, using this magneto-optical recording medium, the recording/reproduction characteristic was evaluated as in Experimental Example 1. The results are shown in Table 1.

Experimental Example 5

Using the same apparatus and method as in Experimental Example 1, an SiN interference layer of 900 Å thickness, a GdFeCo reproduction later of 380 Å thickness, a GdFe intermediate layer of 120 Å thickness, a TbFeCo memory layer of 350 Å thickness and an SiN protective layer of 700 Å thickness were formed on a polycarbonate substrate in the order named, thus obtaining a sample with a structure shown in FIG. 14.

The composition of the GdFeCo reproduction layer was set to represent a RE rich layer at room temperature, an Ms of 280 emu/cc, a compensation temperature of 290° C. and a Curie temperature of 300° C. or more.

The composition of the GdFe intermediate layer was set to represent a RE rich layer at room temperature, an Ms of 420 emu/cc and a Curie temperature of 195° C.

The composition of the TbFeCo memory layer was set to represent a TM rich layer at room temperature, an Ms of −200 emu/cc and a Curie temperature of 220° C.

Subsequently, using this magneto-optical recording medium, the recording/reproduction characteristic was evaluated as in Experimental Example 1. The results are shown in Table 1.

Experimental Example 6

Using the same apparatus and method as in Experimental Example 1, an SiN interference layer of 900 Å thickness, a GdFeCo reproduction layer of 430 Å thickness, a GdFeCo intermediate layer of 130 Å thickness, a TbFeCo memory layer of 350 Å thickness and an SiN protective layer of 700 Å thickness were formed on a polycarbonate substrate in the order named, thus obtaining a sample with a structure shown in FIG. 14.

The composition of the GdFeCo reproduction layer was set to represent a RE rich layer at room temperature, an Ms of 250 emu/cc, a compensation temperature of 260° C. and a curie temperature of 300° C. or more.

The composition of the GdFeCo intermediate layer was set to represent a RE rich layer at room temperature, an Ms of 480 emu/cc and a Curie temperature of 176° C.

The composition of the TbFeCo memory layer was set to represent TM rich at room temperature, an Ms of −240 emu/cc and a Curie temperature of 270° C.

Subsequently, using this magneto-optical recording medium, the recording/reproduction characteristic was evaluated as in Experimental Example 1. The results are shown in Table 1.

Now, the known super-resolution magneto-optical recording medium was prepared, and evaluation thereof was performed in the same manner as in the foregoing experimental examples.

Comparative Example 1

First, a medium the same as that described in Japanese Patent Application Laid-open No. 3-93056 was prepared and evaluated.

Using the same film forming apparatus and method as in Experimental Example 1, an SiN interference layer of 900 Å thickness, a GdFeCo reproduction layer of 300 Å thickness, a TbFeCoAl intermediate layer of 100 Å thickness, a TbFeCo memory layer of 400 Å thickness and an SiN protective layer of 700 Å thickness were formed on a glass substrate in the order named, thus obtaining the magneto-optical recording medium of Comparative Example 1.

The composition of the GdFeCo reproduction layer was set to represent a TM rich layer at room temperature, an Ms of −180 emu/cc and a Curie temperature of 300° C. or more.

The composition of the TbFeCoAl intermediate layer was set to represent a TM rich layer at room temperature, an Ms of −160 emu/cc and a Curie temperature of 140° C.

The composition of the TbFeCo memory layer was set to represent a TM rich layer at room temperature, an Ms of −150 emu/cc and a Curie temperature of 250° C.

Subsequently, using this magneto-optical recording medium, the recording/reproduction characteristic was measured as in Experimental Example 1. In this case, however, upon reproduction, a reproducing magnetic field was applied to the medium in a perpendicular direction, by changing the magnitude of the reproducing magnetic field between 0 Oe, 200 Oe and 400 Oe. The results are shown in Table 1.

Comparative Example 2

Next, a medium the same as that described in Japanese Patent Application Laid-open No. 3-255946 was prepared and evaluated.

Using the same film forming apparatus and method as in Experimental Example 1, an SiN interference layer of 900 Å thickness, a GdFeCo reproduction layer of 300 Å thickness, a TbFeCoAl intermediate layer of 100 Å thickness, a GdFeCo auxiliary layer of 160 Å, a TbFeCo memory layer of 400 Å thickness and an SiN protective layer of 700 Å thickness were formed on a glass substrate in the order named, thus obtaining the magneto-optical recording medium of Comparative Example 2.

The composition of the GdFeCo reproduction layer was set to represent a TM rich layer at room temperature, an Ms of −160 emu/cc and a Curie temperature of 300° C. or more.

The composition of the TbFeCoAl intermediate layer was set to represent a TM rich layer at room temperature, an Ms of −160 emu/cc and a Curie temperature of 140° C.

The composition of the GdFeCo auxiliary layer was set to represent a TM rich layer at room temperature, an Ms of −160 emu/cc and a Curie temperature of 280° C. The composition of the TbFeCo memory layer was set to represent a TM rich layer at room temperature, an Ms of −150 emu/cc and a Curie temperature of 250° C.

Subsequently, using this magneto-optical recording medium, the recording/reproduction characteristic was measured as in Experimental Example 1. In this case, however, prior to reproduction, an initializing magnetic field in a perpendicular direction was applied to the medium by changing a magnitude of the initializing magnetic field between 0 Oe, 1,000 Oe and 2,000 Oe, and a reproducing magnetic field was applied to the medium by changing the magnitude of the reproducing magnetic field between 0 Oe, 200 Oe and 400 Oe. The results are shown in Table 1.

Comparative Example 3

Next, a medium the same as that described in Japanese Patent Application Laid-open No. 6-124500 was prepared and evaluated.

Using the same film forming apparatus and method as in Experimental Example 1, an SiN interference layer of 900 Å thickness, a GdFeCo reproduction layer of 400 Å thickness, a TbFeCo memory layer of 400 Å thickness and an SiN protective layer of 700 Å thickness were formed on a glass substrate in the order named, thus obtaining the magneto-optical recording medium of Comparative Example 3.

The composition of the GdFeCo reproduction layer was set to represent a RE rich layer at room temperature, an Ms of 180 emu/cc, a compensation temperature of 240° C. and a Curie temperature of 300° C. or more.

The composition of the TbFeCo memory layer was set to represent a TM rich layer at room temperature, an Ms of 150 emu/cc and a Curie temperature of 250° C.

Subsequently, using this magneto-optical recording medium, the recording/reproduction characteristic was measured as in Experimental Example 1. The results are shown in Table 1.

According to the measurement results of the foregoing Experimental Examples 1 to 6, particularly according to the measurement results with the short mark lengths, in any of the media, high C/N ratios were obtained with the short mark lengths without applying a reproducing magnetic field. Further, in the media where the reproduction layer is an in-plane magnetization film at room temperature and becomes a perpendicular magnetization film between room temperature and the Curie temperature, an improvement in C/N and the crosstalk was observed. On the other hand, in the medium of Comparative Example 1, a sufficiently high C/N ratio was not obtained without applying the reproducing magnetic field of 400 Oe. Further, the crosstalk showed the bad results. On the other hand, in the medium of Comparative Example 2, no improvement in C/N and the crosstalk were observed without applying a sufficient initializing magnetic field and a reproducing magnetic field. Further, in Comparative Example 3, a sufficiently high C/N ratio was not obtained.

Accordingly, in the magneto-optical recording medium of the present invention, the C/N ratio or both the C/N ratio and the crosstalk can be improved without applying the reproducing magnetic field or without applying both the initializing magnetic field and the reproducing magnetic field. Thus, the line recording density or both the line recording density and the track density can be improved.

Next, verification of the foregoing energy relation expressions (12) to (18) was performed in Experimental Examples 7 to 10 and 11 to 15 and Comparative Examples 4 to 8.

Experimental Example 7

Si, Gd, Tb, Fe and Co targets were attached to a DC magnetron sputtering apparatus, and a glass substrate having a diameter of 130 mm and a polycarbonate substrate with lands and grooves were fixed to a substrate holder, which was set at a position separated from the respective targets by a distance of 150 mm. Thereafter, the interior of the chamber was evacuated by a cryopump to a high vacuum of $1\times10^{-5}$ Pa or less. During the evacuation, Ar gas was introduced into the chamber to 0.5 Pa, and thereafter, an SiN interference layer of 900 Å thickness, a GdFeCo reproduction layer of 400 Å thickness, a TbFeCo intermediate layer of 100 Å thickness, a TbFeCo memory layer of 350 Å thickness and an SiN protective layer of 700 Å thickness were formed in the order named, thus obtaining the magneto-optical recording medium of the present invention with a structure shown in FIG. 14. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.1.

The composition of the GdFeCo reproduction layer was $Gd_x(Fe_{57}Co_{43})_{100-x}$ (the figure of a composition ratio represents an atomic ratio (%); hereinafter this definition will apply), and x was set to be 25%. Hereinafter, the polarity of a saturation magnetization will be described as being positive in case that the rare earth element sublattice magnetization is dominant and as being negative in the case that the iron family element sublattice magnetization is dominant.

The composition of the TbFeCo intermediate layer was $Tb_{20}(Fe_{97}Co_3)_{80}$. A film of this composition was measured alone and represented an Ms3 of $-120$ emu/cc at room temperature and a Curie temperature of 155° C. Since the medium of the present example is a medium of a front-aperture detection (FAD) type in which only the rear mask is formed, TbFeCo having a large perpendicular magnetic anisotropy is used for the intermediate layer so as to avoid formation of a front mask as much as possible.

Figure 17:
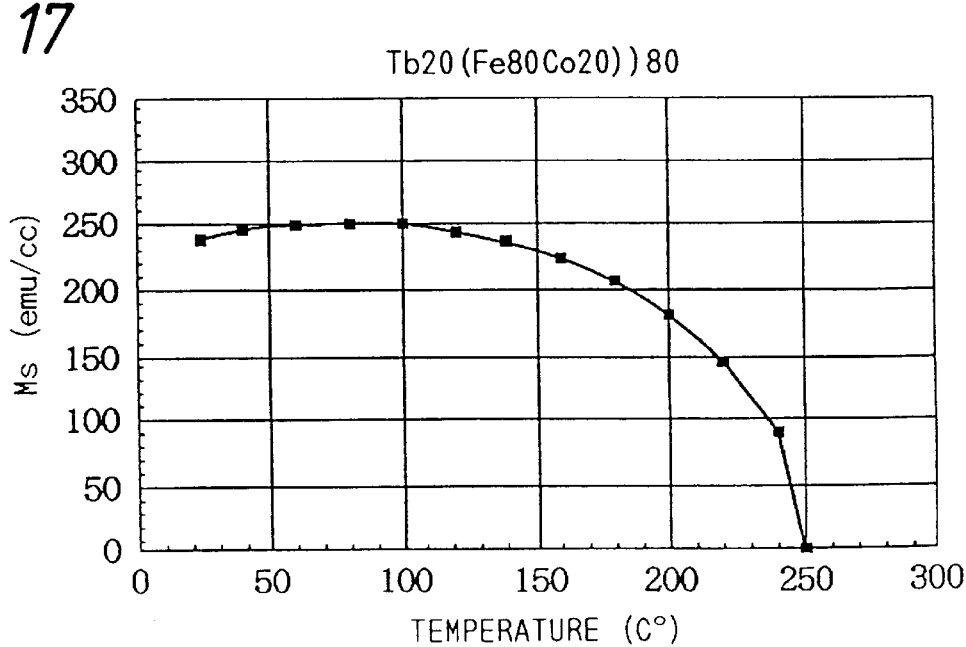
FIG. 17 is a diagram showing the temperature dependency of the saturation magnetization of a TbFeCo memory layer.

The composition of the TbFeCo memory layer was $Tb_{20}(Fe_{80}Co_{20})_{80}$. A film of this composition was measured alone to observe the temperature dependency of a saturation magnetization Ms2, and represented an Ms2 of $-240$ emu/cc at room temperature and a Curie temperature of 250° C. The temperature dependency of Ms2 is shown in FIG. 17.

Experimental Example 8

Figure 16:
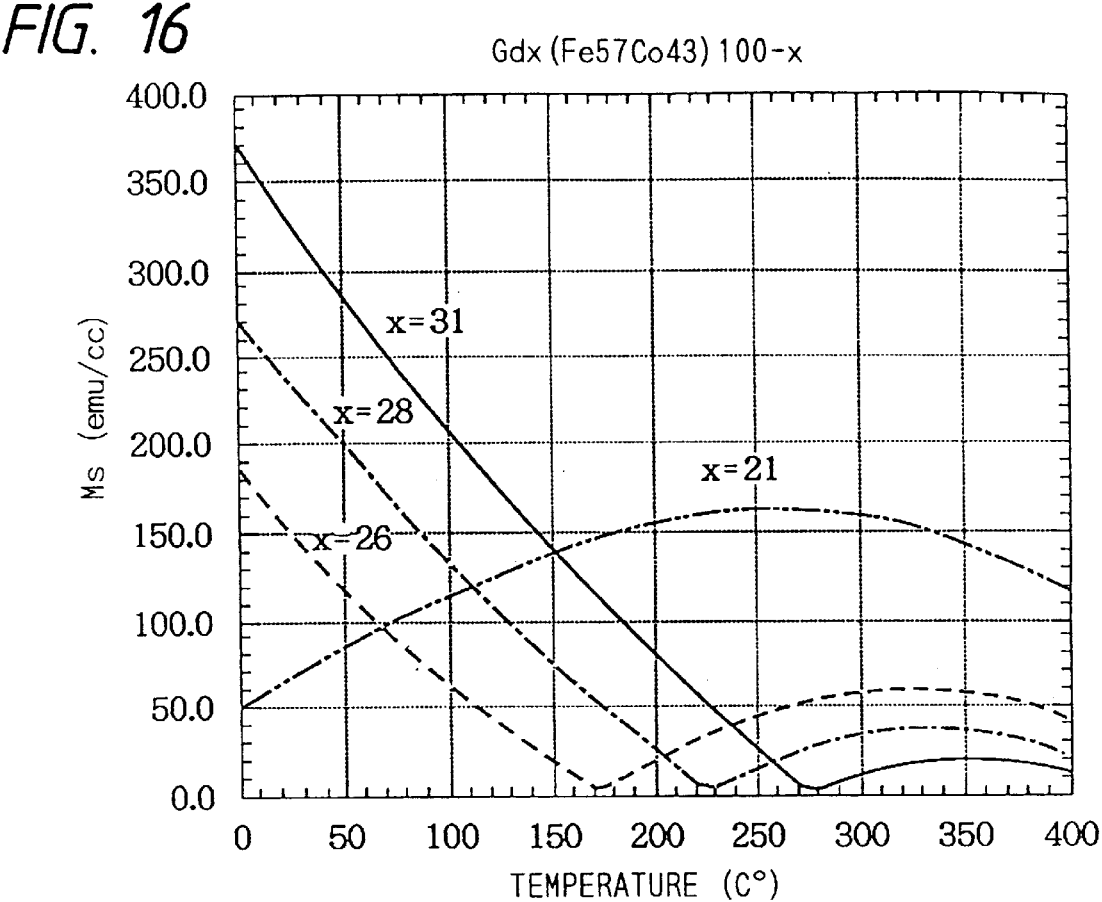
FIG. 16 is a diagram showing the temperature dependency of the saturation magnetization of a GdFeCo reproduction layer.

Subsequently, using the same apparatus and method as in Experimental Example 7, the magneto-optical recording medium of the present invention having a structure like that in Experimental Example 7 was prepared. The intermediate layer and the memory layer respectively had the same film thicknesses and compositions as those of the intermediate layer and the memory layer in Experimental Example 7. The reproduction layer also had the same film thickness as that in Experimental Example 7, but the composition thereof was changed. Specifically, x was set to 26% in $Gd_x(Fe_{57}Co_{43})_{100-x}$. A film of this composition was measured alone to observe the temperature dependency of the saturation magnetization Ms1, and represented an Ms1 of 151 emu/cc at room temperature, a compensation temperature of 172° C. and a Curie temperature of 300° C. or more. The temperature dependency of Ms1 is shown in FIG. 16.

Experimental Example 9

Subsequently, using the same apparatus and method as in Experimental Example 7, the magneto-optical recording medium of the present invention having the same structure as that in Experimental Example 7 except for the composition of the reproduction layer, was prepared. Specifically, in the composition of the reproduction layer, x was set to 28% in $Gd_x(Fe_{57}Co_{43})_{100-x}$. A film of this composition was measured alone to observe the temperature dependency of the saturation magnetization Ms1, and represented an Ms1 of 236 emu/cc at room temperature, a compensation temperature of 225° C. and a Curie temperature of 300° C. or more. The temperature dependency of Ms1 is shown in FIG. 16.

Experimental Example 10

Subsequently, using the same apparatus and method as in Experimental Example 7, the magneto-optical recording medium of the present invention having the same structure as that in Experimental Example 7 except for the composition of the reproduction layer, was prepared. Specifically, in the composition of the reproduction layer, x was set to 31% in $Gd_x(Fe_{57}Co_{43})_{100-x}$. A film of this composition was measured alone to observe the temperature dependency of the saturation magnetization Ms1, and represented an Ms1 of 325 emu/cc at room temperature, a compensation temperature of 275° C. and a Curie temperature of 300° C. or more. The temperature dependency of Ms1 is shown in FIG. 16.

Comparative Example 4

Subsequently, using the same apparatus and method as in Experimental Example 7, the magneto-optical recording medium of Comparative Example 4, having a structure like that in Experimental Example 7, was prepared. The intermediate layer and the memory layer respectively had the same film thicknesses and compositions as those of the intermediate layer and the memory layer in Experimental Example 7. The reproduction layer also had the same film thickness as that in Experimental Example 7, but the composition thereof was changed. Specifically, x was set to 23% in $Gd_x(Fe_{57}Co_{43})100-x$.

In the state where the magnetic films having the foregoing magnetic characteristics were laminated, it was examined whether a mask was formed in the high-temperature region. In case of the magnetostatic energy from the reproduction layer and the memory layer being dominant in the magnetostatic energy inside the medium, such as, in case of a magnetic layer other than the reproduction layer and the memory layer being relatively small in thickness, it is necessary, in order for the mask to be formed in the high-temperature region, that relation (22) is established based on the foregoing energy relation expressions.

$$Ewb-Eleak-Est>Ecl+Ewi \quad (22)$$

First, energies applied to the Bloch magnetic wall of the recorded magnetic domain transferred to the reproduction layer (Bloch magnetic wall energy Ewb, static magnetic field energy Eleak from the reproduction layer, static magnetic field energy Est from the memory layer) were derived.

Since each term in relation (22) depends on temperature, each term is indicated relative to a temperature, for accuracy, so as to determine whether relation (22) is established. On the other hand, since Ewi is rapidly reduced when the intermediate layer reaches around the Curie temperature, it is frequent that a sign of inequality in relation (22) is established before the intermediate layer reaches the Curie temperature. In view of this, it was examined whether relation (22) was established at the Curie temperature of the intermediate layer. At this time point, Ewi can be regarded as O. For calculation, a Bloch magnetic wall energy Ewb of the reproduction layer and saturation magnetizations of the reproduction layer and the memory layer when the intermediate layer reaches the Curie temperature, are necessary. Accordingly, first, each of these materiality values was calculated. It is assumed that the reproduction layer and the memory layer lose the exchange-coupling force around the Curie temperature of the intermediate layer, i.e. about 155° C. Values at this temperature were taken as the materiality values. A Bloch magnetic wall energy awb of the reproduction layer, when measured with the reproduction layer in the form of a single layer film, did not depend on the composition thereof within a range of this experiment and was about 1.9 erg/cc at about 155° C. Further, Ms2 of the memory layer was derived to be −225 emu/cc from FIG. 17. On the other hand, Ms1 of the reproduction layer differed depending on the compositions of the reproduction layer and were derived to be values as shown in Table 3. Using these materiality values, the energies were calculated.

Figure 18:
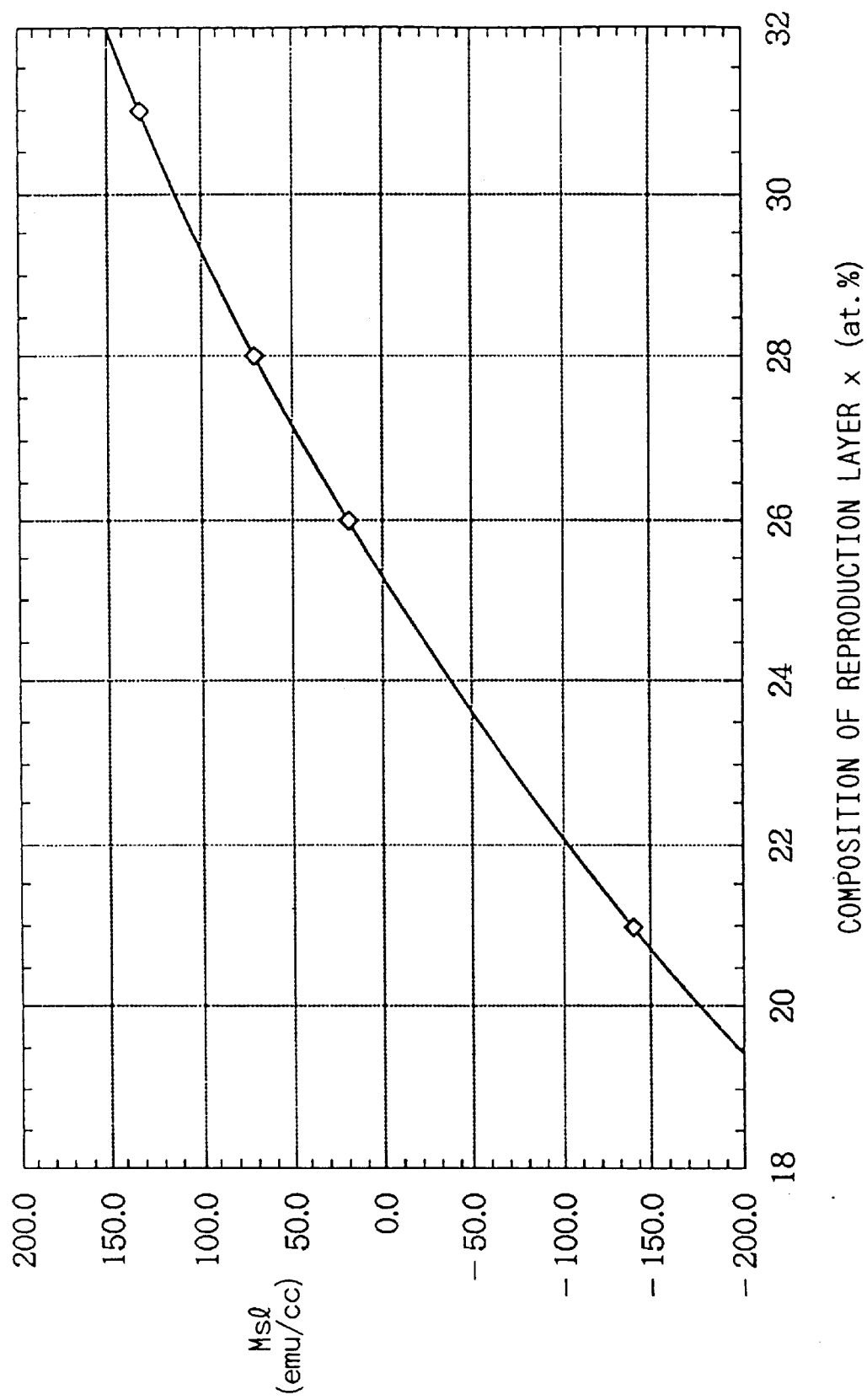
FIG. 18 is a diagram showing the reproduction-layer-composition-x dependency of the saturation magnetization of the reproduction layer at the Curie temperature of an intermediate layer.

First, by substituting σwb=1.9 erg/cc and r=0.2 μm into relation (15), Ewb=9.50×10⁴ erg/cc was obtained. Further, Ms1, necessary for deriving Eleak, was obtained in the following manner. Specifically, Ms1 values corresponding to the respective reproduction layers were plotted. Since the precise measurement of Ms1 around the compensation composition was not easy, a value corresponding to $Gd_x$ $(Fe_{57}Co_{43})_{100-x}$ (x=21%) alone was measured, and from this Ms1 and other Ms1 values, Ms1 values corresponding to x=23, 25 were plotted as shown in FIG. 18 so as to presume Ms1 values therefor. Using h1=30 nm and r=0.2 μm, Eleak was obtained from relation (18). Further, Est is expressed by relation (23).

$$Est=2Ms1Hst \quad (23)$$

Accordingly, Hst was first calculated. Hst can be calculated from relation (24) in the simplified manner. In relations (24) and (25), a represents a radius of the recorded magnetic domain of the memory layer, h2 represents a film thickness of the memory layer and (r, θ, z) represents coordinates of a measurement point, applied with a magnetic field Hst in a film-thickness direction, in a polar coordinate system having the origin, which is the center of an end surface, at a light-incident side, of the recorded magnetic domain in the memory layer, wherein r represents a distance in a radial direction, θ represents an angle and z represents a distance toward the light-incident side.

$$Hst=(4\pi Ms2)\int_o^n\{k-y/a, z/a,\theta)k(z+h),a-\theta\}de \quad (24)$$

k(r/a, z/a, θ) and f(r, z, θ) are defined by relations (25) and (26), respectively.

$$k(r/a,z/a,\theta)=-(1/\pi)\{(z/a)/f(r,z,\theta)\}\{l+f(r,z,\theta)\}/\{1-(r/a)\cos\theta+f(r,z,\theta)\} \quad (25)$$

$$f(r,z,\theta)=\sqrt{(1+(r/a)^2+(z/a)^{2-2(z/a)\cos\theta})} \quad (26)$$

The influence of a static magnetic field from a recorded magnetic domain of the memory layer other than a recorded magnetic domain of the memory layer just under a recorded magnetic domain of the reproduction layer being observed, is not so large. Accordingly, for simplification, relation (24) only deals with the recorded magnetic domain of the memory layer just under the recorded magnetic domain of the reproduction layer being observed. However, for further accuracy, it is better to calculate the magnetostatic energy from all the magnetization in the memory layer. This also applies to the calculation of Hleak defined by relation (8) in a simplified manner. As a result of calculating relation (24) using a calculator, Hst/(4πMs2)=0.15 was obtained in case of a diameter of the recorded magnetic domain being 0.4 nm (a=0.2 nm). Est was obtained using this value, Ms1 and Ms2. The results are shown in Table 3.

Further, a coercive force energy Ec is expressed by relation (27).

$$Ec=2Ms1\cdot Hcl \quad (27)$$

From the temperature dependencies of the saturation magnetization and the coercive force of the reproduction layer, Ec at 155° C. depended on the composition of the reproduction layer only to a small extent in this experimental example, and thus were substantially 6×10⁴ erg/cc for any of the compositions.

These energy values are shown in Table 3.

Figure 19:
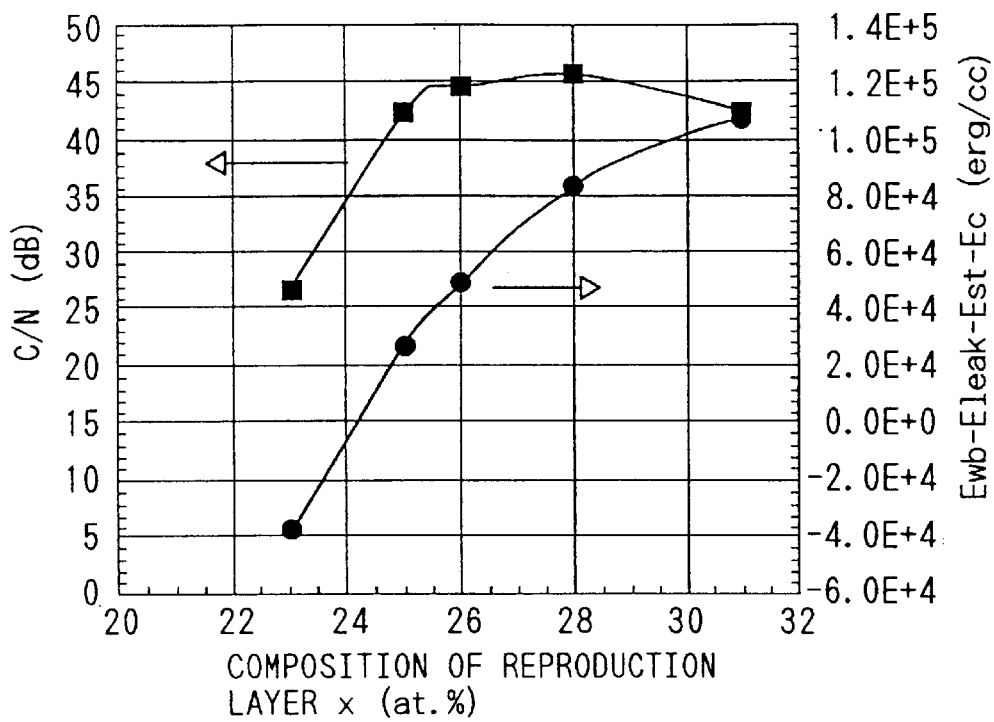
FIG. 19 is a diagram showing the reproduction-layer-composition-x dependency of C/N and energy (Ewb—Eleak—Est—Ecl) in Experimental Examples 7 to 10.

As described before, in order for the mask to be formed in the high-temperature region, relation (22) should be established. Since Ewi=O, an expression Ewb—Eleak—Est—Ec for showing whether the recorded magnetic domain of the reproduction layer is contracted and inverted, is shown in FIG. 19 relative to the compositions x of the reproduction layer. According to FIG. 19, when x≧25%, relation (28) was to be established so that it was expected that the recorded magnetic domain of the reproduction layer would be contracted and inverted, and thus the rear mask would be formed.

$$E_{wb} - E_{leak} - E_{st} - E_{cl} > 0 \tag{28}$$

On the other hand, when $x \leq 24\%$, relation (29) was to be established so that it was expected that the rear mask would not be formed.

$$E_{wb} - E_{leak} - E_{st} - E_{cl} < 0 \tag{29}$$

Next, the recording/reproduction characteristic was measured using this disc magneto-optical recording medium. The measurement was performed by setting the N.A. of an objective lens to be 0.55, the laser beam wavelength to be 780 nm, the recording power to be in a range of 7 to 13mW and the reproducing power to be 2.4 mW. The linear velocity was set to be 9 m/s, and no external magnetic field was applied upon reproduction. First, erasing was performed entirely on the medium, and thereafter, carrier signals of 5.8 MHz, 11.3 MHz and 15 MHz (corresponding to mark lengths 0.78 µm, 0.40 pm and 0.30 µm, respectively) were recorded in the memory layer so as to examine the mark-length dependency of C/N. When the recording of the mark length 0.78 µm was performed, a C/N ratio of 48 dB or more was obtained for all the discs. On the other hand, when the recording of the mark length 0.30 µm was performed, a C/N ratio of 35 dB or more was obtained for the media of Experimental Examples 7 to 10, while a C/N ratio of 20 dB or more was not obtained for the medium of Comparative Example 4.

C/N ratios at the mark length 0.40 pm are shown in FIG. 19 relative to the compositions of the reproduction layer, along with the energies. As seen in FIG. 19, when $x \geq 25\%$ in the composition $Gd_x(Fe_{57}Co_{43})_{100-x}$ of the reproduction layer, the C/N ratio was 40 dB or more so that good values were obtained. On the other hand, when x=23%, the C/N ratio deteriorated. When comparing this with the foregoing energy relation, it is appreciated that this matches well the energy calculation results. This reveals that the medium of the present invention, satisfying the foregoing energy conditional expressions, shows an excellent reproduction characteristic.

Experimental Example 11

Next, the foregoing magneto-optical recording medium in which the reproduction layer is an in-plane magnetization film at room temperature and becomes a perpendicular magnetization film between room temperature and the Curie temperature, was prepared. First, Si, Gd, Tb, Fe and Co targets were attached to a DC magnetron sputtering apparatus, and a glass substrate having a diameter of 130 mm and a polycarbonate substrate with lands and grooves were fixed to a substrate holder which was set at a position separated from the respective targets by a distance of 150 mm. Thereafter, the interior of the chamber was evacuated by a cryopump to a high vacuum of $1 \times 10^{-5}$ Pa or less. During the evacuation, Ar gas was introduced into the chamber to 0.5 Pa, and thereafter, an SiN interference layer of 900 Å thickness, a GdFeCo reproduction layer of 400 Å thickness, a GdFe intermediate layer of 100 Å thickness, a TbFeCo memory layer of 350 Å thickness and an SiN protective layer of 700 Å thickness were formed in the order named, thus forming the magneto-optical recording medium of the present invention with a structure shown in FIG. 14. Upon formation of each SiN dielectric layer, $N_2$ gas was introduced in addition to the Ar gas, and the SiN layer was formed by DC reactive sputtering, adjusting a mixing ratio of the Ar and $N_2$ gases, so as to obtain a refractive index of 2.1.

The composition of the GdFeCo reproduction layer was $Gd_x(Fe_{58}Co_{42})_{100-x}$, and x was set to be 27%. A film of this composition was measured alone to observe the temperature dependency of a saturation magnetization Msl (emu/cc), and represented Msl of 150 emu/cc at room temperature, a compensation temperature of 188° C. and a Curie temperature of 300° C. or more.

The composition of the GdFe intermediate layer was $Gd_{37}Fe_{63}$. A film of this composition was measured alone and represented a saturation magnetization Ms3 of 420 emu/cc at room temperature and a Curie temperature of 198° C. In the present medium, GdFe having a small perpendicular magnetic anisotropy and a large saturation magnetization is used for the intermediate layer so that the reproduction layer becomes an in-plane magnetization film around room temperature to a sufficient extent so as to form a front mask.

The composition of the TbFeCo memory layer was $Tb_{20}(Fe_{80}CO_{20})_{80}$. A film of this composition was measured alone to observe the temperature dependency of the saturation magnetization Ms2, and Ms2 was −240 emu/cc at room temperature and the Curie temperature was 250° C. The temperature dependency of Ms2 is shown in FIG. 17.

Experimental Example 12

Subsequently, using the same apparatus and method as in Experimental Example 11, the magneto-optical recording medium of the present invention, having a structure like that in Experimental Example 11, was prepared. The intermediate layer and the memory layer, respectively, had the same film thicknesses and compositions as those of the intermediate layer and the memory layer in Experimental Example 11. The reproduction layer also had the same film thickness as that in Experimental Example 11, but the composition thereof was changed. Specifically, x was set to be 28% in $Gd_x(Fe_{58}CO_{42})_{100-x}$. A film of this composition was measured alone to observe the temperature dependency of the saturation magnetization Msl, and represented an Msl of 200 emu/cc at room temperature, a compensation temperature of 205° C. and a Curie temperature of 300° C. or more.

Experimental Example 13

Subsequently, using the same apparatus and method as in Experimental Example 11, the magneto-optical recording medium of the present invention, having the same structure as that in Experimental Example 11, except for the composition of the reproduction layer, was prepared. Specifically, in the composition of the reproduction layer, x was set to 29% in $Gd_x(Fe_{58}CO_{42})_{100-x}$. A film of this composition was measured alone to observe the temperature dependency of the saturation magnetization Msl, and represented an Msl of 240 emu/cc at room temperature, a compensation temperature of 225° C. and a Curie temperature of 300° C. or more.

Experimental Example 14

Subsequently, using the same apparatus and method as in Experimental Example 11, the magneto-optical recording medium of the present invention, having the same structure as that in Experimental Example 11, except for the composition of the reproduction layer, was prepared. Specifically, in the composition of the reproduction layer, x was set to 31% in $Gd_x(Fe_{58}CO_{42})_{100-x}$. A film of this composition was measured alone to observe the temperature dependency of the saturation magnetization Msl, and represented an Msl of 310 emu/cc at room temperature, a compensation temperature of 260° C. and a Curie temperature of 300° C. or more.

Comparative Example 5

Subsequently, using the same apparatus and method as in Experimental Example 11, the magneto-optical recording medium of Comparative Example 5, having a structure like that in Experimental Example 11, was prepared. The intermediate layer and the memory layer, respectively, had the same film thicknesses and compositions as those of the intermediate layer and the memory layer in Experimental Example 11. The reproduction layer also had the same film thickness as that in Experimental Example 11, but the composition thereof was changed. Specifically, x was set to 25% in $Gd_x(Fe_{58}CO_{42})_{100-x}$. A film of this composition was measured alone to observe the temperature dependency of the saturation magnetization Msl, and represented an Msl of 51 emu/cc at room temperature, a compensation temperature of 150° C. and a Curie temperature of 300° C. or more.

Comparative Example 6

Subsequently, using the same apparatus and method as in Experimental Example 11, the magneto-optical recording medium of Comparative Example 6, having a structure like that in Experimental Example 11, was prepared. The intermediate layer and the memory layer, respectively, had the same film thicknesses and compositions as those of the intermediate layer and the memory layer in Experimental Example 11. The reproduction layer also had the same film thickness as that in Experimental Example 11, but the composition thereof was changed. Specifically, x was set to 26% in $Gd_x(Fe_{58}CO_{42})_{100-x}$.

In the state where the magnetic films having the foregoing magnetic characteristics were laminated, a condition of formation of the mask in the high-temperature region, when the exchange-coupling force from the memory layer was lost in case of recording the mark length 0.4 μm, was derived. It is assumed that the reproduction layer and the memory layer lose the exchange-coupling force at about 200° C. Values at this temperature were taken as the materiality values. A Bloch magnetic wall energy σwb of the reproduction layer, when measured with the reproduction layer in the form of a single layer film, did not depend on the composition thereof in the present experimental example and was about 1.5 erg/cc at about 200° C. Further, the saturation magnetization Ms2 of the memory layer was derived to be −180 emu/cc. On the other hand, the saturation magnetization Mel of the reproduction layer differed depending on the compositions of the reproduction layer and were derived to be values as shown in Table 4. Using these materiality values, the effective magnetic fields were calculated.

First, by substituting σwb=1.5 erg/cc and r=0.2 μm into relation (15), Ewb=7.50×104 erg/cc was obtained. Eleak was obtained by using hl=30 nm, r=0.2 pm and Msl was derived corresponding to each of the reproduction layers in the same manner as in Experimental Examples 7 to 10. Est was calculated using Hst=0.15, Msl and Ms2 as described before.

From the temperature dependencies of the saturation magnetization and the coercive force of the reproduction layer, a coercive force energy Ec at about 200° C. depended on the composition of the reproduction layer only to a small extent in this experimental example, and thus were substantially 6×10⁴ erg/cc for any of the compositions.

These energy values are shown in Table 4.

Figure 20:
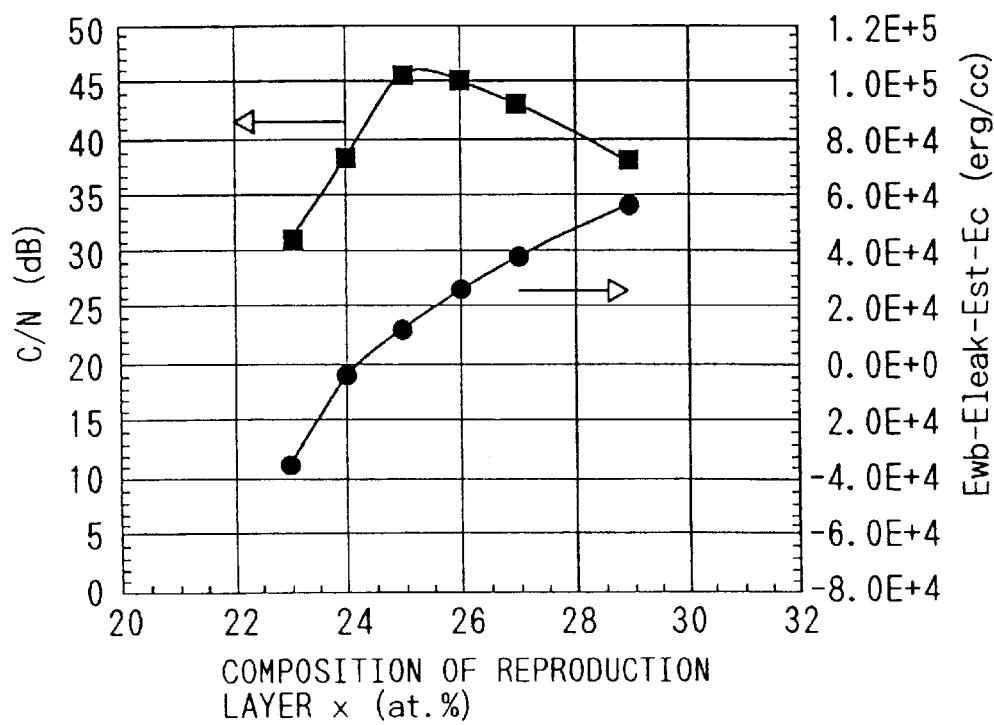
FIG. 20 is a diagram showing the reproduction-layer-composition-x dependency of C/N and energy (Ewb—Eleak—Est—Ecl) in Experimental Examples 11 to 14.

Further, an expression Ewb—Eleak—Est—Ec for showing whether the recorded magnetic domain of the reproduction layer is contracted and inverted, is shown in FIG. 20 relative to the compositions x of the reproduction layer. According to FIG. 20, when x>26%, relation (28) was to be established so that it was expected that the recorded magnetic domain of the reproduction layer would be contracted and inverted, and thus the rear mask would be formed.

Ewb—Eleak—Est—Ecl>0

On the other hand, when x≦26%, relation (29) was to be established so that it was expected that the rear mask would not be formed. Thus, it was expected that a C/N ratio would deteriorate.

Ewb—Eleak—Est—Ecl<0 (29)

Next, the recording/reproduction characteristic was measured using this magneto-optical recording medium. The measurement was performed by setting the N.A. of an objective lens to be 0.55, the laser beam wavelength to be 780 nm, the recording power to be in a range of 7 to 13 mW and the reproducing power to be 3.4 mW. The linear velocity was set to be 9 m/s, and no external magnetic field was applied upon reproduction. First, erasing was performed entirely on the medium, and thereafter, carrier signals of 5.8 MHz, 11.3 MHz and 15 MHz (corresponding to mark lengths 0.78 μm, 0.40 pm and 0.30, um, respectively) were recorded in the memory layer so as to examine the mark-length dependency of C/N. When the recording of the mark length 0.78 pm was performed, a C/N ratio of 48 dB or more was obtained for all the discs. On the other hand, when the recording of the mark length 0.30 pm was performed, a C/N ratio of 35 dB or more was obtained for the media of the present invention in Experimental Examples 11 to 14, while a C/N ratio of 25 dB or more was not obtained for the media of Comparative Examples 5 and 6.

C/N ratios at the mark length 0.40 μm are shown in FIG. 20 relative to the compositions of the reproduction layer. As seen in FIG. 20, when x>26% in the composition $Gd_x(Fe_{58}Co_{42})_{100-x}$ of the reproduction layer, a C/N ratio was 40 dB or more so that good values were obtained. On the other hand, when x=25%, 26%, the C/N ratio deteriorated. When comparing this with the foregoing energy relation, it is appreciated that this matches well the energy calculation results. This reveals that the medium of the present invention, satisfying the foregoing energy conditional expressions, shows an excellent reproduction characteristic. On the other hand, with regard to a disc with x=26%, since the deviation relative to the condition of formation of the rear mask is relatively small, good C/N ratios have been obtained as compared with the conventional medium, which is not a super-resolution medium. However, in order to obtain a sufficiently high C/N ratio, the condition of the present invention is necessary. Further, with x=31%, although the condition of formation of the rear mask was satisfied in terms of the energy expression, the C/N ratio somewhat deteriorated as being 40 dB or less. By measuring a Kerr loop (a loop obtained by plotting Kerr rotation angles of a sample relative to a magnetic field applied in perpendicular to a film thickness direction; measured with a laser beam of 780 nm) under irradiation of light from a side of the reproduction layer with respect to a disc with x=31% by increasing a temperature from room temperature, it has been clarified that the reproduction layer did not become a perpendicular magnetization film to a sufficient extent before the temperature increases to reach the Curie temperature of the intermediate layer. Thus, it has been found out that the deterioration of C/N was caused due to the fact that a condition necessary for the medium of the present invention other than the energy relation, that is, a condition that the reproduction layer should be a magnetic layer which becomes a perpendicular magnetization film at least before the intermediate layer reaches the Curie temperature, was not satisfied.

Experimental Example 15

Finally, consideration has been made from various aspects with respect to the characteristic of the magneto-optical recording medium of the present invention, which will be shown in Experimental Example 15 and Comparative Examples 7 and 8.

Si, Gd, Fe and Co targets were attached to a DC magnetron sputtering apparatus, and a glass substrate having a diameter of 130 mm and a polycarbonate substrate with lands and grooves at a pitch of 1.6 μm were fixed to a substrate holder, which was set at a position separated from the respective targets by a distance of 150 mm. Thereafter, the interior of the chamber was evacuated by a cryopump to a high vacuum of $1\times10^{-5}$ Pa or less. During the evacuation, Ar gas was introduced into the chamber to 0.4 Pa, and thereafter, an SiN interference layer of 900 Å thickness, a $Gd_{28}(Fe_{60}CO_{40})_{72}$ reproduction layer of 400 Å thickness, a $Gd_{37}Fe_{63}$ intermediate layer of 100 Å thickness, a $Tb_{20}(Fe_{80}Co_{20})_{80}$ memory layer of 300 Å thickness and an SiN protective layer of 700 Å thickness were formed in the order named, thus forming the magneto-optical recording medium of the present invention with a structure shown in FIG. 14. This medium is of a double-mask type in which a rear mask and a front mask are formed. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.1. The $Gd_{28}(Fe_{60}Co_{40})_{72}$ reproduction layer was rare earth element sublattice magnetization dominant at room temperature, and was set to represent a saturation magnetization Msl of 180 emu/cc, a compensation temperature Tcompl of 215° C. and a Curie temperature Tc1 of 300° C. or more. The $Gd_{37}Fe_{63}$ intermediate layer was rare earth element sublattice magnetization dominant at room temperature, and was set to represent a saturation magnetization Ms3 of 450 emu/cc and a Curie temperature Tc3 of 190° C. The $Tb_{20}(Fe_{80}Co_{20})_{80}$ memory layer was iron family element lattice magnetization dominant, and was set to represent a saturation magnetization Ms2 of −240 emu/cc and a Curie temperature Tc2 of 250° C.

The energy calculation was performed with respect to this medium as in the foregoing experimental examples, and Ewb—Eleak—Est—Ecl=$1\times10^5$ erg/cc was obtained. Accordingly, the calculation result showed formation of the rear mask.

After recording a magnetic domain of a 0.78 μm mark length in the magneto-optical recording medium, the magnetic domain was observed by a polarizing microscope under irradiation of a semiconductor laser beam of 830 nm. While increasing the laser power, it was confirmed that the recorded magnetic domain was contracted and the magnetization was oriented in an erasing direction at the center (high-temperature region) of the light spot at a certain laser power.

Figure 21:
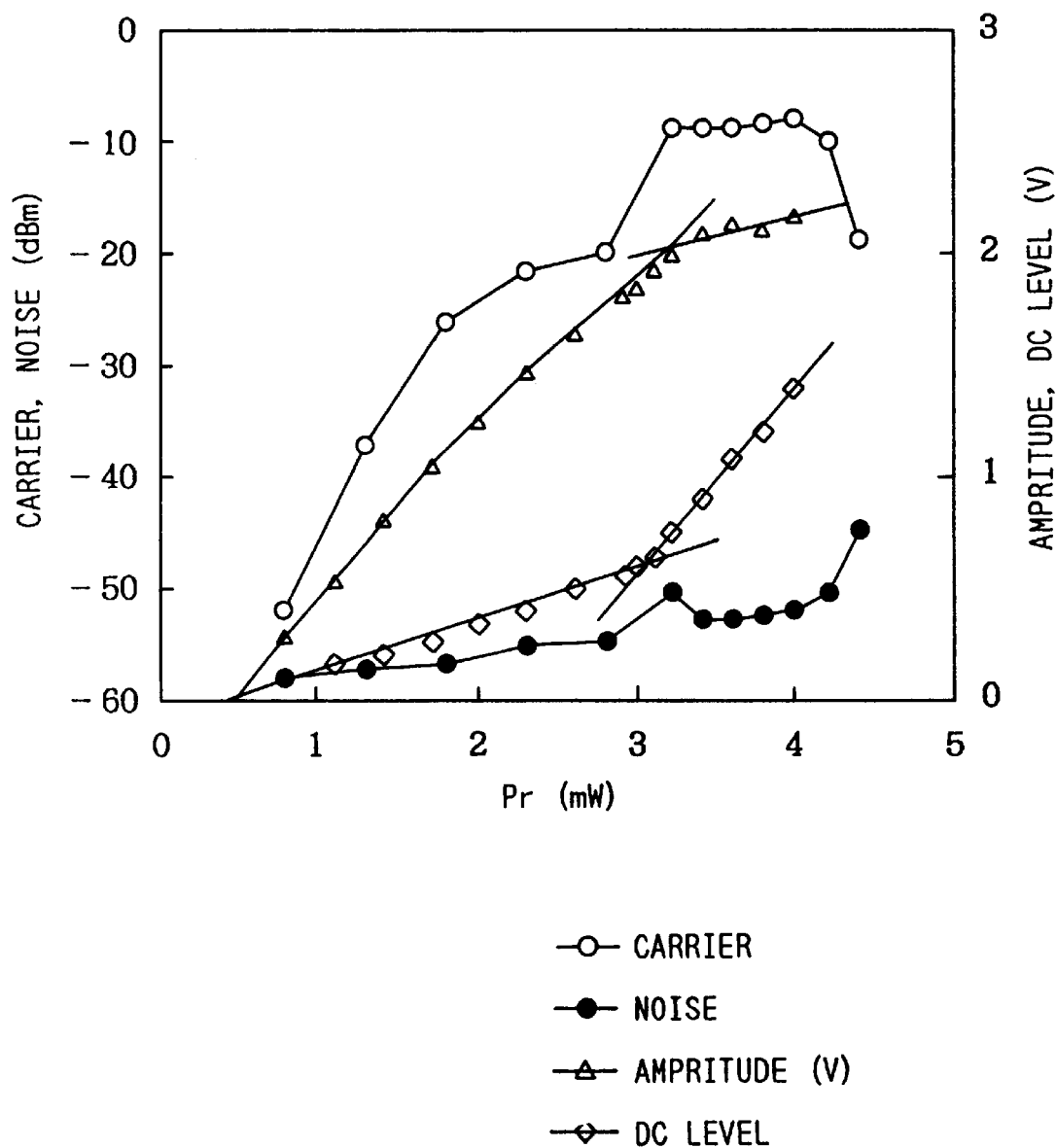
FIG. 21 is a diagram showing the reproducing power dependency of a carrier, noise, amplitude and a DC level.

Subsequently, the recording/reproduction characteristic was measured using this magneto-optical recording medium. The measurement was performed by setting the N.A. of an objective lens to be 0.53, the laser beam wavelength to be 780 nm (using an optical head), the linear velocity to be 9 m/s and the recording power to be 10 mW. First, erasing was performed entirely on the medium, and thereafter, a mark of 0.40 μm length was recorded by modulating a laser beam at a frequency of 11.3 MHz. Subsequently, variations of C/N ratios were measured by changing the reproducing power from 0.8 mW to 4.4 mW. The results are shown in FIG. 21.

In the magneto-optical recording medium of the present invention, since the temperature of the medium does not increase sufficiently while the reproducing power is 1.0 mW or less, magnetization of the reproduction layer is oriented substantially in a film plane. Accordingly, since the mark recorded in the memory layer is masked by the reproduction layer, substantially no C/N ratio is obtained. On the other hand, when the reproducing power is increased to about 2.0 mW to 2.8 mW, a medium-temperature region, that is, an aperture region, is formed within the reproducing spot to transfer the magnetic domain of the memory layer to the reproduction layer so that the C/N ratio is increased. The configuration of the aperture region at this time is substantially the same as in the super resolution of the conventional two-layered structure using the in-plane film. Accordingly, although the super-resolution phenomenon is generated, since the size and location of the aperture region are not optimum, only about 36 dB can be obtained as a C/N ratio. When the reproducing power is further increased from 3.2 mW to 4.0 mW, a portion appears within the spot where the intermediate layer reaches the Curie temperature, that is, a rear mask is formed. Then, as shown in FIG. 5A, the aperture configuration becomes optimum relative to the spot so that a C/N ratio of 45 dB is obtained. On the other hand, when the reproducing power exceeds 4.0 mW, the highest temperature exceeds the Curie temperature of the memory layer so that the recorded data are damaged to reduce the C/N ratio.

Next, amplitudes and DC levels of the reproduced signal were measured for further supporting the formation of the rear mask in the magneto-optical recording medium of the present invention. In case of the recorded mark length being 0.4 μm, when the reproducing power exceeds 3 mW, the carrier level is rapidly increased so that the formation of the rear mask can be confirmed.

The amplitudes and DC levels were obtained from the reproduced signal for the 0.8 μm marks recorded in the same medium. The DC level takes a positive sign at an erasing side. In case of the conventional optical disc, the aperture configuration does not change even when the reproducing power is changed. Accordingly, when the reproducing power is within a range which does not cause the memory layer to reach the Curie temperature, the relationship between the amplitude of the reproduced signal and the reproducing power forms a straight line passing the origin. Further, the mark is not recorded over the full width of the spot light so that erased-state portions remain at both sides of the mark. Accordingly, even when the marks are recorded with a duty cycle of 50%, the DC level of the reproduced signal does not become O, but offsets to the erasing side. Thus, each of relationships of both the amplitude and the DC level relative to the reproducing power forms a straight line with a positive slope passing through the origin. Alternatively, when reduction in the Kerr rotation angles of the reproduction layer, due to the power increase, is at a level which can not be ignored, a curve is formed which is slightly convex upward depending on such a level. On the other hand, in case of the super-resolution disc of the present invention, a straight line does not pass the origin, and further, its slope is changed around the reproducing power of 3 mW. This is considered as follows.

When the reproducing power is 0.5 mW or less, even the highest-temperature portion does not reach a temperature where the reproduction layer makes the transition from an in-plane magnetization film to a perpendicular magnetization film. Accordingly, the magnetization of the reproduction layer is in-plane, that is, masked, in all the regions within the spot. Thus, the amplitude and the DC level are both O. On the other hand, when the reproducing power exceeds 0.5 mW, a part of the reproduction layer within the spot becomes a perpendicular magnetization film. When the power is further increased, since the aperture region expands, both the amplitude and the DC level are rapidly increased with a slope exceeding a proportional relationship with the reproducing power. However, when the reproducing power exceeds 3 mW, the rear mask starts to be formed within the spot so that the direction of the magnetization aligns in the erasing direction in the rear-masked portion. This portion worked for the signal reproduction before the appearance of the rear mask, but does not work for the signal reproduction as being masked in the erasing direction when the rear mask appears. Accordingly, across the reproducing power of 3 mW, the DC level is rapidly increased in the erasing direction, while the amplitude of the reproduced signal is reduced. From the foregoing results, the behavior of the rear mask in the super-resolution disc of the present invention has been supported.

Figure 22:
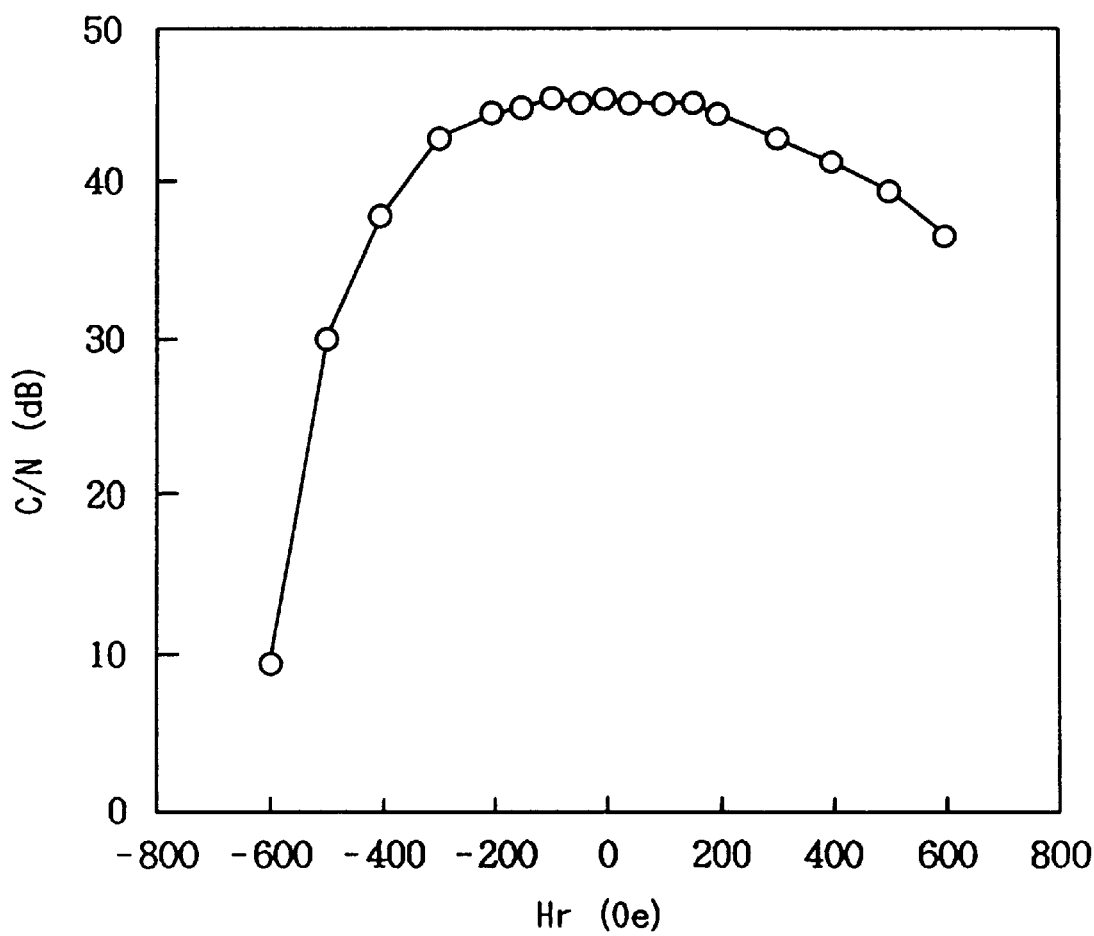
FIG. 22 is a diagram showing the reproducing magnetic field dependency of C/N.

Further, in order to confirm that the super-resolution effect of the present invention is generated without applying an external reproducing magnetic field, the results of examination about dependency upon the reproducing magnetic field are shown in FIG. 22. FIG. 22 was obtained in the following manner. After the 0.4 mm marks were recorded on the disc as in the foregoing manner, the reproducing magnetic field was changed while performing the signal reproduction with the reproducing power of 3.2 mW, and a variation of C/N ratios at that time was plotted. As is clear from this figure, a C/N ratio of 45 dB was stably obtained in a range of the reproducing magnetic field ±200 Oe.

Subsequently, crosstalk with the adjacent track (hereinafter referred to as "crosstalk") was measured. First, erasing was performed entirely on the lands and the grooves, and thereafter, a signal of a 0.78 µm mark length was recorded on the land as in the foregoing manner so as to measure a carrier level CL. Subsequently, a carrier level CG upon tracking the adjacent groove was measured. The crosstalk was represented by a ratio CL/CG. Since the experiment was performed on the assumption that data were recorded on both the land and groove, the effective track pitch was 0.8 µm. The results are shown in FIG. 23. As is clear from the figure, the crosstalk was suppressed to about −28 dB in a range of the reproducing power of 3.2 mW to 4.0 mW, which range was optimum for the medium.

Although not shown in FIG. 23, the crosstalk measurement was performed in the same manner with respect to the medium of Experimental Example 13, wherein the crosstalk values in a range between −32 dB and −35 dB were obtained relative to a range of the reproducing power of 2.5 mW to 4.0 mW.

The foregoing data were all obtained without applying an initializing magnetic field, and excellent results were obtained for the marks recorded at high density using an information recording/reproduction device like the conventional information recording/reproduction device.

Next, experiments were performed with respect to the conventionally known medium structure in the same manner as before and a comparison was made with the medium of the present invention.

Comparative Example 7

Using the same apparatus and method as in Experimental Example 15, an SiN interference layer of 900 Å thickness, a $Tb_{20}(Fe_{80}Co_{20})_{80}$ memory layer of 800 Å thickness and an SiN protective layer of 700 Å thickness were formed on a polycarbonate substrate in the order named. In other words, a single layer disc having, as a magnetic layer, only the memory layer used in Experimental Example 15 was prepared. First, the marks of various sizes were recorded on the medium, and C/N ratios were measured as in Experimental Example 15. The reproducing power was set to be in a range from 2.0 mW to 3.8 mW so as to obtain the highest C/N ratio. As a result, although a sufficiently high C/N ratio was obtained when the mark length was large, i.e. 0.78 µm, the resolution was rapidly reduced when the mark length was short, i.e. close to a cut-off frequency of the optical system, so that a C/N ratio of only 26 dB was obtained when the mark length was 0.40 µm.

Further, in the measurement of the crosstalk, since the effective track pitch of 0.8 µm was narrow relative to the reproducing spot, and further, since no mask effect was provided in case of the single layer disc, crosstalk of only about −22 dB was obtained as shown in FIG. 23.

Comparative Example 8

Using the same apparatus and method as in Experimental Example 15, an SiN interference layer of 900 Å thickness, a $Gd_{28}(Fe_{60}Co_{40})_{72}$ reproduction layer of 700 Å thickness, a $Tb_{20}(Fe_{80}Co_{20})_{s80}$ memory layer of 300 Å thickness and an SiN protective layer of 700 Å thickness were formed on a polycarbonate substrate in the order named, thus obtaining the medium of Comparative Example 8.

First, the marks of 0.4 µm mark length were recorded on the medium, and the reproducing power dependencies of carrier and noise were measured. Since even the medium of this comparative example provides the super-resolution effect by using an in-plane magnetization film at low temperatures, the carrier level was increased, as in the medium of the present invention in Experimental Example 15, in a range of the reproducing power between 0.8 mW and 2.8 mW. However, in the two-layered super-resolution medium of this comparative example, since a rear mask does not appear even when the reproducing power is increased to 3 mW or more, a rapid carrier increase as in the medium of the present invention in Experimental Example 15 was not observed. In the medium of this comparative example, the C/N ratio of only 37 dB was obtained at maximum, in the case of the mark length being 0.40 µm.

Next, marks of various sizes were recorded on the medium of this comparative example, and the spatial frequency characteristic thereof was measured. The results were such that, although the resolution was increased at high-frequency regions as compared with the single layer disc, since no rear mask effect was provided and the positional relationship between the aperture region and the spot was not optimum, the resolution was inferior as compared with the disc of Experimental Example 15.

Further, with regard to the crosstalk, the crosstalk of about −30 dB, equivalent to that of the medium of the present invention in Experimental Example 15, was obtained. However, in a range of the reproducing power between 2.0 mW and 4.0 mW, the crosstalk in this comparative example deteriorated by about 2 dB to 3 dB as compared with the medium of the present invention in Experimental Example 13.

TABLE 1

Reproduction Layer

| | Composition at % | Film Thickness Å | MS emu/cc | Tcomp °C | Tc °C |
|---|---|---|---|---|---|
| Experimental Example 1 | $Gd_{30}(Fe_{65}CO_{35})_{70}$ | 400 | 196 | 240 | 300< |
| Experimental Example 2 | $Gd_{28}(Fe_{65}Co_{35})_{72}$ | 400 | 160 | 180 | 300< |
| Experimental Example 3 | $Gd_{28}(Fe_{60}Co_{40})_{72}$ | 400 | 160 | 205 | 300< |
| Experimental Example 4 | $Gd_{27}(Fe_{57}Co_{43})_{73}$ | 450 | 170 | 190 | 300< |
| Experimental Example 5 | $Gd_{30}(Fe_{62}Co_{38})_{70}$ | 380 | 280 | 290 | 300< |
| Experimental Example 6 | $Gd_{29}(Fe_{65}Co_{35})_{71}$ | 430 | 250 | 260 | 300 |
| Comparative Example 1 | $Gd_{20}(Fe_{75}Co_{25})_{80}$ | 300 | −180 | — | 300< |
| Comparative Example 2 | $Gd_{21}(Fe_{75}Co_{25})_{79}$ | 300 | −160 | — | 300< |
| Comparative Example 3 | $Gd_{30}(Fe_{60}Co_{40})_{70}$ | 400 | 180 | 240 | 300< |

(Ms being positive represents a RE rich composition, and being negative represents a TM rich composition.)

Intermediate Layer

| | Composition at % | Film Thickness Å | MS emu/cc | Tcomp °C | Tc °C |
|---|---|---|---|---|---|
| Experimental Example 1 | $Tb_{18}(Fe_{97}Co_3)_{82}$ | 50 | 95 | — | 135 |
| Experimental Example 2 | $Dy_{20}(Fe_{97}Co_3)_{80}$ | 60 | 80 | — | 128 |
| Experimental Example 3 | $Gd_{40}Fe_{60}$ | 100 | 475 | — | 190 |
| Experimental Example 4 | $Gd_{45}Fe_{55}$ | 80 | 540 | — | 165 |
| Experimental Example 5 | $Gd_{37}Fe_{63}$ | 120 | 420 | — | 195 |
| Experimental Example 6 | $Gd_{42}(Fe_{95}Co_5)_{58}$ | 130 | 480 | — | 176 |
| Comparative Example 1 | $Tb_{18}(Fe_{90}Co_5Al_5)_{82}$ | 100 | −160 | — | 140 |
| Comparative Example 2 | $Tb_{18}(Fe_{90}Co_5Al_5)_{82}$ | 100 | −160 | — | 140 |
| Comparative Example 3 | | | | | |

(Ms being positive represents a RE rich composition, and being negative represents a TM rich composition.)

Auxiliary Layer

| | Composition at % | Film Thickness Å | MS emu/cc | Tcomp °C | Tc °C |
|---|---|---|---|---|---|
| Experimental Example 1 | | | | | |
| Experimental Example 2 | | | | | |
| Experimental Example 3 | | | | | |
| Experimental Example 4 | | | | | |
| Experimental Example 5 | | | | | |
| Experimental Example 6 | | | | | |
| Comparative Example 1 | | | | | |
| Comparative Example 2 | $Gd_{22}(Fe_{60}Co_{40})_{78}$ | 160 | −160 | — | 280 |
| Comparative Example 3 | | | | | |

(A positive Ms indicates a RE rich composition, and a negative Ms indicates a TM rich composition.)

Memory Layer

| | Composition at % | Memory Layer Å | MS emu/cc | Tcomp °C | Tc °C |
|---|---|---|---|---|---|
| Experimental Example 1 | $Tb_{18}(Fe_{88}Co_{12})_{82}$ | 350 | 120 | — | 220 |
| Experimental Example 2 | $Tb_{18}(Fe_{88}Co_{12})_{82}$ | 350 | 120 | — | 220 |
| Experimental Example 3 | $Tb_{20}(Fe_{80}Co_{20})_{80}$ | 300 | −150 | — | 260 |
| Experimental Example 4 | $Tb_{22}(Fe_{80}Co_{20})_{78}$ | 320 | −50 | — | 240 |
| Experimental Example 5 | $T_{18}(Fe_{84}Co_{16})_{82}$ | 300 | −200 | — | 220 |
| Experimental Example 6 | $Tb_{20}(Fe_{80}Co_{20})_{80}$ | 350 | −240 | — | 270 |
| Comparative Example 1 | $Tb_{18}(Fe_{80}Co_{20})_{82}$ | 400 | −150 | — | 250 |
| Comparative Example 2 | $Tb_{18}(Fe_{80}Co_{20})_{82}$ | 400 | −150 | — | 250 |
| Comparative Example 3 | $Tb_{20}(Fe_{80}Co_{20})_{80}$ | 400 | −150 | — | 250 |

(Ms in positive represents RE rich, and in negative TM rich.)

| | Initializing Magnetic Field Oe | Reproducing Magnetic Field Oe |
|---|---|---|
| Experimental Example 1 | 0 | 0 |
| Experimental Example 2 | 0 | 0 |
| Experimental Example 3 | 0 | 0 |
| Experimental Example 4 | 0 | 0 |
| Experimental Example 5 | 0 | 0 |
| Experimental Example 6 | 0 | 0 |
| Comparative Example 1 | 0 | 0 |
| | 0 | 200 |
| | 0 | 400 |
| Comparative Example 2 | 0 | 0 |
| | 1000 | 400 |
| | 2000 | 400 |
| | 3000 | 200 |
| | 3000 | 400 |
| Comparative Example 3 | 0 | 0 |

| | C/N | | | Crosstalk |
|---|---|---|---|---|
| | 0.78 μm dB | 0.40 μm dB | 0.30 μm dB | 0.78 μm dB |
| Experimental Example 1 | 48 | 45 | 36 | −20 |
| Experimental Example 2 | 48 | 44 | 35 | −21 |
| Experimental Example 3 | 49 | 43 | 36 | −39 |
| Experimental Example 4 | 49 | 43 | 35 | −38 |
| Experimental Example 5 | 48 | 45 | 35 | −37 |
| Experimental Example 6 | 49 | 44 | 36 | −39 |

TABLE 1-continued

| | | | | |
|---|---|---|---|---|
| Example 6 | | | | |
| Comparative Example 1 | 48 | 18 | 5 | −12 |
| | 48 | 30 | 18 | −13 |
| | 48 | 45 | 36 | −19 |
| Comparative Example 2 | 48 | 21 | 2 | −15 |
| | 48 | 26 | 8 | −17 |
| | 48 | 29 | 13 | −19 |
| | 48 | 30 | 20 | 19 |
| | 48 | 45 | 34 | −39 |
| Comparative Example 3 | 48 | 35 | 20 | −34 |

TABLE 2

| | Experimental Example 7 | Experimental Example 8 | Experimental Example 9 | Experimental Example 10 | Comparative Example 4 |
|---|---|---|---|---|---|
| Gd content (at. %) | 25 | 26 | 28 | 31 | 23 |
| Ms1 (Emu/cc) | −10 | 17 | 70 | 133 | −72 |
| Ms2 (emu/cc) | −225 | −225 | −225 | −225 | −225 |
| Ewb (erg/cc) | 9.50E + 04 | 9.50E + 04 | 9.50E + 04 | 9.50E + 04 | 9.50E + 04 |
| Eleak (erg/cc) | 2.28E + 02 | 6.60E + 02 | 1.12E + 04 | 4.40E + 04 | 1.18E + 04 |
| Est (erg/cc) | 8.48E + 03 | −1.44E + 04 | −5.93E + 04 | −1.13E + 05 | 6.10E + 04 |
| Ec (erg/cc) | 6.00E + 04 | 6.00E + 04 | 6.00E + 04 | 6.00E + 04 | 6.00E + 04 |
| Ewb-Eleak-Est-Ec (erg/cc) | 2.63E + 04 | 4.88E + 04 | 8.32E + 04 | 1.07E + 05 | −3.79E + 04 |

E + x represents $10^{+x}$

TABLE 3

| | Experimental Example 11 | Experimental Example 12 | Experimental Example 13 | Experimental Example 14 | Comparative Example 5 | Comparative Example 6 |
|---|---|---|---|---|---|---|
| Gd content (at. %) | 27 | 28 | 29 | 31 | 25 | 26 |
| Ms1 (Emu/cc) | −10 | 10 | 30 | 70 | −66 | −32 |
| Ms2 (emu/cc) | −180 | −180 | −180 | −180 | −180 | −180 |
| Ewb (erg/cc) | 7.50E + 04 | 7.50E + 04 | 7.50E + 04 | 7.50E + 04 | 7.50E + 04 | 7.50E + 04 |
| Eleak (erg/cc) | 2.28E + 02 | 2.28E + 02 | 2.06E + 03 | 1.12E + 04 | 9.9E + 03 | 2.34E + 03 |
| Est (erg/cc) | 6.78E + 03 | −6.78E + 03 | −2.03E + 04 | −4.75E + 04 | 4.48E + 04 | 2.17E + 04 |
| Ec (erg/cc) | 5.50E + 04 | 5.50E + 04 | 5.50E + 04 | 5.50E + 04 | 5.50E + 04 | 5.50E + 04 |
| Ewb-Eleak-Est-Ec (erg/cc) | 1.30E + 04 | 2.66E + 04 | 3.83E + 04 | 5.63E + 04 | −3.47E + 04 | −4.04E + 04 |

E + x represents $10^{+x}$ (Second Embodiment)

When a magnetic layer showing an in-plane magnetic anisotropy at room temperature is used as the reproduction layer in the medium of the first embodiment, a magneto-optical recording medium should be designed in consideration of not only the optical effect but also the magnetic behavior of each of the magnetic layers at room temperature and a reproducing temperature, for obtaining an excellent mask effect.

In the second embodiment, the medium, which has been considered in that aspect, will be described.

Hereinbelow, a magneto-optical recording medium according to the second preferred embodiment of the present invention and an information reproducing method using the medium will be described in detail hereinbelow with reference to the accompanying drawings.

Figure 24:
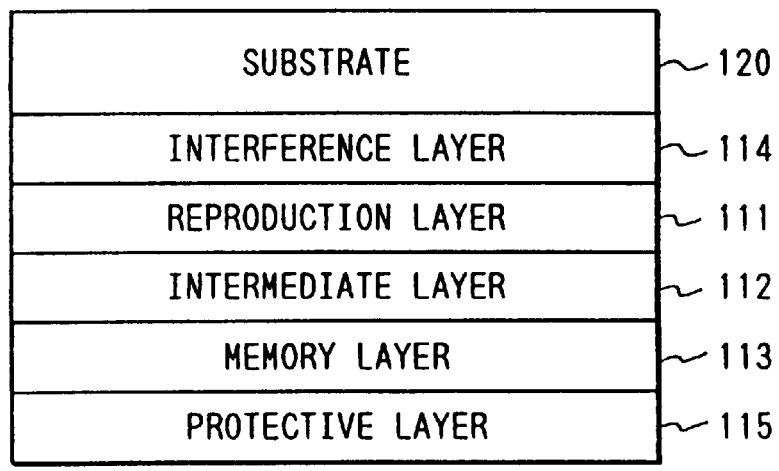
FIG. 24 is a diagram showing a basic layer structure of a magneto-optical recording medium according to a second embodiment of the present invention.

The magneto-optical recording medium of the present invention has at least three magnetic layers, that is, a first magnetic layer being a perpendicular magnetization film, a third magnetic layer having a Curie temperature lower than those of the first magnetic layer and a second magnetic layer, and the second magnetic layer being a perpendicular magnetization film (FIG. 24). Hereinbelow, the first magnetic layer will be referred to as a reproduction layer, the second magnetic layer as a memory layer and the third magnetic layer as an intermediate layer.

The memory layer 113 is a layer for storing recorded information and thus is required to stably hold the magnetic domains. As a material of the memory layer, a material which has a large perpendicular magnetic anisotropy and can stably hold a magnetization state, for example, a rare earth-iron family amorphous alloy, such as, TbFeCo, DyFeCo, TbDyFeCo or the like, garnet, a platinum family-iron family periodic structure film, such as, Pt/Co, Pd/Co or the like, or a platinum family-iron family alloy, such as, PtCo, PdCo or the like is preferable.

It is necessary that the film thickness of the memory layer 113 be 10 nm or greater for stably holding the magnetic domains. Practically, the total film thickness of the three magnetic layers, i.e. the memory layer 113, the reproduction layer 111 and the intermediate layer 112, is preferably smaller for reducing the recording power, and thus the film thickness of the memory layer is preferably 50 nm or less.

The reproduction layer 111 is a layer for reproducing magnetization information held in the memory layer 113. The reproduction layer 111 has a magnetization characteristic such that it is an in-plane magnetization film at room temperature and becomes a perpendicular magnetization film at a given temperature or higher between room temperature and its Curie temperature. The reproduction layer 111 is located closer to a light incident side as compared with the intermediate layer 112 and the memory layer 113, and its Curie temperature is set to be higher than at least those of the intermediate layer 112 and the memory layer 113 for preventing deterioration of the Kerr rotation angle upon reproduction.

As a material of the reproduction layer 111, a rare earth-iron family amorphous alloy, for example, a material mainly containing GdFeCo, is preferable. Tb, Dy or the like may be added. Further, a rare earth light metal, such as, Nd, Pr, Sm or the like may be added for preventing deterioration of the Kerr rotation angle at a shorter wavelength. Preferably, the reproduction layer has a small magnetic anisotropy, and a compensation temperature between room temperature and the Curie temperature. This compensation temperature is set to be near the Curie temperature of the intermediate layer 112, specifically, in a range of −50° C. to 100° C. relative to the Curie temperature of the intermediate layer 112, and preferably, in a range of −20° C. to +80° C. relative to the Curie temperature of the intermediate layer 112, which will be described later.

In the magneto-optical recording medium of the present invention, the film thickness of the reproduction layer 111 is selected to be 20 nm or greater. In the magneto-optical recording medium of the present invention, since the memory layer 13 shows a perpendicular magnetic anisotropy at room temperature and each of the reproduction layer 111 and the intermediate layer 112 shows an in-plane magnetic anisotropy at room temperature, an interface magnetic wall is formed between the memory layer 113 and the reproduction and intermediate layers 111 and 112. Since a material having a large perpendicular magnetic anisotropy is used for the memory layer 113, most of the interface magnetic wall is formed at a side of the intermediate and reproduction layers 112 and 111. Accordingly, even if the composition is the same, when the reproduction layer 111 is thin, the magnetic wall permeates through the intermediate layer 112 to extend to a surface of the reproduction layer 111 at the light incident side at room temperature, as shown in FIG. 25A. Thus, the mask effect becomes insufficient to reduce the C/N ratio. In view of this, the film thickness of the reproduction layer 111 is required to be 20 nm or greater.

To the contrary, when the reproduction layer 111 is too thick, as shown in FIG. 25B, since the exchange-coupling force of the memory layer 113 does not reach the light incident side surface of the reproduction layer 111, the magnetization is not oriented in a perpendicular direction even at a temperature caused by the reproducing power so that a level of a reproduced signal is reduced. In view of this, the film thickness of the reproduction layer 111 is required to be 100 nm or less.

Further, the film thickness of the reproduction layer 111 influences the temperature distribution of the medium and the mask effect at a low-temperature region. Crosstalk with the adjacent track also changes depending on the film thickness. Preferably, the film thickness of the reproduction layer 111 is selected to be no less than 25 nm and no more than 50 nm so that the medium becomes effective for narrowing the track pitch.

The intermediate layer 112 is provided mainly for partly mediating and partly cutting off the exchange-coupling force from the memory layer 113 to the reproduction layer 111. The intermediate layer 112 has a magnetization characteristic such that it is an in-plane magnetic film at room temperature and becomes a perpendicular magnetization film at a given temperature or higher between room temperature and its Curie temperature. The intermediate layer 112 is located between the reproduction layer 111 and the memory layer 113 and has a Curie temperature which is set to be higher than room temperature and lower than those of the reproduction layer 111 and the memory layer 113. The Curie temperature of the intermediate layer 112 is set to be high enough to mediate the exchange-coupling force from the memory layer 113 to the reproduction layer 111 at a low-temperature portion and a medium-temperature portion within the light spot, but low enough to cut off the exchange-coupling force at the highest-temperature portion within the light spot, and thus preferably, 100° C. or higher and 220° C. or lower, and more preferably, 120° C or higher and 180° C. or lower. As a material of the intermediate layer 112, for example, a rare earth-iron family amorphous alloy, such as, GdFeCo, GdCo, GdTbFeCo, GdDyFeCo, TbFeCo, DyFeCo, TbDyFeCo or the like is preferable. A non-magnetic element, such as, Cr, Al, Si, Cu or the like may be added for lowering the Curie temperature.

In the magneto-optical recording medium of the present invention, the film thickness of the intermediate layer 112 is selected to be no less than 3 nm and no more than 30 nm. When the film thickness of the intermediate layer 112 is smaller than 3 nm, the stability of the magnetic characteristic of the magnetic film deteriorates or an intrinsic magnetic characteristic can not be achieved due to manufacturing disuniformity. Further, there is a problem that, even when the intermediate layer reaches the Curie temperature with a pin hole being generated, the exchange coupling between the reproduction layer 111 and the memory layer 113 is not cut off.

Further, when the film thickness of the intermediate layer 112 is small, as shown in FIG. 26A, of the magnetic wall formed in the intermediate layer 112 and the reproduction layer 111 at room temperature, a rate is increased which permeates the reproduction layer 111 so that the mask effect at the reproduction layer 111 becomes incomplete. In view of this, the film thickness of the intermediate layer 112 should be selected to be 3 nm or greater.

On the other hand, since the saturation magnetization Ms of the intermediate layer 112 is greater than that of the reproduction layer 111, when the film thickness of the intermediate layer 112 is large, as shown in FIG. 26B, the intermediate layer 112 can not mediate the exchange-coupling force from the memory layer 113 to the reproduction layer 111 at a medium-temperature portion so that transfer of the magnetization to the reproduction layer 111 becomes incomplete even at a temperature caused by the reproducing power. Thus, the level of the reproduced signal is reduced. In view of this, the film thickness of the intermediate layer 112 is required to be 30 nm or less.

The film thickness of the intermediate layer 112 influences the mask condition at a low-temperature region, that is, a temperature region where the reproduction layer 111 has the in-plane anisotropy, and thus also influences crosstalk with the adjacent track. Preferably, the film thickness of the intermediate layer 112 is selected to be no less than 5 nm and no more than 20 nm so that the medium becomes effective for narrowing the track pitch.

An element, such as, Al, Ti, Pt, Nb, Cr or the like may be added to the reproduction layer 111, the intermediate layer 112 and the memory layer 113 for improving their corrosion resistance. For enhancing the interference effect and the protective performance, a dielectric layer formed of $SiN_x$, $AlO_x$, $TaO_x$, $SiO_x$ or the like may be provided in addition to the foregoing reproduction, intermediate and memory layers. Further, for improving thermal conductivity, a layer formed of Al, AlTa, AlTi, TlCr, Cu or the like and having good thermal conductivity may be provided. Further, an initialization layer in which magnetization is aligned in one direction for performing the optical modulation overwrite operation may be provided. Further, auxiliary layers for recording assistance and reproducing assistance may be provided to adjust the exchange-coupling force or the magnetostatic coupling force. Moreover, a protective coat formed of the foregoing dielectric layer or a polymer resin may be added as a protective film.

Since the recording and reproduction of the data signal relative to the medium in the second embodiment is the same as in the first embodiment, an explanation thereof will be omitted for brevity.

Experimental Example 15

Si, Gd, Tb, Fe and Co targets were attached to a DC magnetron sputtering apparatus, and a glass substrate having a diameter of 130 mm and a polycarbonate substrate with lands and grooves were fixed to a substrate holder which was set at a position separated from the respective targets by a distance of 150 mm. Thereafter, the interior of the chamber was evacuated by a cryopump to a high vacuum of $1 \times 10^{-5}$ Pa or less. During the evacuation, Ar gas was introduced into the chamber to 0.4 Pa, and thereafter, an SiN interference layer of 90 nm thickness, a GdFeCo reproduction layer of 20 nm thickness, a GdFe intermediate layer of 10 nm thickness, a TbFeCo memory layer of 30 nm thickness and an SiN protective layer of 70 nm thickness were formed in the order named, thus obtaining the medium with a structure shown in FIG. 24. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.1.

The composition of the GdFeCo reproduction layer was $Gd_{28}(Fe_{60}Co_{40})_{72}$ and represented a RE rich layer at room temperature, a saturation magnetization Ms of 222 emu/cc, a compensation temperature of 215° C. and a Curie temperature of 300° C. or more.

The composition of the GdFe intermediate layer was $Gd_{40}Fe_{60}$ and represented a TM rich layer at room temperature, a saturation magnetization Ms of 420 emu/cc and a Curie temperature of 190° C.

The composition of the TbFeCo memory layer was $Tb_{20}(Fe_{80}Co_{20})_{80}$ and represented a TM rich layer at room temperature, a saturation magnetization Ms of 200 emu/cc and a Curie temperature of 270° C.

The recording/reproduction characteristic was measured using this magneto-optical recording medium. The measurement was performed by setting the N.A. of an objective lens to be 0.55, the laser beam wavelength to be 780 nm, the recording power to be in a range of 7 to 15 mW and the reproducing power to be in a range of 2.5 to 4.0 mW, so as to provide the highest C/N ratio. The linear velocity was set to be 9 m/s. First, erasing was performed entirely on the medium, and thereafter, a carrier signal of 11.3 MHz (corresponding to a mark length 0.40 μm) was recorded in the memory layer so as to examine the C/N ratios.

Subsequently, crosstalk with the adjacent track (hereinafter referred to as "crosstalk") was measured. The measurement was performed by setting the N.A. of an objective lens to be 0.55, the laser beam wavelength to be 780 nm, the recording power to be in a range of 7 to 15 mW and the linear velocity to be 9 m/s. First, erasing was performed entirely on the lands and the grooves of the medium, and thereafter, a carrier signal of 5.8 MHz (corresponding to a mark length 0.78 μm) was recorded on the memory layer so as to measure a carrier CL. Subsequently, a carrier CG upon tracking the adjacent groove was measured. Crosstalk was represented by a difference CL–CG. Since the experiment was performed on the assumption that data were recorded on both the land and groove, the effective track pitch was 0.8 μm. The measurement results of the C/N ratios under the optimum condition and crosstalk at the same reproducing power are shown in Table 4.

Experimental Examples 16 to 22

The magneto-optical recording media were prepared with the same structure and materials as those in Experimental Example 15 except for the film thickness of the reproduction layer as the first magnetic layer. The film thicknesses of the respective reproduction layers in Experimental Examples 16 to 22 are shown in Table 4. The C/N ratios under the optimum condition and crosstalk at the same reproducing power were measured in the same manner as in Experimental Example 15. The measurement results are shown in Table 4.

Comparative Examples 7 to 9

As shown in Table 5, the magneto-optical recording media were prepared with the same structure and materials as those in Experimental Example 15 except for the film thickness of the reproduction layer as the first magnetic layer. A signal corresponding to the mark length 0.4 μm was recorded, and the C/N ratios were measured. The measurement results are shown in Table 5.

Figure 27:
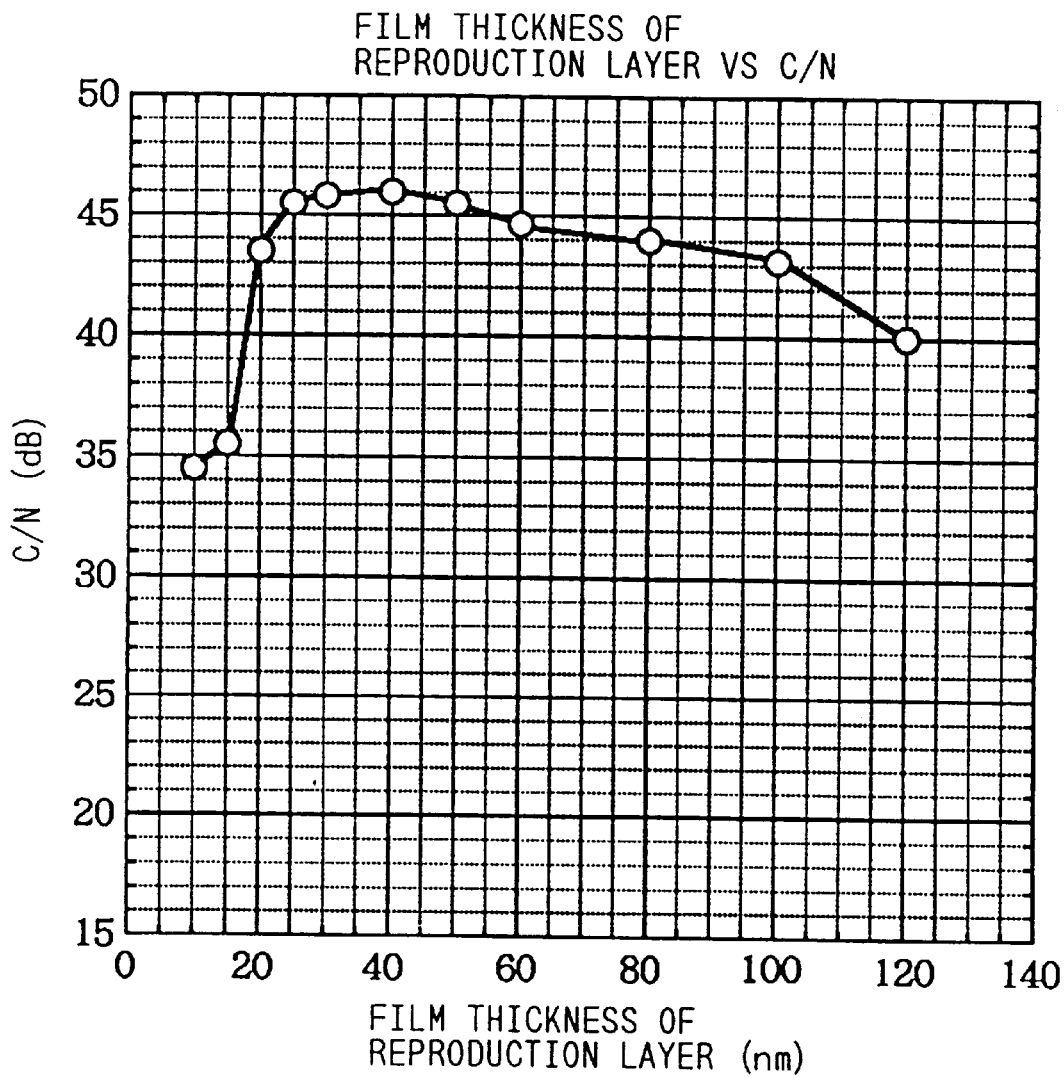
FIG. 27 is a diagram showing the reproduction layer film-thickness dependency of C/N.
Figure 28:
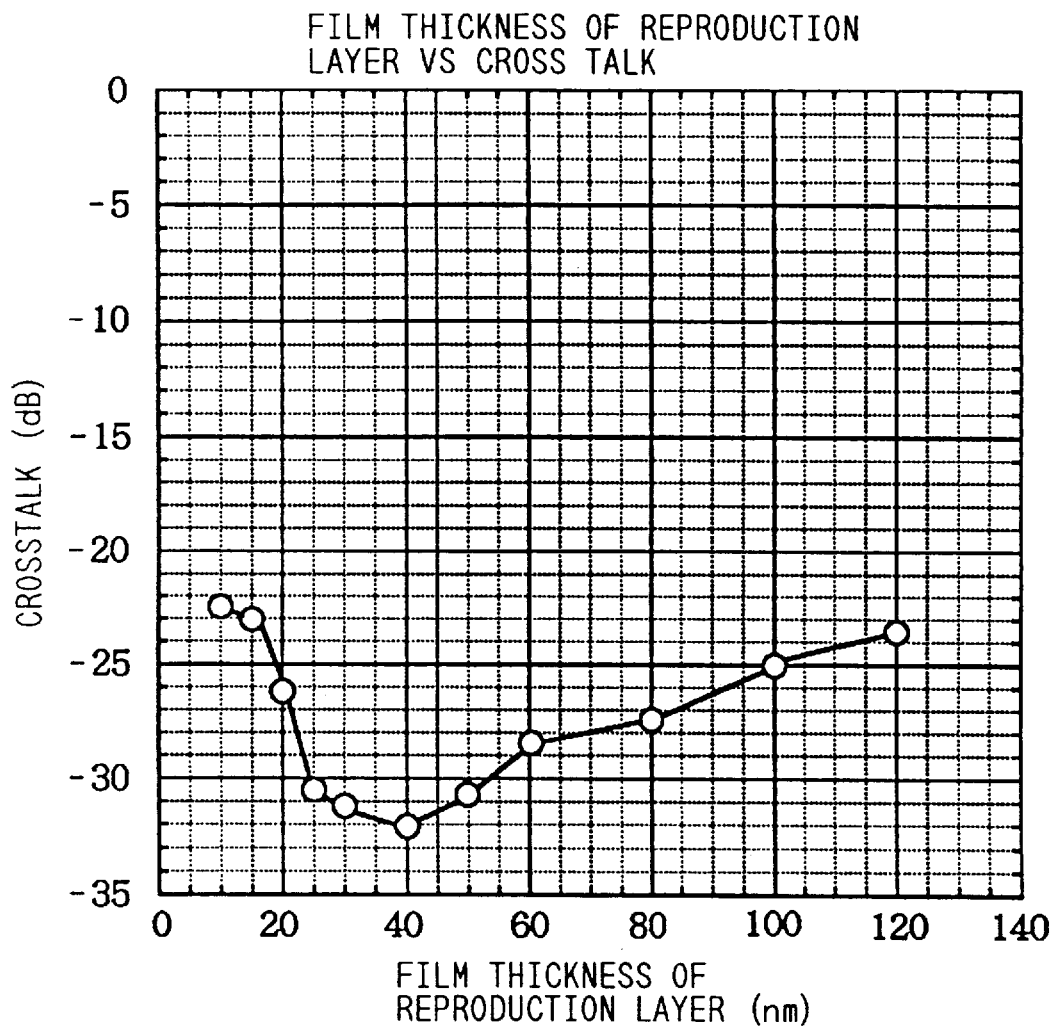
FIG. 28 is a diagram showing the reproduction layer film-thickness dependency of crosstalk.

FIG. 27 is a graph showing the measurement results of Experimental Examples 15 to 22 and Comparative Examples 7 to 9 in terms of the C/N ratios relative to the film thicknesses of the reproduction layer. A C/N ratio of 43 dB or more was obtained in a range of the film thickness of the reproduction layer no less than 20 nm and no more than 100 nm. Further, a crosstalk was suppressed to −30 dB or less in a range of the film thickness of the reproduction layer no less than 25 nm and no more than 50 nm. Accordingly, by using the present invention, a C/N ratio sufficiently high for the excellent information reproduction was obtained. Further, by selecting the film thickness of the reproduction layer to be no less than 25 nm and no more than 50 nm, the track density can be improved in addition to the line recording density.

Experimental Examples 23 to 30

Using the same apparatus and method as in Experimental Example 15, an SiN interference layer of 90 nm thickness, a GdFeCo reproduction layer of 40 nm thickness, a GdFe intermediate layer, a TbFeCo memory layer of 30 nm thickness and an SiN protective layer of 70 nm thickness were formed in the order named, thus forming the medium with a structure shown in FIG. 24. The film thicknesses of the respective intermediate layers in Experimental Examples 23 to 30 are shown in Table 6. With regard to these media of the present invention, a carrier signal of 11.3 MHz (corresponding to a mark length 0.40 μm) was recorded, and the C/N ratios were measured, in the same manner as in Experimental Example 15. The measurement results are shown in Table 6. A C/N ratio of 40 dB or more was obtained in a range of the film thickness of the intermediate layer no less than 3 nm and no more than 30 nm. Accordingly, the excellent information reproduction can be expected.

Crosstalk was suppressed to −30 dB or less in a range of the film thickness of the intermediate layer no less than 5 nm and no more than 20 nm. This shows that optimization of the film thickness of the intermediate layer is also effective for narrowing the track pitch.

Comparative Examples 10, 11

Using the same apparatus and method as in Experimental Examples 23 to 30, the magneto-optical recording media were prepared with the same structure and Lo materials as those in Experimental Examples 23 to 30 except for the film thickness of the intermediate layer. The film thicknesses of the respective intermediate layers are shown in Table 7. The C/N ratios and crosstalks were measured in the same manner as in Experimental Examples 23 to 30. The measurement results are shown in Table 7.

Figure 29:
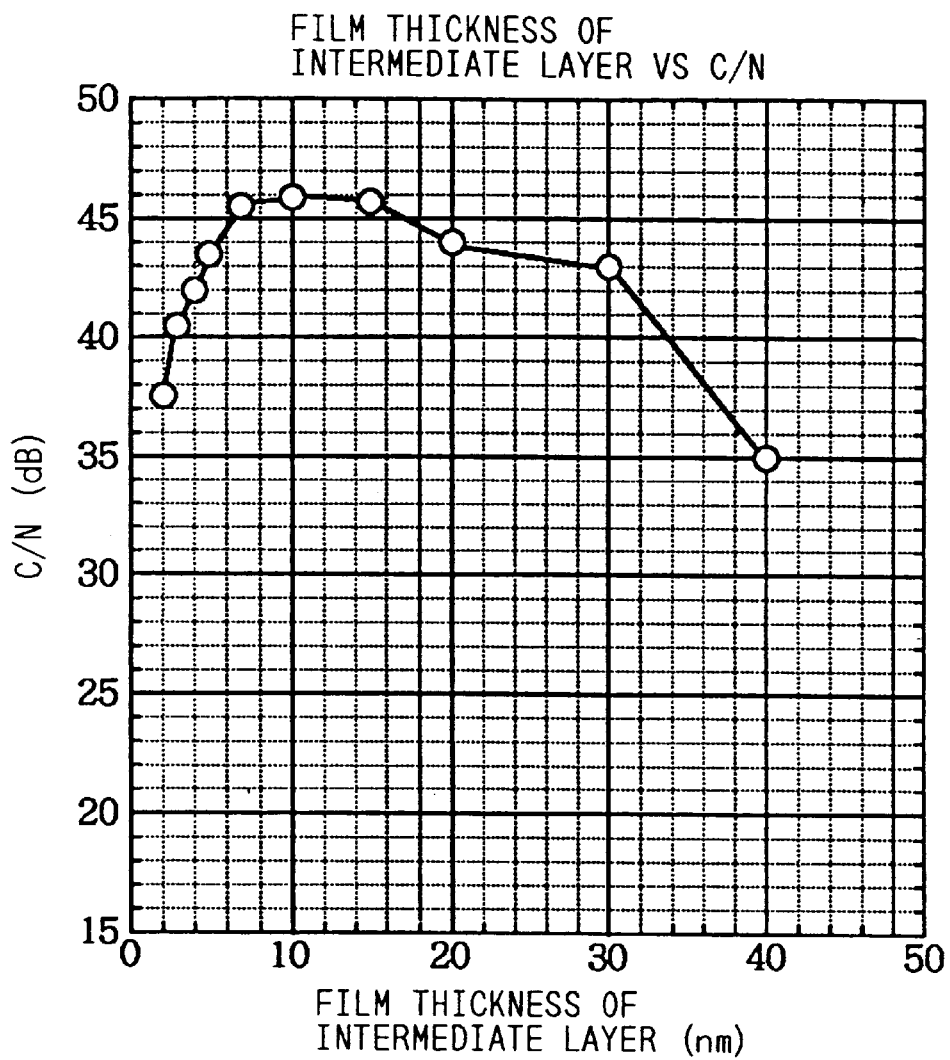
FIG. 29 is a diagram showing the intermediate layer film-thickness dependency of C/N.
Figure 30:
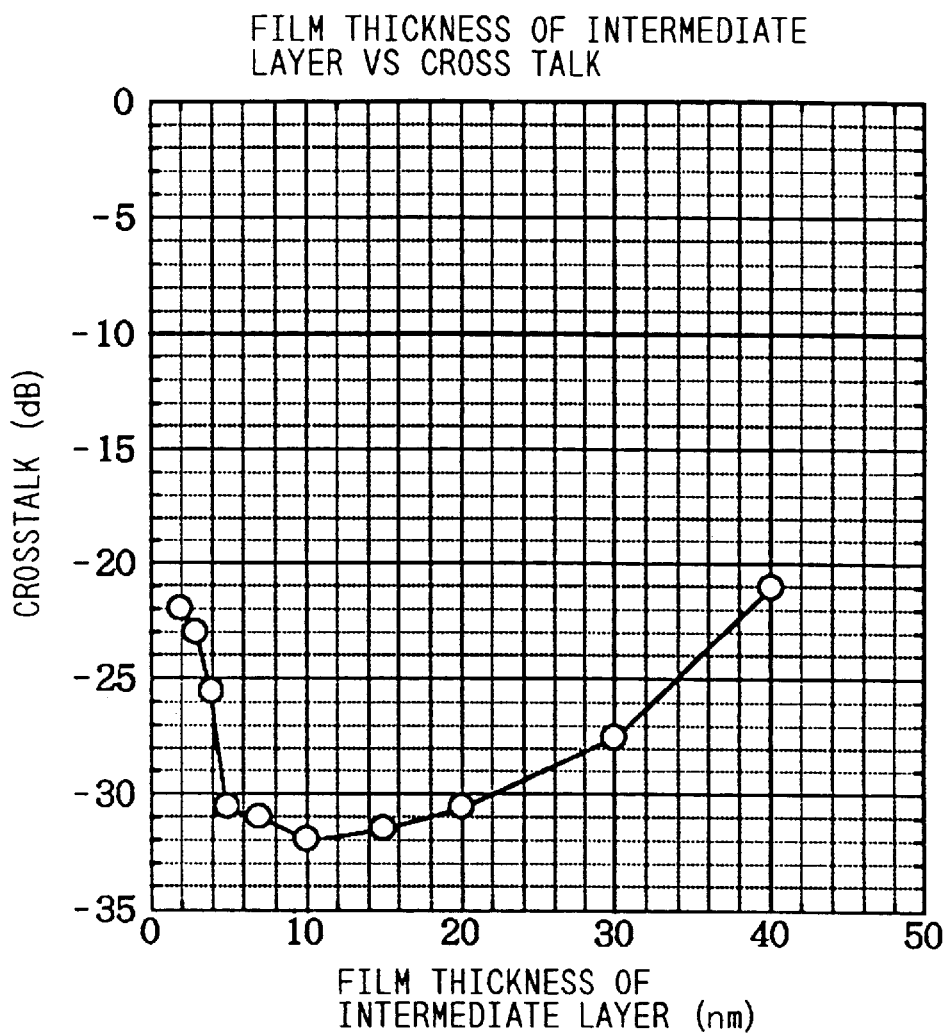
FIG. 30 is a diagram showing the intermediate layer film-thickness dependency of crosstalk.

FIG. 29 is a graph showing the measurement results of Experimental Examples 23 to 30 and Comparative Examples 10 and 11 in terms of the C/N ratios relative to the film thicknesses of the intermediate layer, and FIG. 30 is a graph showing the measurement results of Experimental Examples 23–30 and Comparative Examples 10 and 11 in terms of crosstalk relative to the film thicknesses of the intermediate layer. A C/N ratio of 40 dB or more was obtained in a range of the film thickness of the intermediate layer no less than 3 nm and no more than 30 nm. Further, C/N ratio reaches 43 dB in a range of no less than 5 nm and no more than 30 nm. For improving not only the line recording density but also the track density, the film thickness of the intermediate layer is preferably selected to be no less than 5 nm and no more than 20 nm where the crosstalk is suppressed to −30 dB.

TABLE 4

| | Film Thickness of Reproduction Layer (nm) | Recording Power (mW) | C/N (dB) | Crossstalk (dB) |
|---|---|---|---|---|
| Experimental Example 15 | 20 | 11 | 43.2 | −26.3 |
| Experimental Example 16 | 25 | 11.5 | 45.5 | −30.4 |
| Experimental Example 17 | 30 | 11.5 | 45.7 | −31.1 |
| Experimental Example 18 | 40 | 12 | 45.8 | −32.2 |
| Experimental Example 19 | 50 | 12 | 45.4 | −30.7 |
| Experimental Example 20 | 60 | 12.5 | 44.6 | −28.5 |
| Experimental Example 21 | 80 | 13 | 44 | −27.6 |
| Experimental Example 22 | 100 | 14 | 43.2 | −25 |

TABLE 5

| | Film Thickness of Reproduction Layer (nm) | Recording Power (mW) | C/N (dB) | Crosstalk (dB) |
|---|---|---|---|---|
| Experimental Example 7 | 10 | 11 | 34.5 | −22.5 |
| Experimental Example 8 | 15 | 11 | 35.5 | −23 |

TABLE 5-continued

| | Film Thickness of Reproduction Layer (nm) | Recording Power (mW) | C/N (dB) | Crosstalk (dB) |
|---|---|---|---|---|
| Experimental Example 9 | 120 | 15 | 40 | −23.4 |

TABLE 6

| | Film Thickness of Reproduction Layer (nm) | Recording Power (mW) | C/N (dB) | Crosstalk (dB) |
|---|---|---|---|---|
| Experimental Example 23 | 3 | 12 | 40.5 | −22.9 |
| Experimental Example 24 | 4 | 12 | 42 | −25.6 |
| Experimental Example 25 | 5 | 12 | 43.6 | −30.6 |
| Experimental Example 26 | 7 | 12 | 45.5 | −31.1 |
| Experimental Example 27 | 10 | 12 | 45.8 | −32.2 |
| Experimental Example 28 | 15 | 12 | 45.7 | −31.5 |
| Experimental Example 29 | 20 | 12.5 | 44 | −30.5 |
| Experimental Example 30 | 30 | 12.5 | 43 | −27.3 |

TABLE 7

| | Film Thickness of Reproduction Layer (nm) | Recording Power (mW) | C/N (dB) | Crosstalk (dB) |
|---|---|---|---|---|
| Experimental Example 10 | 2 | 12 | 37.5 | −22.2 |
| Experimental Example 11 | 40 | 13 | 35 | −21 |

(Third Embodiment)

In a third embodiment, the optimum compositions of the reproduction layer and the intermediate layer for obtaining the excellent mask effect will be described, wherein a magnetic layer showing an in-plane magnetic anisotropy at room temperature is used as the reproduction layer in the medium of the first embodiment.

Hereinbelow, the third embodiment of the present invention will be described in detail with reference to the drawings.

Figure 31:
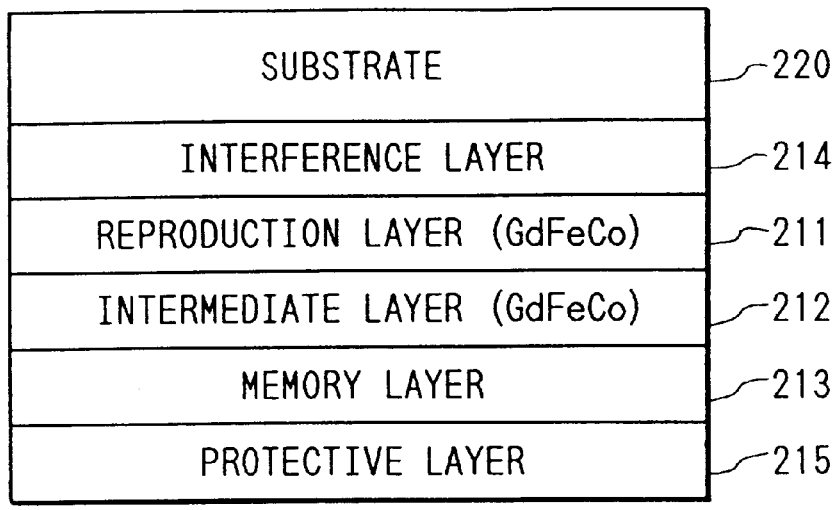
FIG. 31 is a diagram showing the basic structure of a magneto-optical recording medium according to a third embodiment of the present invention.

FIG. 31 shows a sectional view of an optical disc in the third embodiment. As shown in FIG. 31, in the optical disc used in this embodiment, an interference layer 214, a first magnetic layer (hereinafter referred to as "reproduction layer") 211, a third magnetic layer (hereinafter referred to as "intermediate layer") 212, a second magnetic layer (hereinafter referred to as "memory layer") 213 and a protective layer 215 are laminated on a substrate 220 in the order named. The substrate 220 is normally formed of a transparent material, such as, glass or polycarbonate.

Each of these layers can be formed by continuous sputtering or continuous deposition using a DC magnetron sputtering apparatus.

The interference layer 214 is provided for enhancing the magneto-optical effect and formed of, for example, a transparent dielectric material, such as, $Si_3N_4$, AlN, $SiO_2$, SiO, ZnS, $MgF_2$ or the like.

The protective layer 215 is used for protecting the magnetic layers and formed of a material like that of the interference layer 214.

The interference layer 214 and the protective layer 215 have nothing to do with the essence of the present invention, and thus can be omitted. Accordingly, no detailed explanation thereof will be given hereinbelow. Although not shown in FIG. 31, the protective layer 215 may be applied with a hard-coating material, such as, an ultraviolet-setting resin for protecting the films or using a magnetic-field modulation overwrite magnetic head.

The reproduction layer 211 is a layer for reproducing magnetization information held in the memory layer 213. The reproduction layer 211 has a magnetization characteristic such that it is an in-plane magnetization film at room temperature and becomes a perpendicular magnetization film at a given temperature or higher between room temperature and its Curie temperature. The reproduction layer 211 is located closer to a light incident side as compared with the intermediate layer 212 and the memory layer 213, and its Curie temperature is set to be higher than at least those of the intermediate layer 212 and the memory layer 213 for preventing deterioration of the Kerr rotation angle upon reproduction.

As a material of the reproduction layer 211, a rare earth-iron family amorphous alloy having a small perpendicular magnetic anisotropy, particularly, GdFeCo, is preferable. Rare earth light metal, such as, Nd, Pr, Sm or the like may be added for increasing the Kerr rotation angle at a shorter wavelength. Preferably, the reproduction layer has a compensation temperature between room temperature and the Curie temperature. This compensation temperature is set to be near a Curie temperature of the intermediate layer 212, specifically, in a range of −50° C. to +100° C. relative to the Curie temperature of the intermediate layer 212, and preferably, in a range of −20° C. to +80° C. relative to the Curie temperature of the intermediate layer 212, which will be described later. Further, the composition range is set to $Gd_x(Fe_{100-y}Co_y)_{100-x}$, wherein $24 \leq x \leq 32$ (atomic %) and $20 \leq y \leq 50$ (atomic %).

The intermediate layer 212 is provided for the following three purposes:

(1) The intermediate layer 212, around room temperature, moderates the magnetic wall energy between the reproduction layer 211 and the memory layer 213 and helps the reproduction layer 211 to be an in-plane magnetization film. This results in contributing to a reduction in film thickness of the reproduction layer.

(2) When reaching a given temperature or higher, the intermediate layer 212, along with the reproduction layer 211, makes the transition to a perpendicular magnetization film to mediate the exchange coupling from the memory layer 213 to the reproduction layer 211.

(3) At the Curie temperature or higher of the intermediate layer 212, the intermediate layer 212 cuts off the exchange coupling between the reproduction layer 211 and the memory layer 213.

In order to achieve these purposes, the intermediate layer 212 is located between the reproduction layer 211 and the memory layer 213 and has a Curie temperature which is set to be higher than room temperature and lower than those of the reproduction layer 211 and the memory layer 213. The Curie temperature of the intermediate layer 212 is set to be high enough to mediate the exchange-coupling force from the memory layer 213 to the reproduction layer 211 at a enough to cut off the exchange-coupling force at the highest-temperature portion within the light spot, and thus preferably, 100° C. or higher and 220° C. or lower, and more preferably, 120° C. or higher and 180° C. or lower. As a material of the intermediate layer 212, for example, a rare earth-iron family amorphous alloy, particularly, GdFeCo, is preferable. A non-magnetic element, such as, Cr, Al, Si, Cu or the like may be added for lowering the Curie temperature. Further, the composition range is set to $Gd_p(Fe_{100-q}Co_q)_{100-p}$, wherein $2 \leq p \leq 50$ (atomic %) and $0 \leq q \leq 20$ (atomic %).

The memory layer 213 is a layer for storing recorded information and thus is required to stably hold very small magnetic domain of no more than 2 μm. As a material of the memory layer 213, a material which has a large perpendicular magnetic anisotropy and can stably hold a magnetization state, for example, a rare earth-iron family amorphous alloy, such as, TbFeCo, DyFeCo, TbDyFeCo or the like, garnet, a platinum family-iron family periodic structure film, such as, Pt/Co, Pd/Co or the like, or a platinum family-iron family alloy, such as, PtCo, PdCo or the like is preferable.

An element, such as, Al, Ti, Pt, Nb, Cr or the like may be added to the reproduction layer 211, the intermediate layer 212 and the memory layer 213 for improving their corrosion resistances. Further, for improving thermal conductivity, a layer formed of Al, AlTa, AlTi, TlCr, Cu or the like and having good thermal conductivity may be provided. Further, an initialization layer in which magnetization is aligned in one direction for performing the optical modulation overwrite may be provided. Further, auxiliary layers for recording assistance and reproducing assistance may be provided to assistance and reproducing assistance may be provided to adjust the exchange-coupling force or the magnetostatic coupling force.

Since the recording and reproduction of the data signal relative to the medium in the third embodiment is the same as in the first embodiment, an explanation thereof will be omitted for brevity.

The third embodiment of the present invention will be described in further detail by way of experimental examples. However, the present invention is not limited to these experimental examples.

Experimental Example 31

Si, Gd, Tb, Fe and Co targets were attached to a DC magnetron sputtering apparatus, and a glass substrate having a diameter of 130 mm and a polycarbonate substrate with lands and grooves at a pitch of 1.6 μm were fixed to a substrate holder which was set at a position separated from the respective targets by a distance of 150 mm. Thereafter, the interior of the chamber was evacuated by a cryopump to a high vacuum of $1 \times 10^{-5}$ Pa or less. During the evacuation, Ar gas was introduced into the chamber to 0.4 Pa, and thereafter, an SiN interference layer of 90 nm thickness, a $Gd_{28}(Fe_{60}Co_{40})_{72}$ reproduction layer of 40 nm thickness, a $Gd_{37}Fe_{63}$ intermediate layer of 10 nm thickness, a $Tb_{20}(Fe_{80}Co_{20})_{80}$ memory layer of 30 nm thickness and an SiN protective layer of 70 nm thickness were formed in the order named, thus forming the medium with a structure shown in FIG. 31. Upon formation of each SiN dielectric layer, $N_2$ gas was introduced in addition to the Ar gas, and the SiN layer was formed by DC reactive sputtering, adjusting a mixing ratio of the Ar and $N_2$ gases, so as to obtain a refractive index of 2.1. The $Gd_{28}(Fe_{60}Co_{40})_{72}$ reproduction layer was rare earth element sublattice magnetization dominant at room temperature, and was set to represent a saturation magnetization Ms of 225 emu/cc, a compensation temperature of 217° C. and a Curie temperature of 300° C. or more.

The $Gd_{37}Fe_{63}$ intermediate layer was rare earth element sublattice magnetization dominant at room temperature, and was set to represent a saturation magnetization Ms of 470 emu/cc and a Curie temperature of 190° C.

The $Tb_{20}(Fe_{80}Co_{20})_{80}$ memory layer was iron family element lattice magnetization dominant, and was set to represent a saturation magnetization Ms of 250 emu/cc and a Curie temperature of 270° C.

After recording a magnetic domain of a 0.78 µm mark length in the magneto-optical recording medium, the magnetic domain was observed by a polarizing microscope under irradiation of a semiconductor laser beam of 830 nm. While increasing the laser power, it confirmed that the recorded magnetic domain contracted and the magnetization was oriented in an erasing direction at the center (high-temperature region) of the light spot at a certain laser power.

Figure 32:
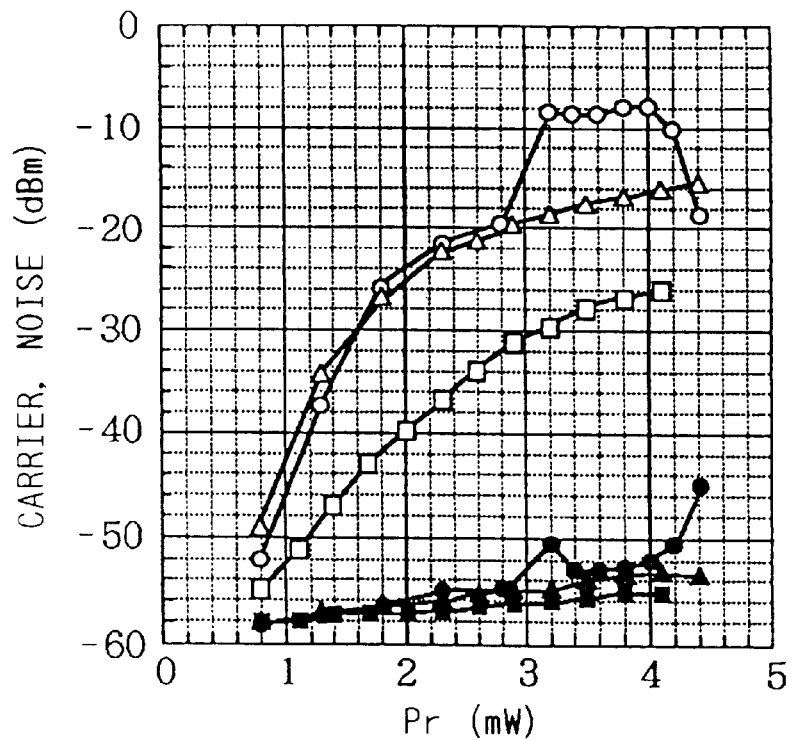
FIG. 32 is a diagram showing the reproducing power dependency of carrier and noise.

Subsequently, the recording/reproduction characteristic was measured using this magneto-optical recording medium. The measurement was performed by setting the N.A. of an objective lens to be 0.53, the laser beam wavelength to be 780 nm (using an optical head), the linear velocity to be 9 m/s and the recording power to be 10 mW. First, erasing was performed entirely on the medium, and thereafter, a mark of 0.40 µm length was recorded by modulating a laser beam at a frequency of 11.3 MHz. Subsequently, a variation of C/N ratios were measured by changing a reproducing power from 0.8 mW to 4.4 mW. The results are shown in FIG. 32.

In the magneto-optical recording medium of the present invention, since the temperature of the medium does not increase sufficiently while the reproducing power is 1.0 mW or less, magnetization of the reproduction layer is oriented substantially in a film plane. Accordingly, since the mark recorded in the memory layer is masked by the reproduction layer, substantially no C/N ratio is obtained. On the other hand, when the reproducing power is increased to about 2.0 mW to 2.8 mW, a medium-temperature region, that is, an aperture region, is formed within the reproducing spot to transfer the magnetic domain of the memory layer to the reproduction layer so that the C/N ratio is increased. The configuration of the aperture region at this time is substantially the same as in the super resolution of the conventional two-layered structure using the in-plane film as shown in FIG. 3B. Accordingly, although the super-resolution phenomenon is generated, since the size and location of the aperture region is not optimum, only about 36 dB can be obtained as the C/N ratio. When the reproducing power is further increased to 3.2 mW to 4.0 mW, a portion appears within the spot where the intermediate layer reaches the Curie temperature, that is, a rear mask is formed. Then, as shown in FIG. 6A, the aperture configuration becomes optimum relative to the spot so that a C/N ratio of 45 dB is obtained. On the other hand, when the reproducing power exceeds 4.0 mW, the highest temperature exceeds the Curie temperature of the memory layer so that the recorded data are damaged to reduce the C/N ratio.

Figure 33:
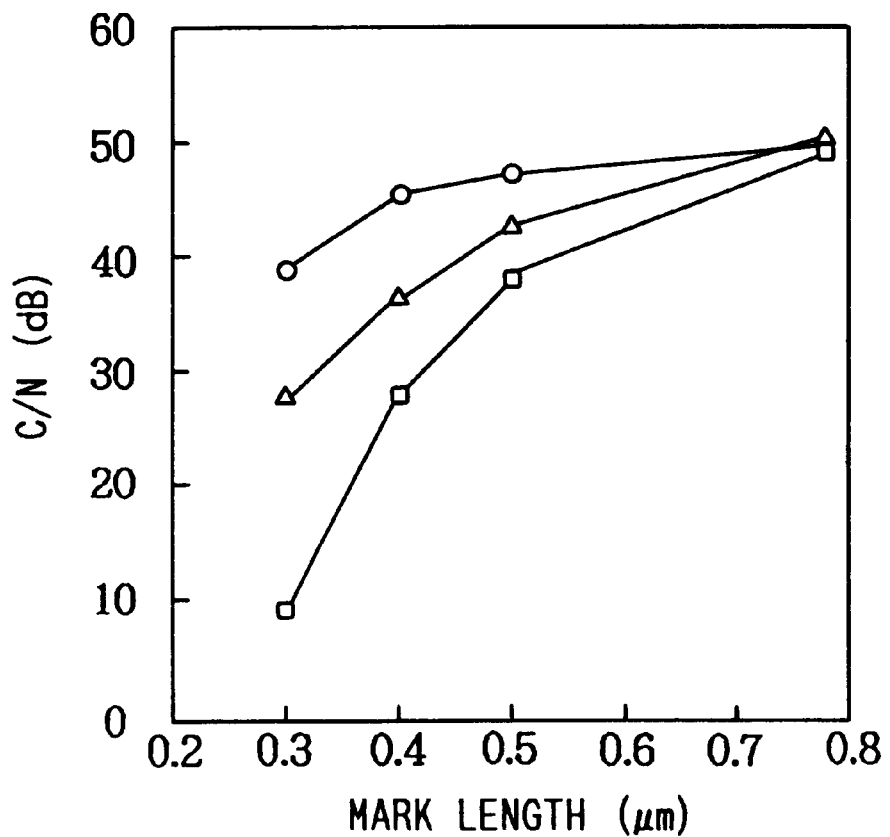
FIG. 33 is a diagram showing the mark length dependency of C/N.

Subsequently, the mark-length dependency of C/N was examined by changing the laser-beam modulation frequency, at the time of recording, between 5.8 MHz, 9.0 MHz, 11.3 MHz and 15 MHz (corresponding to mark lengths 0.78 µm, 0.50 µm, 0.40 µm and 0.30 µm, respectively) with respect to the same medium. The results are shown in FIG. 33. As shown in the figure, an excellent spatial frequency characteristic was obtained in the recording medium of the present invention.

Figure 34:
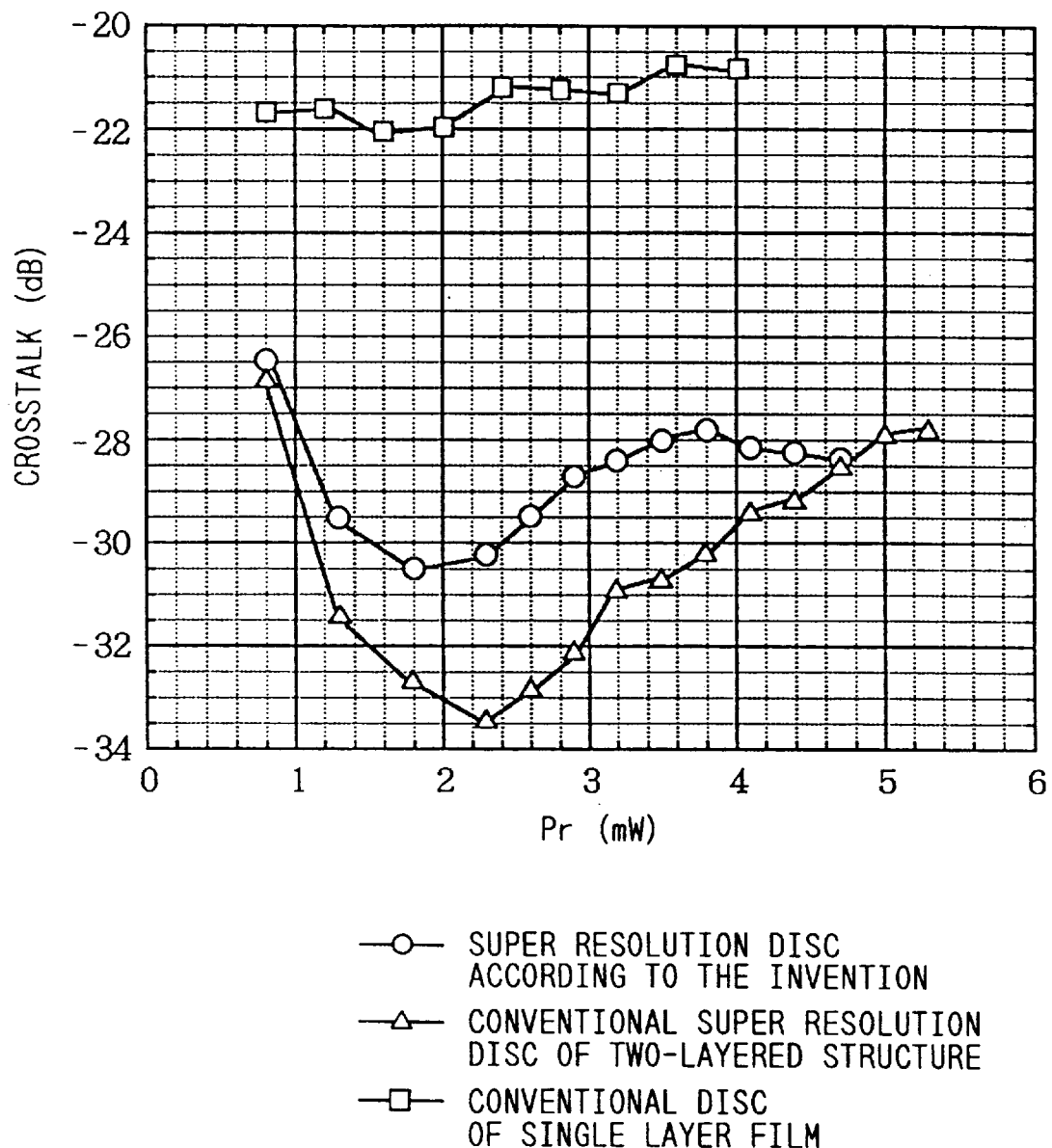
FIG. 34 is a diagram showing the reproducing power dependency of crosstalk.

Subsequently, crosstalk with the adjacent track (hereinafter referred to as "crosstalk") was measured. First, erasing was performed entirely on the lands and the grooves, and thereafter, a signal of a 0.78 µm mark length was recorded on the land as in the foregoing manner so as to measure a carrier level CL. Subsequently, a carrier level CG upon tracking the adjacent groove was measured. The crosstalk was represented by a ratio CL/CG. Since the experiment was performed on the assumption that data were recorded on both the land and groove, the effective track pitch was 0.8 µm. The results are shown in FIG. 34. As is clear from the figure, crosstalk was suppressed to about −28 dB in a range of the reproducing power of 3.2 mW to 4.0 mW, which range was optimum for the medium. This shows that the present medium is also effective for narrowing the track pitch.

The foregoing data were all obtained without applying an initializing magnetic field and the reproducing magnetic field, and excellent results were obtained for the marks recorded at a high density using an information recording/reproduction device like the conventional information recording/reproduction device. The measurement results of the C/N ratios under the optimum condition and the crosstalk at the same reproducing power are shown in Table 8 at Experimental Example 31.

Experimental Example 32

Using the same apparatus and method as in Experimental Example 31, an SiN interference layer of 90 nm thickness, a $Gd_x(Fe_{60}Co_{40})_{100-x}$ reproduction layer of 40 nm thickness, a $Gd_pFe_{100-p}$ intermediate layer of 10 nm thickness, a $Tb_{20}(Fe_{80}Co_{20})_{80}$ memory layer of 30 nm thickness and an SiN protective layer of 70 nm thickness were formed on a polycarbonate substrate in the order named, thus obtaining the medium with a structure shown in FIG. 31. In this experimental example, Gd contents x and p of the reproduction layer and the intermediate layer, respectively, were changed variously so as to examine a variation of the characteristics relative to the compositions.

Figure 35:
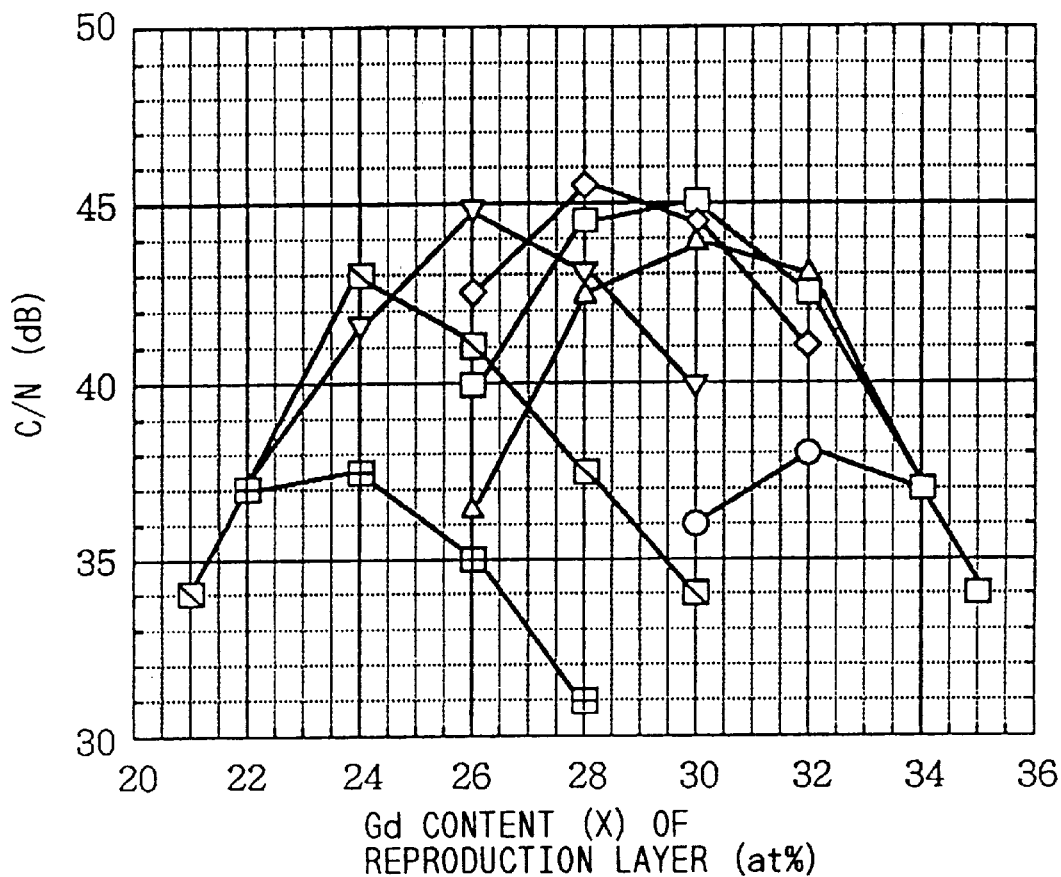
FIG. 35 is a diagram showing the reproduction-layer-Gd-content dependency of C/N.

The relationship between Gd content x (at %) in the reproduction layer and C/N when recording the 0.40 µm marks on the respective samples under the same condition as in Experimental Example 31, is shown in FIG. 35. For example, when seeing a curve with Gd content p (at %) in the intermediate layer being 30, it is the curve which is convex upward and has a maximal value around x=30. This is considered as follows: When x is small, the saturation magnetization Ms of the reproduction layer becomes small to cause the in-plane anisotropy of the reproduction layer to be reduced. Accordingly, the temperature at which the magnetization aligns to be perpendicular due to the exchange coupling with the memory layer, is lowered so that the front mask effect is weakened to reduce C/N. To the contrary, when x is too large, the front mask effect becomes so strong that the intermediate layer reaches the Curie temperature before the aperture sufficiently opens, thereby also causing a deterioration in C/N. The front mask effect is determined due to the balance between the in-plane anisotropies of the reproduction layer and the intermediate layer such that, when the in-plane anisotropy of the reproduction layer is weakened, the in-plane anisotropy of the intermediate layer should be strengthened. Specifically, when Gd content p of the intermediate layer is increased, the optimum value of x is reduced. Accordingly, as shown in FIG. 35, the peak position of C/N shifts due to the change in p. As will be described later, in the conventional two-layered super-resolution medium using an in-plane magnetization film, a C/N of about 37 dB was obtained relative to the mark length of 0.40 µm. As compared with this, it is seen that an excellent super-resolution effect is achieved by the medium of the present invention. For ensuring high reliability of the information reproduction, it is necessary that C/N is no less than 43 dB. It is preferable that Gd content x (at %) in the reproduction layer is in a range of $24 \leq x \leq 32$ in the super-resolution medium of the present invention. For ensuring higher reliability, it is preferable that C/N is about 45 dB. Accordingly, it is more preferable that the Gd content x is set to be in a range of $26 \leq x \leq 30$.

Figure 36:
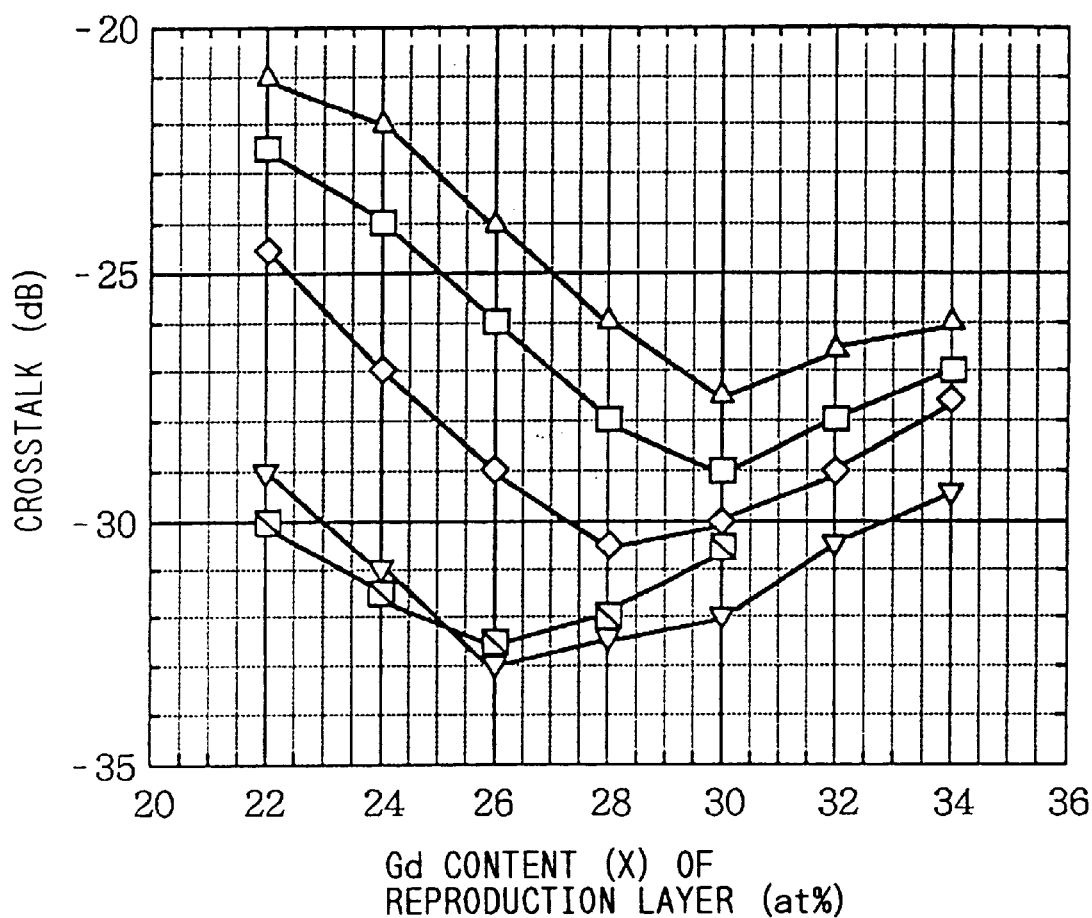
FIG. 36 is a diagram showing the reproduction-layer-Gd-content dependency of crosstalk.

Next, crosstalk was measured for each of the media of this experimental example in the same manner as in Experimental Example 31. The results are shown in FIG. 36. For example, when seeing a curve with a Gd content p (at %) of the intermediate layer being 30, it is the curve which is convex downward and has a minimal value around x=30. This is caused for the following reason. With respect to the same composition of the intermediate layer, when x is large, the in-plane anisotropy of the reproduction layer is so large that the front mask effect becomes too strong. Accordingly, since the carrier level at the land does not increase, the difference is not distinct as compared with reproduction at the groove. To the contrary, when x is small, the front mask effect becomes small so that the reproduction at the groove is liable to be subjected to the influence of the crosstalk. Accordingly, with regard to crosstalk, the optimum value also exists at the most-balanced position between the in-plane anisotropies of the reproduction and intermediate layers. In consideration of the crosstalk being about −22 dB, obtained in the later-described measurement performed relative to a single-layer TbFeCo disc, the front mask effect appears in the super-resolution medium of the present invention when $x \geq 24$. Accordingly, the front mask is formed in the foregoing range of Gd content x (at %) derived in view of C/N, thereby being also effective to the crosstalk.

The same data are shown in FIGS. 33 and 34 in terms of the Gd content p (at %) in the intermediate layer.

Figure 37:
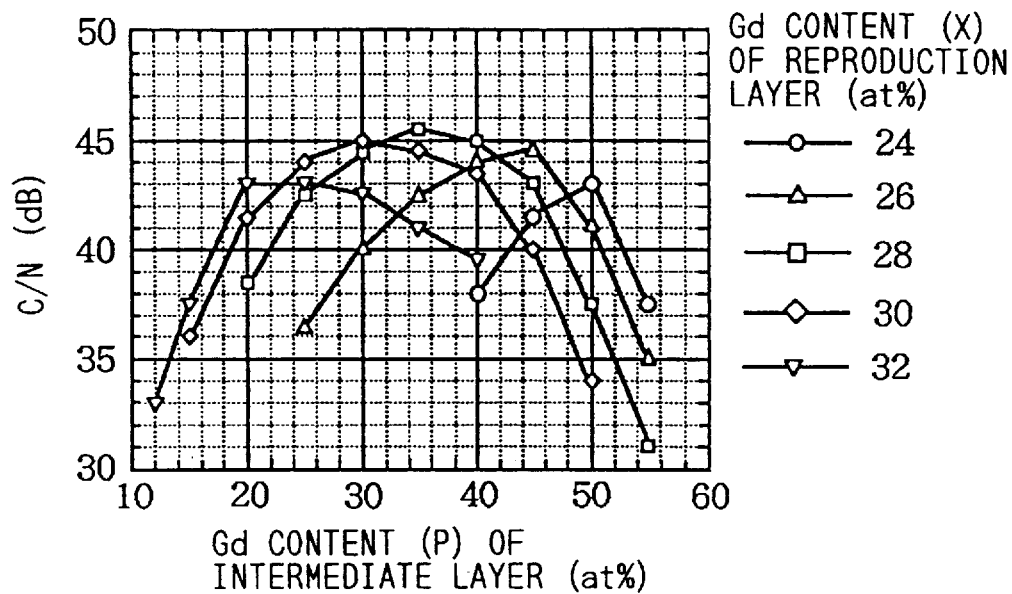
FIG. 37 is a diagram showing the intermediate-layer-Gd-content dependency of C/N.

FIG. 37 shows C/N data which are in the form of upward-convex curves like in FIG. 35. This is caused for the following reason. When the Gd content in the intermediate layer is small, the in-plane anisotropy thereof is small, and the Curie temperature thereof is increased. Accordingly, if the reproducing power is increased until the intermediate layer reaches the Curie temperature, the aperture expands within the spot to an extreme extent so that the resolution is lowered. To the contrary, when the Gd content in the intermediate layer is large, the intermediate layer reaches the Curie temperature with a low reproducing power so that the exchange coupling with the memory layer is not performed to a sufficient level. As described before, for ensuring the high reliability of the information reproduction, it is necessary that C/N be no less than 43 dB. Accordingly, it is preferable that the Gd content p (at %) in the intermediate layer is in a range of $20 \leq p \leq 50$ in the super-resolution medium of the present invention. As also described before, for ensuring the higher reliability, it is preferable that C/N is about 45 dB. Accordingly, it is more preferable that the Gd content p is set to be in a range of $30 \leq p \leq 45$.

Figure 38:
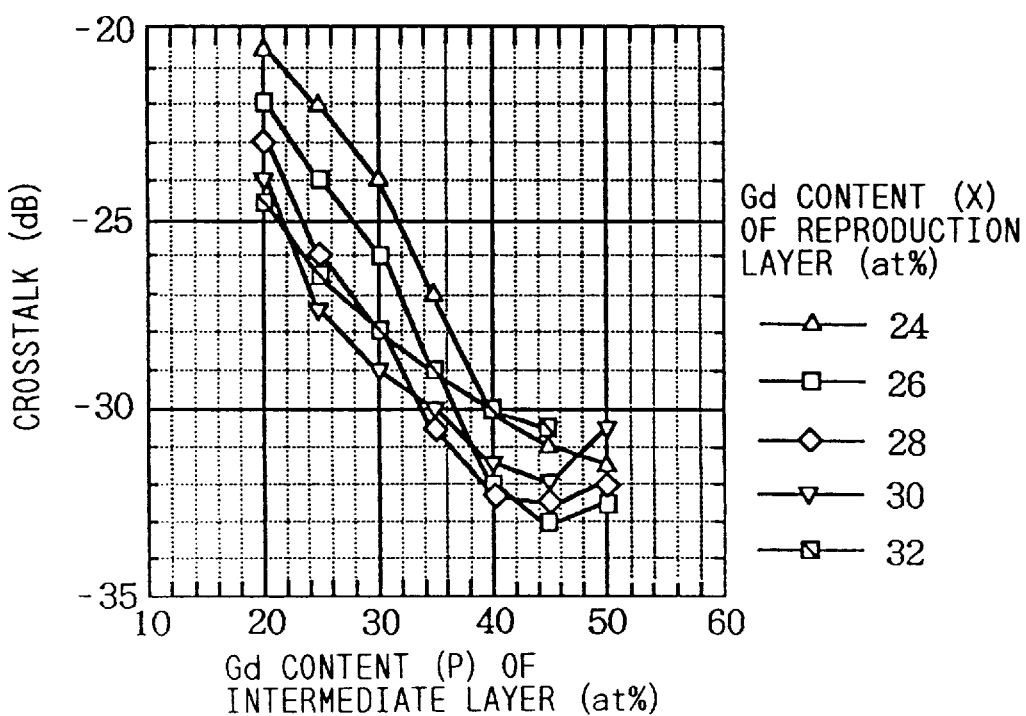
FIG. 38 is a diagram showing the intermediate-layer-Gd-content dependency of crosstalk.

On the other hand, from the crosstalk data shown in FIG. 38, it is seen that the crosstalk largely changes relative to the Gd content in the intermediate layer. This is because, since the Gd content in the intermediate layer influences the lowering of both the in-plane anisotropy and the reproducing power, the Gd content in the intermediate layer largely influences the front mask effect. According to the results shown in FIG. 38, crosstalk was not necessarily improved in the composition providing a C/N of no less than 43 dB. When using −22 dB, which is obtained by the single-layer TbFeCo disc, as a reference, the front mask effect is obtained when $p \geq 25$.

From the foregoing results, the Gd content p (at %) in the intermediate layer of the present invention is set, preferably, to $25 \leq p \leq 50$, and more preferably, to $30 \leq p \leq 45$. A portion of the data obtained in this experimental example is shown in Table 8.

In this experimental example, the film thicknesses of the reproduction layer and the intermediate layer were set to 40 nm and 10 nm, respectively, for comparison. However, when considering the mask effect of the reproduction layer, the film thickness of the reproduction layer may have a value no less than 20 nm. Further, in consideration that the intermediate layer works to cut off the exchange coupling between the reproduction layer and the memory layer at the Curie temperature or higher, the film thickness of the intermediate layer may have a value no less than 3 nm. Further, the film thickness of the memory layer may have a value no less than 10 nm for stably holding the magnetic domains, so that the medium which realizes the effect of the present invention can be obtained. To the contrary, in consideration of the necessary power for recording/reproduction of the information, it is preferable to suppress the film thickness of the total magnetic layers to 200 nm or less.

Accordingly, when the film thicknesses are within the foregoing ranges, it is within the scope of the present invention.

Experimental Example 33

Using the same apparatus and method as in Experimental Example 31, an SiN interference layer of 90 nm thickness, a $Gd_x(Fe_{100-y}Co_y)_{100-x}$ reproduction layer of 40 nm thickness, a $Gd_pFe_{100-p}$ intermediate layer of 10 nm thickness, a $Tb_{20}(Fe_{80}Co_{20})_{80}$ memory layer of 30 nm thickness and an SiN protective layer of 70 nm thickness were formed on a polycarbonate substrate in the order named, thus forming the medium with a structure shown in FIG. 31. In this experimental example, the Co content y (at %) in the reproduction layer was changed variously relative to the Gd contents x and p of the reproduction layer and the intermediate layer obtained in Experimental Example 32.

The Co content in the GdFeCo alloy influences various materiality values, particularly, the perpendicular magnetic anisotropy Ku and the Curie temperature Tc. The reproduction layer in the present invention works not only to provide the mask effect, but also to enhance the Kerr effect in the aperture region. Since the Kerr rotation angle obtained upon irradiation of a polarization light beam onto a perpendicular magnetization film is, in general, larger as the Curie temperature of a material is higher. Since the quality of the reproduced signal is increased with a large Kerr rotation angle, it is preferable that the Curie temperature of the reproduction layer is set to a certain high value. When the Co content in the GdFeCo alloy is reduced, the Curie temperature tends to be lowered so that it is desired to add Co to a certain extent. In this experimental example, $Gd_{24}(Fe_{80}Co_{20})_{76}$ was used for the reproduction layer. The results are shown in Table 8, wherein a C/N of 42 dB was obtained even relative to the 0.40 μm mark. Accordingly, the effect of the present invention was confirmed. However, when reducing the Co content in the reproduction layer to 19 at % or less, C/N was reduced to 39 dB due to the lowering of the Curie temperature.

On the other hand, when the Co content in the reproduction layer is too great, the reproduction layer becomes reluctant to make the transition to a perpendicular magnetization film even when heated by the laser beam due to the lowering of the perpendicular magnetic anisotropy, that is, the exchange coupling with the memory layer is weakened, so that C/N is reduced. The results are shown in Table 8, wherein $Gd_{32}(Fe_{50}Co_{50})_{68}$ was used for the reproduction layer. As shown, a C/N of 42 dB was obtained even relative to the 0.40 μm mark. However, when increasing the Co content in the reproduction layer to 51 at % or greater, C/N was reduced to 38 dB due to the insufficient exchange coupling in the aperture portion.

From the foregoing results, it is preferable that the Co content y (at %) in the reproduction layer of the present invention is set to $20 \leq y \leq 50$.

Experimental Example 34

Using the same apparatus and method as in Experimental Example 31, an SiN interference layer of 90 nm thickness, a $Gd_x(Fe_{100-y}Co_y)_{100-x}$ reproduction layer of 40 nm thickness, a $Gd_p(Fe_{100-q}Co_q)_{100-p}$ intermediate layer of 10 nm thickness, a $Tb_{20}(Fe_{80}Co_{20})_{80}$ memory layer of 30 nm thickness and an SiN protective layer of 70 nm thickness were formed on a polycarbonate substrate in the order named, thus forming the medium with a structure shown in FIG. 31. In this experimental example, the Co content q (at %) in the intermediate layer was changed variously relative to the Gd contents x and p and the Co content y of the reproduction layer and the intermediate layer obtained in Experimental Examples 32 and 33.

The Co content in the intermediate layer has a relationship to the Curie temperature and is one of the important factors to determine the reproducing power to the medium. For example, assuming that a reproducing power is 4 mW or larger when the linear velocity is 9 m/s, the laser power for erasing data is required to be 7 mW or greater in consideration of the power margin. Further, since the laser beam is in a pulsed form during the optical modulation recording, the recording power is required to be about 13 mW so that reliability of the drive unit is extremely limited. Accordingly, the laser power upon data reproduction is set, preferably, to 4 mW or less, and more preferably, to 3 mW or less. For this, the Curie temperature of the intermediate layer should be 220° C. or less.

Data shown in Table 8 were obtained using $Gd_{45}(Fe_{80}Co_{20})_{55}$ for the intermediate layer. When the Co content in the intermediate layer is 20 at %, the Curie temperature becomes 220° C. so that the reliable information reproduction is possible. However, when the Co content exceeds 20 at %, the reproducing power is increased to drastically lower the reliability of the drive unit.

This experimental example has been explained as using GdFeCo for the intermediate layer. On the other hand, only in consideration of the Curie temperature, the Curie temperature is lowered by adding a non-magnetic element, such as, Al or Cr for the purpose of improving corrosion resistance. In this case, even when the Co content exceeds 20 at %, a Curie temperature of an acceptable value can be obtained due to the addition of the non-magnetic element. However, the magnetic property deteriorates on the whole due to the addition of the non-magnetic element, and further, the perpendicular magnetic anisotropy is reduced due to the addition of Co. Accordingly, the exchange coupling with the memory layer at the aperture portion is weakened so that it becomes difficult to obtain a reproduced signal having an excellent S/N. In view of the foregoing, it is preferable that the intermediate layer is formed of $Gd_p(Fe_{100-q}Co_q)_{100-p}$ as a main component, and that the Co content q (at %) is set to $0 \leq q \leq 20$ even when another element is added.

Experimental Example 35

Using the same apparatus and method as in Experimental Example 31, an SiN interference layer of 90 nm thickness, a $Gd_x(Fe_{100-y}Co_y)_{100-x}$ reproduction layer of 40 nm thickness, a $Gd_p(Fe_{100-q}Co_q)_{100-p}$ intermediate layer of 10 nm thickness, a $Tb_a(Fe_{100-b}Co_b)_{100-a}$ memory layer of 30 nm thickness and an SiN protective layer of 70 nm thickness were formed on a polycarbonate substrate in the order named, thus forming the medium with a structure shown in FIG. 31. In this experimental example, the Tb content a (at %) and the Co content b (at %) in the memory layer were changed variously relative to the Gd contents x and p and the Co contents y and q of the reproduction layer and the intermediate layer obtained in Experimental Examples 32, 33 and 34.

Figure 39:
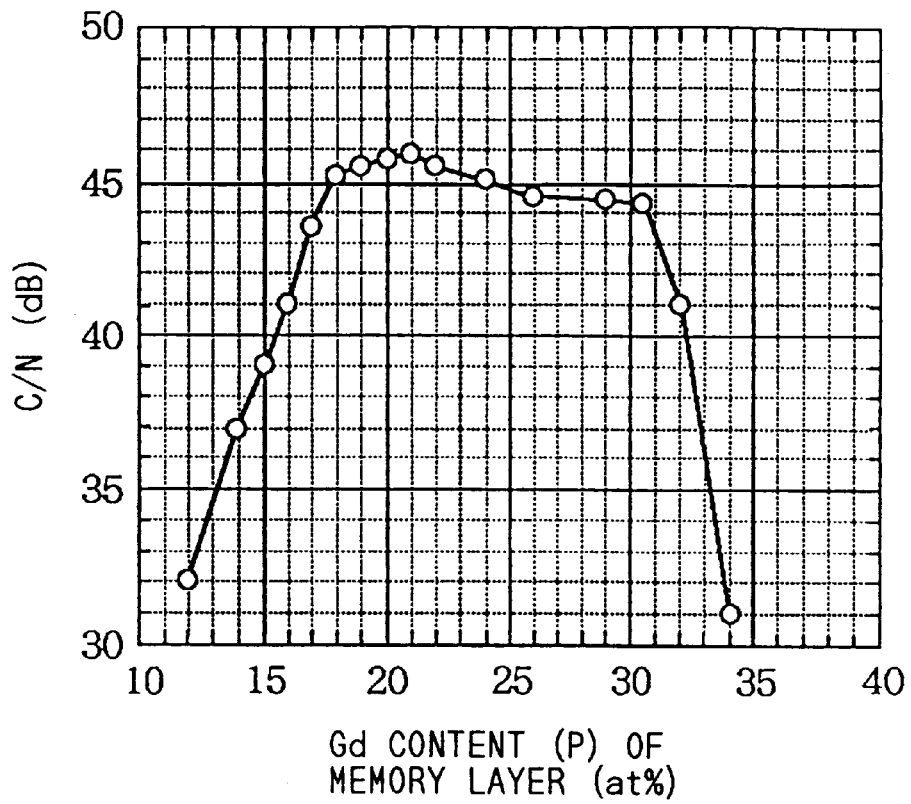
FIG. 39 is a diagram showing the memory-layer-Tb-content dependency of C/N.

FIG. 39 shows the relationship between the Tb content a (at %) in the memory layer and C/N, wherein a mark length is 0.40 μm. on the other hand, the Co content b (at %) in the memory layer is adjusted depending on Tb content so as to hold the Curie temperature to be constant at about 270° C.

As seen from the figure, the composition margin of the memory layer is sufficiently large in view of C/N so that C/N is substantially constant in a range of $18 \leq a \leq 31$. When the Tb content a becomes no more than 18 at %, the saturation magnetization becomes no less than 250 emu/cc (iron family element sublattice magnetization dominant) so that the influence of the diamagnetic field becomes large. As a result, further smaller magnetic domains (microdomain) are formed in the magnetic domain or deformation of configuration of the magnetic domain is caused so that noise components are increased to cause C/N to deteriorate. To the contrary, when the Tb content a becomes no less than 31%, the saturation magnetization becomes no less than 200 emu/cc (rare earth element sublattice magnetization dominant), and further, the compensation temperature becomes no less than 200° C. In this case, since the compensation temperature of the memory layer becomes higher than the Curie temperature of the intermediate layer, the memory layer is rare earth element sublattice magnetization dominant at a temperature where the exchange coupling with the reproduction layer is cut off. Then, since the magnetostatic coupling force acting on the reproduction layer from the memory layer is oriented in the same direction as the exchange-coupling force at a low temperature, it works in a direction to prevent the magnetic domain transferred to the reproduction layer from inverting due to the rear mask. Accordingly, the super-resolution effect is weakened to reduce C/N.

A comparison between the results shown in FIG. 39 and data obtained in the conventional two-layered super-resolution magneto-optical recording medium using an in-plane magnetization film, reveals that the effect of the present invention is obtained in a range of $14 \leq a \leq 33$. In order to ensure a C/N of 42 dB or more for improving reliability, a range of $16 \leq a \leq 32$ is more preferable. Further, in order to ensure a C/N which is stable in view of the composition margin, a range of $18 \leq a \leq 31$ is further preferable.

Experimental Example 36

Using the same apparatus and method as in Experimental Example 31, an SiN interference layer of 90 nm thickness, a $Gd_x(Fe_{100-y}Co_y)_{100-x}$ reproduction layer of 40 nm thickness, a $Gd_p(Fe_{100-q}Co_q)_{100-p}$ intermediate layer of 10 nm thickness, a $Tb_a(Fe_{100-b}Co_b)_{100-a}$ memory layer of 30 nm thickness and an SiN protective layer of 70 nm thickness were formed on a polycarbonate substrate in the order named, thus forming the medium with a structure shown in FIG. 31. In this experimental example, the Co content b (at %) in the memory layer was changed variously relative to the Gd contents x and p and the Co contents y and q of the reproduction layer and the intermediate layer and the Tb content a of the memory layer obtained in Experimental Examples 32, 33, 34 and 35. One example of the results is shown in Table 1.

The Co content in the memory layer has a relationship to the Curie temperature and is an important parameter for determining the laser power at the time of recording. In consideration of the stability of holding data on the medium, the Curie temperature of the memory layer is required to be set to a certain high value. In view of this, it is preferable that the Curie temperature of the memory layer is about 180° C. to 280° C. Accordingly, in order to ensure this Curie temperature in the range of the Tb content described in Experimental Example 35, it is preferable that the Co content b (at %) is set to $14 \leq b \leq 45$.

Experimental Example 37

Figure 40:
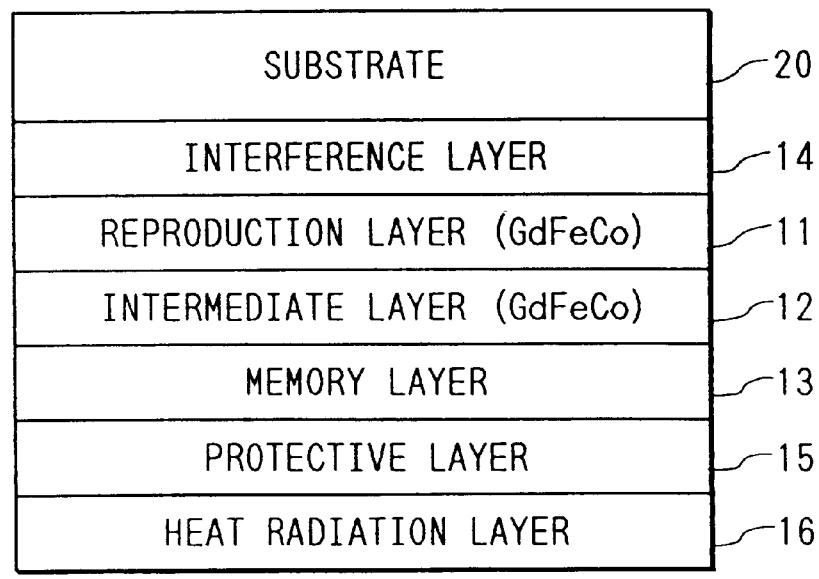
FIG. 40 is a diagram showing another structure of the magneto-optical recording medium of the third embodiment.

Using the same apparatus and method as in Experimental Example 31, an SiN interference layer of 90 nm thickness, a $Gd_{28}(Fe_{60}Co_{40})_{72}$ reproduction layer of 40 nm thickness, a $Gd_{37}Fe_{63}$ intermediate layer of 10 nm thickness, a $Tb_{20}(Fe80Co_{20})_{80}$ memory layer of 30 nm thickness and an SiN protective layer of 70 nm thickness were formed on a polycarbonate substrate in the order named, and further, an Al heat radiation layer of 60 nm was formed for improving the thermal characteristic, thus forming the medium with a structure shown in FIG. 40. It is known in the art that the linear velocity dependency of the thermal characteristic can be improved by adding the heat radiation layer. Also in the present invention, the linear velocity dependencies of the recording power and the reproducing power are improved by adding the heat radiation layer.

Although this effect is obtained in the optical modulation recording as described in Experimental Examples 31 to 36, the similar effect is also obtained in magnetic-field modulation recording. In the case of the magnetic-field modulation recording, it is known that the recorded mark becomes a bow-like shape (so-called arrow-feather mark) according to a configuration of the temperature distribution of the medium at the time of recording. By providing the heat radiation layer, there is an effect that the curvature of an arc portion of the mark can be reduced.

Figure 41:
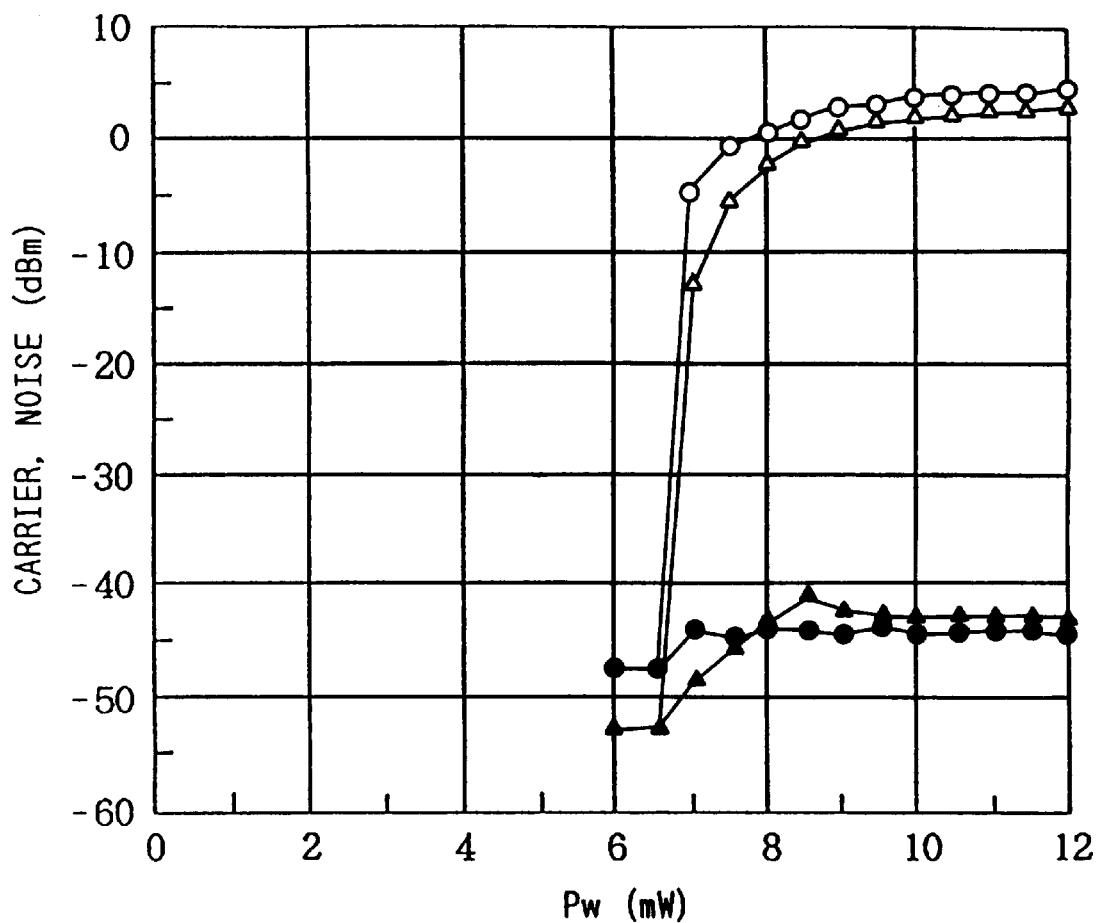
FIG. 41 is a diagram showing the recording power dependency of a carrier and noise when magnetic field modulation recording is performed relative to the medium of the third embodiment.

FIG. 41 shows the recording power dependencies of carrier and noise when magnetic-field modulation recording was performed relative to the medium of this experimental example. As seen from the figure, according to this experimental example, even in case of the magnetic-field modulation recording, the C/N was excellent, i.e. 44 dB relative to even the small mark (0.40 μm), thereby being capable of achieving the super-resolution effect of the present invention.

Experimental Example 38

Using the same apparatus and method as in Experimental Example 31, an SiN interference layer of 90 nm thickness, a $Gd_{28}(Fe_{60}Co_{40})_{72}$ reproduction layer of 40 nm thickness, a $Gd_{37}Fe_{63}$ intermediate layer of 10 nm thickness, a $Dy_{25}(Fe_{70}Co_{30})_{75}$ memory layer of 30 nm thickness and an SiN protective layer of 70 nm thickness were formed on a polycarbonate substrate in the order named, thus forming the medium with a structure shown in FIG. 31.

In this experimental example, DyFeCo was used for the memory layer instead of TbFeCo. The good results as in Experimental Example 31 were obtained for both C/N and crosstalk. It has been confirmed that the present invention is not limited to the TbFeCo memory layer.

Next, in order to make the effect of the present invention more distinct, like experiments were performed relative to the conventional medium structure for comparison.

Comparative Example 12

Using the same apparatus and method as in Experimental Example 31, an SiN interference layer of 90 nm thickness, a $Tb_{20}(Fe_{80}Co_{20})_{80}$ memory layer of 80 nm thickness and an SiN protective layer of 70 nm thickness were formed on a polycarbonate substrate in the order named. In other words, a single layer disc having, as a magnetic layer, only the memory layer used in Experimental Example 31 was prepared. First, the 0.40 μm marks were recorded on the medium, and the reproducing power dependencies of carrier and noise were measured. The results are shown in FIG. 32. As seen in the figure, although the carrier level increases according to an increment of the reproducing power, the slope is gradual since the mask effect observed in the medium of the present invention can not be obtained.

Next, marks of various sizes were recorded on the medium of this comparative example, and the spatial frequency characteristic was measured. The results are shown in FIG. 33, wherein it is seen that, although a sufficiently high C/N ratio was obtained when the mark length was large, i.e. 0.78 μm, the resolution was rapidly reduced when exceeding a cut-off frequency of the optical system.

Further, in the measurement of crosstalk, since the effective track pitch of 0.8 μm was narrow relative to the reproducing spot, and further, no mask effect was provided in the case of the single layer disc, a crosstalk of only about −22 dB was obtained as shown in FIG. 34.

Comparative Example 13

Figure 3A:
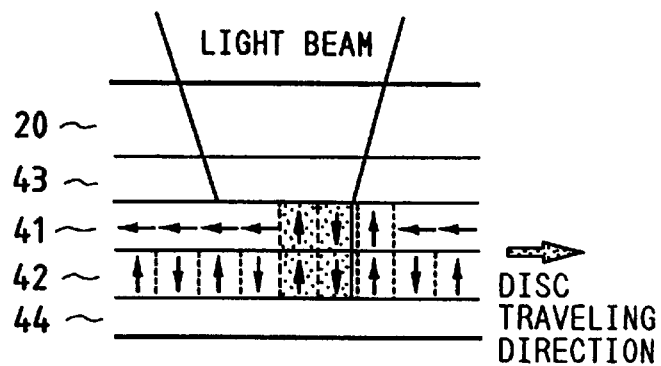
Figure 3B:
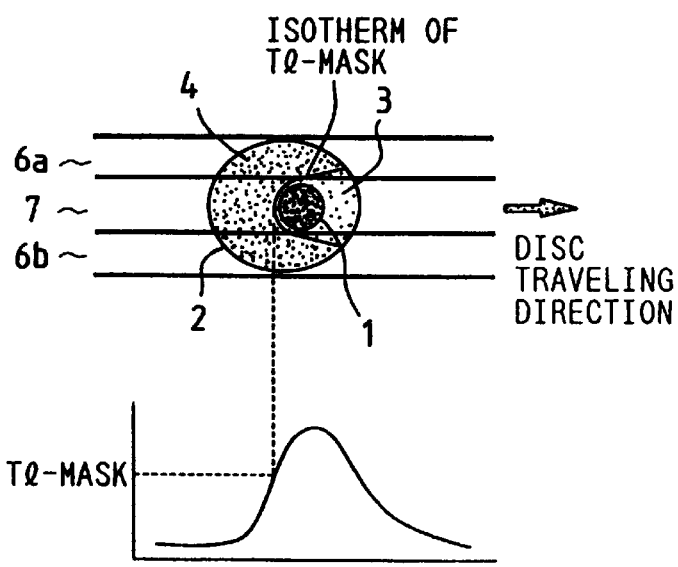
Figure 3C:
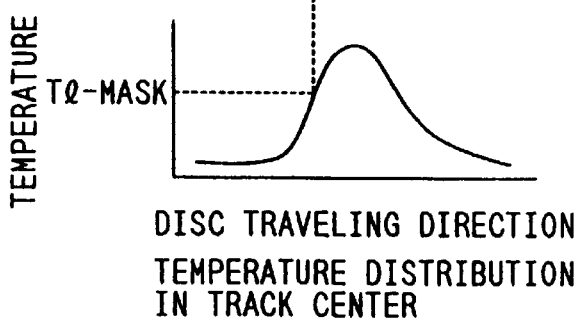

Using the same apparatus and method as in Experimental Example 31, an SiN interference layer of 90 nm thickness, a $Gd_{28}(Fe_{60}Co_{40})_{72}$ reproduction layer of 70 nm thickness, a $Tb_{20}(Fe_{80}Co_{20})_{80}$ memory layer of 30 nm thickness and an SiN protective layer of 70 nm thickness were formed on a polycarbonate substrate in the order named, thus forming the medium with a structure shown in FIG. 3A.

First, the marks of 0.40 μm mark length were recorded on the medium, and the reproducing power dependencies of carrier and noise were measured. The results are shown in FIG. 32. As seen in the figure, since even the medium of this comparative example provides the super-resolution effect by using an in-plane magnetization film at low temperatures, the carrier level was increased, as in the medium of the present invention in Experimental Example 31, in a range of the reproducing power between 0.8 mW and 2.8 mW. However, in the two-layered super-resolution medium of this comparative example, since a rear mask does not appear even when the reproducing power is increased to 3 mW or more, the rapid carrier increase as in the medium of the present invention in Experimental Example 31 was not observed.

Next, marks of various sizes were recorded on the medium of this comparative example, and the spatial frequency characteristic was measured. As shown in FIG. 33, the results were such that, although the resolution was increased at high-frequency regions as compared with the single layer disc, since no rear mask effect was provided and the positional relationship between the aperture region and the spot was not optimum, the resolution was inferior as compared with the disc of Experimental Example 31.

On the other hand, with regard to crosstalk, the front mask largely influences, but the rear mask does not. Accordingly, as shown in FIG. 34, crosstalk of about −30 dB, which is equivalent to that obtained in the medium of Experimental Example 31, was obtained.

The reproduction layer 311 is a layer for reproducing magnetization information held in the memory layer 313. The reproduction layer 311 has a magnetization characteristic such that it is an in-plane magnetization film at room temperature and becomes a perpendicular magnetization

TABLE 8

| | Reproduction Layer $Gd_x(Fe_{100-y}Co_y)_{100-x}$ | | | Intermediate Layer $Gd_p(Fe_{100-q-r}Co_qCr_r)_{100-p}$ | | | | Memory Layer $Tb_a(Fe_{100-b}Co_b)_{100-a}$ | | | C/N | | | Cross Talk |
|---|---|---|---|---|---|---|---|---|---|---|---|---|---|---|
| | x (at %) | y (at %) | Film Thickness (nm) | p (at %) | q (at %) | r (at %) | Film Thickness (nm) | a (at %) | b (at %) | Film Thickness (nm) | 0.78 um (dB) | 0.40 um (dB) | 0.30 um (dB) | 0.78 (dB) |
| Experimental Example 31 | 28 | 40 | 40 | 37 | 0 | 0 | 10 | 20 | 20 | 30 | 50 | 45 | 39 | −28 |
| Experimental Example 32 | 24 | 40 | 40 | 45 | 0 | 10 | 10 | 20 | 20 | 30 | 49 | 42 | 34 | −31 |
| Experimental Example 33 | 32 | 40 | 40 | 25 | 0 | 0 | 0 | 20 | 20 | 30 | 49 | 43 | 35 | −26 |
| Experimental Example 34 | 24 | 20 | 40 | 45 | 0 | 10 | 10 | 20 | 20 | 30 | 48 | 41 | 32 | −26 |
| Experimental Example 35 | 32 | 50 | 40 | 25 | 0 | 0 | 10 | 20 | 20 | 30 | 48 | 42 | 34 | −28 |
| Experimental Example 36 | 32 | 40 | 40 | 45 | 20 | 0 | 10 | 20 | 20 | 30 | 48 | 43 | 35 | −29 |
| Experimental Example 35 | 28 | 40 | 40 | 37 | 0 | 0 | 10 | 18 | 18 | 30 | 50 | 45 | 39 | −28 |
| Experimental Example 36 | 29 | 40 | 40 | 37 | 3 | 0 | 10 | 31 | 45 | 30 | 49 | 44 | 39 | −30 |
| Experimental Example | 28 | 40 | 40 | 37 | 0 | 0 | 10 | 18 | 14 | 30 | 49 | 44 | 39 | −28 |
| Comparative Example 12 | — | — | — | — | — | — | — | 20 | 20 | 80 | 49 | 28 | 9 | −22 |
| Comparative Example 13 | 28 | 40 | 70 | — | — | — | — | 20 | 20 | 30 | 50 | 36 | 28 | −31 |

(Fourth Embodiment)

In a fourth embodiment, a preferable relationship between a Curie temperature of an intermediate layer and a compensation temperature of a reproduction layer will be described, wherein a magnetic layer showing an in-plane magnetic anisotropy at room temperature is used as the reproduction layer in the medium of the first embodiment.

Hereinbelow, the fourth embodiment of the present invention will be described in detail with reference to the drawings.

Figure 42:
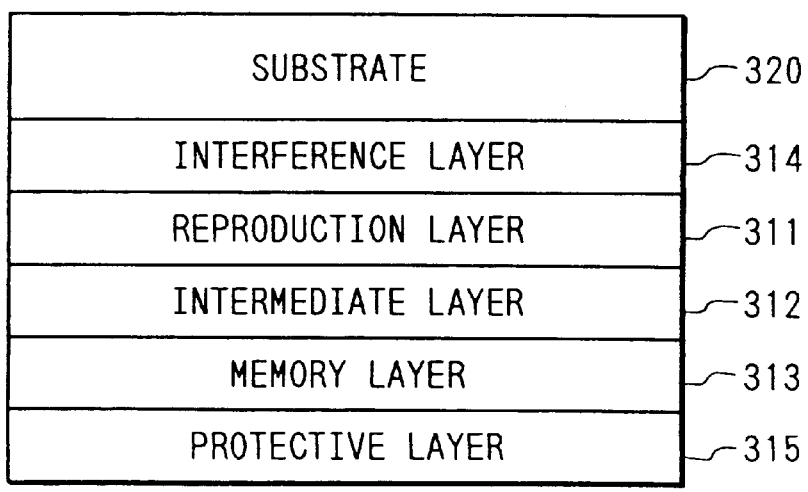
FIG. 42 is a diagram showing the basic structure of a magneto-optical recording medium according to a fourth embodiment of the present invention.

FIG. 42 shows a sectional view of an optical disc in the fourth embodiment. As shown in FIG. 42, in the optical disc used in this embodiment, an interference layer 314, a first magnetic layer (hereinafter referred to as "reproduction layer") 311, a third magnetic layer (hereinafter referred to as "intermediate layer") 312, a second magnetic layer (hereinafter referred to as "memory layer") 313 and a protective layer 315 are laminated on a substrate 320 in the order named. The substrate 320 is normally formed of a transparent material, such as, glass or polycarbonate.

Each of these layers can be formed by continuous sputtering or continuous deposition using a DC magnetron sputtering apparatus.

The interference layer 314 is provided for enhancing the magneto-optical effect and formed of, for example, a transparent dielectric material, such as, $Si_3N_4$, AlN, $SiO_2$, SiO, ZnS, $MgF_2$ or the like.

The protective layer 315 is used for protecting the magnetic layers and formed of a material like that of the interference layer 314.

The interference layer 314 and the protective layer 315 have nothing to do with the essence of the present invention, and thus, a detailed explanation thereof will be omitted. Although not shown in FIG. 42, the protective layer 315 may be applied with a hard-coating material, such as, an ultraviolet-setting resin for protecting the films or using a magnetic-field modulation overwrite magnetic head.

film at a given temperature or higher between room temperature and its Curie temperature. The reproduction layer 311 is located closer to a light incident side as compared with the intermediate layer 312 and the memory layer 313, and its Curie temperature is set to be higher than at least those of the intermediate layer 312 and the memory layer 313 for preventing deterioration of the Kerr rotation angle upon reproduction. Further, the reproduction layer 311 has a compensation temperature Tcompl between room temperature and the Curie temperature, satisfying the following condition:

$$-20°C. \leq Tcompl-Tc3 < 80°C.$$

wherein Tc3 represents a Curie temperature of the intermediate layer.

As a specific material of the reproduction layer 311, a material, for example, a rare earth-iron family amorphous alloy having a small perpendicular magnetic anisotropy, such as, GdFeCo, GdTbFeCo, GdDyFeCo or the like, mainly containing GdFeCo, is preferable since it has a high Curie temperature and a low coercive force and easily causes contraction of recorded magnetic domains in a high-temperature region, which is the prime aim of the present medium. GdFeCo is particularly desired. Rare earth light metal, such as, Nd, Pr, Sm or the like may be added for increasing the Kerr rotation angle at a shorter wavelength.

The intermediate layer 312 is provided for the following three purposes:

(1) The intermediate layer 312, around room temperature, moderates the magnetic wall energy between the reproduction layer 311 and the memory layer 313 and helps the reproduction layer 311 to be an in-plane magnetization film. This results in contributing to a reduction in the film thickness of the reproduction layer.

(2) When reaching a given temperature or higher, the intermediate layer 312, along with the reproduction layer 311, makes the transition to a perpendicular magnetization film to mediate the exchange coupling from the memory layer 313 to the reproduction layer 311.

(3) At the Curie temperature or higher of the intermediate layer 312, the intermediate layer 312 cuts off the exchange coupling between the reproduction layer 311 and the memory layer 313.

In order to achieve these purposes, the intermediate layer 312 is located between the reproduction layer 311 and the memory layer 313 and has a Curie temperature which is set to be higher than room temperature and lower than those of the reproduction layer 311 and the memory layer 313. The Curie temperature of the intermediate layer 312 is set to be high enough to mediate the exchange-coupling force from the memory layer 313 to the reproduction layer 311 at a medium-temperature portion within the light spot, but low enough to cut off the exchange-coupling force at the highest-temperature portion within the light spot, and thus preferably, 80° C. or higher and 220° C. or lower, and more preferably, 110° C. or higher and 180° C. or lower. As a material of the intermediate layer 312, for example, a rare earth-iron family amorphous alloy, such as, TbFe, TbFeCo, GdFe, GdFeCo, GdTbFeCo, GdDyFeCo, DyFe, DyFeCo, TbDyFeCo or the like is preferable. A non-magnetic element, such as, Cr, Al, Si, Cu or the like may be added for lowering the Curie temperature. Further, when masking a low-temperature region by causing the reproduction layer to be the in-plane magnetization film at a low temperature, it is preferable that an in-plane magnetic anisotropy of the intermediate layer at room temperature is greater than that of the reproduction layer at room temperature, for example, the saturation magnetization Ms of the intermediate layer at room temperature is greater than that of the reproduction layer at room temperature, for strengthening the in-plane magnetic anisotropy of the reproduction layer at the low temperature.

The memory layer 313 is a layer for storing recorded information and thus is required to stably hold a very small magnetic domain of no more than 1 μm. As a material of the memory layer 313, a material which has a large perpendicular magnetic anisotropy and can stably hold a magnetization state, for example, a rare earth-iron family amorphous alloy, such as, TbFeCo, DyFeCo, TbDyFeCo or the like, garnet, a platinum family-iron family periodic structure film, such as, Pt/Co, Pd/Co or the like, or a platinum family-iron family alloy, such as, PtCo, PdCo or the like is preferable.

An element, such as, Al, Ti, Pt, Nb, Cr or the like may be added to the reproduction layer 311, the intermediate layer 312 and the memory layer 313 for improving their corrosion resistances. Further, for improving thermal conductivity, a layer formed of Al, AlTa, AlTi, TiCr, Cu or the like and having good thermal conductivity may be provided. Further, an initialization layer in which magnetization is aligned in one direction for performing the optical modulation overwrite may be provided. Further, auxiliary layers for recording assistance and reproducing assistance may be provided to adjust the exchange-coupling force or the magnetostatic coupling force.

Since the recording and reproduction of the data signal relative to the medium in the fourth embodiment is the same as in the first embodiment, an explanation thereof will be omitted for brevity.

In the reproducing process explained in the first embodiment, for forming the rear mask within the spot, the intermediate layer should reach the Curie temperature in the highest-temperature portion within the spot. The laser power for the information reproduction is normally set to about no more than 4 mW on the medium since, if it is more than 4 mW, the margin relative to the laser power at the time of recording becomes small. In consideration that the temperature reaches about 220° C. by irradiation of the reproducing power, the Curie temperature of the intermediate layer should be set to 220° C. or less. To the contrary, since the rear mask should be formed only at a portion in the spot, if the intermediate layer reaches the Curie temperature without irradiation of the laser beam, neither the front mask nor the aperture is formed so that the signal can not be reproduced. The temperature in the magneto-optical recording/reproduction device normally increases to 50° C. to 60° C. Accordingly, the Curie temperature of the intermediate layer should be 80° C. or higher, or otherwise stable information reproduction can not be performed. In view of this, the Curie temperature of the intermediate layer should be set to a range of 80° C. to 220° C.

One condition for stably forming the rear mask when the intermediate layer reaches around the Curie temperature is that Hleak is small as described in the first embodiment. As shown in relation (10), Hleak is proportional to the saturation magnetization Msl" around the recorded magnetic domain. Thus, Msl" is required to be small. Accordingly, the foregoing condition is satisfied, provided that the reproduction layer reaches around the compensation temperature when the intermediate layer reaches around the Curie temperature.

Next, consideration will be given to Hst which constitutes another condition for forming the rear mask. Hst represents the magnetostatic coupling force acting on the reproduction layer from the recorded magnetic domain of the memory layer when the intermediate layer reaches around the Curie temperature. When the memory layer and the reproduction layer are of an anti-parallel type, Hst works in a direction to invert the transferred magnetic domain so as to form the rear mask. On the other hand, in case of a parallel type, Hst works in a direction to prevent formation of the rear mask. Specifically, Hst works in a direction to form the rear mask, provided that, for example, when the memory layer is iron family element sublattice magnetization dominant, the reproduction layer is rare earth element sublattice magnetization dominant at a temperature around the Curie temperature Tc3 of the intermediate layer. This means that the effect of Hst to form the rear mask is large when the compensation temperature Tcompl of the reproduction layer is higher than the Curie temperature Tc3 of the intermediate layer.

As described above, for reducing the magnetic-domain holding effect by Hleak and increasing the magnetic-domain contracting effect by Hst, the compensation temperature Tcompl of the reproduction layer is set to be somewhat higher than the Curie temperature Tc3 of the intermediate temperature, wherein the rear mask is formed most stably. On the other hand, if Tcompl is lowered, the magnetic-domain contracting effect by Hst is reduced so that the rear mask can not be formed stably, thereby lowering the quality of the reproduced signal. To the contrary, if Tcompl is too high, Msl" is increased to raise Hleak so that the magnetic domain of the reproduction layer becomes reluctant to contract even when the intermediate layer reaches the Curie temperature, thereby also lowering quality of the reproduced signal. Specifically, when Tcompl−Tc3 is set to be some tens (° C.), and more concretely, no less than −20° C. and no more than 80° C., the effect of the present invention becomes a maximum.

The present invention will be described in further detail by way of experimental examples. However, the present invention is not limited to these experimental examples.

Experimental Example 37

Si, Gd, Tb, Fe and Co targets were attached to a DC magnetron sputtering apparatus, and a glass substrate having a diameter of 130 mm and a polycarbonate substrate with lands and grooves at a pitch of 1.6 µm were fixed to a substrate holder which was set at a position separated from the respective targets by a distance of 150 mm. Thereafter, the interior of the chamber was evacuated by a cryopump to a high vacuum of $1\times10^{-5}$ Pa or less. During the evacuation, Ar gas was introduced into the chamber to 0.4 Pa, and thereafter, an SiN interference layer of 90 nm thickness, a $Gd_{28}(Fe_{60}Co_{40})_{72}$ reproduction layer of 40 nm thickness, a $Gd_{37}Fe_{63}$ intermediate layer of 10 nm thickness, a $Tb_{20}(Fe_{80}Co_{20})_{80}$ memory layer of 30 nm thickness and an SiN protective layer of 70 nm thickness were formed in the order named, thus forming the medium with a structure shown in FIG. 42. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.1. The $Gd_{28}(Fe_{60}Co_{40})_{72}$ reproduction layer was rare earth element sublattice magnetization dominant at room temperature, and was set to represent a saturation magnetization Ms1 of 180 emu/cc, a compensation temperature Tcompl of 215° C. and a Curie temperature Tc1 of 300° C. or more. The $Gd_{37}Fe_{63}$ intermediate layer was rare earth element sublattice magnetization dominant at room temperature, and was set to represent a saturation magnetization Ms3 of 450 emu/cc and a Curie temperature Tc3 of 190° C. The $Tb_{20}(Fe_{80}Co_{20})_{80}$ memory layer was iron family element lattice magnetization dominant, and was set to represent a saturation magnetization Ms2 of −250 emu/cc and a Curie temperature Tc2 of 270° C. Hereinafter, the polarity of a saturation magnetization will be described as being positive in the case that the rare earth element sublattice magnetization is dominant and as being negative in the case that the iron family element sublattice magnetization is dominant.

After recording a magnetic domain of a 0.78 µm mark length in the magneto-optical recording medium, the magnetic domain was observed by a polarizing microscope under irradiation of a semiconductor laser beam of 830 nm. While increasing the laser power, it was confirmed that the recorded magnetic domain contracted and the magnetization was oriented in an erasing direction at the center (high-temperature region) of the light spot at a certain laser power.

Figure 43:
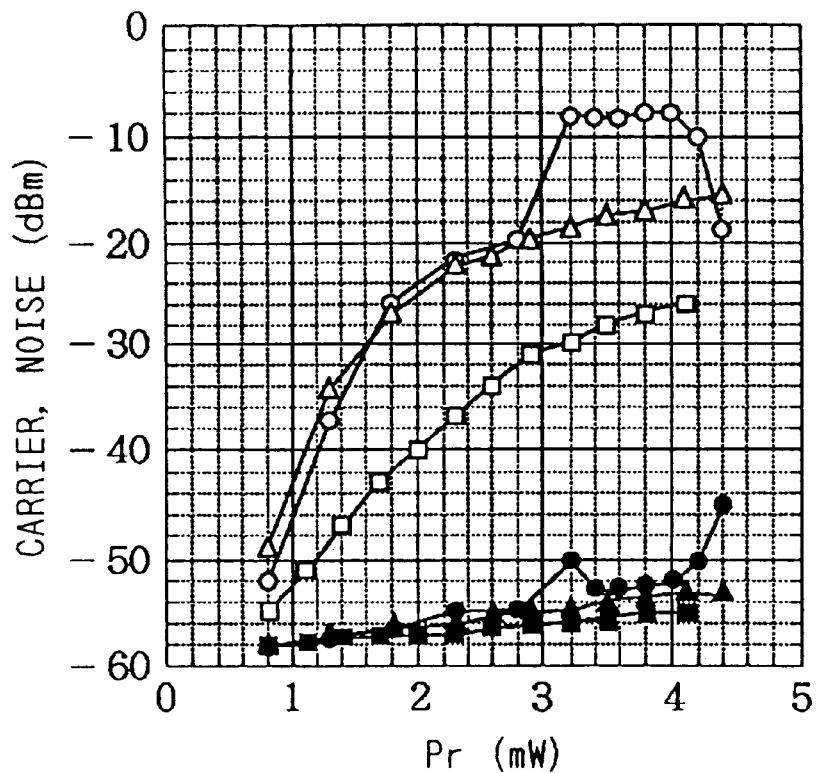
FIG. 43 is a diagram showing the reproducing power dependency of a carrier and noise.

Subsequently, the recording/reproduction characteristic was measured using this magneto-optical recording medium. The measurement was performed by setting the N.A. of an objective lens to be 0.53, the laser beam wavelength to be 780 nm (using an optical head), the linear velocity to be 9 m/s and the recording power to be 10 mW. First, erasing was performed entirely on the medium, and thereafter, a mark of 0.40 µm length was recorded by modulating a laser beam at a frequency of 11.3 MHz. Subsequently, the variation of C/N ratios were measured by changing the reproducing power from 0.8 mW to 4.4 mW. The results are shown in FIG. 43.

In the magneto-optical recording medium of the present invention, since the temperature of the medium does not increase sufficiently while the reproducing power is 1.0 mW or less, magnetization of the reproduction layer is oriented substantially in a film plane. Accordingly, since the mark recorded in the memory layer is masked by the reproduction layer, substantially no C/N ratio is obtained. On the other hand, when the reproducing power is increased to about 2.0 mW to 2.8 mW, a medium-temperature region, that is, an aperture region, is formed within the reproducing spot to transfer the magnetic domain of the memory layer to the reproduction layer so that the C/N ratio is increased. The configuration of the aperture region at this time is substantially the same as in the super resolution of the conventional two-layered structure using the in-plane film as shown in FIG. 3B. Accordingly, although the super-resolution phenomenon is generated, since the size and location of the aperture region is not optimum, only about 36 dB can be obtained as the C/N ratio. When the reproducing power is further increased to 3.2 mW to 4.0 mW, a portion appears within the spot where the intermediate layer reaches the Curie temperature, that is, a rear mask is formed. Then, as shown in FIG. 6A, the aperture configuration becomes optimum relative to the spot so that a C/N ratio of 45 dB is obtained. On the other hand, when the reproducing power exceeds 4.0 mW, the highest temperature exceeds the Curie temperature of the memory layer so that the recorded data are damaged to reduce the C/N ratio.

Figure 44:
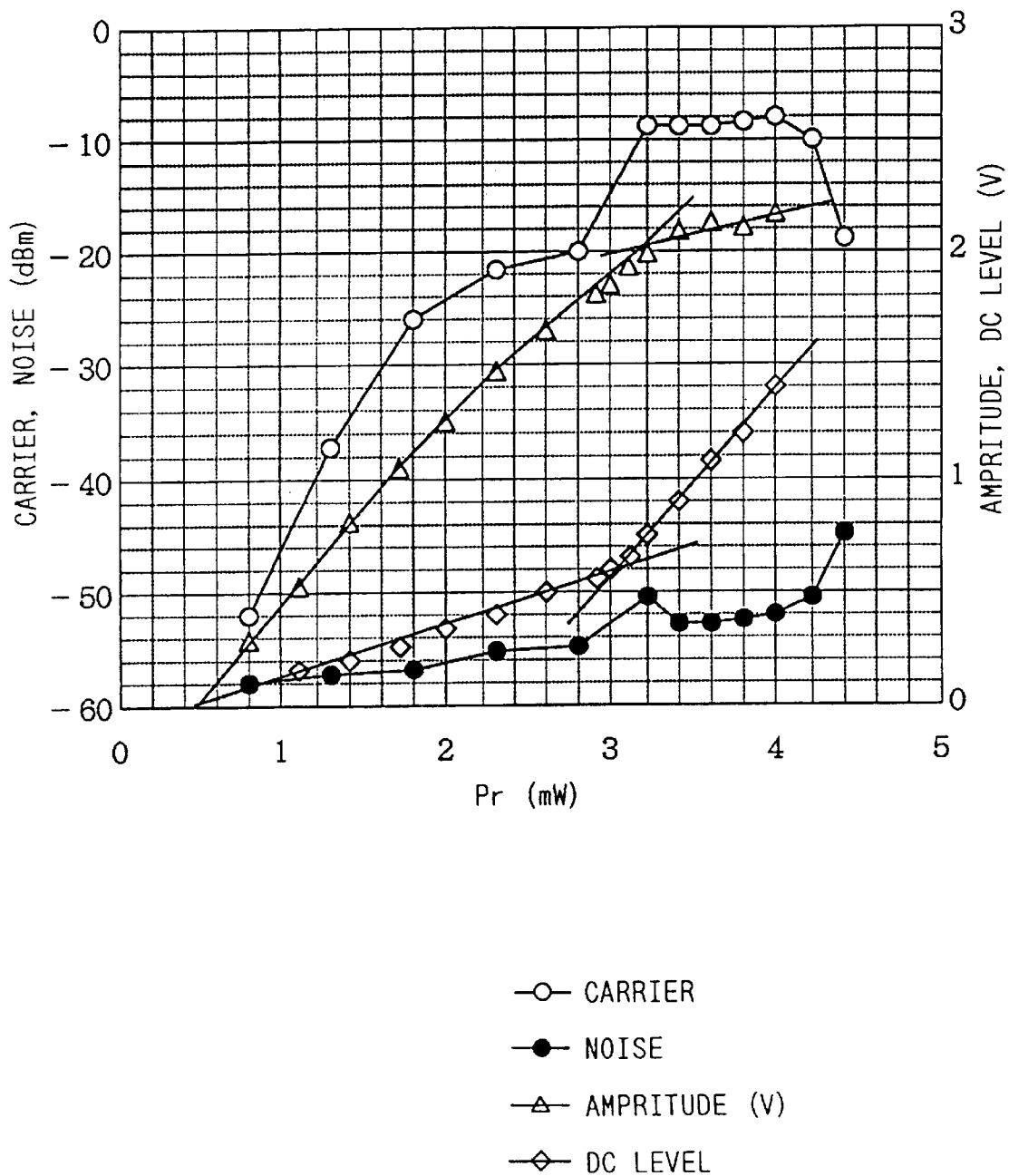
FIG. 44 is a diagram showing the reproducing power dependency of a carrier, noise, amplitude, and a DC level.

Next, the amplitudes and DC levels of the reproduced signal were measured for further supporting the formation of the rear mask in the magneto-optical recording medium of the present invention. The carrier and noise shown in FIG. 44 are the same data as those described before. In case of the recorded mark length being 0.4 µm, when the reproducing power exceeds 3 mW, the carrier level is rapidly increased so that the formation of the rear mask can be confirmed.

The amplitudes and DC levels were obtained from the reproduced signal for the 0.8 µm marks recorded in the same medium. The DC level takes a positive sign at an erasing side. In case of a conventional optical disc, the aperture configuration does not change even when the reproducing power is changed. Accordingly, when the reproducing power is within a range which does not cause the memory layer to reach the Curie temperature, the relationship between the amplitude of the reproduced signal and the reproducing power forms a straight line passing the origin. Further, the mark is not recorded over the full width of the spot light so that erased-state potions remain at both sides of the mark. Accordingly, even when the marks are recorded with a duty cycle of 50%, the DC level of the reproduced signal does not become 0, but offsets to the erasing side (positive side in FIG. 44). Thus, each of the relationships of both the amplitude and the DC level relative to the reproducing power forms a straight line with a positive slope passing through the origin. Alternatively, when reduction in the Kerr rotation angles of the reproduction layer due to the power increase is at a level which can not be ignored, a curve is formed which is slightly convex upward depending on such a level. On the other hand, in case of the super-resolution disc of the present invention, a straight line does not pass the origin, and further, its slope is changed around the reproducing power of 3 mW. This is considered as follows.

When the reproducing power is 0.5 mW or less, even the highest-temperature portion does not reach a temperature where the reproduction layer makes the transition from an in-plane magnetization film to a perpendicular magnetization film. Accordingly, the magnetization of the reproduction layer is in-plane, that is, is masked, in all the regions within the spot. Thus, the amplitude and the DC level are both 0. On the other hand, when the reproducing power exceeds 0.5 mW, a part of the reproduction layer within the spot becomes a perpendicular magnetization film. When the power is further increased, since the aperture region expands, both the amplitude and the DC level are rapidly increased with a slope exceeding a proportional relationship with the reproducing power. However, when the reproducing power exceeds 3 mW, the rear mask starts to be formed within the spot so that the direction of the magnetization aligns in the erasing direction in the rear-masked portion. This portion worked for the signal reproduction before the appearance of the rear mask, but does not work for the signal reproduction as being masked in the erasing direction when the rear mask appears. Accordingly, across the reproducing power of 3 mW, the DC level is rapidly increased in the erasing direction, while the amplitude of the reproduced signal is reduced. From the foregoing results, the behavior of the rear mask in the super-resolution disc of the present invention has been supported.

Figure 45:
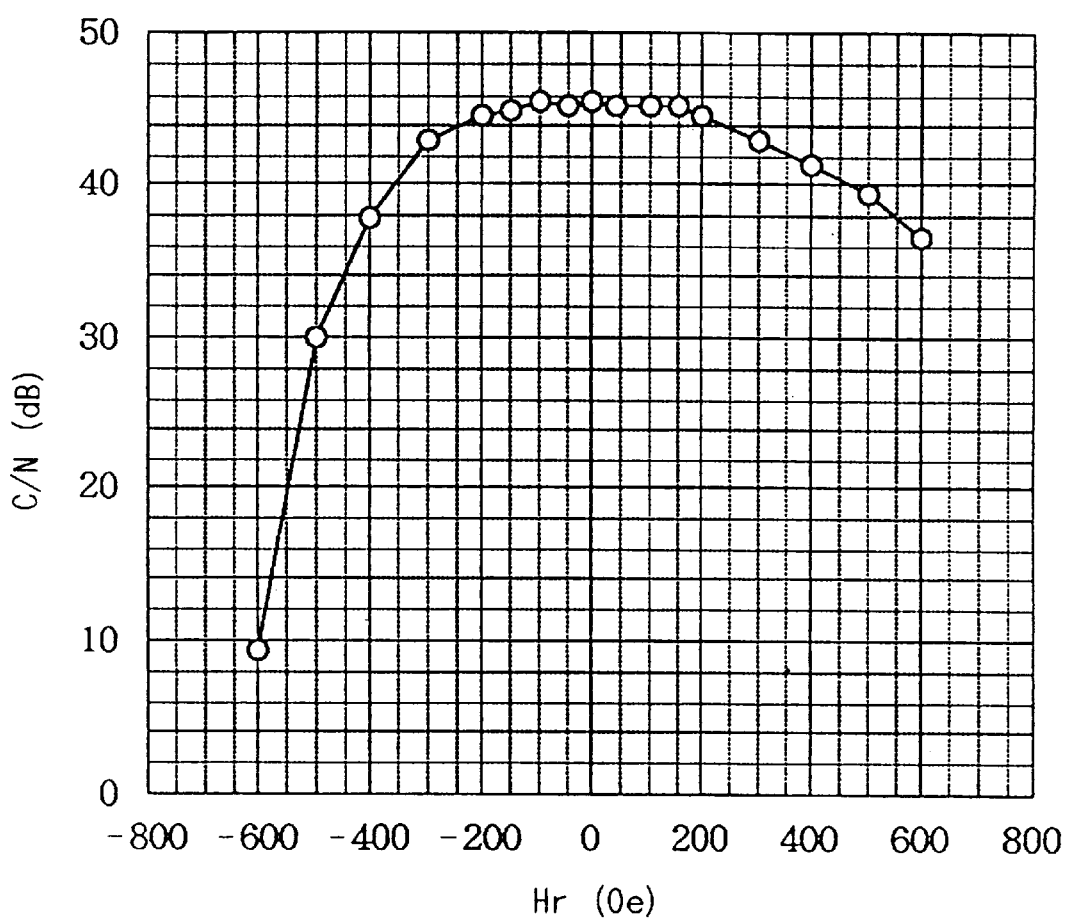
FIG. 45 is a diagram showing the reproducing magnetic field dependency of C/N.

Further, in order to confirm that the super-resolution effect of the present invention is generated without applying an external reproducing magnetic field, the results of examination about dependency upon the reproducing magnetic field are shown in FIG. 45. FIG. 45 was obtained in the following manner. After the 0.4 μm marks were recorded on the disc as in the foregoing manner, the reproducing magnetic field was changed while performing the signal reproduction with the reproducing power of 3.2 mW, and the variation of C/N ratios at that time was plotted. As clear from this figure, the C/N ratio of 45 dB was stably obtained in a range of the reproducing magnetic field±200 Oe.

Figure 46:
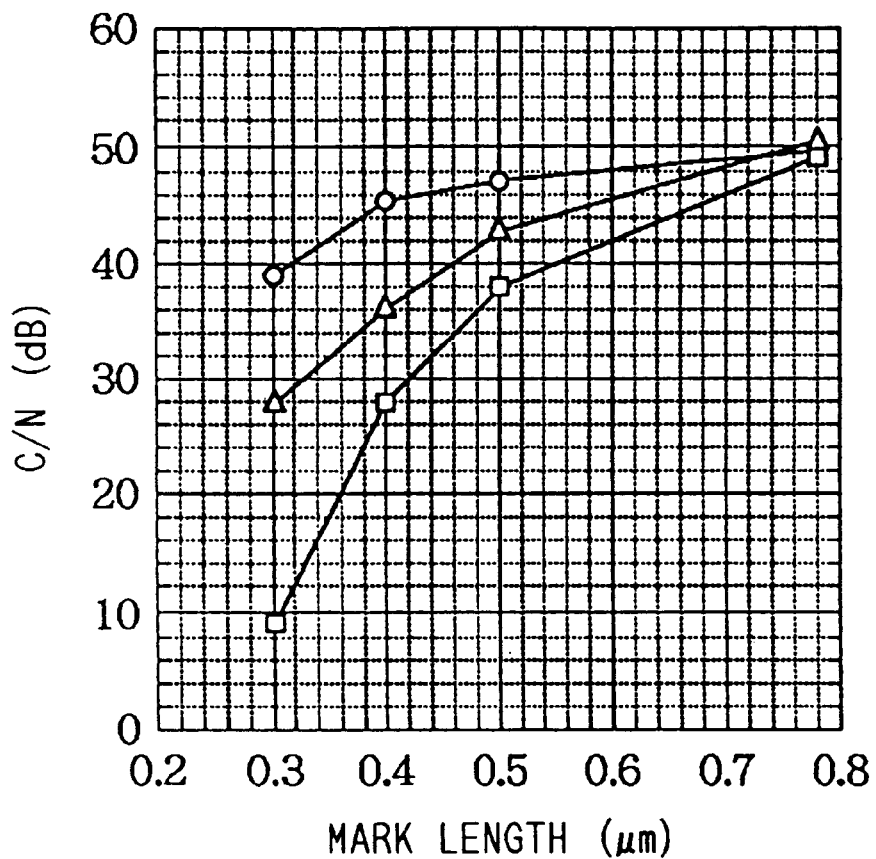
FIG. 46 is a diagram showing the mark length dependency of C/N.

Subsequently, the mark-length dependency of C/N was examined by changing the laser-beam modulation frequency, at the time of recording, between 5.8 MHz, 9.0 MHz, 11.3 MHz and 15 MHz (corresponding to mark lengths 0.78 μm, 0.50 μm, 0.40 μm and 0.30 μm, respectively) with respect to the same medium. The results are shown in FIG. 46. As shown in the figure, an excellent spatial frequency characteristic was obtained in the recording medium of the present invention.

Figure 47:
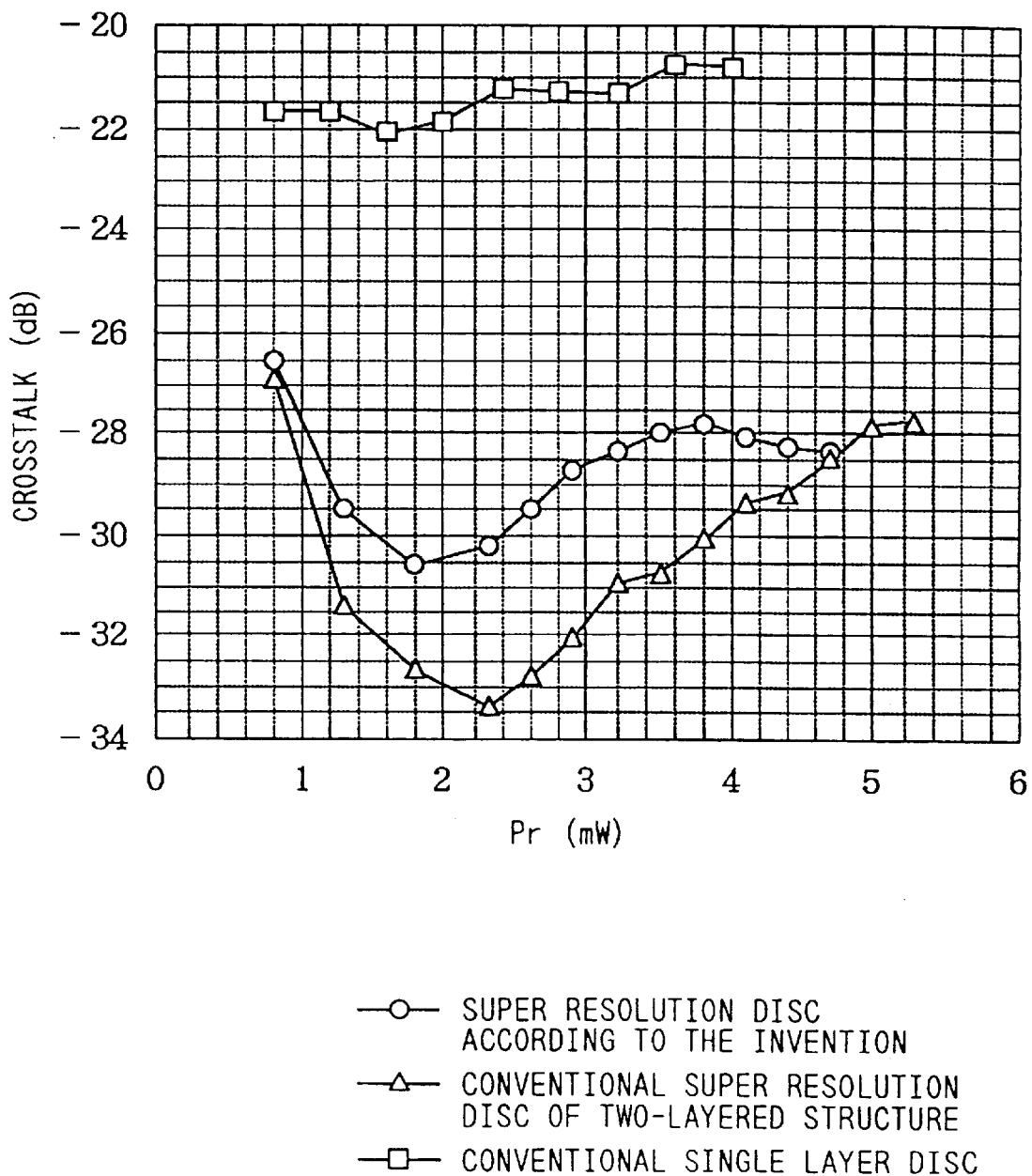
FIG. 47 is a diagram showing the reproducing power dependency of crosstalk.

Subsequently, crosstalk with the adjacent track (hereinafter referred to as "crosstalk") was measured. First, erasing was performed entirely on the lands and the grooves, and thereafter, a signal of a 0.78 μm mark length was recorded on the land as in the foregoing manner so as to measure a carrier level CL. Subsequently, the carrier level CG upon tracking the adjacent groove was measured. The crosstalk was represented by a ratio CL/CG. Since the experiment was performed on the assumption that data were recorded on both the land and groove, an effective track pitch was 0.8 μm. The results are shown in FIG. 47. As is clear from the figure, crosstalk was suppressed to about −28 dB in the range of the reproducing power of 3.2 mW to 4.0 mW, which range was optimum for the medium. This shows that the present medium is also effective for narrowing the track pitch.

The foregoing data were all obtained without applying an initializing magnetic field, and excellent results were obtained for the marks recorded at high density using an information recording/reproduction device like the conventional information recording/reproduction device. The measurement results of the C/N ratios under the optimum condition and the crosstalk at the same reproducing power are shown in Table 9 at Experimental Example 37.

Experimental Example 38

Using the same apparatus and method as in Experimental Example 37, an SiN interference layer of 90 nm thickness, a GdFeCo reproduction layer of 40 nm thickness, a GdFeCo intermediate layer of 10 nm thickness, a TbFeCo memory layer of 30 nm thickness and an SiN protective layer of 70 nm thickness were formed on a polycarbonate substrate in the order named, thus forming the medium with a structure shown in FIG. 42. In this experimental example, by changing the compositions of the reproduction layer and the intermediate layer, the saturation magnetization, the compensation temperature and the Curie temperature of those layers were changed so as to examine a variation of the characteristics relative to those materiality values.

Figure 48:
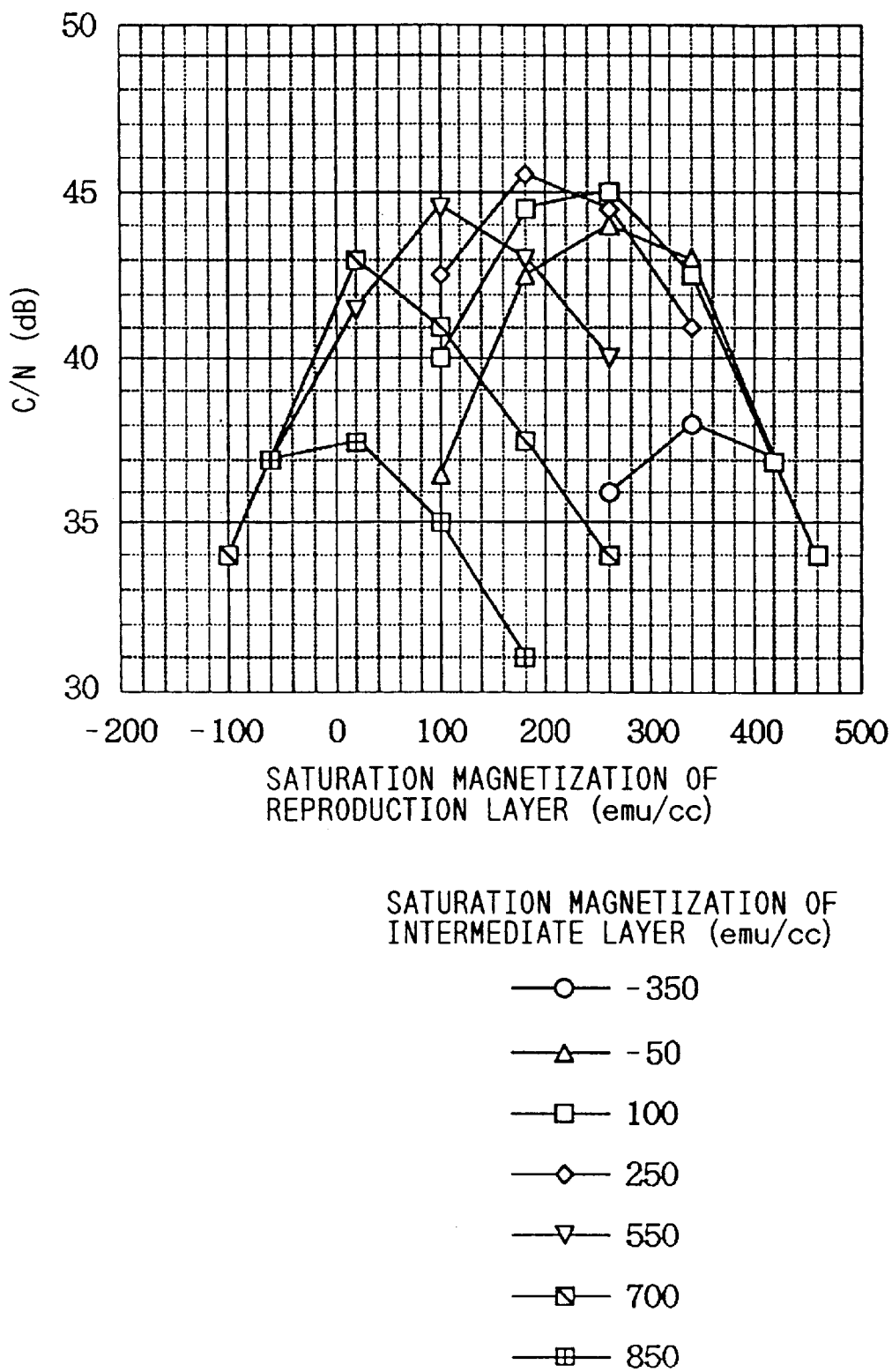
FIG. 48 is a diagram showing the relationship between C/N and the saturation magnetization of the reproduction layer.

The relationship between the saturation magnetization Ms1 (emu/cc) of the reproduction layer and C/N when recording the 0.4 μm marks on the respective samples under the same condition as in Experimental Example 37, is shown in FIG. 48. For example, when seeing a curve with a saturation magnetization Ms3 (emu/cc) of the intermediate layer being 100, it is the curve which is convex upward and has a maximum value around Ms1=260. This is considered as follows. When the saturation magnetization Ms1 of the reproduction layer is small, the in-plane anisotropy of the reproduction layer is reduced. Accordingly, the temperature at which the magnetization aligns in the perpendicular direction due to the exchange coupling with the memory layer, is lowered so that the front mask effect is weakened to reduce C/N. To the contrary, when Ms1 is too large, the front mask effect becomes so strong that the intermediate layer reaches the Curie temperature before the aperture sufficiently opens, thereby also causing a deterioration in C/N. The front mask effect is determined due to the balance between the in-plane anisotropies of the reproduction layer and the intermediate layer such that, when the in-plane anisotropy of the reproduction layer is weakened, the in-plane anisotropy of the intermediate layer should be strengthened. Specifically, when the saturation magnetization Ms3 of the intermediate layer is increased, an optimum value of Ms1 is reduced. Accordingly, as shown in FIG. 48, the peak position of C/N shifts due to change in Ms3. As will be described later, in the conventional two-layered super-resolution medium using an in-plane magnetization film, a C/N of about 37 dB was obtained relative to the mark length of 0.40 μm. As compared with this, it is seen that an excellent super-resolution effect is achieved by the medium of the present invention. For ensuring high reliability of the information reproduction, it is necessary that C/N be no less than 43 dB. It is preferable that the saturation magnetization Ms1 of the reproduction layer at room temperature is in a range of $20 \leq Ms1 \leq 340$ (rare earth element sublattice magnetization dominant) in the super-resolution medium of the present invention. For ensuring higher reliability, it is preferable that C/N is about 45 dB. Accordingly, it is more preferable that Ms1 is set to be in a range of $100 \leq Ms1 \leq 260$.

Figure 49:
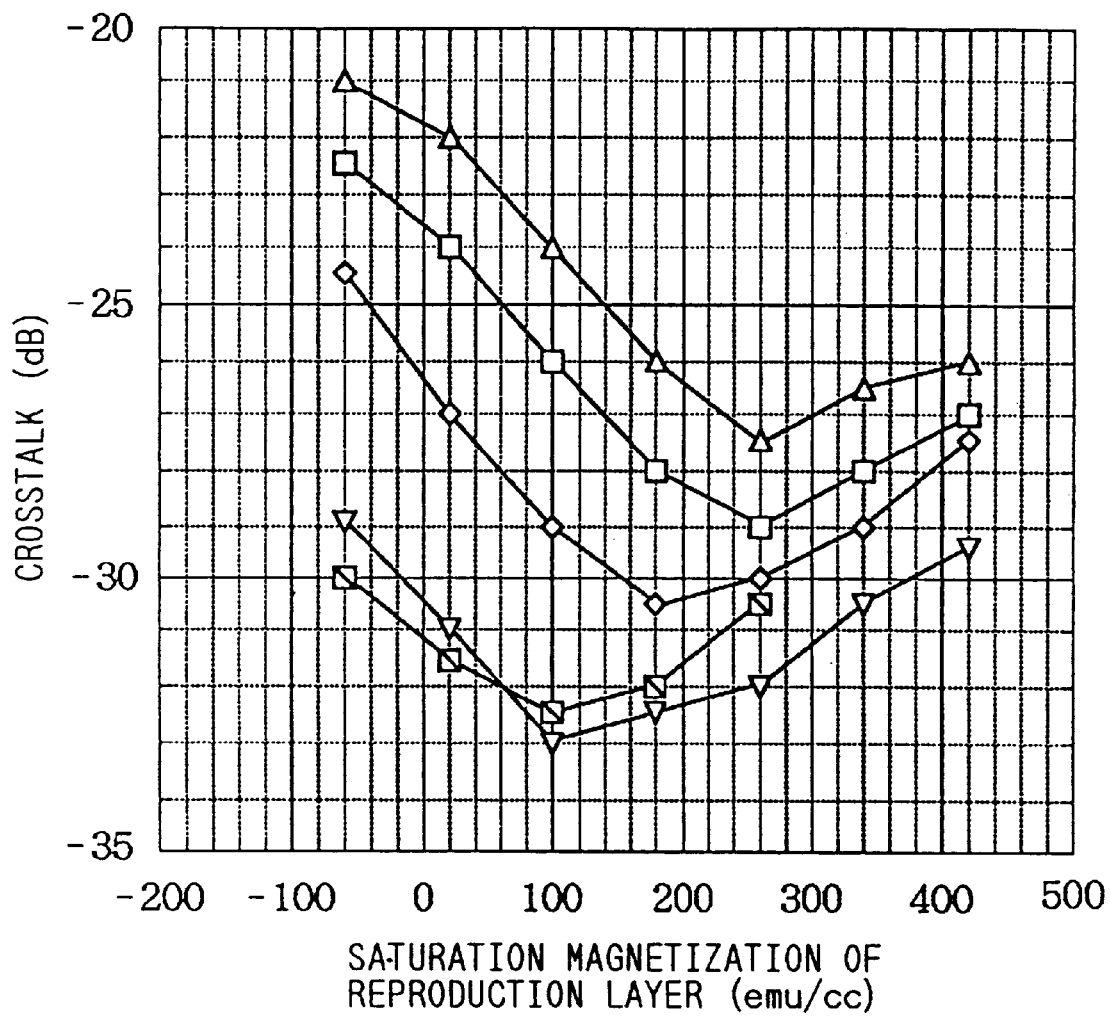
FIG. 49 is a diagram showing the relationship between crosstalk and the saturation magnetization of the reproduction layer.

Next, crosstalk was measured for each of the media of this experimental example in the same manner as in Experimental Example 37. The results are shown in FIG. 49. For example, when seeing a curve with the saturation magnetization Ms3 (emu/cc) of the intermediate layer being 100, it is the curve which is convex downward and has a minimal value around Ms1=260. This is caused for the following reason. With respect to the same composition of the intermediate layer, when Ms1 is large, the in-plane anisotropy of the reproduction layer is so large that the front mask effect becomes too strong. Accordingly, since the carrier level at the land does not increase, the difference is not distinct as compared with reproduction at the groove. To the contrary, when Ms1 is small, the front mask effect becomes small so that the reproduction at the groove is liable to be subjected to influence of the crosstalk. Accordingly, with regard to crosstalk, the optimum value also exists at the most-balanced position between the in-plane anisotropies of the reproduction and intermediate layers. In consideration of the crosstalk being about −22 dB obtained in the later-described measurement performed relative to a single-layer TbFeCo disc, it is assumed that the level of the crosstalk where the effect of the present invention fully appears, is −25 dB. Accordingly, the front mask is formed in the foregoing range of Ms1 derived in view of C/N, thereby being also effective for the crosstalk.

Figure 50:
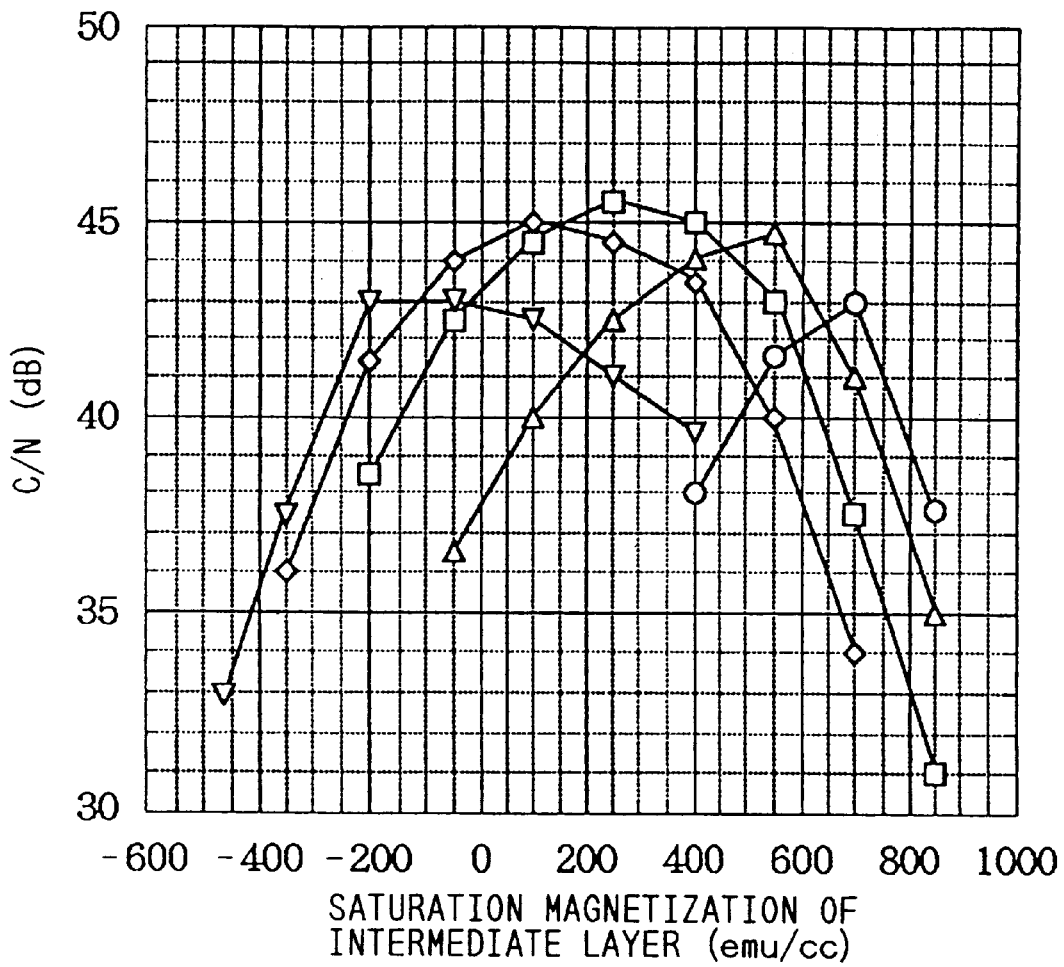
FIG. 50 is a diagram showing the relationship between C/N and the saturation magnetization of the intermediate layer.
Figure 51:
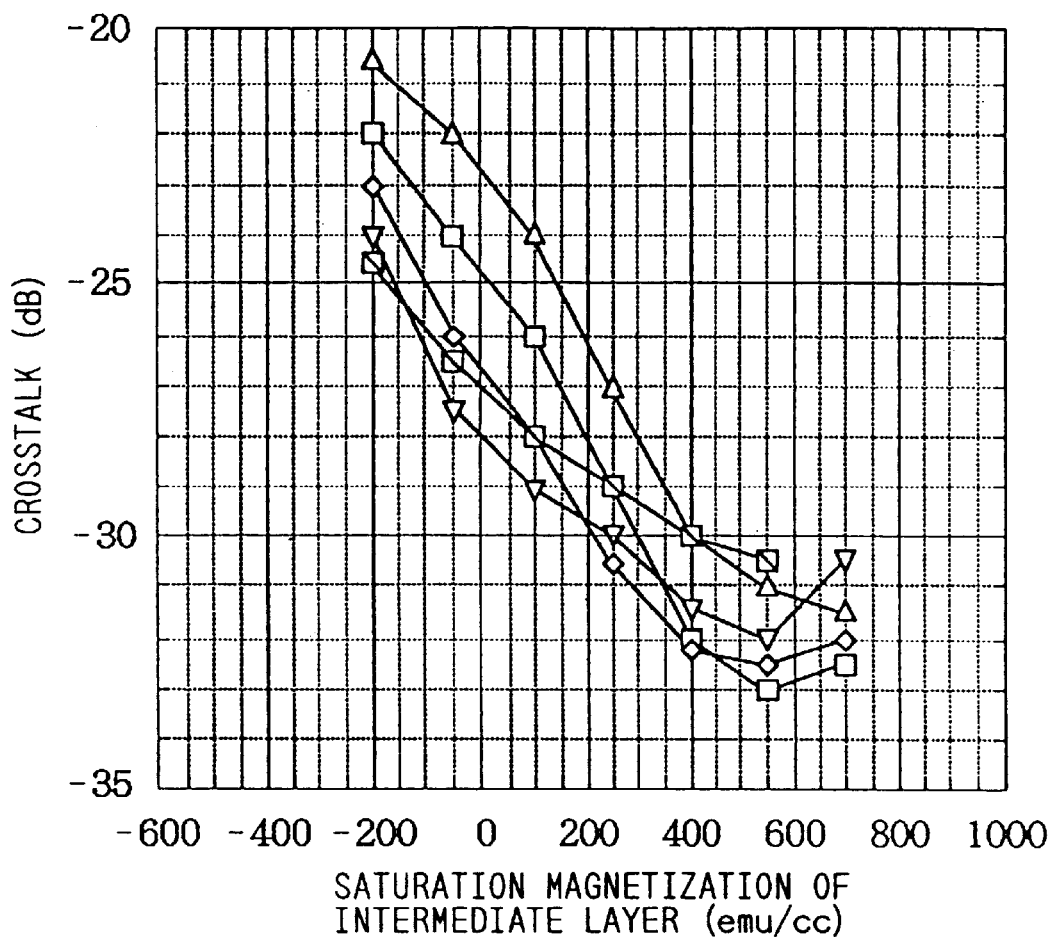
FIG. 51 is a diagram showing the relationship between crosstalk and the saturation magnetization of the intermediate layer.

The same data are shown in FIGS. 50 and 51 in terms of the saturation magnetization Ms3 (emu/cc) of the intermediate layer. FIG. 50 shows C/N data which are in the form of upward-convex curves like in FIG. 48. This is caused for the following reason. When the saturation magnetization Ms3 of the intermediate layer is small, the in-plane anisotropy thereof is small. Accordingly, if the reproducing power is increased until the intermediate layer reaches the Curie temperature, the aperture expands within the spot to an extreme extent so that the resolution is lowered. To the contrary, when the saturation magnetization Ms3 of the intermediate layer is large, the exchange coupling with the memory layer is not performed to a sufficient level before the intermediate layer reaches the Curie temperature. As described before, for ensuring high reliability of the information reproduction, it is necessary that C/N is no less than 43 dB. Accordingly, it is preferable that the saturation magnetization Ms3 of the intermediate layer is in a range of $-200 \leq Ms3 \leq 700$ in the super-resolution medium of the present invention. On the other hand, from the crosstalk data shown in FIG. 51, it is seen that the crosstalk largely changes relative to the saturation magnetization Ms3 of the intermediate layer. This is because the saturation magnetization of the intermediate layer largely influences the front mask effect. According to the results shown in FIG. 51, crosstalk was not necessarily improved in the composition providing C/N of no less than 43 dB. When using −25 dB as a reference as before, the front mask effect was obtained when $Ms3 \geq -150$. Accordingly, in consideration of both C/N and the crosstalk, the saturation magnetization Ms3 of the intermediate layer is preferably set to $-150 \leq Ms3 \geq 700$. For further narrowing the track pitch, more excellent crosstalk is required. Accordingly, when the crosstalk is no more than −30 dB, then $200 \leq Ms3 \leq 700$. Further, for ensuring a C/N of about 45 dB for higher reliability, then $200 \leq Ms3 \leq 550$. From the foregoing results, the saturation magnetization Ms3 of the intermediate layer of the present invention is set, preferably, to $-150 \leq Ms3 \leq 700$, more preferably, to $200 \leq Ms3 \leq 700$, and further preferably, to $200 \leq Ms3 \leq 500$. A portion of the data obtained in this experimental example is shown in Table 9.

Figure 52:
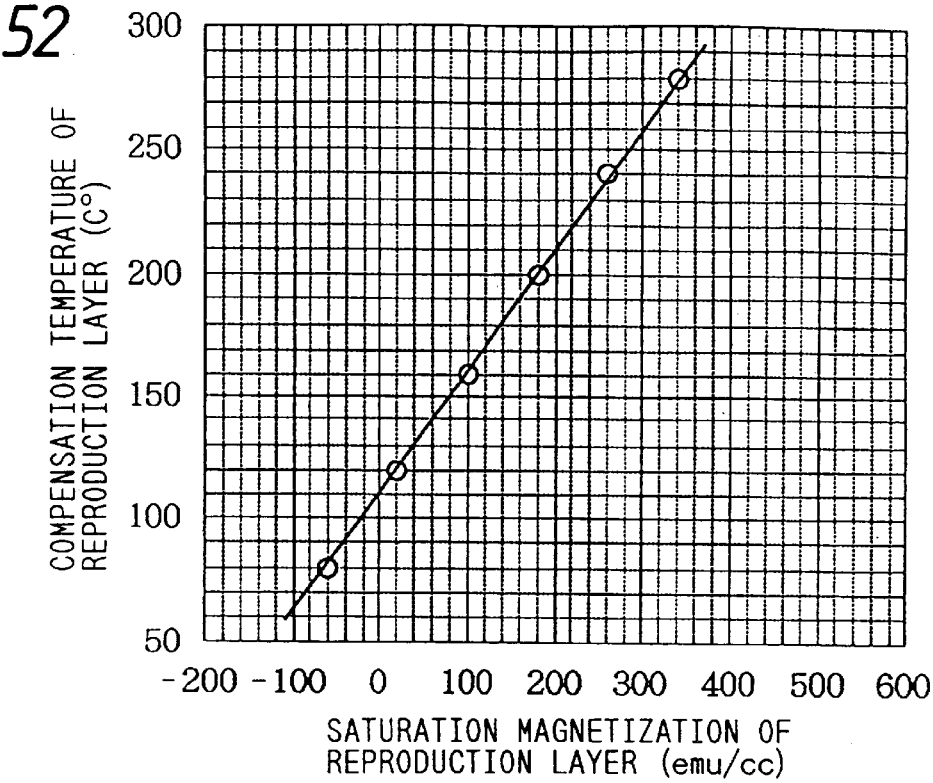
FIG. 52 is a diagram showing the relationship between the saturation magnetization and the compensation temperature of the reproduction layer.
Figure 53:
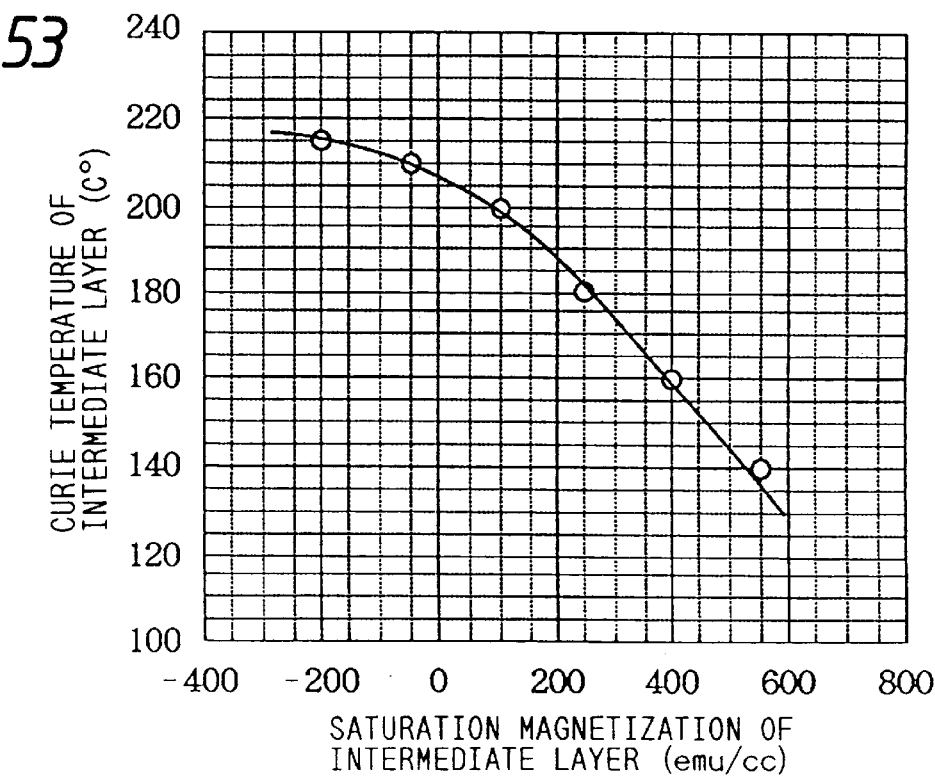
FIG. 53 is a diagram showing the relationship between the saturation magnetization and the Curie temperature of the intermediate layer.
Figure 54:
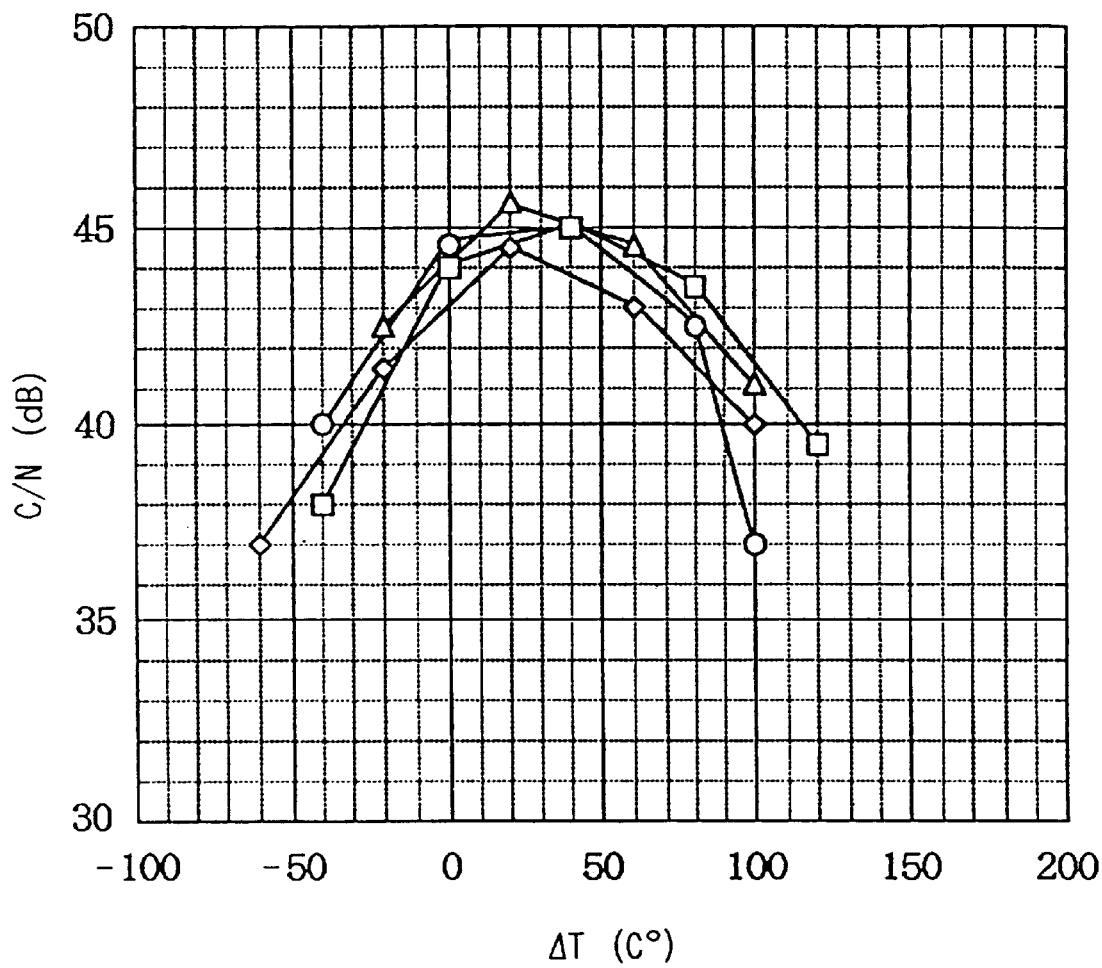
FIG. 54 is a diagram showing the relationship between the difference between the compensation temperature of the reproduction layer and a Curie temperature of the intermediate layer, and C/N.

For supporting the foregoing rear mask formation mechanism, the experiment results obtained in this experimental example are expressed from another point of view. FIG. 52 is a diagram showing the relationship between the saturation magnetization and the compensation temperature of the reproduction layer. FIG. 53 is a diagram showing the relationship between the saturation magnetization and the Curie temperature of the intermediate layer. The shown relationships may change s depending on the combination of the compositions of GdFeCo. In this experimental example, the characteristics were changed not largely by the Co content, but largely by the Gd content so that the curves as shown in FIGS. 52 and 53 were obtained. In the C/N data shown in FIG. 48, the peak position shifted depending on the saturation magnetization of the intermediate layer. On the other hand, by writing the C/N data based on FIGS. 52 and 53 so that the abscissas represent the difference between the compensation temperature of the reproduction layer and the Curie temperature of the intermediate layer ($\Delta T=Tcompl-Tc3$), curves are obtained as shown in FIG. 54, wherein the peak positions substantially coincide with each other.

As described before, the rear mask formation of the present invention largely depends on the directions and magnitudes of magnetizations of the reproduction layer and the memory layer when the intermediate layer substantially reaches the Curie temperature to cut off the exchange coupling between the reproduction layer and the memory layer. In this experimental example, the composition of the memory layer is held constant and iron family element sublattice magnetization is dominant at room temperature. Accordingly, whether or not the rear mask is formed depends on the characteristic of the reproduction layer.

In a range of $0 \leq \Delta T \leq 60$, when the intermediate layer reaches the Curie temperature, the reproduction layer does not reach the compensation temperature and thus is rare earth element sublattice magnetization dominant. Accordingly, the magnetostatic coupling force from the memory layer which is iron family element sublattice magnetization dominant, works in a direction to assist formation of the rear mask. Further, since the saturation magnetization of the reproduction layer itself is also small, the leakage magnetic field from around the magnetic domain is small so that the mask is liable to be formed. As a result, a high C/N can be obtained.

In the case that $\Delta T$ is reduced to be a negative value, when the intermediate layer reaches the Curie temperature, the reproduction layer already exceeds the compensation temperature so as to be iron family element sublattice magnetization dominant. Accordingly, the magnetostatic coupling force from the memory layer works in a direction to prevent contraction of the magnetic domain transferred to the reproduction layer so that the mask is reluctant to be formed. As a result, the C/N is gradually reduced. To the contrary, when $\Delta T$ is too great, the saturation magnetization of the reproduction layer at the time of cutting-off of the exchange coupling is too large so that the magnetic domain is caused to be held due to the leakage magnetic field. As a result, the rear mask is not formed, and thus, the C/N is reduced.

From these results, a C/N of no less than 43 dB is obtained when $-20 \leq Tcompl-Tc3 \leq 80$, and a C/N of no less than 45 dB is obtained when $0 \leq Tcompl-Tc3 \leq 50$.

In this experimental example, the film thicknesses of the reproduction layer and the intermediate layer were set to 40 nm and 10 nm, respectively, for comparison. However, when considering the mask effect of the reproduction layer, the film thickness of the reproduction layer may have a value no less than 20 nm. Further, in consideration that the intermediate layer works to cut off the exchange coupling between the reproduction layer and the memory layer at the Curie temperature or higher, the film thickness of the intermediate layer may have a value no less than 3 nm. Further, the film thickness of the memory layer may have a value no less than 10 nm for stably holding the magnetic domains, so that the medium which realizes the effect of the present invention can be obtained. To the contrary, in consideration of the necessary power for recording/reproduction of the information, it is preferable to suppress the film thickness of the total magnetic layers to 200 nm or less.

Accordingly, when the film thicknesses are within the foregoing ranges, it is within the scope of the present invention.

Experimental Example 39

Using the same apparatus and method as in Experimental Example 37, an SiN interference layer of 90 nm thickness, a GdFeCo reproduction layer of 40 nm thickness, a GdFeCo intermediate layer of 10 nm thickness, a TbFeCo memory layer of 30 nm thickness and an SiN protective layer of 70 nm thickness were formed on a polycarbonate substrate in the order named, thus obtaining the medium with a structure shown in FIG. 42. In this experimental example, the saturation magnetization Ms2 (emu/cc) of the memory layer was changed variously relative to the optimum film characteristics of the reproduction layer and the intermediate layer obtained in Experimental Example 38.

Figure 55:
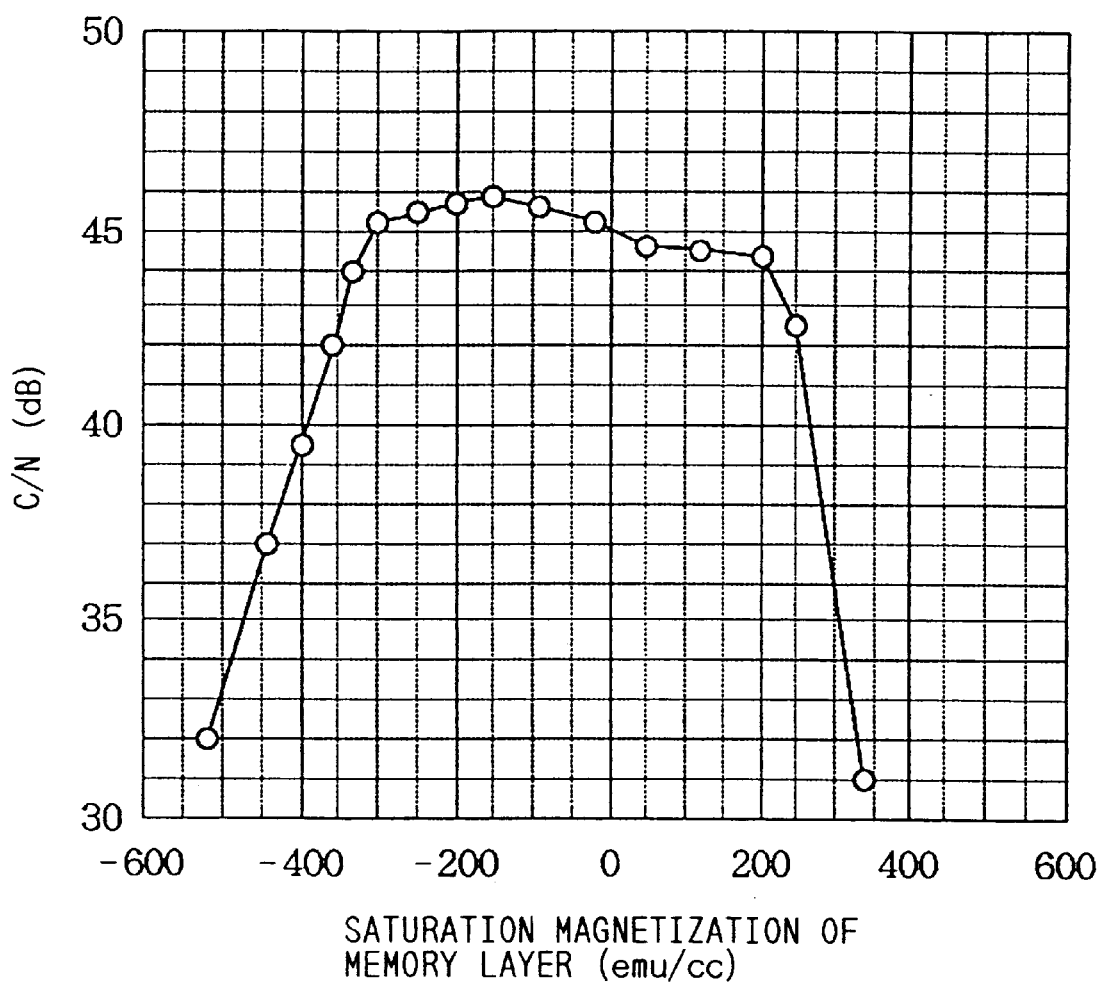
FIG. 55 is a diagram showing the relationship between C/N and the saturation magnetization of the memory layer.

FIG. 55 shows a relationship between the saturation magnetization of the memory layer and C/N (mark length 0.40 μm). As seen from the figure, the composition margin of the memory layer is sufficiently large in view of C/N so that C/N is substantially constant in a range of $-300 \leq Ms2 \leq 200$. When the saturation magnetization of the memory layer exceeds −300 emu/cc (iron family element sublattice magnetization dominant), the influence of the diamagnetic field of the memory layer itself becomes large. As a result, further smaller magnetic domains (microdomain) are formed in the magnetic domain or deformation of configuration of the magnetic domain is caused so that noise components are increased to cause a deterioration in C/N. To the contrary, when the saturation magnetization of the memory layer becomes no less than 200 emu/cc (rare earth element sublattice magnetization dominant), the compensation temperature of the memory layer becomes no less than 200° C. In this case, since the compensation temperature of the memory layer becomes higher than the Curie temperature of the intermediate layer, the memory layer is rare earth element sublattice magnetization dominant at a temperature where the exchange coupling with the reproduction layer is cut off. Then, since the magnetostatic coupling force acting on the reproduction layer from the memory layer is oriented in the same direction as the exchange-coupling force at the low temperature, it works in a direction to prevent the magnetic domain transferred to the reproduction layer from inverting due to the rear mask. Accordingly, the super-resolution effect is weakened to reduce C/N.

From the results in FIG. 55, a C/N of 43 dB or higher can be obtained due to the super-resolution effect of the present invention when $-350 \leq Ms2 \leq 250$. Further, in order to ensure a C/N which is stable in view of the composition margin, a range of $-300 \leq Ms2 \leq 200$ is preferable.

Experimental Example 40

Figure 56:
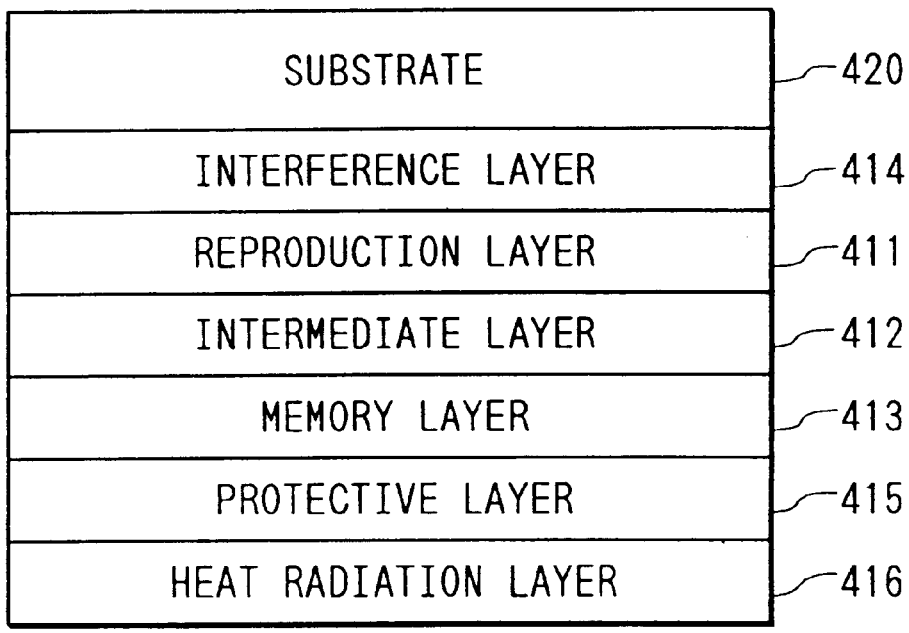
FIG. 56 is a diagram showing another structure of the magneto-optical recording medium of the fourth embodiment.

Using the same apparatus and method as in Experimental Example 37, an SiN interference layer of 90 nm thickness, a $Gd_{28}(Fe_{60}Co_{40})_{72}$ reproduction layer of 5 40 nm thickness, a $Gd_{37}Fe_{63}$ intermediate layer of 10 nm thickness, a $Tb_{20}(Fe_{80}Co_{20})_{80}$ memory layer of 30 nm thickness and an SiN protective layer of 70 nm thickness were formed on a polycarbonate substrate in the order named, and further, an Al heat radiation layer of 60 nm was formed for improving the thermal characteristic, thus forming the medium with a structure shown in FIG. 56. It is known in the art that the linear velocity dependency of the thermal characteristic can be improved by adding the heat radiation layer. Also in the present invention, the linear velocity dependencies of the recording power and the reproducing power are improved by adding the heat radiation layer.

Although this effect is obtained in the optical modulation recording, the similar effect is also obtained in the magnetic-field modulation recording. In case of the magnetic-field modulation recording, it is known that the recorded mark becomes a bow-like shape (so-called arrow-feather mark) according to a configuration of the temperature distribution of the medium at the time of recording. By providing the heat radiation layer, there is an effect that a curvature of the arc portion of the mark can be reduced.

FIG. 57 shows the recording power dependencies of carrier and noise when the magnetic-field modulation recording was performed relative to the medium of this experimental example. As seen from the figure, according to this experimental example, even in the case of the magnetic-field modulation recording, the C/N was excellent, i.e. 44 dB relative to even the small mark (0.40 μm), thereby being capable of achieving the super-resolution effect of the present invention.

Experimental Example 41

Using the same apparatus and method as in Experimental Example 37, an SiN interference layer of 90 nm thickness, a $Gd_{28}(Fe_{60}Co_{40})_{72}$ reproduction layer of 40 nm thickness, a $Gd_{37}Fe_{63}$ intermediate layer of 10 nm thickness, a $Dy_{25}(Fe_{70}Co_{30})_{75}$ memory layer of 30 nm thickness and an SiN protective layer of 70 nm thickness were formed on a polycarbonate substrate in the order named, thus forming the medium with a structure shown in FIG. 42.

In this experimental example, DyFeCo was used for the memory layer instead of TbFeCo. The good results as in Experimental Example 37 were obtained for both C/N and the crosstalk. It has been confirmed that the present invention is not limited to the TbFeCo memory layer.

Next, in order to make the effect of the present invention more distinct, like experiments were performed relative to the conventional medium structure for comparison.

Comparative Example 14

Using the same apparatus and method as in Experimental Example 37, an SiN interference layer of 90 nm thickness, a $Tb_{20}(Fe_{80}Co_{20})_{80}$ memory layer of 80 nm thickness and an SiN protective layer of 70 nm thickness were formed on a polycarbonate substrate in the order named. In other words, a single layer disc having, as a magnetic layer, only the memory layer used in Experimental Example 37 was prepared. First, the 0.40 μm marks were recorded on the medium, and the reproducing power dependencies of the carrier and noise were measured. The results are shown in FIG. 43. As seen in the figure, although the carrier level increases according to incrementing of the reproducing power, the slope is gradual since the mask effect observed in the medium of the present invention can not be obtained.

Next, the marks of various sizes were recorded on the medium of this comparative example, and the spatial frequency characteristic was measured. The results are shown in FIG. 46, wherein it is seen that, although a sufficiently high C/N ratio was obtained when the mark length was large, i.e. 0.78 μm, the resolution was rapidly reduced when exceeding a cut-off frequency of the optical system.

Further, in the measurement of the crosstalk, since the effective track pitch of 0.8 μm was narrow relative to the reproducing spot, and further, no mask effect was provided in case of the single layer disc, crosstalk of only about −22 dB was obtained as shown in FIG. 47.

Comparative Example 15

Using the same apparatus and method as in Experimental Example 37, an SiN interference layer of 90 nm thickness, a $Gd_{28}(Fe_{60}Co_{40})_{72}$ reproduction layer of 70 nm thickness, a $Tb_{20}(Fe_{80}Co_{20})_{80}$ memory layer of 30 nm thickness and an SiN protective layer of 70 nm thickness were formed on a polycarbonate substrate in the order named, thus forming the medium with a structure shown in FIG. 3A.

First, the marks of 0.40 μm mark length were recorded on the medium, and the reproducing power dependencies of the carrier and noise were measured. The results are shown in FIG. 43. As seen in the figure, since even the medium of this comparative example provides the super-resolution effect by using an in-plane magnetization film at low temperatures, the carrier level was increased, as in the medium of the present invention in Experimental Example 37, in a range of the reproducing power between 0.8 mW and 2.8 mW. However, in the two-layered super-resolution medium of this comparative example, since a rear mask does not appear even when the reproducing power is increased to 3 mW or more, the rapid carrier increase as in the medium of the present invention in Experimental Example 37 was not observed.

Next, marks of various sizes were recorded on the medium of this comparative example, and the spatial frequency characteristic was measured. As shown in FIG. 46, the results were such that, although the resolution was increased at high-frequency regions as compared with the single layer disc, since no rear mask effect was provided and a positional relationship between the aperture region and the spot was not optimum, the resolution was inferior as compared with the disc of Experimental Example 37.

On the other hand, with regard to the crosstalk, the front mask largely influences it, but the rear mask does not. Accordingly, as shown in FIG. 47, crosstalk of about −30 dB, which is equivalent to that obtained in the medium of Experimental Example 37, was obtained.

TABLE 9

| | Reproduction Layer $Gd_x(Fe_{100-y}Co_y)_{100-x}$ | | | | | |
|---|---|---|---|---|---|---|
| | x (at %) | y (at %) | Film Thickness (nm) | Saturation Magnetization (emu/cc) | Compensation Temperature (° C.) | Curie Temperature (° C.) |
| Experimental Example 37 | 28 | 40 | 40 | 180 | 215 | >300 |
| Experimental Example 38 | 24 | 40 | 40 | 20 | 110 | >300 |
| | 32 | 40 | 40 | 340 | 270 | >300 |
| Experimental Example 39 | 28 | 40 | 40 | 180 | 215 | >300 |
| | 29 | 40 | 40 | 180 | 230 | >300 |
| Comparative Example 14 | — | — | — | — | — | — |
| Comparative Example 15 | 28 | 40 | 70 | 180 | 215 | >300 |

| | Intermediate Layer $Gd_p(Fe_{100-q-r}Co_qCr_r)_{100-p}$ | | | | | | |
|---|---|---|---|---|---|---|---|
| | p (at %) | q (at %) | r (at %) | Film Thickness (nm) | Saturation Magnetization (emu/cc) | Compensation Temperature (° C.) | Curie Temperature (° C.) |
| Experimental Example 37 | 37 | 0 | 0 | 10 | 450 | — | 190 |
| Experimental Example 38 | 45 | 0 | 10 | 10 | 700 | — | 100 |
| | 25 | 0 | 0 | 10 | −50 | — | 210 |
| Experimental Example 39 | 37 | 0 | 0 | 10 | 470 | — | 190 |
| | 37 | 3 | 0 | 10 | 470 | — | 210 |
| Comparative Example 14 | — | — | — | — | — | — | — |
| Comparative Example 15 | — | — | — | — | — | — | — |

| | Memory Layer $Tb_a(Fe_{100-b}Co_b)_{100-a}$ | | | | | | C/N | | | Crosstalk |
|---|---|---|---|---|---|---|---|---|---|---|
| | a (at %) | b (at %) | Film Thickness (nm) | Saturation Magnetization (emu/cc) | Compensation Temperature (° C.) | Curie Temperature (° C.) | 0.78 um (dB) | 0.40 um (dB) | 0.30 um (dB) | 0.78 um (dB) |
| Experimental Example 37 | 20 | 20 | 30 | −250 | — | 270 | 50 | 45 | 39 | −28 |
| Experimental Example 38 | 20 | 20 | 30 | −250 | — | 270 | 49 | 42 | 34 | — |
| | 20 | 20 | 30 | −250 | — | 270 | 49 | 43 | 35 | 31 |
| | | | | | | | | | | 26 |
| Experimental Example 39 | 18 | 18 | 30 | −300 | — | 270 | 50 | 45 | 39 | — |
| | 31 | 45 | 30 | 250 | 220 | 270 | 49 | 44 | 39 | 28 |
| | | | | | | | | | | 30 |
| Experimental | 20 | 20 | 80 | −250 | — | 270 | 49 | 28 | 9 | — |

TABLE 9-continued

| Example 14 | | | | | | | | | | 22<br>—<br>147 |
|---|---|---|---|---|---|---|---|---|---|---|
| Experimental Example 15 | 20 | 20 | 30 | −250 | — | 270 | 50 | 36 | 28 | —<br>—<br>31 |

(Fifth Embodiment)

In a fifth embodiment, the formation of a front mask in addition to a rear mask will be described, wherein a magnetic layer showing a perpendicular magnetic anisotropy at room temperature is used as the reproduction layer in the medium of the first embodiment.

Figure 1A:
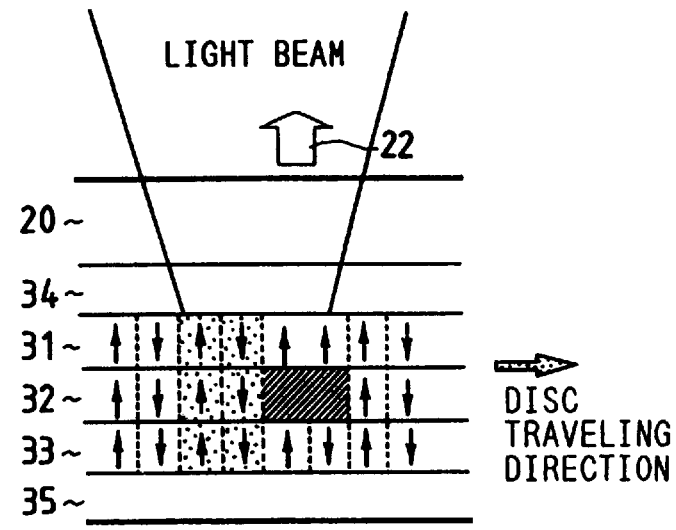
FIGS. 1A to 1C, 2A to 2C and 3A to 3C are diagrams showing conventional super-resolution methods, respectively.
Figure 1B:
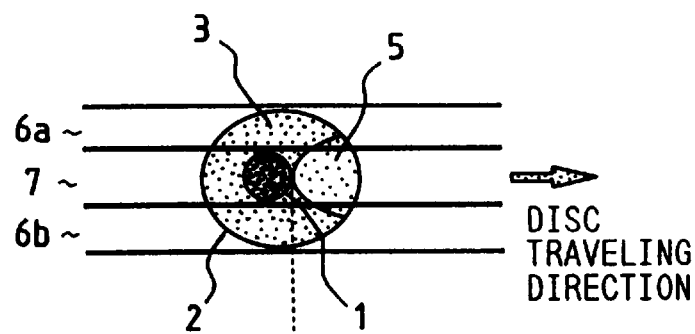
Figure 1C:
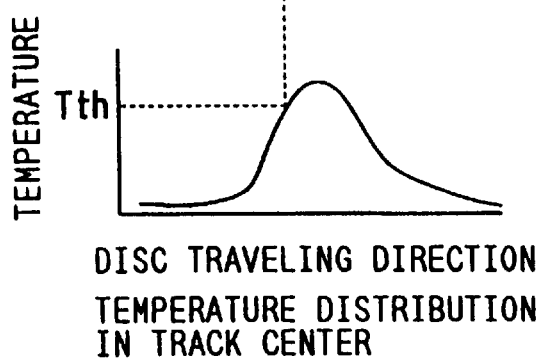
Figure 2A:
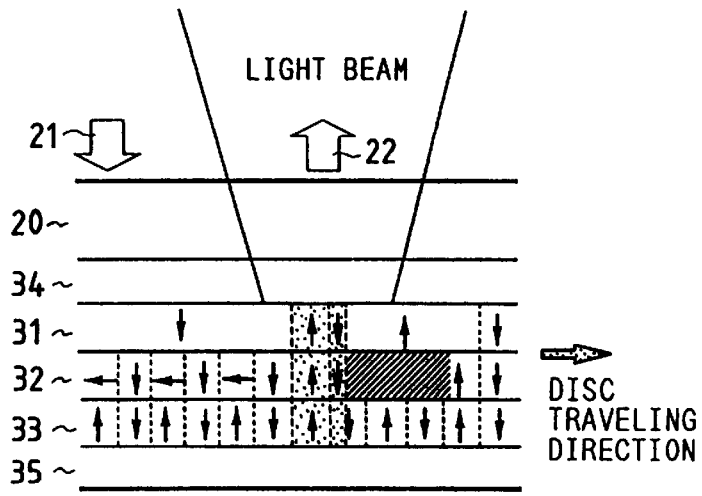
Figure 2B:
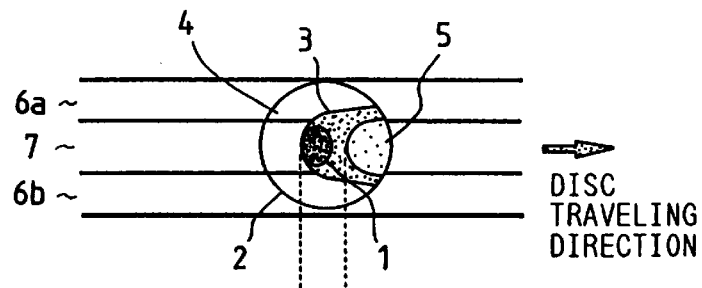
Figure 2C:
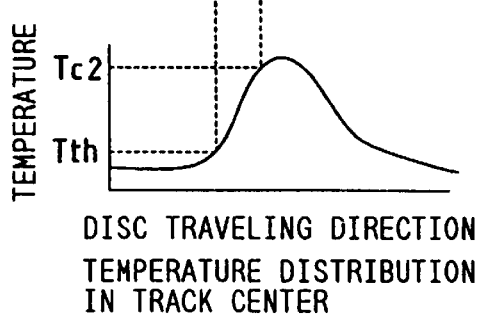

In the fifth embodiment, the front mask is formed using an initializing magnet. Accordingly, this arrangement appears to be outside the object of the present invention. However, as compared with the conventional technique shown in FIGS. 2A to 2C, wherein a front mask is formed using an initializing magnet and a rear mask is formed using a reproducing magnet, this embodiment is considered to be within the object of the present invention since only the initializing magnet is an external magnet so that a recorded mark equal to or smaller than the diffraction limit of light can be reproduced as a high quality signal with a simple structure.

Hereinbelow, a magneto-optical recording medium according to the fifth preferred embodiment of the present invention and an information reproducing method using the medium will be described in detail hereinbelow with reference to the accompanying drawings.

Figure 58:
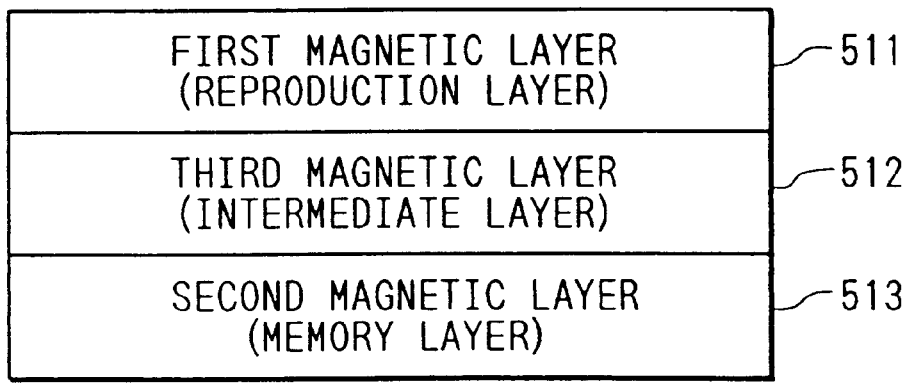
FIG. 58 is a diagram showing a basic layer structure of magnetic layers of a magneto-optical recording medium according to a fifth embodiment of the present invention.

The magneto-optical recording medium of the present invention has, on a translucent substrate, at least three magnetic layers, that is, a first magnetic layer, a third magnetic layer having a Curie temperature lower than those of the first magnetic layer and a second magnetic layer, and the second magnetic layer being a perpendicular magnetization film, in the order named from a side of the substrate (FIG. 58). Hereinbelow, the first magnetic layer will be referred to as a reproduction layer, the second magnetic layer as a memory layer and the third magnetic layer as an intermediate layer.

Further, for improvement, the medium may have a four-magnetic-layered structure by dividing the foregoing intermediate layer into two layers. In case of this four-magnetic-layered structure, the foregoing third magnetic layer is divided into two magnetic layers which will be referred to as first and second intermediate layers from the light incident side. Hereinafter, when referring to simply as "intermediate layer", it represents the intermediate layer of the three-magnetic-layered structure, and when referring to as "first intermediate layer" and "second intermediate layer", they represent the first intermediate layer and the second intermediate layer, respectively, of the four-magnetic-layered structure.

The reproduction layer is a layer for reproducing magnetization information held in the memory layer. The reproduction layer is located closer to a light incident side as compared with the intermediate layer and the memory layer, and its Curie temperature is set to be higher than those of the intermediate layer and the memory layer for preventing deterioration of the Kerr rotation angle upon reproduction. Further, it is necessary that the coercive force of the reproduction layer is smaller than that of the memory layer. Preferably, the reproduction layer has a small magnetic anisotropy, and a compensation temperature between room temperature and the Curie temperature. Further, the magnetization manner of the reproduction layer is such that the reproduction layer is a perpendicular magnetization film at room temperature and between room temperature and the Curie temperature. As a specific material of the reproduction layer, a material, for example, a rare earth-iron family amorphous alloy, such as, GdFeCo, GdTbFeCo, GdDyFeCo, NdGdFeCo or the like, mainly containing GdFeCo, is preferable since it has a high Curie temperature and a low coercive force and easily causes contraction of recorded magnetic domains in a high-temperature region, which is the prime aim of the present medium.

The intermediate layer is provided mainly for partly mediating and partly reducing or cutting off an exchange-coupling force from the memory layer to the reproduction layer. More specifically, the intermediate layer has a role to moderate the interface magnetic wall energy between the reproduction layer and the memory layer for realizing, with a smaller initializing magnetic field, formation of a mask (front mask) at a low-temperature region within a light spot by inverting the magnetization of the reproduction layer in one direction at room temperature and for stably holding a magnetization state of each layer even when a magnetic wall is generated. The intermediate layer has a further role to mediate the exchange-coupling force between the reproduction layer and the memory layer so as to transfer magnetization information of the memory layer to the reproduction layer in an aperture region (medium-temperature region). The intermediate layer has a still further role to cut off the exchange-coupling force between the reproduction layer and the memory layer for forming a rear mask in a high-temperature region. Accordingly, the intermediate layer is located between the reproduction layer and the memory layer and has a Curie temperature which is set to be higher than room temperature and lower than those of the reproduction layer and the memory layer. The Curie temperature of the intermediate layer is set to be high enough to mediate the exchange-coupling force from the memory layer to the reproduction layer at a low-temperature portion and a medium-temperature portion within a light spot, but low enough to cut off the exchange-coupling force at a highest-temperature portion within the light spot, and thus preferably, 80° C. or higher and 220° C. or lower, and more preferably, 110° C. or higher and 180° C. or lower. When the reproduction layer has the compensation temperature between room temperature and the Curie temperature, the Curie temperature of the intermediate layer is set to a temperature within a range of, preferably, −100° C. to +50° C. relative to the compensation temperature, and more preferably, −80° C. to +20° C. relative to the compensation temperature.

An in-plane anisotropy of the intermediate layer at room temperature is set to be greater than those of the reproduction layer and the memory layer at room temperature. This means that the magnetization of the intermediate layer is more liable to align in an in-plane direction as compared with those of the reproduction layer and the memory layer.

As a material of the intermediate layer, for example, a rare earth-iron family amorphous alloy, such as, GdFe, GdFeCo, GdTbFeCo, GdDyFeCo or the like is preferable. It is also effective to increase the effective in-plane anisotropy by increasing the saturation magnetization. This can reduce the interface magnetic wall energy between the first intermediate layer and the memory layer. A non-magnetic element, such as, Cr, Al, Si, Cu or the like may be added for lowering the Curie temperature.

Further, in order to improve the reproducing characteristic of the medium of the present invention, the foregoing intermediate layer may be divided into two magnetic layers as the first intermediate layer and the second intermediate layer, which are provided next to the reproduction layer from the light incident side. In this case, the first intermediate layer has a role to stably hold, at a low temperature, the magnetization state of the reproduction layer at a front mask region in the low-temperature region after initialization, and to cause contraction of the magnetic domain of the reproduction layer at the high-temperature region. In view of this, the perpendicular magnetic anisotropy of the first intermediate layer is set to be greater than that of the reproduction layer, in other words, the coercive force thereof is large. The Curie temperature of the first intermediate layer is set to be the same as the Curie temperature of the foregoing intermediate layer, which is lower than those of the other magnetic layers (reproduction layer, second intermediate layer, memory layer). As a material of the first intermediate layer, TbFe, TbFeCo, GdTbFeCo, GdDyFeCo, DyFe, DyFeCo, TbDyFeCo or the like is preferable. The second intermediate layer mainly has a role, as the foregoing intermediate layer, to moderate an interface magnetic wall energy between the reproduction layer and the memory layer for realizing, with a smaller initializing magnetic field, formation of a mask (front mask) at a low-temperature region within a light spot by inverting magnetization of the reproduction layer in one direction at room temperature and for stably holding a magnetization state of each layer even when a magnetic wall is generated. In view of this, the in-plane anisotropy of the second intermediate layer at room temperature is set to be greater than those of the first intermediate layer and the memory layer. As a material of the second intermediate layer, a material, such as, GdFe, GdFeCo, GdTbFeCo, GdDyFeCo or the like, mainly containing Gd, is preferable. It is also effective to increase an effective in-plane anisotropy by increasing the saturation magnetization. This can reduce the interface magnetic wall energy between the first intermediate layer and the memory layer.

The memory layer is a layer for storing recorded information and thus is required to stably hold the magnetic domains. As a material of the memory layer, a material which has a large perpendicular magnetic anisotropy and can stably hold a magnetization state, for example, a rare earth-iron family amorphous alloy, such as, TbFeCo, DyFeCo, TbDyFeCo or the like, garnet, a platinum family-iron family periodic structure film, such as, Pt/Co, Pd/Co or the like, or a platinum family-iron family alloy, such as, PtCo, PdCo or the like is preferable.

An element, such as, Al, Ti, Pt, Nb, Cr or the like may be added to the reproduction layer, the intermediate layer and the memory layer for improving their corrosion resistances. For enhancing the interference effect and the protective performance, a dielectric layer formed of $SiN_x$, $AlO_x$, $TaO_x$, $SiO_x$ or the like may be provided in addition to the foregoing reproduction, intermediate and memory layers. Further, for improving thermal conductivity, a layer formed of Al, AlTa, AlTi, TlCr, Cu or the like and having good thermal conductivity may be provided. Further, an initialization layer in which magnetization is aligned in one direction for performing the optical modulation overwrite may be provided. Further, auxiliary layers for recording assistance and reproducing assistance may be provided to adjust the exchange-coupling force or the magnetostatic coupling force. Moreover, a protective coat formed of the foregoing dielectric layer or a polymer resin may be added as a protective film.

Since the recording process of this embodiment is the same as that in the first embodiment, an explanation thereof will be omitted for brevity.

Now, the reproduction process of the present invention will be described hereinbelow.

In the present invention, magnetic super resolution is realized by apparently and optically masking a partial region within the light spot without applying the external magnetic field. In the present medium, the front mask, the rear mask and the aperture are present within the light spot. These regions are divided by a temperature distribution within the light spot. Hereinbelow, the structures of these masks and nature of the aperture will be described.

In the present invention, there are a medium formed of three magnetic layers and a medium formed of four magnetic layers. An explanation will be given to each of them. Hereinafter, Tm1 represents the boundary temperature between the front mask and the aperture, and Tm2 represents the boundary temperature between the aperture and the rear mask.

Figure 59A:
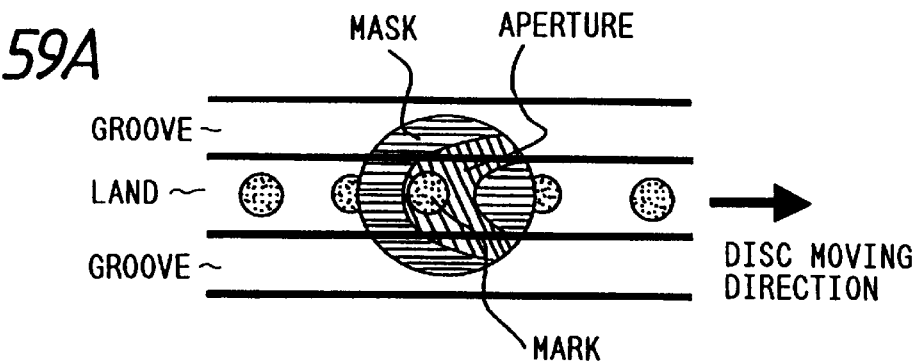
Figure 59B:
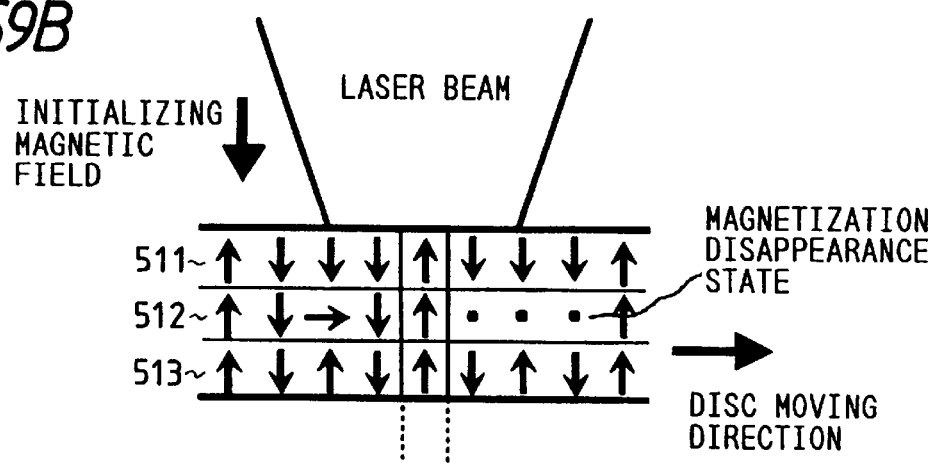
Figure 59C:
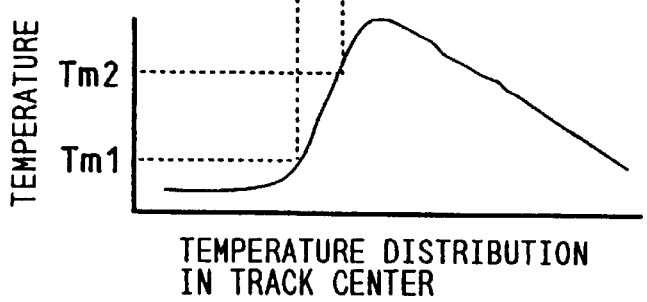

(A) Three-Magnetic-Layered Structure (see FIGS. 59A to 59C)

(a) Front Mask Region

First, the front mask to be formed in the low-temperature region will be described hereinbelow.

In the present medium, the magnetization of the reproduction layer is aligned in one direction by an initializing magnetic field to form a front mask region in advance before irradiation of a light beam.

Before irradiating the light beam, that is, when a medium temperature T is an ambient temperature Ta (room temperature), in order to align the magnetization of the reproduction layer in one direction, relation (30) should be established.

$$Hcl+Hwl<Hini(T=Ta) \qquad (30)$$

wherein Hcl represents a coercive force of the reproduction layer, Hwl an effective magnetic field applied to the reproduction layer due to an interface magnetic wall between the reproduction layer and the memory layer, Hini an initializing magnetic field.

Further, relation (31) should be established for preventing damage to the magnetization information of the memory layer due to the initializing magnetic field.

$$Hc2+Hw2>Hini(T=Ta) \qquad (31)$$

wherein Hw2 represents the effective magnetic field applied to the memory layer due to the interface magnetic wall between the reproduction layer and the memory layer.

If the interface magnetic wall energy between the reproduction layer and the memory layer is ρwl, the saturation magnetization of the reproduction layer is Msl, the saturation magnetization of the memory layer is Ms2, the film thickness of the reproduction layer is hi and the film thickness of the memory layer is h2, Hwl and Hw2 are expressed by relations (32) and (33), respectively.

$$Hwl=\rho wi/(2Ms1h1) \qquad (32)$$

$$Hw2=\rho wi/(2Ms2h2) \qquad (33)$$

Further, relation (34) should be established for holding formation of the mask within the light spot after initialization and even when the medium temperature increases due to the irradiation of the light beam.

$$Hwl<Hcl(Ta<T<Tml) \qquad (34)$$

(b) Aperture Region

The initialized reproduction layer reduces Hcl as the medium temperature T is raised due to irradiation of the light beam. When the effective magnetic field due to the interface magnetic wall becomes dominant, the magnetization of the reproduction layer is inverted so as to eliminate the interface magnetic wall. As a result, the magnetization information of the memory layer is transferred to the reproduction layer. A condition for this is expressed by relation (35).

$$Hcl<Hwl(Tml<T<Tm2) \qquad (35)$$

In further detail, in addition to the effective magnetic field Hwi due to the exchange-coupling force from the memory layer 513, the effective magnetic field Hwb due to the Bloch magnetic wall energy and the static magnetic field Hd from the interior of the medium are applied to the recorded magnetic domain 1. Hwi works to stably hold the recorded magnetic domain 1 of the reproduction layer, while Hwb and Hd apply forces in directions to expand and contract the recorded magnetic domain. Accordingly, in order for the reproduction layer 511 to be stably transferred with the magnetization of the memory layer 513, a condition expressed by relation (36) should be satisfied before the recorded magnetic domain reaches the high-temperature region.

$$|Hwb-Hd|<Hcl+Hwl(Tml<T<Tm2) \qquad (36)$$

The coercive force Hcl of the reproduction layer 511 is apparently increased due to the exchange-coupling force from the memory layer 513. Accordingly, relation (36) can be easily established to stably transfer the magnetization information of the memory layer 513 so that the recorded information can be reproduced accurately.

(c) Rear Mask Region

Since the detail of the rear mask region (high-temperature region) is the same as that in the first embodiment, an explanation thereof will be omitted for brevity.

Figure 60A:
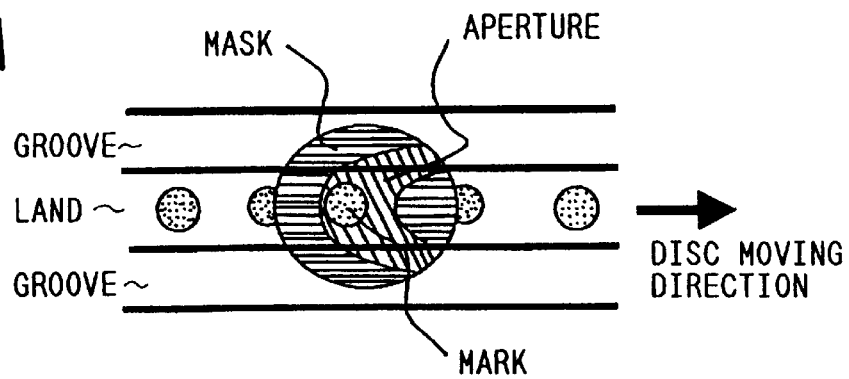
Figure 60B:
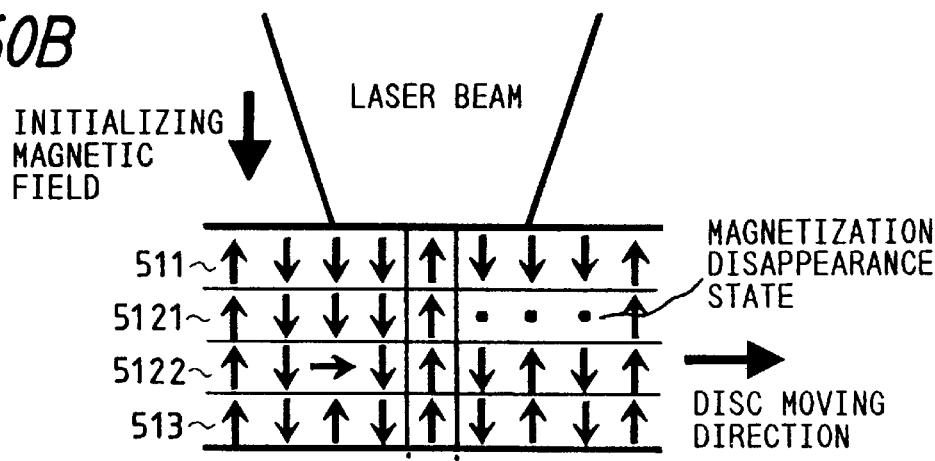
Figure 60C:
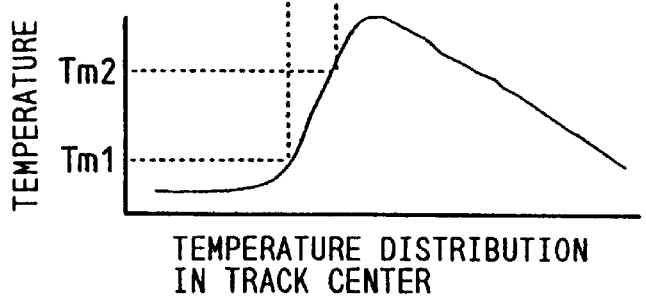

(B) Four-Magnetic-Layered Structure (see FIGS. 60A to 60C)

In the foregoing description, the intermediate layer is formed of one magnetic layer. On the other hand, the intermediate layer can be divided into two magnetic layers to improve the characteristic for performing reproduction more stably.

Specifically, the intermediate layer is divided into a first intermediate layer 5121 and a second intermediate layer 5122. For establishing relations (34) and (35) more reliably, the first intermediate layer 5121, which has a perpendicular magnetic anisotropy greater than and a Curie temperature lower than those of the reproduction layer, is provided between the reproduction layer and the memory layer, and the second intermediate layer 5122 is provided between the first intermediate layer and the memory layer for stabilizing the magnetic wall generated between the first intermediate layer and the memory layer.

At this time, the coercive force of the reproduction layer is apparently increased due to the first intermediate layer 5121. If the saturation magnetization of the first intermediate layer 5121 is Ms5, the coercive force thereof is Hc5, and a film thickness thereof is h5, the apparent coercive force Hcl' of the reproduction layer is expressed by relation (37).

$$Hcl'=(Ms1h1Hcl+Ms5h5Hc5)/(Ms1h1+Ms5h5) \qquad (37)$$

Further, Hwl becomes Hwl' expressed by relation (38).

$$Hwl'=\rho wi/(2Ms1h1+2Ms5h5) \qquad (38)$$

Accordingly, at a low temperature, the coercive force of the reproduction layer becomes greater as compared with the case where the intermediate layer is not divided. Further, the effective magnetic field due to the interface magnetic wall becomes smaller. Thus, relation (34) can be established more stably.

When the temperature is further increased, since the Curie temperature of the first intermediate layer 5121 is low, the coercive force of the reproduction layer rapidly returns to the normal small state. Accordingly, relation (35) can also be established stably at the same time.

As described above, the four-magnetic-layered structure is capable of performing super-resolution reproduction more stably as compared with the three-magnetic-layered structure.

The present invention will be described in further detail by way of experimental examples. However, the present invention is not limited to these experimental examples.

Experimental Example 42

Figure 61:
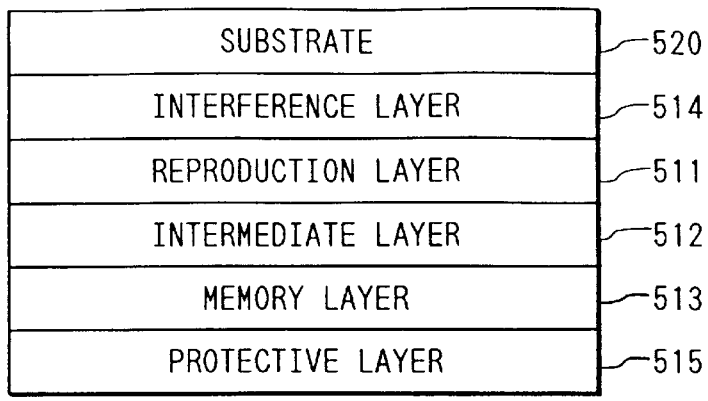
FIG. 61 is a diagram showing one example of the layer structure of the magneto-optical recording medium according to the fifth embodiment of the present invention.

Si, Gd, Tb, Fe and Co targets were attached to a DC magnetron sputtering apparatus, and a glass substrate having a diameter of 130 mm and a polycarbonate substrate with lands and grooves were fixed to a substrate holder which was set at a position separated from the respective targets by a distance of 150 mm. Thereafter, the interior of the chamber was evacuated by a cryopump to a high vacuum of $1\times10^{-5}$ Pa or less. During the evacuation, Ar gas was introduced into the chamber to 0.4 Pa, and thereafter, an SiN interference layer of 90 nm thickness, a GdFeCo reproduction layer of 40 nm thickness, a GdFe intermediate layer of 15 nm thickness, a TbFeCo memory layer of 30 nm thickness and an SiN protective layer of 70 nm thickness were formed on the substrate in the order named, thus forming a sample with a structure shown in FIG. 61. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.1.

The composition of the GdFeCo reproduction layer was set to represent a RE rich layer at room temperature, a saturation magnetization Ms of 108 emu/cc, a compensation temperature of 160° C. and a Curie temperature of 300° C. or more.

The composition of the GdFe intermediate layer was set to represent a RE rich layer at room temperature, a saturation magnetization Ms of 420 emu/cc and a Curie temperature of 190° C.

The composition of the TbFeCo memory layer was set to represent a TM rich layer at room temperature, a saturation magnetization Ms of −240 emu/cc and a Curie temperature of 270° C.

Subsequently, the recording/reproduction characteristic was measured in the following manner, using this magneto-optical recording medium. Before reproduction, an initializing magnetic field of 3,000 Oe in a perpendicular direction was applied to the medium. The results are shown in Tables 10 to 14.

After recording a magnetic domain of a 0.78 μm mark length in the magneto-optical recording medium, the magnetic domain was observed by a polarizing microscope under irradiation of a semiconductor laser beam of 830 nm. While increasing the laser power, it was confirmed that the recorded magnetic domain contracted and the magnetization was oriented in an erasing direction at the center (high-temperature region) of the light spot at a certain laser power.

Subsequently, the recording/reproduction characteristic was measured using this magneto-optical recording medium. The measurement was performed by setting the N.A. of an objective lens to be 0.55, the laser beam wavelength to be 780 nm, the recording power to be in a range of 7k to 13 mW and the reproducing power to be in a range of 2.5 to 3.5 mW, so as to provide the highest C/N ratio. The linear velocity was set to be 9 m/s. First, erasing was performed entirely on the medium, and thereafter, carrier signals of 5.8 MHz, 11.3 MHz and 15 MHz (corresponding to mark lengths 0.78 μm, 0.40 μm and 0.30 μm, respectively) were recorded in the memory layer so as to examine the mark-length dependency of C/N.

Subsequently, crosstalk with the adjacent tracks (hereinafter referred to as "crosstalk") was measured. Specifically, after recording a signal of a 0.78 μm mark length on the land as in the foregoing manner and measuring the carrier level C1, the carrier level C2 was similarly measured upon tracking the adjacent groove where data had been erased, and crosstalk was represented by a ratio (C2/C1). Since the experiment was performed on the assumption that data were recorded on both the land and groove, an effective track pitch was 0.8 μm. Both the C/N ratios and the crosstalk were measured without applying an initializing magnetic field and a reproducing magnetic field. Tables 10 to 14 show compositions and materiality values of each layer and the results of the C/N ratios and the crosstalk.

Experimental Example 43

Figure 62:
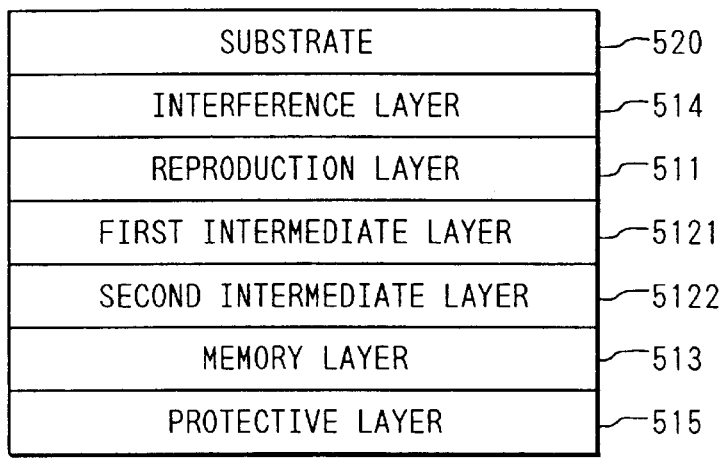
FIG. 62 is a diagram showing another example of the layer structure of the magneto-optical recording medium according to the fifth embodiment of the present invention.

Using the same apparatus and method as in Experimental Example 42, an SiN interference layer of 90 nm thickness, a GdFeCo reproduction layer of 40 nm thickness, a TbFeCoCr intermediate layer of 11 nm thickness, a GdFeCo auxiliary layer of 15 nm thickness, a TbFeCo memory layer of 30 nm thickness and an SiN protective layer of 70 nm thickness were formed on a polycarbonate substrate in the order named, thus forming a sample with a structure shown in FIG. 62. Upon formation of each SiN dielectric layer, N2 gas was introduced in addition to the Ar gas, and the SiN layer was formed by DC reactive sputtering, adjusting the mixing ratio of the Ar and $N_2$ gases, so as to obtain a refractive index of 2.1.

The composition of the GdFeCo reproduction layer was set to represent a RE rich layer at room temperature, a saturation magnetization Ms of 160 emu/cc, a compensation temperature of 180° C. and a Curie temperature of 300° C. or more.

The composition of the TbFeCoCr first intermediate layer was set to represent a TM rich layer at room temperature, a saturation magnetization Ms of −160 emu/cc and a Curie temperature of 150° C.

The composition of the GdFeCo second intermediate layer was set to represent a TM rich layer at room temperature, a saturation magnetization Ms of −160 emu/cc and a Curie temperature of 300° C. or more.

The composition of the TbFeCo memory layer was set to represent a TM rich layer at room temperature, a saturation magnetization Ms of −240 emu/cc and a Curie temperature of 270° C.

Subsequently, using this magneto-optical recording medium, the recording/reproduction characteristic was evaluated as in Experimental Example 42. Before reproduction, an initializing magnetic field of 3,000 Oe in a perpendicular direction was applied to the medium. The results are shown in Tables 10 to 14.

Experimental Example 44

Using the same apparatus and method as in Experimental Example 42, an SiN interference layer of 90 nm thickness, a GdFeCo reproduction layer of 32 nm thickness, a TbFeCo intermediate layer of 11 nm thickness, a GdFeCo auxiliary layer of 16 nm thickness, a TbFeCo memory layer of 30 nm thickness and an SiN protective layer of 70 nm thickness were formed on a polycarbonate substrate in the order named, thus obtaining a sample with a structure shown in FIG. 62.

The composition of the GdFeCo reproduction layer was set to represent a RE rich layer at room temperature, a saturation magnetization Ms of 170 emu/cc, a compensation temperature of 205° C. and a Curie temperature of 300° C. or more.

The composition of the TbFeCo first intermediate layer was set to represent a TM rich layer at room temperature, a saturation magnetization Ms of −180 emu/cc and a Curie temperature of 145° C.

The composition of the GdFeCo second intermediate layer was set to represent a TM rich layer at room temperature, a saturation magnetization Ms of −160 emu/cc and a Curie temperature of 300° C. or more.

The composition of the TbFeCo memory layer was set to represent a TM rich layer at room temperature, a saturation magnetization Ms of −150 emu/cc and a Curie temperature of 230° C.

Subsequently, using this magneto-optical recording medium, the recording/reproduction characteristic was evaluated as in Experimental Example 42. Before reproduction, an initializing magnetic field of 3,000 Oe in a perpendicular direction was applied to the medium. The results are shown in Tables 10 to 14.

Now, the known super-resolution magneto-optical recording medium was prepared, and an evaluation thereof was performed in the same manner as in the foregoing experimental examples.

Comparative Example 16

First, a medium the same as that described in Japanese Patent Application Laid-open No. 3-93056 was prepared and evaluated.

Using the same film forming apparatus and method as in Experimental Example 42, an SiN interference layer of 90 nm thickness, a GdFeCo reproduction layer of 30 nm thickness, a TbFeCoAl intermediate layer of 10 nm thickness, a TbFeCo memory layer of 40 nm thickness and an SiN protective layer of 70 nm thickness were formed on a glass substrate in the order named, thus forming the magneto-optical recording medium of Comparative Example 16.

The composition of the GdFeCo reproduction layer was set to represent a TM rich layer at room temperature, an Ms of −180 emu/cc and a Curie temperature of 300° C. or more.

The composition of the TbFeCoAl intermediate layer was set to represent a TM rich layer at room temperature, an Ms of −160 emu/cc and a Curie temperature of 140° C.

The composition of the TbFeCo memory layer was set to represent a TM rich layer at room temperature, an Ms of −240 emu/cc and a Curie temperature of 260° C.

Subsequently, using this magneto-optical recording medium, the recording/reproduction characteristic was measured as in Experimental Example 42. In this case, however, upon reproduction, a reproducing magnetic field was applied to the medium in a perpendicular direction, by changing the magnitude of the reproducing magnetic field between 0 Oe, 200 Oe and 400 Oe. The results are shown in Tables 10 to 14. The conventional non-super-resolution medium, such as, the medium having only the memory layer, showed data similar to the reproduction characteristic (C/N, crosstalk) obtained in the medium of this comparative example when the reproducing magnetic field is 0.

Comparative Example 17

Next, a medium the same as that described in Japanese Patent Application Laid-open No. 3-255946 was prepared and evaluated. In this case, the intermediate layer was divided into two layers for improving the characteristic.

Using the same film forming apparatus and method as in Experimental Example 42, an SiN interference layer of 90 nm thickness, a GdFeCo reproduction layer of 30 nm thickness, a TbFeCoAl first intermediate layer of 10 nm thickness, a GdFeCo second intermediate layer of 16 nm, a TbFeCo memory layer of 40 nm thickness and an SiN protective layer of 70 nm thickness were formed on a glass substrate in the order named, thus forming the magneto-optical recording medium of Comparative Example 17.

The composition of the GdFeCo reproduction layer was set to represent a TM rich layer at room temperature, an Ms of −160 emu/cc and a Curie temperature of 300° C. or more. The composition of the TbFeCoAl first intermediate layer was set to represent a TM rich layer at room temperature, an Ms of −160 emu/cc and a Curie temperature of 140° C.

The composition of the GdFeCo second intermediate layer was set to represent a TM rich layer at room temperature, an Ms of −160 emu/cc and a Curie temperature of 280° C.

The composition of the TbFeCo memory layer was set to represent a TM rich layer at room temperature, an Ms of −240 emu/cc and a Curie temperature of 260° C.

Subsequently, using this magneto-optical recording medium, the recording/reproduction characteristic was measured as in Experimental Example 42. In this case, however, prior to reproduction, an initializing magnetic field of 3,000 Oe in a perpendicular direction was applied to the medium, and a reproducing magnetic field was applied to the medium by changing the magnitude of the reproducing magnetic field between 0 Oe, 200 Oe and 400 Oe. The results are shown in Tables 10 to 14.

According to the measurement results of the foregoing Experimental Examples 42 to 44, particularly to the measurement results with the short mark lengths, in any of the media, the high C/N ratios were obtained with the short mark lengths without applying the reproducing magnetic field. Further, the improvement in crosstalk was also observed along with C/N. On the other hand, in the medium of Comparative Example 16, a sufficiently high C/N ratio was not obtained without applying the reproducing magnetic field of 400 Oe. Further, the crosstalk showed the bad results. On the other hand, in the medium of Comparative Example 17, no improvement in C/N and crosstalk was observed without applying the sufficient reproducing magnetic field.

Accordingly, in the magneto-optical recording medium of the present invention, both the C/N ratio and the crosstalk can be improved without applying the reproducing magnetic field or without applying the reproducing magnetic field. Thus, both the line recording density and the track density can be improved.

TABLE 10

| | Reproduction Layer | | | |
|---|---|---|---|---|
| | Composition at % | Film Thickness Å | Ms emu/cc | Tcomp ° C. | Tc ° C. |
| Experimental Example 42 | Gd26(Fe61Co39)74 | 400 | 108 | 160 | 300< |
| Experimental Example 43 | Gd28(Fe65Co35)72 | 400 | 160 | 180 | 300< |
| Experimental Example 44 | Gd28(Fe60Co40)72 | 400 | 170 | 205 | 300< |
| Comparative Example 16 | Gd20(F375Co25)80 | 300 | −180 | — | 300< |
| Comparative Example 17 | Gd21(Fe75Co25)79 | 300 | −160 | — | 300< |

TABLE 11

| | Intermediate Layer or First Intermediate Layer | | | | |
|---|---|---|---|---|---|
| | Composition at % | Film Thickness Å | Ms emu/cc | Tcomp ° C. | Tc ° C. |
| Experimental Example 42 | Gd38Fe62 | 150 | 420 | — | 190 |
| Experimental Example 43 | Tb18(Fe84Co10Cr6)82 | 110 | −160 | — | 150 |
| Experimental Example 44 | Tb20(Fe96Co4)80 | 110 | −180 | — | 145 |
| Comparative Example 16 | Tb18(Fe90Co5A15)82 | 100 | −160 | — | 140 |
| Comparative Example 17 | Tb18(Fe90Co5A15)82 | 100 | −160 | — | 140 |

TABLE 12

| | Second Intermediate Layer | | | | |
|---|---|---|---|---|---|
| | Composition at % | Film Thickness Å | Ms emu/cc | Tcomp ° C. | Tc ° C. |
| Experimental Example 43 | Gd22(Fe60Co40)78 | 150 | −160 | — | 300< |
| Experimental Example 44 | Gd21(Fe60Co40)79 | 160 | −160 | — | 300< |
| Comparative Example 17 | Gd22(Fe60Co40)78 | 160 | −160 | — | 280 |

TABLE 13

| | Memory Layer | | | | |
|---|---|---|---|---|---|
| | Composition at % | Film Thickness Å | Ms emu/cc | Tcomp ° C. | Tc ° C. |
| Experimental Example 42 | Tb20(Fe80Co20)80 | 300 | −240 | — | 260 |
| Experimental Example 43 | Tb20(Fe80Co20)80 | 300 | −240 | — | 260 |
| Experimental Example 44 | Tb20(Fe80Co20)80 | 300 | −240 | — | 260 |
| Comparative Example 16 | Tb20(Fe80Co20)80 | 300 | −240 | — | 260 |
| Comparative Example 17 | Tb20(Fe80Co20)80 | 300 | −240 | — | 260 |

TABLE 14

| | Initializing Magnetic Field Oe | Reproducing Magnetic Field Oe | C/N | | | Crosstalk |
|---|---|---|---|---|---|---|
| | | | 0.78 μm dB | 0.40 μm dB | 0.30 μm dB | 0.78 μm dB |
| Experimental Example 42 | 3000 | 0 | 48 | 41 | 33 | −30 |
| Experimental Example 43 | 3000 | 0 | 48 | 44 | 38 | −37 |
| Experimental Example 44 | 3000 | 0 | 49 | 45 | 38 | −36 |
| Comparative Example 16 | 0 | 0 | 48 | 18 | 5 | −12 |
| | 0 | 200 | 48 | 30 | 18 | −13 |
| | 0 | 400 | 48 | 45 | 36 | −19 |
| Comparative Example 17 | 3000 | 0 | 48 | 21 | 2 | −15 |
| | 3000 | 200 | 48 | 30 | 20 | 19 |
| | 3000 | 400 | 48 | 45 | 34 | −39 |

(Sixth Embodiment)

In the foregoing embodiments, the information in the memory layer is transferred to the reproduction layer in the medium-temperature region or in the low-temperature and medium-temperature regions, using the exchange-coupling force. On the other hand, in the sixth embodiment, the information in the memory layer is transferred to the reproduction layer in those regions, using the magnetostatic coupling force.

Hereinbelow, a magneto-optical recording medium according to the sixth preferred embodiment of the present invention and an information reproducing method using the medium will be described in detail hereinbelow with reference to the accompanying drawings.

Figure 63A:
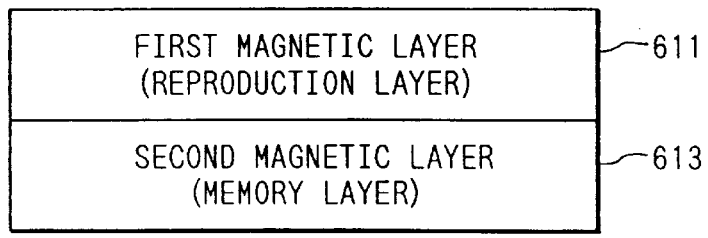
FIGS. 63A and 63B are diagrams showing the basic layer structure of magnetic layers of a magneto-optical recording medium according to a sixth embodiment of the present invention.

The magneto-optical recording medium of the present invention has, on a translucent substrate, at least two magnetic layers, that is, a reproduction layer and a memory layer being a perpendicular magnetization film (FIG. 63A).

The reproduction layer is a layer for reproducing magnetization information held in the memory layer. The reproduction layer is located closer to a light incident side as compared with the memory layer, and its Curie temperature is set to be higher than that of the memory layer for preventing deterioration of the Kerr rotation angle upon reproduction. Further, it is necessary that the coercive force of the reproduction layer is smaller than that of the memory layer. Moreover, it is necessary that the reproduction layer has a compensation temperature between room temperature and the Curie temperature of the memory layer. This is because, in the present medium, upon reproduction, the high-temperature region within the light spot is increased to a temperature which exceeds the compensation temperature of the reproduction layer, so as to form the rear mask for performing the super-resolution reproduction. Accordingly, if the Curie temperature of the memory layer is equal to or lower than the compensation temperature of the reproduction layer, the magnetization information of the memory layer is damaged upon reproduction so that the effect of the present invention can not be achieved. The Curie temperature of the memory layer is set to be higher than the compensation temperature of the reproduction layer, preferably, by 10° C. or more, and more preferably, by 20° C. or more. On the other hand, if it is set to be too high, the recording by the laser beam can not be easily performed. In view of this, the Curie temperature of the memory layer is set to be, preferably, no more than 280° C., and more preferably, no more than 240° C. In other words, the compensation temperature of the reproduction layer is set to be, preferably, no more than 270° C., and more preferably, no more than 230° C.

On the other hand, the magnetization manner of the reproduction layer is such that the reproduction layer is a perpendicular magnetization film at room temperature and between room temperature and its Curie temperature, or the reproduction layer is an in-plane magnetization film at room temperature and becomes a perpendicular magnetization film between room temperature and its compensation temperature. As a specific material of the reproduction layer, a material, for example, a rare earth-iron family amorphous alloy, such as, GdFeCo, GdTbFeCo, GdDyFeCo, NdGdFeCo or the like, mainly containing GdFeCo, is preferable since it has a high Curie temperature and a low coercive force and easily causes contraction of recorded magnetic domains in a high-temperature region, which is the prime aim of the present medium.

When using GdFeCo for the reproduction layer, the compensation temperature largely depends on, particularly, the composition of rare earth element (Gd). Thus, when using a magnetic layer mainly containing GdFeCo as the reproduction layer, it is preferable that the Gd content is set to be 24 to 35 at %.

The memory layer is a layer for storing recorded information and thus is required to stably hold the magnetic domains. As a material of the memory layer, a material which has a large perpendicular magnetic anisotropy and can stably hold a magnetization state, for example, a rare earth-iron family amorphous alloy, such as, TbFeCo, DyFeCo, TbDyFeCo or the like, is preferable.

Further, it is necessary that the compensation temperature of the memory layer is set to be, at least, lower than the temperature where the reproduction layer is magnetostatically coupled with the memory layer. This is because, in the present invention, since, upon reproduction, a high-temperature region within the light spot is increased to a temperature which exceeds the compensation temperature of the reproduction layer, so as to invert the net magnetization of the reproduction layer in an opposite direction as compared with the reproduction layer at an aperture region, thereby causing the reproduction layer and the memory layer to be in an anti-magnetostatic coupling state to form the rear mask, it is necessary for the memory layer to hold the same magnetization state in a transfer region and a rear mask region.

For example, when using ferromagnetic rare earth-iron family element amorphous alloy films for the reproduction layer and the memory layer, it may be arranged that the reproduction layer is rare earth element sublattice magnetization dominant at room temperature and the memory layer is iron family element sublattice magnetization dominant at room temperature, or both the reproduction layer and the memory layer are rare earth element sublattice magnetization dominant at room temperature. Since it is easy to realize the foregoing structure by using the ferromagnetic rare earth-iron family element amorphous alloy film, this film is preferable for the medium of the present invention.

Figure 63B:
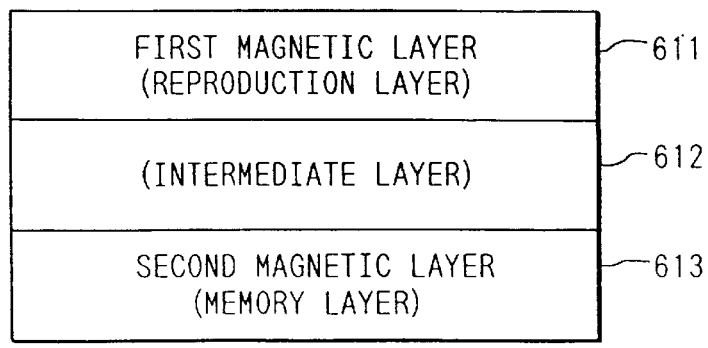

Between the foregoing reproduction and memory layers, the exchange-coupling force is cut off and the magnetostatic coupling force is exerted over a temperature range from room temperature to a high temperature. For realizing this, it is necessary that the reproduction layer is rare earth element sublattice magnetization dominant at room temperature and the memory later is iron family element sublattice magnetization dominant at room temperature. Further, for cutting off the exchange-coupling force working between the reproduction layer and the memory layer over the temperature range from room temperature to a high temperature, it is effective to prevent the exchange-coupling force from acting at the interface by the plasma processing after formation of the reproduction layer and until formation of the memory layer, or to provide an intermediate layer between the reproduction layer and the memory layer for cutting off the exchange-coupling force (FIG. 63B). A non-metal layer, such as, a dielectric, a non-magnetic metal layer, a magnetic layer formed of an in-plane magnetization film or the like is preferable as the intermediate layer. By providing such an intermediate layer, the exchange force can be cut off more reliably as compared with the foregoing plasma processing method.

An element, such as, Al, Ti, Pt, Nb, Cr or the like may be added to the reproduction layer and the memory layer for improving their corrosion resistances. For enhancing the interference effect and the protective performance, a dielectric layer formed of $SiN_x$, $AlO_x$, $TaO_x$, $SiO_x$ or the like may be provided in addition to the foregoing reproduction and memory layers. Further, for improving thermal conductivity, a layer formed of Al, AlTa, AlTi, TlCr, Cu or the like and having good thermal conductivity may be provided. Further, an initialization layer in which magnetization is aligned in one direction for performing the optical modulation overwrite may be provided. Further, auxiliary layers for recording assistance and reproducing assistance may be provided to adjust the exchange-coupling force or the magnetostatic coupling force. Moreover, a protective coat formed of the foregoing dielectric layer or a polymer resin may be added as a protective film.

Since the recording process of this embodiment is the same as that in the foregoing embodiments, an explanation thereof will be omitted for brevity.

Now, the reproduction process of the present invention will be described hereinbelow.

In the present invention, magnetic super resolution is realized by apparently and optically masking a partial region within the light spot without applying the external magnetic field. FIGS. 65A, 65B and 65C are diagrams showing a process, wherein the recorded magnetic domain of the reproduction layer transferred from the memory layer (hereinbelow simply referred to as "recorded magnetic domain") is contracted in the high-temperature region while the light spot moves. For brevity, in FIGS. 65A to 65C, the contracting process of only one recorded magnetic domain is shown. Further, in these figures, a rare earth-iron family ferromagnetic substance is used as a magnetic material, blank arrows 630 represent the whole magnetization, black arrows 631 represent the iron family sublattice magnetization, the reproduction layer 611 is an RE rich magnetic layer and the memory layer 613 is a TM rich magnetic layer. On the other hand, in FIGS. 64A to 64C, the whole image upon reproduction is shown along with the temperature distribution. In FIG. 64B, blank arrows represent the whole magnetization and black arrows represent the iron family sublattice magnetization, like in FIGS. 65A to 65C.

The temperature distribution of the medium is shifted from the center of the light spot in a direction opposite to the moving direction of the light spot due to the limit of thermal conductivity. As shown in FIG. 65A, shortly after the light spot 602 has reached the recorded magnetic domain 601, the recorded magnetic domain 601 does not reach the high-temperature region 605. In addition to a magnetic field Hst due to the magnetostatic coupling force from the memory layer 613, an effective magnetic field Hwb due to the Bloch magnetic wall energy and a static magnetic field Hleak from another region of the reproduction layer are applied to the recorded magnetic domain 601. Hst works to stably hold the recorded magnetic domain 601 of the reproduction layer, while Hwb applies a force in a direction to contract the recorded magnetic domain. Accordingly, in order for the reproduction layer 611 to be stably transferred with the magnetization of the memory layer 613, a condition expressed by relation (39) should be satisfied before the recorded magnetic domain 601 reaches the high-temperature region 605.

$$|Hwb \pm Hleak| < Hcl + Hst(T < Th\text{-mask}) \qquad (39)$$

Figure 66:
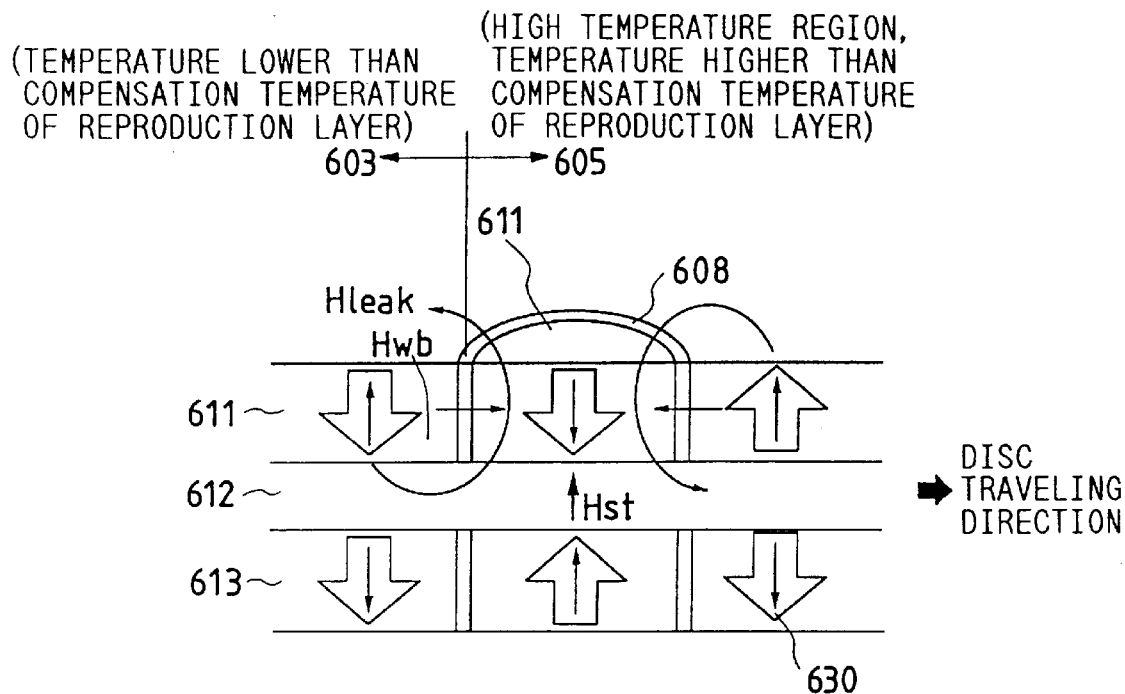
FIG. 66 is a diagram showing static magnetic fields Hleak, Hst and an effective magnetic field Hwb due to a Bloch magnetic wall energy, which are applied to a recorded magnetic domain transferred to a reproduction layer.

If the Bloch magnetic wall energy is ρwb and a radius of the recorded magnetic domain 601 of the reproduction layer 611 is r, Hwb is expressed by relation (40) and works in a direction to contract the recorded magnetic domain 601 (FIG. 66).

$$Hwb = \rho wb/2\ Mslr \qquad (40)$$

When the light spot further moves so that the recorded magnetic domain 601 enters the high-temperature region where the temperature reaches a point equal to or higher than the compensation temperature of the reproduction layer, the net magnetization of the reproduction layer reverses its orientation. As result, the recorded magnetic domain is applied with an anti-parallel magnetostatic force from the memory layer. Accordingly, Hst works to invert the recorded magnetic domain like Hwb. FIG. 66 shows the state of the magnetic field applying to the magnetic domain just before contraction. Practically, the magnetic wall moves from the high-temperature side to cause contraction of the magnetic domain as shown in FIG. 66. Accordingly, relation (41) is established so that the Bloch magnetic wall 608 of the recorded magnetic domain 601 moves in a direction to contract the magnetic domain.

$$Hwb+Hst\pm Hleak>Hal(T>Th-\text{mask}) \quad (41)$$

As shown in FIG. 65B, when entering the high-temperature region 605, the recorded magnetic domain 601 contracts to be inverted so that, finally, as shown in FIG. 65C, the magnetization is all aligned in the erasing direction. "Th–mask" shown in relations (40) and (41) and in FIG. 64C is equal to the compensation temperature of the reproduction layer.

Further, the static magnetic field Hst from the memory layer 613 also works on the magnetization in the erasing direction. However, if the magnetization in the erasing direction is inverted by Hst, a magnetic wall is formed over an extensive range of the high-temperature region 605 so that the magnetic wall energy is largely increased. Accordingly, the magnetization inversion does not occur, and the magnetization in the erasing direction is held. Thus, in the high-temperature region 605, a region is generated in which magnetization is always oriented in the erasing direction. This region becomes the rear mask 605. If a radius of the inverted magnetic domain is R, the effective magnetic field Hwb' of the Bloch magnetic wall energy in case of the erasing magnetization being inverted is expressed by relation (42).

$$Hwb'=\rho wb/2MsIR \quad (42)$$

Thus, the condition that the erasing magnetization is not inverted by Hst is expressed by relation (43).

$$Hwb'>Hst \quad (43)$$

Figure 64A:
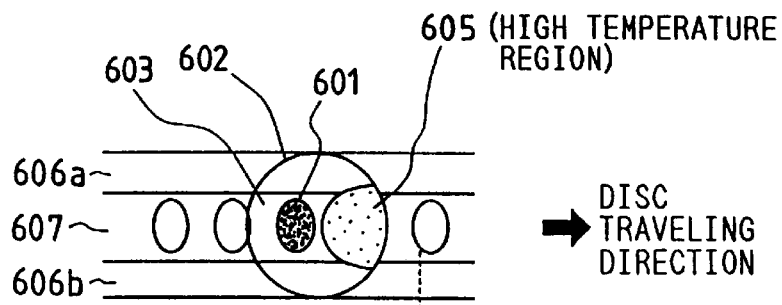
Figure 64B:
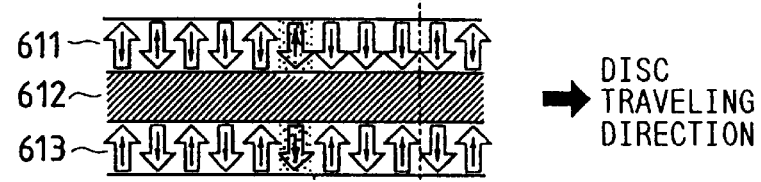
Figure 64C:
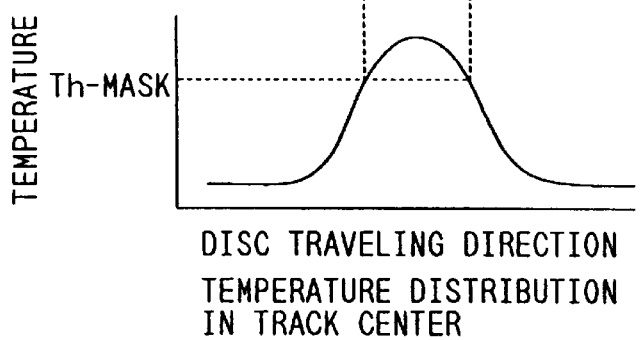
Figure 65A:
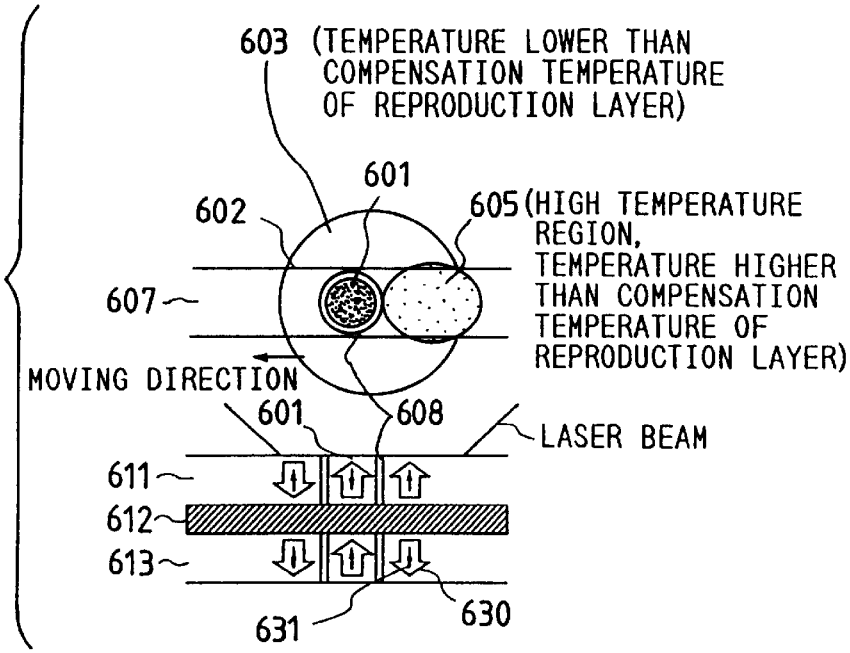
FIGS. 65A to 65C are diagrams for explaining a principle in which a high-temperature region in a light spot is masked in the magneto-optical recording medium according to the sixth embodiment of the present invention.
Figure 65B:
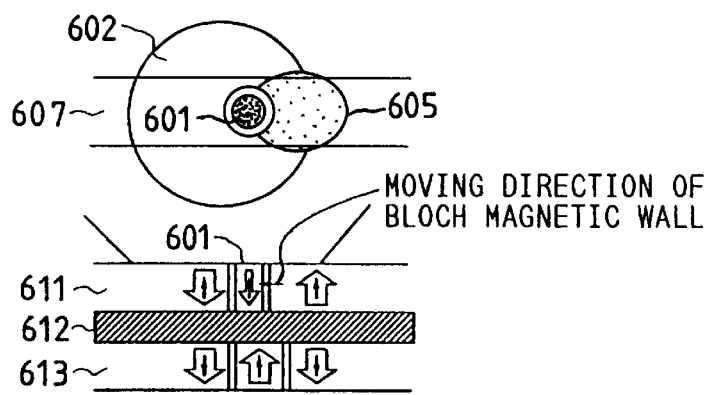
Figure 65C:
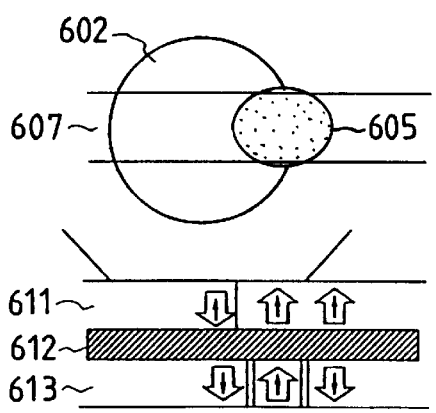

Specifically, as shown in FIGS. 64A to 64C, since the reproduction layer 611 always becomes a perpendicular magnetization film oriented in the erasing direction at the high-temperature region 605 within the light spot 602, thus serving as an optical mask (rear mask 605). Accordingly, as shown in FIG. 64A, the light spot 602 is apparently narrowed to a region excluding the high-temperature region 605 and serving as the aperture region 603 so that the recorded magnetic domain (recorded mark) having a period equal to or smaller than the detection limit can be detected.

In the foregoing, the light spot region other than the high-temperature region becomes the aperture region. On the other hand, when the reproduction layer is formed of a magnetic layer which, in addition to the foregoing condition, is an in-plane magnetization film at room temperature and becomes a perpendicular magnetization film between room temperature and the compensation temperature, not only the high-temperature region in the light spot, but also the low-temperature region in the light spot can be masked.

Specifically, in the low-temperature region where a temperature is around room temperature, the magnetization information of the memory layer is masked by the reproduction Layer in the form of an in-plane magnetization film.

On the other hand, in the medium-temperature region where the reproduction layer becomes a perpendicular magnetization film, the magnetization information of the memory layer is transferred to the reproduction layer due to the magnetostatic coupling so as to be reproduced. Further, in the high-temperature region, the magnetization information of the memory layer is masked through the foregoing mechanism. The super resolution of such a double-mask type can improve not only the line recording density, but also the track density.

The present invention will be described in further detail by way of experimental examples. However, the present invention is not limited to these experimental examples.

First, a magneto-optical recording medium in which a reproduction layer is a perpendicular magnetization film at room temperature and between room temperature and a Curie temperature was prepared and evaluated, which will be described in the following Experimental Examples 45 and 46.

Experimental Example 45

Si, Gd, Tb, Fe and Co targets were attached to a DC magnetron sputtering apparatus, and a glass substrate having a diameter of 130 mm and a polycarbonate substrate with lands and grooves were fixed to a substrate holder which was set at a position separated from the respective targets by a distance of 150 mm. Thereafter, the interior of the chamber was evacuated by a cryopump to a high vacuum of $1\times10^{-5}$ Pa or less. During the evacuation, Ar gas was introduced into the chamber to 0.4 Pa, and thereafter, an SiN interference layer of 90 nm thickness, a GdFeCo reproduction layer of 40 nm thickness, an SiN intermediate layer of 10 nm thickness, a TbFeCo memory layer of 35 nm thickness and an SiN protective layer of 70 nm thickness were formed in the order named, thus forming the magneto-optical recording medium of the present invention with a structure shown in FIG. 67. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.1.

The composition of the GdFeCo reproduction layer was $Gd_{24}(Fe_{68}Co_{32})_{76}$ and represented a RE rich layer at room temperature, an Ms of 120 emu/cc, a compensation temperature of 200° C. and a Curie temperature of 300° C. or more. This reproduction layer was a perpendicular magnetization film at room temperature.

The composition of the TbFeCo memory layer was $Tb_{20}(Fe_{80}Co_{20})_{80}$ and represented a TM rich layer at room temperature, an Ms of –230 emu/cc and a Curie temperature of 250° C.

Evaluation was performed in the following manner using the present medium.

First, after recording a magnetic domain of a 0.78 μm mark length in the magneto-optical recording medium, the magnetic domain was observed by a polarizing microscope under irradiation of a semiconductor laser beam of 780 nm. While increasing the laser power, it was confirmed that the transferred recorded magnetic domain contracted and the magnetization was oriented in an erasing direction at the center (high-temperature region) of the light spot at a certain laser power.

Subsequently, the recording/reproduction characteristic was measured using this magneto-optical recording medium. The measurement was performed by setting the N.A. of an objective lens to be 0.55, the laser beam wavelength to be 780 nm, the recording power to be in a range of 7 to 13 mW and a reproducing power to be in a range of 3.0 to 4.0 mW, so as to provide the highest C/N ratio. The linear velocity was set to be 9 m/s. First, erasing was performed entirely on the medium, and thereafter, carrier signals of 5.8 MHz, 11.3 MHz and 15 MHz (corresponding to mark lengths 0.78 μm, 0.40 μm and 0.30 μm, respectively) were recorded in the memory layer so as to examine the mark-length dependency of C/N.

Subsequently, crosstalk with the adjacent tracks (hereinafter referred to as "crosstalk") was measured. Specifically, after recording a signal of a 0.78 μm mark length on the land as in the foregoing manner and measuring the carrier level C1, the carrier level C2 was similarly measured upon tracking the adjacent groove where data had been erased, and crosstalk was represented by a ratio (C2/C1). Since the experiment was performed on the assumption that data were recorded on both the land and groove, an effective track pitch was 0.8 μm.

Both the C/N ratios and the crosstalk were measured without applying an initializing magnetic field and a reproducing magnetic field. The results are shown in Table 15. It is seen that, although the crosstalk was not improved, a high value was obtained for C/N with the short mark length.

Experimental Example 46

A magneto-optical recording medium the same as that in Experimental Example 45 was prepared, except that the intermediate layer was omitted and that the memory layer was formed after the substrate was plasma-processed (the substrate was reverse-sputtered with RF of 300W) with a very small amount of $O_2$ gas being introduced after formation of the reproduction layer. Also in this medium, the exchange coupling between the reproduction layer and the memory layer was cut off so that the super resolution effect was achieved without using the reproducing magnetic field. This magneto-optical recording medium was evaluated as in Experimental Example 45. The results are shown in Table 15. It is seen that, although the crosstalk was not improved, a high value was obtained for C/N with the short mark length.

Experimental Example 47

Figure 67:
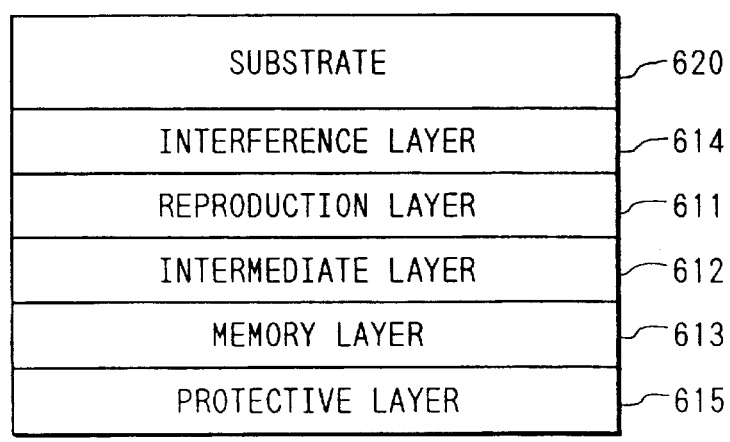
FIG. 67 is a diagram showing an example of the layer structure of the magneto-optical recording medium according to the sixth embodiment of the present invention.

Using the same apparatus and method as in Experimental Example 45, an SiN interference layer of 90 nm thickness, a GdFeCo reproduction layer of 40 nm thickness, an SiN intermediate layer of 10 nm thickness, a TbFeCo memory layer of 35 nm thickness and an SiN protective layer of 70 nm thickness were formed on a polycarbonate substrate in the order named, thus obtaining the magneto-optical recording medium of the present invention with a structure shown in FIG. 67. Upon formation of each SiN dielectric layer, $N_2$ gas was introduced in addition to the Ar gas, and the SiN layer was formed by DC reactive sputtering, adjusting the mixing ratio of the Ar and $N_2$ gases, so as to obtain a refractive index of 2.1.

The composition of the GdFeCo reproduction layer was $Gd_{28}(Fe_{60}Co_{40})_{72}$ and represented a RE rich layer at room temperature, an Ms of 220 emu/cc, a compensation temperature of 217° C. and a Curie temperature of 300° C. or more. This reproduction layer was an in-plane magnetization film at room temperature and became a perpendicular magnetization film at about 140° C.

The composition of the TbFeCo memory layer was $Tb_{20}(Fe_{80}Co_{20})_{80}$ and represented a TM rich layer at room temperature, an Ms of −230 emu/cc and a Curie temperature of 250° C.

This magneto-optical recording medium was evaluated as in Experimental Example 45. The results are shown in Table 15. It is seen that, since the low-temperature region was masked by an in-plane magnetization film, the crosstalk was also improved along with C/N.

Now, the known super-resolution magneto-optical recording medium was prepared, and an evaluation thereof was performed in the same manner as in the foregoing experimental examples.

Comparative Example 18

First, a medium the same as that described in Japanese Patent Application Laid-open No. 3-93056 was prepared and evaluated.

Using the same film forming apparatus and method as in Experimental Example 45, an SiN interference layer of 90 nm thickness, a GdFeCo reproduction layer of 30 nm thickness, a TbFeCoAl intermediate layer of 10 nm thickness, a TbFeCo memory layer of 40 nm thickness and an SiN protective layer of 70 nm thickness were formed on a glass substrate in the order named, thus forming the magneto-optical recording medium of Comparative Example 18.

The composition of the GdFeCo reproduction layer was set to represent a TM rich layer at room temperature, an Ms of −180 emu/cc and a Curie temperature of 300° C. or more.

The composition of the TbFeCoAl intermediate layer was set to represent a TM rich layer at room temperature, an Ms of −160 emu/cc and a Curie temperature of 140° C.

The composition of the TbFeCo memory layer was set to represent a TM rich layer at room temperature, an Ms of −150 emu/cc and a Curie temperature of 250° C.

Subsequently, using this magneto-optical recording medium, the recording/reproduction characteristic was measured as in Experimental Example 45. In this case, however, upon reproduction, a reproducing magnetic field was applied to the medium in a perpendicular direction, by changing a magnitude of the reproducing magnetic field between 0 Oe, 200 Oe and 400 Oe. The results are shown in Table 15.

Comparative Example 19

Next, a medium the same as that described in Japanese Patent Application Laid-open No. 3-255946 was prepared and evaluated.

Using the same film forming apparatus and method as in Experimental Example 45, an SiN interference layer of 90 nm thickness, a GdFeCo reproduction layer of 30 nm thickness, a TbFeCoAl intermediate layer of 10 nm thickness, a GdFeCo auxiliary layer of 16 nm, a TbFeCo memory layer of 40 nm thickness and an SiN protective layer of 70 nm thickness were formed on a glass substrate in the order named, thus obtaining the magneto-optical recording medium of Comparative Example 19.

The composition of the GdFeCo reproduction layer was set to represent a TM rich layer at room temperature, an Ms of −160 emu/cc and a Curie temperature of 300° C. or more.

The composition of the TbFeCoAl intermediate layer was set to represent a TM rich layer at room temperature, an Ms of −160 emu/cc and a Curie temperature of 140° C.

The composition of the GdFeCo auxiliary layer was set to represent a TM rich layer at room temperature, an Ms of −160 emu/cc and a Curie temperature of 280° C.

The composition of the TbFeCo memory layer was set to represent a TM rich layer at room temperature, an Ms of −150 emu/cc and a Curie temperature of 250° C.

Subsequently, using this magneto-optical recording medium, the recording/reproduction characteristic was measured as in Experimental Example 45. In this case, however, prior to reproduction, an initializing magnetic field in a perpendicular direction was applied to the medium by changing the magnitude of the initializing magnetic field between 0 Oe, 1,000 Oe and 2,000 Oe, and a reproducing magnetic field was applied to the medium by changing the magnitude of the reproducing magnetic field between 0 Oe, 200 Oe and 400 Oe. The results are shown in Table 15.

Accordingly, in the magneto-optical recording medium of the present invention, the C/N ratio or both the C/N ratio and the crosstalk can be improved without applying the reproducing magnetic field or without applying both the initializing magnetic field and the reproducing magnetic field. Thus, the line recording density or both the line recording density and the track density can be improved.

TABLE 15

| | Initializing Magnetic Field Oe | Reproducing Magnetic Field Oe | C/N | | | Crosstalk |
| --- | --- | --- | --- | --- | --- | --- |
| | | | 0.78 μm dB | 0.40 μm dB | 0.30 μm dB | 0.78 μm dB |
| Experimental Example 45 | 0 | 0 | 48 | 44 | 35 | −15 |
| Experimental Example 46 | 0 | 0 | 48 | 41 | 33 | −14 |
| Experimental Example 47 | 0 | 0 | 49 | 44 | 35 | −30 |
| Comparative Example 18 | 0 | 0 | 48 | 18 | 5 | −12 |
| | 0 | 200 | 48 | 30 | 18 | −13 |
| | 0 | 400 | 48 | 44 | 36 | −19 |
| Comparative Example 19 | 0 | 0 | 48 | 21 | 2 | −15 |
| | 1000 | 400 | 48 | 26 | 8 | −17 |
| | 2000 | 400 | 48 | 29 | 13 | −19 |
| | 3000 | 200 | 48 | 30 | 20 | 19 |
| | 3000 | 400 | 48 | 44 | 34 | −30 |

What is claimed is:

1. A magneto-optical recording medium comprising:
a substrate;
a first magnetic layer laminated on said substrate, said first magnetic layer contributing to the reproduction of information;
a second magnetic layer laminated on said first magnetic layer for storing information; and
a third magnetic layer disposed between said first and second magnetic layers and having a Curie temperature lower than the Curie temperatures of said first and second magnetic layers,
wherein the following condition is satisfied among said magnetic layers at a temperature of the Curie temperature of said third magnetic layer and higher:

$$H_{wb} - H_d > H_{c1} + H_{wi}$$

where $H_{wb}$ is the effective magnetic field due to the Bloch magnetic wall energy of a recording domain of said first magnetic layer, $H_d$ is a static magnetic field applied to the recording domain of said first magnetic layer, $H_{c1}$ is the coercive force of said first magnetic layer, and $H_{wi}$ is the exchange-coupling force applied to the recording domain of said first magnetic layer from said third magnetic layer.

2. The magneto-optical recording medium as set forth in claim 1, wherein said first magnetic layer has a compensation temperature between room temperature and its Curie temperature.

3. The magneto-optical recording medium as set forth in claim 1, wherein said first magnetic layer is an in-plane magnetization film at room temperature and becomes a perpendicular magnetization film when increased in temperature.

4. The magneto-optical recording medium as set forth in claim 1, wherein said first magnetic layer is a perpendicular magnetization film over a range from room temperature to its Curie temperature.

5. The magneto-optical recording medium as set forth in claim 2, wherein the Curie temperature of said second magnetic layer is lower than the Curie temperature of said first magnetic layer.

6. The magneto-optical recording medium as set forth in claim 2, wherein the Curie temperature of said third magnetic layer is around the compensation temperature of said first magnetic layer.

7. The magneto-optical recording medium as set forth in claim 3, wherein a film thickness of said first magnetic layer is no less than 20 nm and no more than 100 nm.

8. The magneto-optical recording medium as set forth in claim 3, wherein a film thickness of said third magnetic layer is no less than 3 nm and no more than 30 nm.

9. The magneto-optical recording medium as set forth in claim 3, wherein said first magnetic layer is mainly formed of GdFeCo.

10. The magneto-optical recording medium as set forth in claim 3, wherein said third magnetic layer is mainly formed of one of GdFe and GdFeCo.

11. The magneto-optical recording medium as set forth in claim 3, wherein said third magnetic layer is an in-plane magnetization film at room temperature and becomes a perpendicular magnetization film when increased in temperature.

12. The magneto-optical recording medium as set forth in claim 11, wherein an in-plane anisotropy of said third magnetic layer at room temperature is greater than an in-plane anisotropy of said first magnetic layer at room temperature.

13. The magneto-optical recording medium as set forth in claim 1, wherein each of said first and second magnetic layers is formed of a ferrimagnetic rare earth-iron family element amorphous alloy.

14. The magneto-optical recording medium as set forth in claim 13, wherein said first magnetic layer is rare earth rich at room temperature and said second magnetic layer is iron family rich at room temperature, and vice versa.

15. The magneto-optical recording medium as set forth in claim 9, wherein said first magnetic layer has the following composition:
$Gd_x(Fe_{100-y}Co_y)_{100-x}$, wherein $24 \leq x \leq 32$ and $20 \leq y \leq 50$.

16. The magneto-optical recording medium as set forth in claim 10, wherein said third magnetic layer has the following composition:
$Gd_x(Fe_{100-y}Co_y)_{100-x}$, wherein $25 \leq x \leq 50$ and $0 \leq y \leq 20$.

17. The magneto-optical recording medium as set forth in claim 1, wherein said second magnetic layer contains one of TbFe, TbFeCo, DyFe and DyFeCo as a main component.

18. The magneto-optical recording medium as set forth in claim 17, wherein said second magnetic layer has the following composition:

$Tb_x(Fe_{100-y}Co_y)_{100-x}$, wherein $14 \leq x \leq 33$ and $14 \leq y \leq 45$.

19. The magneto-optical recording medium as set forth in claim 6, wherein the compensation temperature Tcomp of said first magnetic layer and the Curie temperature T3 of said third magnetic layer satisfy the following relation:

$$-20° C. \leq T\text{comp} - T3 \leq 80° C.$$

20. The magneto-optical recording medium as set forth in claim 1, wherein a saturation magnetization Ms1 of said first magnetic layer satisfies the following relation at room temperature:

$$20 \text{ emu/cc} \leq Ms1 \leq 340 \text{ emu/cc}.$$

21. The magneto-optical recording medium as set forth in claim 1, wherein a saturation magnetization Ms2 of said second magnetic layer satisfies the following relation when being rare earth rich at room temperature:

$$Ms2 \leq 250 \text{ emu/cc}$$

and the following relation when being iron family rich at room temperature:

$$Ms2 \leq 350 \text{ emu/cc}.$$

22. The magneto-optical recording medium as set forth in claim 1, wherein a saturation magnetization Ms3 of said third magnetic layer satisfies the following relation when being rare earth rich at room temperature:

$$Ms3 \leq 700 \text{ emu/cc}$$

and the following relation when being iron family rich at room temperature:

$$Ms3 \leq 150 \text{ emu/cc}.$$

23. The magneto-optical recording medium as set forth in claim 1, wherein the Curie temperature T3 of said third magnetic layer satisfies the following relation:

$$80° C. \leq T3 \leq 220° C.$$

24. The magneto-optical recording medium as set forth in claim 1, wherein a coercive force of said second magnetic layer is greater than a coercive force of said first magnetic layer.

25. The magneto-optical recording medium a set forth in claim 1, wherein said first magnetic layer is a perpendicular magnetization film at a temperature range from room temperature to the Curie temperature thereof and the coercive force of said third magnetic layer is greater than the coercive force of said first magnetic layer.

26. The magneto-optical recording medium as set forth in claim 1, wherein said third magnetic layer cuts off an exchange-coupling force working between said first and second magnetic layers at least at a temperature equal to or higher than room temperature.

27. The magneto-optical recording medium as set forth in claim 1, wherein said third magnetic layer is a perpendicular magnetization film over a range from room temperature to its Curie temperature.

28. An information reproducing method for reproducing information stored in a magneto-optical recording medium which comprises: a substrate; a first magnetic layer laminated on the substrate, and contributing to the reproduction of information; a second magnetic layer laminated on the first magnetic layer for storing information; and a third magnetic layer disposed between the first and second magnetic layers and having a Curie temperature lower than the Curie temperatures of said first and second magnetic layers, wherein the following condition is satisfied among the magnetic layers at a temperature of the Curie temperature of the third magnetic layer and higher, $H_{wb} - H_d > H_{c1} + H_{wi}$ where $H_{wb}$ is the effective magnetic field due to the Block magnetic wall energy of a recording domain of the first magnetic layer, $H_d$ is a static magnetic field applied to the recording domain of the first magnetic layer, $H_{c1}$ is the coercive force of the first magnetic layer, and $H_{wi}$ is the exchange-coupling force applied to the recording domain of the first magnetic layer from the third magnetic layer, said method comprising the steps of:

irradiating a light spot;

raising the temperature of a high temperature region of the light spot to the Curie temperature of the third magnetic layer or higher to thereby orient the magnetization in the high temperature region of the first magnetic layer in one direction;

transferring information stored in said second magnetic layer to said first magnetic layer at least at a medium-temperature region inside the light spot; and reproducing the information by detecting the magneto-optic effect of reflected light of the light spot.

29. The information reproducing method as set forth in claim 28, wherein, in said transferring step, the information stored in said second magnetic layer is transferred to said first magnetic layer via said third magnetic layer due to an exchange-coupling force.

30. The information reproducing method as set forth in claim 28, wherein, in said transferring step, the information stored in said second magnetic layer is transferred to said first magnetic layer due to a magnetostatic coupling force.

31. The information reproducing method as set forth in claim 28, further comprising the step of applying an external magnetic field for initializing magnetization in a low-temperature region within said light spot to align in one direction.

32. A magneto-optical recording medium comprising:

a substrate;

a first magnetic layer laminated on said substrate, said first magnetic layer contributing to the reproduction of information; and a second magnetic layer laminated on said first magnetic layer for storing information, said second magnetic layer being magnetostatically coupled to said first magnetic layer, wherein said first magnetic layer has a compensation temperature between room temperature and the Curie temperature of said second magnetic layer, and the following condition is satisfied among said magnetic layers at a temperature of said compensation temperature of said first magnetic layer and higher:

$$H_{wb} + H_{st} \pm H_{leak} > H_{c1},$$

where $H_{wb}$ is the effective magnetic field due to the Bloch magnetic wall energy of a recording domain of said first magnetic layer, $H_{st}$ is a static magnetic field applied to the recording domain of said first magnetic layer from said second magnetic layer, $H_{leak}$ is a static magnetic field applied to the recording domain from a region other than the recording domain of said first magnetic layer, and $H_{c1}$ is the coercive force of said first magnetic layer.

33. A magneto-optical recording medium according to claim 32, wherein a non-magnetic layer is provided between said first magnetic layer and said second magnetic layer.

34. An information reproducing method for reproducing information stored in a magneto-optical recording medium which comprises a substrate, a first magnetic layer laminated on the substrate and contributing to the reproduction of information; and a second magnetic layer laminated on the first magnetic layer for storing information an being magnetostatically coupled to the first magnetic layer, wherein the Curie temperature of the second magnetic layer, and the following condition is satisfied among the magnetic layers at a temperature of the compensation temperature of the first magnetic layer and higher, $H_{wb}+H_{st}\pm H_{leak}>H_{c1}$, where $H_{wb}$ is the effective magnetic field due to the Block magnetic wall energy of a recording domain of the first magnetic layer, $H_{st}$ is a static magnetic field applied to the recording domain of the first magnetic layer from the second magnetic layer, $H_{leak}$ is a static magnetic field applied to the recording domain from a region other than the recording domain of the first magnetic layer, and $H_{c1}$ is the coercive force of the first magnetic layer, said method comprising the steps of:

irradiating a light spot;

raising the temperature of a high temperature region of the light spot to the compensation temperature of the first magnetic layer or higher to thereby orient the magnetization in the high temperature region of the first magnetic layer in one direction;

transferring information stored in the second magnetic layer to the first magnetic layer at least at a medium-temperature region inside the light spot; and reproducing the information by detecting the magneto-optical effect of reflected light of the light spot.

* * * * *

UNITED STATES PATENT AND TRADEMARK OFFICE
CERTIFICATE OF CORRECTION

PATENT NO. : 6,125,083
DATED : September 26, 2000
INVENTOR(S) : NAOKI NISHIMURA ET AL.

Page 1 of 3

It is certified that error appears in the above-identified patent and that said Letters Patent is hereby corrected as shown below:

ON THE TITLE PAGE [56] References Cited:

FOREIGN PATENT DOCUMENTS,
        "393056   should read  --3-393056
        393058"                     3-393058--.

FIGURE 21:

SHEET 15, "AMPRITUDE" (both occurrences) should read
        --AMPLITUDE--.

COLUMN 15:

Line 37, "Ewb-Ed|" should read --|Ewb-Ed|--; and
    Line 41, "Ewb-Ed|" should read --|Ewb-Ed|--.

COLUMN 20:

Line 25, "look" should read --100Å--.

COLUMN 21:

Line 7, "later" should read --layer--.

COLUMN 25:

Line 51, "awb" should read --$\sigma$wb--.

COLUMN 43:

Line 12, "Lo" should be deleted.

UNITED STATES PATENT AND TRADEMARK OFFICE
CERTIFICATE OF CORRECTION

PATENT NO.  : 6,125,083
DATED       : September 26, 2000
INVENTOR(S) : NAOKI NISHIMURA ET AL.

It is certified that error appears in the above-identified patent and that said Letters Patent is hereby corrected as shown below:

COLUMN 46:

Line 13, "2µm." should read --1 µm.--; and
Line 31, delete "to assistance".

COLUMN 53:

Line 25, "(Fe80Co$_{20}$)$_{80}$" should read --(Fe$_{80}$Co$_{20}$)$_{80}$--.

COLUMN 65:

Line 51, "5" should be deleted.

COLUMN 72:

Line 64, "pw1," should read --σw1,--.

COLUMN 73:

Line 4, "Hw1=pwi/(2Ms1h1)" should read
   --Hw1=σwi/(2Ms1h1)--; and
Line 7, "Hw2-pwi/(2Ms2h2)" should read
   --Hw2=σwi/(2Ms2h2)--.

COLUMN 74:

Line 21, "Hw1'=pwi/(2Ms1h1+2Ms5h5)" should read
   --Hw1'=σwi/(2Ms1h1+2Ms5h5)--.

COLUMN 82:

Line 54, "pwb" should read --σwb--; and
Line 60, "Hwb=pwb/2Ms1r" should read --Hwb=σwb/2Ms1r--.

UNITED STATES PATENT AND TRADEMARK OFFICE
CERTIFICATE OF CORRECTION

PATENT NO.  : 6,125,083
DATED       : September 26, 2000
INVENTOR(S) : NAOKI NISHIMURA ET AL.

It is certified that error appears in the above-identified patent and that said Letters Patent is hereby corrected as shown below:

COLUMN 83:

Line 42, "Hwb'=pwb/2Ms1r" --Hwb=σwb/2Ms1r--; and
Line 67, "Layer" should read --layer--.

COLUMN 89:

Line 53, "a" should read --as--.

COLUMN 91:

Line 16, "an" should read --and--.

Signed and Sealed this

Twenty-second Day of May, 2001

Attest:

NICHOLAS P. GODICI

Attesting Officer        Acting Director of the United States Patent and Trademark Office